US012578837B2

(12) United States Patent
Lemay et al.

(10) Patent No.: US 12,578,837 B2
(45) Date of Patent: Mar. 17, 2026

(54) USER INTERFACES FOR MANAGING SHARING OF CONTENT IN THREE-DIMENSIONAL ENVIRONMENTS

(71) Applicant: Apple Inc., Cupertino, CA (US)

(72) Inventors: Stephen O. Lemay, Palo Alto, CA (US); Christopher D. Mckenzie, Burlingame, CA (US); Matan Stauber, San Francisco, CA (US); Rajat Bhardwaj, Walnut Creek, CA (US); Shih-Sang Chiu, San Francisco, CA (US); Connor A. Smith, San Jose, CA (US); Joseph P. Cerra, San Francisco, CA (US); Willem Mattelaer, San Jose, CA (US); Yonghyun A. Kim, San Francisco, CA (US); Gregory T. Scott, Soquel, CA (US); Lucio Moreno Rufo, San Jose, CA (US); Fredric R. Vinna, San Francisco, CA (US); Brian K. Shiraishi, Belmont, CA (US); So Tanaka, San Pedro, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 18/367,977

(22) Filed: Sep. 13, 2023

(65) Prior Publication Data

US 2024/0103677 A1 Mar. 28, 2024

Related U.S. Application Data

(60) Provisional application No. 63/527,526, filed on Jul. 18, 2023, provisional application No. 63/470,450, (Continued)

(51) Int. Cl.
*G06F 3/04815* (2022.01)
*G06F 3/01* (2006.01)
(Continued)

(52) U.S. Cl.
CPC ...... *G06F 3/04815* (2013.01); *G06F 3/04842* (2013.01); *G06F 3/04845* (2013.01); *G06F 3/017* (2013.01)

(58) Field of Classification Search
None
See application file for complete search history.

(56) References Cited

U.S. PATENT DOCUMENTS

| 102,663 | A | 5/1870 | Dillen |
| 4,761,642 | A | 8/1988 | Huntzinger et al. |
| | | (Continued) | |

FOREIGN PATENT DOCUMENTS

| AU | 2015100713 A4 | 6/2015 |
| CA | 2876587 A1 | 2/2014 |
| | (Continued) | |

OTHER PUBLICATIONS

Corrected Notice of Allowance received for U.S. Appl. No. 18/138,348, mailed on Mar. 26, 2025, 2 pages.
(Continued)

*Primary Examiner* — Linda Huynh
(74) *Attorney, Agent, or Firm* — YHE Law LLP

(57) ABSTRACT

A computer system optionally displays a user interface object that reveals content based on whether the content is private or shared. A computer system optionally displays a user interface object that includes shared content based on whether participants have entitlement to the content. A computer system optionally displays a sharing indicator that indicates that the respective content is shared with one or more other participants.

45 Claims, 37 Drawing Sheets

Related U.S. Application Data filed on Jun. 1, 2023, provisional application No. 63/409,414, filed on Sep. 23, 2022.

(51) Int. Cl.
  G06F 3/04842 (2022.01)
  G06F 3/04845 (2022.01)

(56) References Cited

U.S. PATENT DOCUMENTS

| | | | |
|---|---|---|---|
| 4,885,704 | A | 12/1989 | Takagi et al. |
| 4,896,291 | A | 1/1990 | Gest et al. |
| 5,140,678 | A | 8/1992 | Torres |
| 5,146,556 | A | 9/1992 | Hullot et al. |
| 5,202,961 | A | 4/1993 | Mills et al. |
| 5,227,771 | A | 7/1993 | Kerr et al. |
| 5,229,852 | A | 7/1993 | Maietta et al. |
| 5,237,653 | A | 8/1993 | Noguchi et al. |
| 5,287,447 | A | 2/1994 | Miller et al. |
| 5,333,256 | A | 7/1994 | Green et al. |
| 5,347,295 | A | 9/1994 | Agulnick et al. |
| 5,384,911 | A | 1/1995 | Bloomfield |
| 5,412,776 | A | 5/1995 | Bloomfield et al. |
| 5,416,895 | A | 5/1995 | Anderson et al. |
| 5,428,730 | A | 6/1995 | Baker et al. |
| 5,463,725 | A | 10/1995 | Henckel et al. |
| 5,487,143 | A | 1/1996 | Southgate |
| 5,499,334 | A | 3/1996 | Staab |
| 5,500,936 | A | 3/1996 | Allen et al. |
| 5,557,724 | A | 9/1996 | Sampat et al. |
| 5,560,022 | A | 9/1996 | Dunstan et al. |
| 5,561,811 | A | 10/1996 | Bier |
| 5,581,670 | A | 12/1996 | Bier et al. |
| 5,583,984 | A | 12/1996 | Conrad et al. |
| 5,617,526 | A | 4/1997 | Oran et al. |
| 5,657,049 | A | 8/1997 | Ludolph et al. |
| 5,659,693 | A | 8/1997 | Hansen et al. |
| 5,721,850 | A | 2/1998 | Farry |
| 5,745,116 | A | 4/1998 | Pisutha-Amond |
| 5,793,365 | A | 8/1998 | Tang et al. |
| 5,825,357 | A | 10/1998 | Malamud et al. |
| 5,958,006 | A | 9/1999 | Eggleston et al. |
| 6,025,871 | A | 2/2000 | Kantor et al. |
| 6,166,736 | A | 12/2000 | Hugh |
| 6,215,490 | B1 | 4/2001 | Kaply |
| 6,219,047 | B1 | 4/2001 | Bell |
| 6,230,170 | B1 | 5/2001 | Zellweger et al. |
| 6,300,951 | B1 | 10/2001 | Filetto et al. |
| 6,333,973 | B1 | 12/2001 | Smith et al. |
| 6,346,962 | B1 | 2/2002 | Goodridge |
| 6,486,895 | B1 | 11/2002 | Robertson et al. |
| 6,493,002 | B1 | 12/2002 | Christensen |
| 6,661,437 | B1 | 12/2003 | Miller et al. |
| 6,726,094 | B1 | 4/2004 | Rantze et al. |
| 6,728,784 | B1 | 4/2004 | Mattaway |
| 6,731,308 | B1 | 5/2004 | Tang et al. |
| 6,768,497 | B2 | 7/2004 | Baar et al. |
| 7,007,241 | B2 | 2/2006 | Boeuf |
| 7,102,663 | B2 | 9/2006 | Crook |
| 7,148,911 | B1 | 12/2006 | Mitsui et al. |
| 7,185,054 | B1 | 2/2007 | Ludwig et al. |
| 7,343,561 | B1 | 3/2008 | Stochosky et al. |
| 7,444,645 | B1 | 10/2008 | St-Michel et al. |
| 7,458,014 | B1 | 11/2008 | Rubin et al. |
| 7,506,260 | B2 | 3/2009 | Wada et al. |
| 7,571,014 | B1 | 8/2009 | Lambourne et al. |
| 7,676,767 | B2 | 3/2010 | Hofmeister et al. |
| 7,707,514 | B2 | 4/2010 | Forstall et al. |
| 7,739,622 | B2 | 6/2010 | Deline et al. |
| 7,801,971 | B1 | 9/2010 | Amidon et al. |
| 7,814,112 | B2 | 10/2010 | Gupta et al. |
| 7,840,907 | B2 | 11/2010 | Kikuchi et al. |
| 7,876,996 | B1 | 1/2011 | Herz |
| 7,903,171 | B2 | 3/2011 | Takabatake et al. |
| 7,954,056 | B2 | 5/2011 | Graham |
| 7,982,762 | B2 | 7/2011 | Chatting et al. |
| 8,077,157 | B2 | 12/2011 | Sengupta et al. |
| 8,169,463 | B2 | 5/2012 | Enstad et al. |
| 8,171,137 | B1 | 5/2012 | Parks et al. |
| 8,181,119 | B1 | 5/2012 | Ording |
| RE43,462 | E | 6/2012 | Washino et al. |
| 8,196,061 | B1 | 6/2012 | Bhojan |
| 8,224,894 | B1 | 7/2012 | Parks et al. |
| 8,250,071 | B1 | 8/2012 | Killalea et al. |
| 8,259,153 | B1 | 9/2012 | Campbell et al. |
| 8,260,879 | B2 | 9/2012 | Chan |
| 8,269,739 | B2 | 9/2012 | Hillis et al. |
| 8,274,544 | B2 | 9/2012 | Kurtz et al. |
| 8,290,777 | B1 | 10/2012 | Nguyen et al. |
| 8,291,341 | B2 | 10/2012 | Tseng et al. |
| 8,294,105 | B2 | 10/2012 | Alameh et al. |
| 8,370,448 | B2 | 2/2013 | Galchev |
| 8,427,303 | B1 | 4/2013 | Brady et al. |
| 8,438,504 | B2 | 5/2013 | Cranfill et al. |
| 8,443,280 | B2 | 5/2013 | Noyes |
| 8,462,961 | B1 | 6/2013 | Bywaters et al. |
| 8,478,363 | B2 | 7/2013 | Levien et al. |
| 8,478,816 | B2 | 7/2013 | Parks et al. |
| 8,499,236 | B1 | 7/2013 | Keljo |
| 8,502,856 | B2 | 8/2013 | Jeong et al. |
| 8,542,265 | B1 | 9/2013 | Dodd et al. |
| 8,566,700 | B2 | 10/2013 | Ueda |
| 8,613,070 | B1 | 12/2013 | Borzycki et al. |
| 8,624,952 | B2 | 1/2014 | Currivan et al. |
| 8,656,040 | B1 | 2/2014 | Bajaj et al. |
| 8,718,556 | B2 | 5/2014 | Lee et al. |
| 8,725,880 | B2 | 5/2014 | Santamaria et al. |
| 8,738,090 | B2 | 5/2014 | Kanda et al. |
| 8,762,844 | B2 | 6/2014 | Kim et al. |
| 8,782,513 | B2 | 7/2014 | Migos et al. |
| 8,799,406 | B1 | 8/2014 | Slonh |
| 8,806,369 | B2 | 8/2014 | Khoe et al. |
| 8,839,122 | B2 | 9/2014 | Anzures et al. |
| 8,856,105 | B2 | 10/2014 | Gargi |
| 8,914,752 | B1 | 12/2014 | Spiegel |
| 8,949,250 | B1 | 2/2015 | Garg et al. |
| 9,032,321 | B1 | 5/2015 | Cohen et al. |
| 9,080,736 | B1 | 7/2015 | Salzinger et al. |
| 9,095,779 | B2 | 8/2015 | Chan et al. |
| 9,185,062 | B1 | 11/2015 | Yang et al. |
| 9,253,531 | B2 | 2/2016 | Relyea et al. |
| 9,253,631 | B1 | 2/2016 | White et al. |
| 9,380,264 | B1 | 6/2016 | Vakalapudi |
| 9,406,103 | B1 | 8/2016 | Gray et al. |
| 9,417,781 | B2 | 8/2016 | Lee et al. |
| 9,442,516 | B2 | 9/2016 | Migos et al. |
| 9,445,048 | B1 | 9/2016 | Nariyawala et al. |
| 9,462,017 | B1 | 10/2016 | Siracusano, Jr. |
| 9,483,175 | B2 | 11/2016 | Wagner |
| 9,552,015 | B2 | 1/2017 | Capela et al. |
| 9,635,314 | B2 | 4/2017 | Barkley et al. |
| 9,639,252 | B2 | 5/2017 | Jin et al. |
| 9,781,540 | B2 | 10/2017 | Jagannathan et al. |
| 9,787,938 | B2 | 10/2017 | Cranfill et al. |
| 9,800,951 | B1 | 10/2017 | Carlson et al. |
| 9,819,877 | B1 | 11/2017 | Faulkner et al. |
| 9,830,056 | B1 | 11/2017 | Keely et al. |
| 9,992,450 | B1 | 6/2018 | Yuan et al. |
| 10,025,496 | B2 | 7/2018 | Park et al. |
| 10,157,040 | B2 | 12/2018 | Ballinger et al. |
| 10,194,189 | B1 | 1/2019 | Goetz et al. |
| 10,198,144 | B2 | 2/2019 | Munoz et al. |
| 10,270,983 | B1 | 4/2019 | Van Os et al. |
| 10,284,812 | B1 | 5/2019 | Van Os et al. |
| 10,300,394 | B1 | 5/2019 | Evans et al. |
| 10,339,769 | B2 | 7/2019 | Mixter et al. |
| 10,353,532 | B1 | 7/2019 | Holz et al. |
| 10,362,272 | B1 | 7/2019 | Van Os et al. |
| 10,386,994 | B2 | 8/2019 | Singal et al. |
| 10,389,977 | B1 | 8/2019 | Van Os et al. |
| 10,410,426 | B2 | 9/2019 | Kamini et al. |
| 10,523,625 | B1 | 12/2019 | Allen et al. |
| 10,523,976 | B2 | 12/2019 | Hemmati et al. |
| 10,534,535 | B2 | 1/2020 | Lee et al. |

(56)  References Cited

U.S. PATENT DOCUMENTS

| | | | |
|---|---|---|---|
| 10,645,294 B1 | 5/2020 | Manzari et al. |
| 10,757,366 B1 | 8/2020 | Kwatra et al. |
| 10,771,740 B1 | 9/2020 | Reynolds et al. |
| 10,771,741 B1 | 9/2020 | Reynolds et al. |
| 10,783,883 B2 | 9/2020 | Mixter et al. |
| 10,909,586 B2 | 2/2021 | Avedissian et al. |
| 10,924,446 B1 | 2/2021 | Paul |
| 10,929,099 B2 | 2/2021 | Querze et al. |
| 10,963,145 B1 | 3/2021 | Voss et al. |
| 10,972,655 B1 | 4/2021 | Ostap et al. |
| 11,012,575 B1 | 5/2021 | Leblang et al. |
| 11,024,303 B1 | 6/2021 | Devaraj et al. |
| 11,064,256 B1 | 7/2021 | Voss et al. |
| 11,079,913 B1 | 8/2021 | Kim et al. |
| 11,144,885 B2 | 10/2021 | Rosenberg |
| 11,164,113 B2 | 11/2021 | Howard |
| 11,164,580 B2 | 11/2021 | Kraker |
| 11,176,940 B1 | 11/2021 | Zhong et al. |
| 11,212,449 B1 | 12/2021 | Manzari et al. |
| 11,258,619 B2 | 2/2022 | Libin |
| 11,283,916 B2 | 3/2022 | Coffman et al. |
| 11,290,687 B1 | 3/2022 | Becchetti |
| 11,316,709 B2 | 4/2022 | Brown et al. |
| 11,343,613 B2 | 5/2022 | Gordon et al. |
| 11,360,634 B1 | 6/2022 | Chang et al. |
| 11,449,188 B1 | 9/2022 | Chang et al. |
| 11,523,166 B1 | 12/2022 | Tu et al. |
| 11,621,979 B1 | 4/2023 | Slotznick |
| 11,671,697 B2 | 6/2023 | O'Leary et al. |
| 11,726,647 B2 | 8/2023 | Kim |
| 11,770,600 B2 | 9/2023 | O'Leary et al. |
| 11,955,025 B2 | 4/2024 | Aoki et al. |
| 12,014,118 B2 | 6/2024 | Gruber et al. |
| 12,085,421 B2 | 9/2024 | Yedid et al. |
| 12,218,944 B1 * | 2/2025 | Hadley .................. G06T 19/00 |
| 2001/0021649 A1 | 9/2001 | Kinnunen et al. |
| 2001/0030597 A1 | 10/2001 | Inoue et al. |
| 2001/0041007 A1 | 11/2001 | Aoki |
| 2002/0010707 A1 | 1/2002 | Chang et al. |
| 2002/0075334 A1 | 6/2002 | Yfantis |
| 2002/0083101 A1 | 6/2002 | Card et al. |
| 2002/0093531 A1 | 7/2002 | Barile |
| 2002/0101446 A1 | 8/2002 | Tang et al. |
| 2002/0105537 A1 | 8/2002 | Orbanes et al. |
| 2002/0113802 A1 | 8/2002 | Card et al. |
| 2002/0118230 A1 | 8/2002 | Card et al. |
| 2002/0120651 A1 | 8/2002 | Pustejovsky et al. |
| 2003/0013493 A1 | 1/2003 | Irimajiri et al. |
| 2003/0030673 A1 | 2/2003 | Ho |
| 2003/0055977 A1 | 3/2003 | Miller |
| 2003/0076352 A1 | 4/2003 | Uhlig et al. |
| 2003/0098884 A1 | 5/2003 | Christensen |
| 2003/0112938 A1 | 6/2003 | Kanakubo et al. |
| 2003/0158886 A1 | 8/2003 | Walls et al. |
| 2003/0160861 A1 | 8/2003 | Barlow et al. |
| 2003/0184598 A1 | 10/2003 | Graham |
| 2003/0217096 A1 | 11/2003 | Mckelvie et al. |
| 2003/0218619 A1 | 11/2003 | Ben-Tovim |
| 2003/0225836 A1 | 12/2003 | Lee et al. |
| 2004/0003040 A1 | 1/2004 | Beavers et al. |
| 2004/0017404 A1 | 1/2004 | Schileru-Key |
| 2004/0048601 A1 | 3/2004 | Lee et al. |
| 2004/0048612 A1 | 3/2004 | Virtanen et al. |
| 2004/0080531 A1 | 4/2004 | Berstis |
| 2004/0102225 A1 | 5/2004 | Furuta et al. |
| 2004/0125081 A1 | 7/2004 | Hayakawa |
| 2004/0141016 A1 | 7/2004 | Fukatsu et al. |
| 2004/0162877 A1 | 8/2004 | Van et al. |
| 2004/0174398 A1 | 9/2004 | Luke et al. |
| 2004/0205514 A1 | 10/2004 | Sommerer et al. |
| 2004/0218035 A1 | 11/2004 | Crook |
| 2004/0239763 A1 | 12/2004 | Notea et al. |
| 2005/0015286 A1 | 1/2005 | Rudnik et al. |
| 2005/0099492 A1 | 5/2005 | Orr |
| 2005/0120306 A1 | 6/2005 | Klassen et al. |
| 2005/0124365 A1 | 6/2005 | Balasuriya et al. |
| 2005/0132281 A1 | 6/2005 | Pan et al. |
| 2005/0138122 A1 | 6/2005 | Boehringer et al. |
| 2005/0144247 A1 | 6/2005 | Christensen et al. |
| 2005/0223068 A1 | 10/2005 | Shohfi et al. |
| 2005/0233780 A1 | 10/2005 | Jani et al. |
| 2005/0239512 A1 | 10/2005 | Hasegawa et al. |
| 2005/0289482 A1 | 12/2005 | Anthony et al. |
| 2006/0002315 A1 | 1/2006 | Theurer et al. |
| 2006/0002523 A1 | 1/2006 | Bettis et al. |
| 2006/0031776 A1 | 2/2006 | Glein et al. |
| 2006/0033724 A1 | 2/2006 | Chaudhri et al. |
| 2006/0055789 A1 | 3/2006 | Jin et al. |
| 2006/0056837 A1 | 3/2006 | Vapaakoski |
| 2006/0071947 A1 | 4/2006 | Ubillos et al. |
| 2006/0098085 A1 | 5/2006 | Nichols et al. |
| 2006/0098634 A1 | 5/2006 | Umemoto et al. |
| 2006/0101122 A1 | 5/2006 | Ishii |
| 2006/0107226 A1 | 5/2006 | Matthews et al. |
| 2006/0129947 A1 | 6/2006 | Hamzy et al. |
| 2006/0149399 A1 | 7/2006 | Norhammar et al. |
| 2006/0150215 A1 | 7/2006 | Wroblewski et al. |
| 2006/0158730 A1 | 7/2006 | Kira |
| 2006/0161863 A1 | 7/2006 | Gallo |
| 2006/0184894 A1 | 8/2006 | Daniels et al. |
| 2006/0185005 A1 | 8/2006 | Graves et al. |
| 2006/0230346 A1 | 10/2006 | Bhogal et al. |
| 2006/0256188 A1 | 11/2006 | Mock et al. |
| 2007/0004389 A1 | 1/2007 | Wallace et al. |
| 2007/0015519 A1 | 1/2007 | Casey |
| 2007/0040898 A1 | 2/2007 | Lee et al. |
| 2007/0064112 A1 | 3/2007 | Chatting et al. |
| 2007/0083828 A1 | 4/2007 | Toriyama et al. |
| 2007/0115349 A1 | 5/2007 | Currivan et al. |
| 2007/0115933 A1 | 5/2007 | Muhamed et al. |
| 2007/0124783 A1 | 5/2007 | Ahiska et al. |
| 2007/0150842 A1 | 6/2007 | Chaudhri et al. |
| 2007/0156910 A1 | 7/2007 | Alfke et al. |
| 2007/0160345 A1 | 7/2007 | Sakai et al. |
| 2007/0174761 A1 | 7/2007 | Lin et al. |
| 2007/0177025 A1 | 8/2007 | Kopet et al. |
| 2007/0177804 A1 | 8/2007 | Elias et al. |
| 2007/0211141 A1 | 9/2007 | Christiansen |
| 2007/0233736 A1 | 10/2007 | Xiong et al. |
| 2007/0236476 A1 | 10/2007 | Suzuki |
| 2007/0239831 A1 | 10/2007 | Basu |
| 2007/0264977 A1 | 11/2007 | Zinn et al. |
| 2007/0277121 A1 | 11/2007 | Beckman |
| 2007/0279482 A1 | 12/2007 | Oswald et al. |
| 2007/0291736 A1 | 12/2007 | Furlong et al. |
| 2008/0032704 A1 | 2/2008 | O'Neil et al. |
| 2008/0034307 A1 | 2/2008 | Cisler et al. |
| 2008/0036849 A1 | 2/2008 | Oh et al. |
| 2008/0063389 A1 | 3/2008 | Fang et al. |
| 2008/0068447 A1 | 3/2008 | Mattila et al. |
| 2008/0074049 A1 | 3/2008 | Kitai et al. |
| 2008/0074550 A1 | 3/2008 | Park |
| 2008/0084482 A1 | 4/2008 | Hansson et al. |
| 2008/0094368 A1 | 4/2008 | Ording et al. |
| 2008/0094370 A1 | 4/2008 | Ording et al. |
| 2008/0114716 A1 | 5/2008 | Mock |
| 2008/0117876 A1 | 5/2008 | Hidaka et al. |
| 2008/0122796 A1 | 5/2008 | Jobs et al. |
| 2008/0129816 A1 | 6/2008 | Mattila et al. |
| 2008/0129844 A1 | 6/2008 | Cusack et al. |
| 2008/0134033 A1 | 6/2008 | Burns et al. |
| 2008/0134088 A1 | 6/2008 | Tse et al. |
| 2008/0140488 A1 | 6/2008 | Oral et al. |
| 2008/0141182 A1 | 6/2008 | Barsness et al. |
| 2008/0160974 A1 | 7/2008 | Vartiainen et al. |
| 2008/0165388 A1 | 7/2008 | Serlet |
| 2008/0168073 A1 | 7/2008 | Siegel et al. |
| 2008/0174570 A1 | 7/2008 | Jobs et al. |
| 2008/0218535 A1 | 9/2008 | Forstall et al. |
| 2008/0220752 A1 | 9/2008 | Forstall et al. |
| 2008/0246778 A1 | 10/2008 | Ham et al. |
| 2008/0282202 A1 | 11/2008 | Sunday |
| 2008/0306997 A1 | 12/2008 | Keohane et al. |
| 2008/0307323 A1 | 12/2008 | Coffman et al. |

(56)　　　　　References Cited

U.S. PATENT DOCUMENTS

| | | |
|---|---|---|
| 2008/0307345 A1 | 12/2008 | Hart et al. |
| 2008/0313257 A1 | 12/2008 | Allen et al. |
| 2008/0313278 A1 | 12/2008 | Hochberg |
| 2008/0316183 A1 | 12/2008 | Westerman et al. |
| 2008/0316295 A1 | 12/2008 | King et al. |
| 2008/0319856 A1 | 12/2008 | Zito et al. |
| 2008/0319944 A1 | 12/2008 | Venolia et al. |
| 2009/0005011 A1 | 1/2009 | Christie et al. |
| 2009/0007017 A1 | 1/2009 | Anzures et al. |
| 2009/0015658 A1 | 1/2009 | Enstad et al. |
| 2009/0033737 A1 | 2/2009 | Goose et al. |
| 2009/0046075 A1 | 2/2009 | Kim et al. |
| 2009/0049446 A1 | 2/2009 | Merten et al. |
| 2009/0089712 A1 | 4/2009 | Sato |
| 2009/0100383 A1 | 4/2009 | Sunday et al. |
| 2009/0103780 A1 | 4/2009 | Nishihara et al. |
| 2009/0106687 A1 | 4/2009 | De et al. |
| 2009/0109276 A1 | 4/2009 | Kim |
| 2009/0113347 A1 | 4/2009 | Hess et al. |
| 2009/0117936 A1 | 5/2009 | Maeng |
| 2009/0140960 A1 | 6/2009 | Mahowald et al. |
| 2009/0158217 A1 | 6/2009 | Stuart |
| 2009/0164322 A1 | 6/2009 | Khan et al. |
| 2009/0164587 A1 | 6/2009 | Gavita et al. |
| 2009/0174680 A1 | 7/2009 | Anzures et al. |
| 2009/0174763 A1 | 7/2009 | Bengtsson et al. |
| 2009/0177981 A1 | 7/2009 | Christie et al. |
| 2009/0179867 A1 | 7/2009 | Shim et al. |
| 2009/0183125 A1 | 7/2009 | Magal et al. |
| 2009/0187825 A1 | 7/2009 | Sandquist et al. |
| 2009/0213086 A1 | 8/2009 | Chae et al. |
| 2009/0228126 A1 | 9/2009 | Spielberg et al. |
| 2009/0228322 A1 | 9/2009 | Van et al. |
| 2009/0228820 A1 | 9/2009 | Kim et al. |
| 2009/0228825 A1 | 9/2009 | Van Os et al. |
| 2009/0228938 A1 | 9/2009 | White et al. |
| 2009/0232129 A1 | 9/2009 | Wong et al. |
| 2009/0235155 A1 | 9/2009 | Ueda |
| 2009/0235162 A1 | 9/2009 | Nuccio et al. |
| 2009/0241054 A1 | 9/2009 | Hendricks |
| 2009/0249244 A1 | 10/2009 | Robinson et al. |
| 2009/0254867 A1 | 10/2009 | Farouki et al. |
| 2009/0256780 A1 | 10/2009 | Small et al. |
| 2009/0259939 A1 | 10/2009 | Lockett et al. |
| 2009/0262200 A1 | 10/2009 | Takabatake et al. |
| 2009/0262206 A1 | 10/2009 | Park |
| 2009/0271381 A1 | 10/2009 | Beezer et al. |
| 2009/0287790 A1 | 11/2009 | Upton et al. |
| 2009/0305679 A1 | 12/2009 | Kim |
| 2009/0305732 A1 | 12/2009 | Marcellino et al. |
| 2009/0309897 A1 | 12/2009 | Morita et al. |
| 2009/0315841 A1 | 12/2009 | Cheng et al. |
| 2009/0319888 A1 | 12/2009 | Oygard |
| 2010/0009719 A1 | 1/2010 | Oh et al. |
| 2010/0011065 A1 | 1/2010 | Scherpa et al. |
| 2010/0023878 A1 | 1/2010 | Douris et al. |
| 2010/0023883 A1 | 1/2010 | Khazaka et al. |
| 2010/0029255 A1 | 2/2010 | Kim et al. |
| 2010/0039498 A1 | 2/2010 | Liu et al. |
| 2010/0040292 A1 | 2/2010 | Clarkson |
| 2010/0044121 A1 | 2/2010 | Simon et al. |
| 2010/0045616 A1 | 2/2010 | Li et al. |
| 2010/0053212 A1 | 3/2010 | Kang et al. |
| 2010/0058231 A1 | 3/2010 | Duarte et al. |
| 2010/0066763 A1 | 3/2010 | Macdougall et al. |
| 2010/0073454 A1 | 3/2010 | Lovhaugen et al. |
| 2010/0073455 A1 | 3/2010 | Iwabuchi et al. |
| 2010/0085416 A1 | 4/2010 | Hegde et al. |
| 2010/0087230 A1 | 4/2010 | Peh et al. |
| 2010/0095240 A1 | 4/2010 | Shiplacoff et al. |
| 2010/0097438 A1 | 4/2010 | Ujii |
| 2010/0107078 A1 | 4/2010 | Hayashi |
| 2010/0109864 A1 | 5/2010 | Haartsen et al. |
| 2010/0115388 A1 | 5/2010 | Nguyen |
| 2010/0121636 A1 | 5/2010 | Burke et al. |
| 2010/0123724 A1 | 5/2010 | Moore et al. |
| 2010/0125785 A1 | 5/2010 | Moore et al. |
| 2010/0125807 A1 | 5/2010 | Easterday et al. |
| 2010/0125811 A1 | 5/2010 | Moore et al. |
| 2010/0146384 A1 | 6/2010 | Peev et al. |
| 2010/0159994 A1 | 6/2010 | Stallings et al. |
| 2010/0159995 A1 | 6/2010 | Stallings et al. |
| 2010/0162108 A1 | 6/2010 | Stallings et al. |
| 2010/0162171 A1 | 6/2010 | Felt et al. |
| 2010/0169435 A1 | 7/2010 | Osullivan et al. |
| 2010/0174606 A1 | 7/2010 | Hoyle |
| 2010/0175018 A1 | 7/2010 | Petschnigg et al. |
| 2010/0177156 A1 | 7/2010 | Kim et al. |
| 2010/0185989 A1 | 7/2010 | Shiplacoff et al. |
| 2010/0189096 A1 | 7/2010 | Flynn et al. |
| 2010/0205563 A1 | 8/2010 | Haapsaari et al. |
| 2010/0211872 A1 | 8/2010 | Rolston et al. |
| 2010/0238262 A1 | 9/2010 | Kurtz et al. |
| 2010/0241699 A1 | 9/2010 | Muthukumarasamy et al. |
| 2010/0242066 A1 | 9/2010 | Tseng et al. |
| 2010/0246571 A1 | 9/2010 | Geppert et al. |
| 2010/0247077 A1 | 9/2010 | Yamamoto et al. |
| 2010/0251119 A1 | 9/2010 | Geppert et al. |
| 2010/0251158 A1 | 9/2010 | Geppert et al. |
| 2010/0257490 A1 | 10/2010 | Lyon et al. |
| 2010/0262714 A1 | 10/2010 | Hiie |
| 2010/0269039 A1 | 10/2010 | Pahlavan et al. |
| 2010/0269069 A1 | 10/2010 | Paila et al. |
| 2010/0281399 A1 | 11/2010 | Banker |
| 2010/0295789 A1 | 11/2010 | Shin et al. |
| 2010/0309284 A1 | 12/2010 | Samadani et al. |
| 2010/0311336 A1 | 12/2010 | Huotari et al. |
| 2010/0318928 A1 | 12/2010 | Neuman et al. |
| 2010/0318939 A1 | 12/2010 | Moon |
| 2010/0333045 A1 | 12/2010 | Guéziec et al. |
| 2011/0007029 A1 | 1/2011 | Ben-david |
| 2011/0010667 A1 | 1/2011 | Sakai et al. |
| 2011/0016417 A1 | 1/2011 | Shiplacoff et al. |
| 2011/0029864 A1 | 2/2011 | Stewart et al. |
| 2011/0029891 A1 | 2/2011 | Kim et al. |
| 2011/0030324 A1 | 2/2011 | Higgins |
| 2011/0032324 A1 | 2/2011 | George et al. |
| 2011/0041056 A1 | 2/2011 | Griffin et al. |
| 2011/0041096 A1 | 2/2011 | Larco et al. |
| 2011/0041102 A1 | 2/2011 | Kim |
| 2011/0065384 A1 | 3/2011 | Cader et al. |
| 2011/0074824 A1 | 3/2011 | Srinivasan et al. |
| 2011/0081889 A1 | 4/2011 | Gao et al. |
| 2011/0085017 A1 | 4/2011 | Robinson et al. |
| 2011/0087431 A1 | 4/2011 | Gupta et al. |
| 2011/0087955 A1 | 4/2011 | Ho et al. |
| 2011/0087970 A1 | 4/2011 | Swink et al. |
| 2011/0088086 A1 | 4/2011 | Swink et al. |
| 2011/0091182 A1 | 4/2011 | Look et al. |
| 2011/0105096 A1 | 5/2011 | Dods et al. |
| 2011/0107216 A1 | 5/2011 | Bi |
| 2011/0107241 A1 | 5/2011 | Moore |
| 2011/0115875 A1 | 5/2011 | Sadwick et al. |
| 2011/0115876 A1 | 5/2011 | Khot et al. |
| 2011/0115945 A1 | 5/2011 | Takano et al. |
| 2011/0117898 A1 | 5/2011 | Pereira et al. |
| 2011/0126148 A1 | 5/2011 | Krishnaraj et al. |
| 2011/0138295 A1 | 6/2011 | Momchilov et al. |
| 2011/0145691 A1 | 6/2011 | Noyes |
| 2011/0145692 A1 | 6/2011 | Noyes et al. |
| 2011/0161836 A1 | 6/2011 | Mu et al. |
| 2011/0164032 A1 | 7/2011 | Shadmi |
| 2011/0167357 A1 | 7/2011 | Benjamin et al. |
| 2011/0178811 A1 | 7/2011 | Sheridan |
| 2011/0179386 A1 | 7/2011 | Shaffer et al. |
| 2011/0184768 A1 | 7/2011 | Norton et al. |
| 2011/0191710 A1 | 8/2011 | Jang et al. |
| 2011/0193995 A1 | 8/2011 | Goh et al. |
| 2011/0205333 A1 | 8/2011 | Wu et al. |
| 2011/0209099 A1 | 8/2011 | Hinckley et al. |
| 2011/0209104 A1 | 8/2011 | Hinckley et al. |
| 2011/0209201 A1* | 8/2011 | Chollat ............... G06F 16/9537 715/764 |
| 2011/0227810 A1 | 9/2011 | Mckinney et al. |

(56) References Cited

U.S. PATENT DOCUMENTS

| | | |
|---|---|---|
| 2011/0234746 A1 | 9/2011 | Saleh et al. |
| 2011/0235549 A1 | 9/2011 | Ahlers et al. |
| 2011/0242356 A1 | 10/2011 | Aleksic et al. |
| 2011/0246944 A1 | 10/2011 | Byrne et al. |
| 2011/0249073 A1 | 10/2011 | Cranfill et al. |
| 2011/0249074 A1 | 10/2011 | Cranfill et al. |
| 2011/0249086 A1 | 10/2011 | Guo et al. |
| 2011/0252062 A1 | 10/2011 | Hanatani et al. |
| 2011/0252146 A1 | 10/2011 | Santamaria et al. |
| 2011/0252364 A1 | 10/2011 | Anzures et al. |
| 2011/0252368 A1 | 10/2011 | Anzures et al. |
| 2011/0252376 A1 | 10/2011 | Chaudhri et al. |
| 2011/0252377 A1 | 10/2011 | Anzures et al. |
| 2011/0252381 A1 | 10/2011 | Chaudhri |
| 2011/0261030 A1 | 10/2011 | Bullock |
| 2011/0273526 A1 | 11/2011 | Mehin et al. |
| 2011/0275358 A1 | 11/2011 | Faenger |
| 2011/0281568 A1 | 11/2011 | Le |
| 2011/0291945 A1 | 12/2011 | Ewing et al. |
| 2011/0295879 A1 | 12/2011 | Logis et al. |
| 2011/0296163 A1 | 12/2011 | Abernethy et al. |
| 2011/0296328 A1 | 12/2011 | Jikeya |
| 2011/0296333 A1 | 12/2011 | Bateman et al. |
| 2011/0296344 A1 | 12/2011 | Habib et al. |
| 2011/0296351 A1 | 12/2011 | Ewing et al. |
| 2011/0314398 A1 | 12/2011 | Yano et al. |
| 2012/0002001 A1 | 1/2012 | Prentice |
| 2012/0019610 A1 | 1/2012 | Hornyak et al. |
| 2012/0023438 A1 | 1/2012 | Xia et al. |
| 2012/0023462 A1 | 1/2012 | Rosing et al. |
| 2012/0033028 A1 | 2/2012 | Murphy et al. |
| 2012/0054278 A1 | 3/2012 | Taleb et al. |
| 2012/0062784 A1 | 3/2012 | Van et al. |
| 2012/0081375 A1 | 4/2012 | Robert et al. |
| 2012/0084644 A1 | 4/2012 | Robert et al. |
| 2012/0084691 A1 | 4/2012 | Yun |
| 2012/0092436 A1 | 4/2012 | Pahud et al. |
| 2012/0096069 A1 | 4/2012 | Chan |
| 2012/0096076 A1 | 4/2012 | Chan et al. |
| 2012/0096344 A1 | 4/2012 | Ho et al. |
| 2012/0096386 A1 | 4/2012 | Baumann et al. |
| 2012/0102387 A1 | 4/2012 | Badoiu et al. |
| 2012/0105225 A1 | 5/2012 | Valtonen |
| 2012/0114108 A1 | 5/2012 | Katis et al. |
| 2012/0121185 A1 | 5/2012 | Zavesky |
| 2012/0129496 A1 | 5/2012 | Park et al. |
| 2012/0131470 A1 | 5/2012 | Wessling et al. |
| 2012/0136998 A1 | 5/2012 | Hough et al. |
| 2012/0143694 A1 | 6/2012 | Zargahi et al. |
| 2012/0159364 A1 | 6/2012 | Hyun |
| 2012/0159373 A1 | 6/2012 | Archer et al. |
| 2012/0159380 A1 | 6/2012 | Kocienda et al. |
| 2012/0166950 A1 | 6/2012 | Frumar et al. |
| 2012/0173383 A1 | 7/2012 | Badawiyeh et al. |
| 2012/0179970 A1 | 7/2012 | Hayes |
| 2012/0182381 A1 | 7/2012 | Abate et al. |
| 2012/0185355 A1 | 7/2012 | Kilroy |
| 2012/0185467 A1 | 7/2012 | Prager et al. |
| 2012/0185542 A1 | 7/2012 | Vyrros et al. |
| 2012/0188394 A1 | 7/2012 | Park et al. |
| 2012/0192068 A1 | 7/2012 | Migos et al. |
| 2012/0192102 A1 | 7/2012 | Migos et al. |
| 2012/0192118 A1 | 7/2012 | Migos et al. |
| 2012/0201479 A1 | 8/2012 | Zhang et al. |
| 2012/0214552 A1 | 8/2012 | Sirpal et al. |
| 2012/0223890 A1 | 9/2012 | Borovsky et al. |
| 2012/0229591 A1 | 9/2012 | Lee |
| 2012/0233239 A1 | 9/2012 | Urim et al. |
| 2012/0240085 A1 | 9/2012 | Sim et al. |
| 2012/0257095 A1 | 10/2012 | Velazquez |
| 2012/0266098 A1 | 10/2012 | Webber |
| 2012/0274550 A1 | 11/2012 | Campbell et al. |
| 2012/0284256 A1 | 11/2012 | Mahajan et al. |
| 2012/0284297 A1 | 11/2012 | Aguera-Arcas et al. |
| 2012/0284673 A1 | 11/2012 | Lamb et al. |
| 2012/0289217 A1 | 11/2012 | Riemer et al. |
| 2012/0290657 A1 | 11/2012 | Parks et al. |
| 2012/0290943 A1 | 11/2012 | Toney et al. |
| 2012/0290950 A1 | 11/2012 | Rapaport et al. |
| 2012/0293605 A1 | 11/2012 | Seferian et al. |
| 2012/0296972 A1 | 11/2012 | Backer |
| 2012/0304079 A1 | 11/2012 | Rideout et al. |
| 2012/0304111 A1 | 11/2012 | Queru et al. |
| 2012/0320141 A1 | 12/2012 | Bowen et al. |
| 2013/0005487 A1 | 1/2013 | Frazzini et al. |
| 2013/0007665 A1 | 1/2013 | Chaudhri et al. |
| 2013/0014040 A1 | 1/2013 | Jagannathan et al. |
| 2013/0019182 A1 | 1/2013 | Gil et al. |
| 2013/0041790 A1 | 2/2013 | Murugesan et al. |
| 2013/0046893 A1 | 2/2013 | Hauser et al. |
| 2013/0050263 A1 | 2/2013 | Khoe et al. |
| 2013/0054697 A1 | 2/2013 | Cha et al. |
| 2013/0055113 A1 | 2/2013 | Chazin et al. |
| 2013/0061155 A1 | 3/2013 | Hon |
| 2013/0061175 A1 | 3/2013 | Matas et al. |
| 2013/0070046 A1 | 3/2013 | Wolf et al. |
| 2013/0073989 A1 | 3/2013 | Harris et al. |
| 2013/0080525 A1 | 3/2013 | Aoki et al. |
| 2013/0080923 A1 | 3/2013 | Anzures et al. |
| 2013/0088413 A1 | 4/2013 | Raffle et al. |
| 2013/0091214 A1 | 4/2013 | Kellerman et al. |
| 2013/0102281 A1 | 4/2013 | Kanda et al. |
| 2013/0111342 A1 | 5/2013 | Alameh et al. |
| 2013/0111603 A1 | 5/2013 | Sakai et al. |
| 2013/0120254 A1 | 5/2013 | Mun et al. |
| 2013/0122961 A1 | 5/2013 | Choi et al. |
| 2013/0124207 A1 | 5/2013 | Sarin et al. |
| 2013/0132865 A1 | 5/2013 | Li |
| 2013/0145295 A1 | 6/2013 | Bocking et al. |
| 2013/0145303 A1 | 6/2013 | Prakash et al. |
| 2013/0151623 A1 | 6/2013 | Weiser et al. |
| 2013/0151959 A1 | 6/2013 | Flynn et al. |
| 2013/0162781 A1 | 6/2013 | Hubner et al. |
| 2013/0166580 A1 | 6/2013 | Maharajh et al. |
| 2013/0169742 A1 | 7/2013 | Wu et al. |
| 2013/0173699 A1 | 7/2013 | Parks et al. |
| 2013/0185642 A1 | 7/2013 | Gammons |
| 2013/0185650 A1 | 7/2013 | Gutowitz |
| 2013/0187753 A1 | 7/2013 | Chiriyankandath |
| 2013/0191911 A1 | 7/2013 | Dellinger et al. |
| 2013/0212212 A1 | 8/2013 | Addepalli et al. |
| 2013/0216206 A1 | 8/2013 | Dubin et al. |
| 2013/0219276 A1 | 8/2013 | Shan |
| 2013/0219332 A1 | 8/2013 | Woley et al. |
| 2013/0225140 A1 | 8/2013 | Greisson |
| 2013/0230293 A1 | 9/2013 | Boyle et al. |
| 2013/0282180 A1 | 10/2013 | Layton |
| 2013/0283199 A1 | 10/2013 | Selig et al. |
| 2013/0283283 A1 | 10/2013 | Wang et al. |
| 2013/0290058 A1 | 10/2013 | Gray et al. |
| 2013/0293777 A1 | 11/2013 | Huber et al. |
| 2013/0298024 A1 | 11/2013 | Rhee et al. |
| 2013/0318158 A1 | 11/2013 | Teng et al. |
| 2013/0318249 A1 | 11/2013 | Mcdonough et al. |
| 2013/0321340 A1 | 12/2013 | Seo et al. |
| 2013/0325949 A1 | 12/2013 | Virani et al. |
| 2013/0325967 A1 | 12/2013 | Parks et al. |
| 2013/0328770 A1 | 12/2013 | Parham |
| 2013/0328997 A1 | 12/2013 | Desai |
| 2013/0332826 A1 | 12/2013 | Karunamuni et al. |
| 2013/0332856 A1 | 12/2013 | Sanders et al. |
| 2013/0332886 A1 | 12/2013 | Cranfill et al. |
| 2013/0346882 A1 | 12/2013 | Shiplacoff et al. |
| 2013/0346892 A1 | 12/2013 | Wren et al. |
| 2013/0346922 A1 | 12/2013 | Shiplacoff et al. |
| 2014/0013271 A1 | 1/2014 | Moore et al. |
| 2014/0018053 A1 | 1/2014 | Cho et al. |
| 2014/0024340 A1 | 1/2014 | Raleigh |
| 2014/0026074 A1 | 1/2014 | Cortes et al. |
| 2014/0032706 A1 | 1/2014 | Kuscher et al. |
| 2014/0043424 A1 | 2/2014 | Gava et al. |
| 2014/0047020 A1 | 2/2014 | Matus et al. |
| 2014/0047382 A1 | 2/2014 | Kim et al. |
| 2014/0055426 A1 | 2/2014 | Park et al. |

(56) References Cited

U.S. PATENT DOCUMENTS

| | | |
|---|---|---|
| 2014/0058941 A1 | 2/2014 | Moon et al. |
| 2014/0063176 A1 | 3/2014 | Modai et al. |
| 2014/0068477 A1 | 3/2014 | Roh |
| 2014/0082136 A1 | 3/2014 | Garcia Puga et al. |
| 2014/0089857 A1 | 3/2014 | Wang et al. |
| 2014/0099004 A1 | 4/2014 | Dibona et al. |
| 2014/0101597 A1 | 4/2014 | Bamford et al. |
| 2014/0101768 A1 | 4/2014 | Miller et al. |
| 2014/0105372 A1 | 4/2014 | Nowack et al. |
| 2014/0108084 A1 | 4/2014 | Bargetzi et al. |
| 2014/0108568 A1 | 4/2014 | Lee |
| 2014/0118272 A1 | 5/2014 | Gunn |
| 2014/0119531 A1 | 5/2014 | Tuchman et al. |
| 2014/0122730 A1 | 5/2014 | Burch et al. |
| 2014/0123257 A1 | 5/2014 | Gordon et al. |
| 2014/0136481 A1 | 5/2014 | Quan et al. |
| 2014/0149884 A1 | 5/2014 | Flynn et al. |
| 2014/0165012 A1 | 6/2014 | Shen et al. |
| 2014/0168696 A1 | 6/2014 | Matsuhara et al. |
| 2014/0171064 A1 | 6/2014 | Das |
| 2014/0173447 A1 | 6/2014 | Das et al. |
| 2014/0189524 A1 | 7/2014 | Murarka et al. |
| 2014/0201126 A1 | 7/2014 | Zadeh et al. |
| 2014/0201527 A1 | 7/2014 | Krivorot |
| 2014/0201632 A1 | 7/2014 | Kunigita et al. |
| 2014/0215356 A1 | 7/2014 | Brander et al. |
| 2014/0215404 A1 | 7/2014 | Kong et al. |
| 2014/0218371 A1 | 8/2014 | Du et al. |
| 2014/0218461 A1 | 8/2014 | Deland |
| 2014/0229835 A1 | 8/2014 | Ravine |
| 2014/0247368 A1 | 9/2014 | Chinn |
| 2014/0280812 A1 | 9/2014 | Bealkowski et al. |
| 2014/0282084 A1 | 9/2014 | Murarka et al. |
| 2014/0282103 A1 | 9/2014 | Jerry |
| 2014/0282110 A1 | 9/2014 | Chaudhri |
| 2014/0282208 A1 | 9/2014 | Chaudhri |
| 2014/0282233 A1 | 9/2014 | Sandler et al. |
| 2014/0282240 A1 | 9/2014 | Flynn et al. |
| 2014/0298253 A1 | 10/2014 | Jin et al. |
| 2014/0310643 A1 | 10/2014 | Karmanenko et al. |
| 2014/0317532 A1 | 10/2014 | Ma et al. |
| 2014/0320387 A1 | 10/2014 | Eriksson et al. |
| 2014/0320425 A1 | 10/2014 | Jeong et al. |
| 2014/0325447 A1 | 10/2014 | Jin et al. |
| 2014/0331149 A1 | 11/2014 | Labey |
| 2014/0335827 A1 | 11/2014 | Tsuda |
| 2014/0337791 A1 | 11/2014 | Agnetta et al. |
| 2014/0349754 A1 | 11/2014 | Kaneoka et al. |
| 2014/0351722 A1 | 11/2014 | Frederickson et al. |
| 2014/0354759 A1 | 12/2014 | Cranfill et al. |
| 2014/0359637 A1 | 12/2014 | Yan |
| 2014/0365929 A1 | 12/2014 | Ding |
| 2014/0366158 A1 | 12/2014 | Han et al. |
| 2014/0368547 A1 | 12/2014 | Elings |
| 2014/0368600 A1 | 12/2014 | Do et al. |
| 2014/0368719 A1 | 12/2014 | Kaneko et al. |
| 2014/0373081 A1 | 12/2014 | Dodson et al. |
| 2014/0375577 A1 | 12/2014 | Yeh et al. |
| 2014/0375747 A1 | 12/2014 | Martinez et al. |
| 2014/0378099 A1 | 12/2014 | Huang et al. |
| 2014/0380187 A1 | 12/2014 | Gardenfors et al. |
| 2015/0004945 A1 | 1/2015 | Steeves et al. |
| 2015/0019966 A1 | 1/2015 | Jeon et al. |
| 2015/0033149 A1 | 1/2015 | Kuchoor |
| 2015/0040012 A1 | 2/2015 | Faaborg et al. |
| 2015/0049591 A1 | 2/2015 | Adams et al. |
| 2015/0058413 A1 | 2/2015 | Ge |
| 2015/0062158 A1 | 3/2015 | Hildreth et al. |
| 2015/0067541 A1 | 3/2015 | Owens et al. |
| 2015/0070272 A1 | 3/2015 | Kim et al. |
| 2015/0078680 A1 | 3/2015 | Shakib et al. |
| 2015/0082255 A1 | 3/2015 | Devries et al. |
| 2015/0082446 A1 | 3/2015 | Flowers et al. |
| 2015/0085057 A1 | 3/2015 | Ouyang et al. |
| 2015/0094120 A1 | 4/2015 | Suh et al. |
| 2015/0095804 A1 | 4/2015 | Grossman et al. |
| 2015/0098309 A1 | 4/2015 | Adams et al. |
| 2015/0106720 A1 | 4/2015 | Backer |
| 2015/0109966 A1 | 4/2015 | Hong et al. |
| 2015/0116353 A1 | 4/2015 | Miura et al. |
| 2015/0116363 A1 | 4/2015 | Monte et al. |
| 2015/0116464 A1 | 4/2015 | Tanaka |
| 2015/0121267 A1 | 4/2015 | Wu et al. |
| 2015/0121312 A1 | 4/2015 | Li |
| 2015/0128042 A1 | 5/2015 | Churchill et al. |
| 2015/0130892 A1 | 5/2015 | Whynot et al. |
| 2015/0135098 A1 | 5/2015 | Geppert et al. |
| 2015/0160832 A1 | 6/2015 | Walkin et al. |
| 2015/0163188 A1 | 6/2015 | Faaborg et al. |
| 2015/0169146 A1 | 6/2015 | Lalwani |
| 2015/0169182 A1 | 6/2015 | Khoe et al. |
| 2015/0172552 A1 | 6/2015 | Kim |
| 2015/0177914 A1 | 6/2015 | Coyner et al. |
| 2015/0193069 A1 | 7/2015 | Di Censo et al. |
| 2015/0193196 A1 | 7/2015 | Lin et al. |
| 2015/0193392 A1 | 7/2015 | Greenblatt et al. |
| 2015/0199082 A1 | 7/2015 | Scholler et al. |
| 2015/0205488 A1 | 7/2015 | Yi et al. |
| 2015/0206529 A1 | 7/2015 | Kwon et al. |
| 2015/0235432 A1 | 8/2015 | Bronder et al. |
| 2015/0248167 A1 | 9/2015 | Turbell et al. |
| 2015/0256796 A1 | 9/2015 | Ma |
| 2015/0264304 A1 | 9/2015 | Chastney et al. |
| 2015/0288868 A1 | 10/2015 | Slavin et al. |
| 2015/0296077 A1 | 10/2015 | Wakeyama et al. |
| 2015/0301338 A1 | 10/2015 | Van Heugten |
| 2015/0304366 A1 | 10/2015 | Bader-Natal et al. |
| 2015/0304413 A1 | 10/2015 | Park |
| 2015/0309689 A1 | 10/2015 | Jin et al. |
| 2015/0319006 A1 | 11/2015 | Plummer et al. |
| 2015/0319144 A1 | 11/2015 | Barton et al. |
| 2015/0324067 A1 | 11/2015 | Cabral |
| 2015/0332031 A1 | 11/2015 | Mistry et al. |
| 2015/0334140 A1 | 11/2015 | Singh et al. |
| 2015/0334313 A1 | 11/2015 | Chougle et al. |
| 2015/0339007 A1 | 11/2015 | Yoshizawa et al. |
| 2015/0339466 A1 | 11/2015 | Gao et al. |
| 2015/0347010 A1 | 12/2015 | Yang et al. |
| 2015/0350143 A1 | 12/2015 | Lemay et al. |
| 2015/0350296 A1 | 12/2015 | Yang et al. |
| 2015/0350297 A1 | 12/2015 | Yang et al. |
| 2015/0350533 A1 | 12/2015 | Harris et al. |
| 2015/0358484 A1 | 12/2015 | Permude |
| 2015/0358584 A1 | 12/2015 | Mattson |
| 2015/0365306 A1 | 12/2015 | Chaudhri et al. |
| 2015/0370426 A1 | 12/2015 | Carrigan et al. |
| 2015/0370529 A1 | 12/2015 | Zambetti et al. |
| 2015/0373065 A1 | 12/2015 | Holmquist et al. |
| 2015/0373178 A1 | 12/2015 | Felt et al. |
| 2016/0014059 A1 | 1/2016 | Rathod |
| 2016/0014477 A1 | 1/2016 | Siders |
| 2016/0021155 A1 | 1/2016 | Sawato |
| 2016/0028875 A1 | 1/2016 | Brown et al. |
| 2016/0029004 A1 | 1/2016 | Campbell et al. |
| 2016/0048296 A1 | 2/2016 | Gan et al. |
| 2016/0048316 A1 | 2/2016 | Bae et al. |
| 2016/0057173 A1 | 2/2016 | Singman et al. |
| 2016/0059864 A1 | 3/2016 | Feit et al. |
| 2016/0062567 A1 | 3/2016 | Yang et al. |
| 2016/0062589 A1 | 3/2016 | Wan et al. |
| 2016/0065708 A1 | 3/2016 | Yang et al. |
| 2016/0065832 A1 | 3/2016 | Kim et al. |
| 2016/0072861 A1 | 3/2016 | Woolsey et al. |
| 2016/0073185 A1 | 3/2016 | Kannappan et al. |
| 2016/0099901 A1 | 4/2016 | Allen et al. |
| 2016/0099987 A1 | 4/2016 | Shamma |
| 2016/0110059 A1 | 4/2016 | Li et al. |
| 2016/0124614 A1 | 5/2016 | Bromberg et al. |
| 2016/0127636 A1 | 5/2016 | Ito et al. |
| 2016/0139785 A1 | 5/2016 | Griffin et al. |
| 2016/0142450 A1 | 5/2016 | Paul et al. |
| 2016/0170608 A1 | 6/2016 | Zambetti et al. |
| 2016/0180259 A1 | 6/2016 | Marianko et al. |
| 2016/0210602 A1 | 7/2016 | Siddique et al. |

(56) References Cited

U.S. PATENT DOCUMENTS

| | | | |
|---|---|---|---|
| 2016/0212374 A1 | 7/2016 | Usbergo et al. | |
| 2016/0227095 A1 | 8/2016 | Yoshizawa et al. | |
| 2016/0231902 A1 | 8/2016 | Sirpal et al. | |
| 2016/0259528 A1 | 9/2016 | Foss et al. | |
| 2016/0261653 A1 | 9/2016 | Kim | |
| 2016/0266769 A1 | 9/2016 | Oursbourn et al. | |
| 2016/0277708 A1 | 9/2016 | Rintel et al. | |
| 2016/0277903 A1 | 9/2016 | Poosala et al. | |
| 2016/0291824 A1 | 10/2016 | Grossman et al. | |
| 2016/0299679 A1 | 10/2016 | Park et al. | |
| 2016/0306328 A1 | 10/2016 | Ko et al. | |
| 2016/0306422 A1 | 10/2016 | Parham et al. | |
| 2016/0306504 A1 | 10/2016 | Brunsch et al. | |
| 2016/0308920 A1 | 10/2016 | Brunsch et al. | |
| 2016/0316038 A1 | 10/2016 | Jolfaei | |
| 2016/0320849 A1 | 11/2016 | Koo | |
| 2016/0327911 A1 | 11/2016 | Eim et al. | |
| 2016/0335041 A1 | 11/2016 | Wachter et al. | |
| 2016/0344972 A1 | 11/2016 | Missig et al. | |
| 2016/0352661 A1 | 12/2016 | Yang et al. | |
| 2016/0364106 A1 | 12/2016 | Koum et al. | |
| 2016/0380780 A1 | 12/2016 | Stephenson et al. | |
| 2017/0006162 A1 | 1/2017 | Bargetzi et al. | |
| 2017/0024100 A1 | 1/2017 | Pieper et al. | |
| 2017/0024226 A1 | 1/2017 | Yan | |
| 2017/0031557 A1 | 2/2017 | Xiangli et al. | |
| 2017/0034583 A1 | 2/2017 | Long et al. | |
| 2017/0048817 A1 | 2/2017 | Yang et al. | |
| 2017/0064184 A1 | 3/2017 | Tsai | |
| 2017/0083189 A1 | 3/2017 | Yang et al. | |
| 2017/0094019 A1 | 3/2017 | Ahmed et al. | |
| 2017/0097621 A1 | 4/2017 | Ackmann et al. | |
| 2017/0097715 A1 | 4/2017 | Kim et al. | |
| 2017/0111587 A1 | 4/2017 | Herbst et al. | |
| 2017/0111595 A1 | 4/2017 | Soni et al. | |
| 2017/0126592 A1 | 5/2017 | El | |
| 2017/0150904 A1 | 6/2017 | Park et al. | |
| 2017/0206779 A1 | 7/2017 | Lee et al. | |
| 2017/0212667 A1 | 7/2017 | Miyazaki | |
| 2017/0220212 A1 | 8/2017 | Yang et al. | |
| 2017/0230585 A1 | 8/2017 | Nash et al. | |
| 2017/0230705 A1 | 8/2017 | Pardue et al. | |
| 2017/0244932 A1 | 8/2017 | Pistilli et al. | |
| 2017/0280098 A1 | 9/2017 | Sethuraman et al. | |
| 2017/0280494 A1 | 9/2017 | Jung et al. | |
| 2017/0309174 A1 | 10/2017 | Gonzales et al. | |
| 2017/0324784 A1 | 11/2017 | Taine et al. | |
| 2017/0336960 A1 | 11/2017 | Chaudhri et al. | |
| 2017/0344253 A1 | 11/2017 | Zhang | |
| 2017/0353508 A1 | 12/2017 | Yoakum | |
| 2017/0357382 A1 | 12/2017 | Miura et al. | |
| 2017/0357425 A1 | 12/2017 | Smith et al. | |
| 2017/0357434 A1 | 12/2017 | Coffman et al. | |
| 2017/0357917 A1 | 12/2017 | Holmes et al. | |
| 2017/0359191 A1 | 12/2017 | Smith et al. | |
| 2017/0359285 A1 | 12/2017 | Weinig et al. | |
| 2017/0359461 A1 | 12/2017 | De Vries et al. | |
| 2017/0367484 A1 | 12/2017 | Salvoni et al. | |
| 2017/0371496 A1 | 12/2017 | Denoue et al. | |
| 2017/0373868 A1 | 12/2017 | Deets, Jr. | |
| 2018/0013799 A1 | 1/2018 | Davies | |
| 2018/0020530 A1 | 1/2018 | Scordato et al. | |
| 2018/0047200 A1 | 2/2018 | O'Hara et al. | |
| 2018/0048820 A1 | 2/2018 | Hinkel et al. | |
| 2018/0061158 A1 | 3/2018 | Greene | |
| 2018/0070144 A1 | 3/2018 | Tang et al. | |
| 2018/0081522 A1 | 3/2018 | Greenberg et al. | |
| 2018/0081538 A1 | 3/2018 | Kim | |
| 2018/0091732 A1 | 3/2018 | Wilson et al. | |
| 2018/0095616 A1 | 4/2018 | Valdivia et al. | |
| 2018/0095634 A1* | 4/2018 | Alexander | G06T 15/20 |
| 2018/0095636 A1* | 4/2018 | Valdivia | G06F 3/011 |
| 2018/0101297 A1 | 4/2018 | Yang et al. | |
| 2018/0103074 A1 | 4/2018 | Rosenberg | |
| 2018/0121074 A1 | 5/2018 | Peron et al. | |
| 2018/0122378 A1 | 5/2018 | Mixter et al. | |
| 2018/0123986 A1 | 5/2018 | Faulkner et al. | |
| 2018/0124128 A1 | 5/2018 | Faulkner et al. | |
| 2018/0124359 A1 | 5/2018 | Faulkner | |
| 2018/0131732 A1 | 5/2018 | Aronoff et al. | |
| 2018/0131907 A1 | 5/2018 | Schmirler et al. | |
| 2018/0139374 A1 | 5/2018 | Yu | |
| 2018/0144590 A1 | 5/2018 | Mixter et al. | |
| 2018/0150433 A1 | 5/2018 | Sowden et al. | |
| 2018/0157333 A1* | 6/2018 | Ross | G06F 3/013 |
| 2018/0157455 A1 | 6/2018 | Troy et al. | |
| 2018/0160072 A1 | 6/2018 | Cranfill et al. | |
| 2018/0165002 A1 | 6/2018 | Yang et al. | |
| 2018/0183849 A1 | 6/2018 | Shin et al. | |
| 2018/0191965 A1 | 7/2018 | Faulkner et al. | |
| 2018/0199164 A1 | 7/2018 | Bargetzi et al. | |
| 2018/0203577 A1 | 7/2018 | Astavans et al. | |
| 2018/0204111 A1 | 7/2018 | Zadeh et al. | |
| 2018/0205797 A1 | 7/2018 | Faulkner | |
| 2018/0213144 A1 | 7/2018 | Kim et al. | |
| 2018/0213396 A1 | 7/2018 | Segal et al. | |
| 2018/0227341 A1 | 8/2018 | Rizzi | |
| 2018/0228003 A1 | 8/2018 | O'driscoll et al. | |
| 2018/0228006 A1 | 8/2018 | Baker et al. | |
| 2018/0249047 A1 | 8/2018 | Marlatt | |
| 2018/0253152 A1 | 9/2018 | Forsblom et al. | |
| 2018/0267774 A1 | 9/2018 | Williams et al. | |
| 2018/0286395 A1 | 10/2018 | Li et al. | |
| 2018/0288104 A1 | 10/2018 | Padilla et al. | |
| 2018/0293959 A1 | 10/2018 | Monga et al. | |
| 2018/0295079 A1 | 10/2018 | Longo | |
| 2018/0308480 A1 | 10/2018 | Jang et al. | |
| 2018/0309801 A1 | 10/2018 | Rathod | |
| 2018/0321842 A1 | 11/2018 | Lee et al. | |
| 2018/0329586 A1 | 11/2018 | Sundstrom et al. | |
| 2018/0332559 A1 | 11/2018 | Gudivada et al. | |
| 2018/0338038 A1 | 11/2018 | Ly et al. | |
| 2018/0341448 A1 | 11/2018 | Behzadi et al. | |
| 2018/0348764 A1 | 12/2018 | Zhang et al. | |
| 2018/0359293 A1 | 12/2018 | Faulkner et al. | |
| 2018/0364665 A1 | 12/2018 | Clymer et al. | |
| 2018/0367483 A1 | 12/2018 | Rodriguez et al. | |
| 2018/0367484 A1 | 12/2018 | Rodriguez et al. | |
| 2018/0375676 A1 | 12/2018 | Bader-Natal et al. | |
| 2019/0005419 A1 | 1/2019 | Howard | |
| 2019/0018586 A1 | 1/2019 | Yang et al. | |
| 2019/0025943 A1 | 1/2019 | Jobs et al. | |
| 2019/0028419 A1 | 1/2019 | Sullivan | |
| 2019/0034849 A1 | 1/2019 | Romaine et al. | |
| 2019/0037173 A1 | 1/2019 | Lee et al. | |
| 2019/0065027 A1 | 2/2019 | Hauenstein et al. | |
| 2019/0068670 A1 | 2/2019 | Adam et al. | |
| 2019/0102049 A1 | 4/2019 | Anzures et al. | |
| 2019/0102145 A1 | 4/2019 | Wilberding et al. | |
| 2019/0110087 A1 | 4/2019 | Parasseeri et al. | |
| 2019/0124021 A1 | 4/2019 | Demattei | |
| 2019/0138951 A1 | 5/2019 | Brownhill et al. | |
| 2019/0149768 A1 | 5/2019 | Mcardle | |
| 2019/0149887 A1 | 5/2019 | Williams et al. | |
| 2019/0173939 A1 | 6/2019 | Lewis et al. | |
| 2019/0199963 A1 | 6/2019 | Ahn et al. | |
| 2019/0199993 A1 | 6/2019 | Babu J D et al. | |
| 2019/0205861 A1 | 7/2019 | Bace | |
| 2019/0208028 A1 | 7/2019 | Larabie-Belanger | |
| 2019/0215503 A1* | 7/2019 | Monson | G06F 3/013 |
| 2019/0222775 A1 | 7/2019 | Ahn | |
| 2019/0228495 A1 | 7/2019 | Tremblay et al. | |
| 2019/0236142 A1 | 8/2019 | Balakrishnan et al. | |
| 2019/0246238 A1 | 8/2019 | Crutchfield et al. | |
| 2019/0279634 A1 | 9/2019 | Tak et al. | |
| 2019/0297039 A1 | 9/2019 | Rodriguez et al. | |
| 2019/0303861 A1 | 10/2019 | Mathias et al. | |
| 2019/0332400 A1 | 10/2019 | Spoor et al. | |
| 2019/0339769 A1 | 11/2019 | Cox et al. | |
| 2019/0339825 A1 | 11/2019 | Anzures et al. | |
| 2019/0342507 A1 | 11/2019 | Dye et al. | |
| 2019/0342519 A1 | 11/2019 | Van Os et al. | |
| 2019/0342621 A1 | 11/2019 | Carrigan et al. | |
| 2019/0347181 A1 | 11/2019 | Cranfill et al. | |

(56) References Cited

U.S. PATENT DOCUMENTS

| | | | |
|---|---|---|---|
| 2019/0354252 A1 | 11/2019 | Badr | |
| 2019/0361575 A1 | 11/2019 | Ni et al. | |
| 2019/0361694 A1 | 11/2019 | Gordon et al. | |
| 2019/0362555 A1 | 11/2019 | Chen et al. | |
| 2019/0369862 A1 | 12/2019 | De Vries | |
| 2019/0370805 A1 | 12/2019 | Van Os et al. | |
| 2020/0004401 A1* | 1/2020 | Hwang | G06F 3/04815 |
| 2020/0005539 A1 | 1/2020 | Hwang et al. | |
| 2020/0034033 A1 | 1/2020 | Chaudhri et al. | |
| 2020/0045245 A1 | 2/2020 | Van Os et al. | |
| 2020/0050502 A1 | 2/2020 | Ghafourifar et al. | |
| 2020/0055515 A1 | 2/2020 | Herman et al. | |
| 2020/0059628 A1 | 2/2020 | Cranfill et al. | |
| 2020/0106952 A1 | 4/2020 | Missig et al. | |
| 2020/0106965 A1 | 4/2020 | Malia et al. | |
| 2020/0112690 A1 | 4/2020 | Harrison et al. | |
| 2020/0127988 A1 | 4/2020 | Bradley et al. | |
| 2020/0135191 A1 | 4/2020 | Nourbakhsh | |
| 2020/0142667 A1 | 5/2020 | Querze et al. | |
| 2020/0143593 A1 | 5/2020 | Rudman et al. | |
| 2020/0152186 A1 | 5/2020 | Koh et al. | |
| 2020/0183548 A1 | 6/2020 | Anzures et al. | |
| 2020/0186378 A1 | 6/2020 | Six et al. | |
| 2020/0186576 A1 | 6/2020 | Gopal et al. | |
| 2020/0195887 A1 | 6/2020 | Van Os et al. | |
| 2020/0213530 A1 | 7/2020 | Ahn | |
| 2020/0226896 A1 | 7/2020 | Robertson et al. | |
| 2020/0242788 A1 | 7/2020 | Jacobs et al. | |
| 2020/0274726 A1 | 8/2020 | Setteboun et al. | |
| 2020/0279279 A1 | 9/2020 | Chaudhuri | |
| 2020/0296329 A1 | 9/2020 | Tang et al. | |
| 2020/0302913 A1 | 9/2020 | Marcinkiewicz | |
| 2020/0312318 A1 | 10/2020 | Olson et al. | |
| 2020/0322479 A1 | 10/2020 | De Vries et al. | |
| 2020/0335187 A1 | 10/2020 | Lefkofsky et al. | |
| 2020/0356063 A1 | 11/2020 | Guzman et al. | |
| 2020/0371673 A1* | 11/2020 | Faulkner | G06F 3/017 |
| 2020/0383157 A1 | 12/2020 | Lee et al. | |
| 2020/0385116 A1 | 12/2020 | Sabripour et al. | |
| 2020/0395012 A1 | 12/2020 | Kim et al. | |
| 2020/0400957 A1 | 12/2020 | Van Heugten | |
| 2021/0043189 A1 | 2/2021 | Pyun | |
| 2021/0064317 A1 | 3/2021 | Juenger et al. | |
| 2021/0065134 A1 | 3/2021 | Chhabra et al. | |
| 2021/0096703 A1 | 4/2021 | Anzures et al. | |
| 2021/0097768 A1 | 4/2021 | Malia et al. | |
| 2021/0099829 A1 | 4/2021 | Soto et al. | |
| 2021/0136129 A1 | 5/2021 | Ponnusamy et al. | |
| 2021/0144336 A1 | 5/2021 | Van Os et al. | |
| 2021/0152503 A1 | 5/2021 | Rodriguez et al. | |
| 2021/0158622 A1 | 5/2021 | Leelaphattarakij et al. | |
| 2021/0158830 A1 | 5/2021 | Boehlke | |
| 2021/0176204 A1 | 6/2021 | Geppert et al. | |
| 2021/0182169 A1 | 6/2021 | Mardente et al. | |
| 2021/0195084 A1 | 6/2021 | Olajos et al. | |
| 2021/0203878 A1 | 7/2021 | Lee et al. | |
| 2021/0217106 A1 | 7/2021 | Hauser et al. | |
| 2021/0233325 A1 | 7/2021 | Kawakami et al. | |
| 2021/0265032 A1 | 8/2021 | Burgess et al. | |
| 2021/0266274 A1 | 8/2021 | Liu et al. | |
| 2021/0306288 A1 | 9/2021 | Boyd et al. | |
| 2021/0321197 A1 | 10/2021 | Annamraju | |
| 2021/0323406 A1 | 10/2021 | So et al. | |
| 2021/0333864 A1 | 10/2021 | Harvey et al. | |
| 2021/0349680 A1 | 11/2021 | Kim et al. | |
| 2021/0352172 A1 | 11/2021 | Kim et al. | |
| 2021/0360192 A1 | 11/2021 | Cranfill et al. | |
| 2021/0360199 A1 | 11/2021 | Oz et al. | |
| 2021/0373672 A1 | 12/2021 | Schwarz et al. | |
| 2021/0409359 A1 | 12/2021 | Eirinberg et al. | |
| 2022/0004356 A1 | 1/2022 | Kim et al. | |
| 2022/0006946 A1 | 1/2022 | Missig et al. | |
| 2022/0014715 A1 | 1/2022 | Tamura et al. | |
| 2022/0021680 A1 | 1/2022 | Roedel et al. | |
| 2022/0046186 A1 | 2/2022 | Fayad et al. | |
| 2022/0046222 A1 | 2/2022 | Meier | |
| 2022/0050578 A1 | 2/2022 | Waldman et al. | |
| 2022/0053142 A1 | 2/2022 | Manzari et al. | |
| 2022/0086203 A1 | 3/2022 | Morris et al. | |
| 2022/0100362 A1 | 3/2022 | Kim | |
| 2022/0100812 A1 | 3/2022 | Anvaripour et al. | |
| 2022/0103784 A1 | 3/2022 | Pollefeys | |
| 2022/0122089 A1 | 4/2022 | Bonilla Kuhlmann et al. | |
| 2022/0141259 A1 | 5/2022 | Copley et al. | |
| 2022/0163996 A1 | 5/2022 | Yang et al. | |
| 2022/0166918 A1 | 5/2022 | Burger | |
| 2022/0180862 A1 | 6/2022 | Sharifi et al. | |
| 2022/0199267 A1 | 6/2022 | Subramanian et al. | |
| 2022/0207840 A1 | 6/2022 | Cansizoglu et al. | |
| 2022/0244836 A1 | 8/2022 | O'Leary et al. | |
| 2022/0247587 A1 | 8/2022 | Rolin et al. | |
| 2022/0247918 A1 | 8/2022 | O'Leary et al. | |
| 2022/0247919 A1 | 8/2022 | O'Leary et al. | |
| 2022/0253136 A1 | 8/2022 | Holder et al. | |
| 2022/0253195 A1* | 8/2022 | Stevens | G06F 3/04815 |
| 2022/0254074 A1 | 8/2022 | Berliner et al. | |
| 2022/0263940 A1 | 8/2022 | De Vries et al. | |
| 2022/0269882 A1 | 8/2022 | Proschowsky et al. | |
| 2022/0278992 A1 | 9/2022 | Baker et al. | |
| 2022/0286314 A1 | 9/2022 | Meyer et al. | |
| 2022/0303150 A1 | 9/2022 | Jensen et al. | |
| 2022/0343569 A1 | 10/2022 | Karri et al. | |
| 2022/0365643 A1 | 11/2022 | Triverio et al. | |
| 2022/0365739 A1 | 11/2022 | Chang et al. | |
| 2022/0365740 A1 | 11/2022 | Chang et al. | |
| 2022/0368548 A1 | 11/2022 | Chang et al. | |
| 2022/0368659 A1 | 11/2022 | Chang et al. | |
| 2022/0368742 A1 | 11/2022 | Chang et al. | |
| 2022/0374136 A1 | 11/2022 | Chang et al. | |
| 2022/0375358 A1 | 11/2022 | Shimomura et al. | |
| 2023/0004264 A1 | 1/2023 | Anzures et al. | |
| 2023/0041125 A1 | 2/2023 | Kim et al. | |
| 2023/0086248 A1* | 3/2023 | Puyol | G06F 9/451 |
| | | | 715/848 |
| 2023/0092103 A1* | 3/2023 | Puyol | G06F 3/011 |
| | | | 715/205 |
| 2023/0094453 A1 | 3/2023 | O'Leary et al. | |
| 2023/0098395 A1 | 3/2023 | O'Leary et al. | |
| 2023/0109787 A1 | 4/2023 | O'Leary et al. | |
| 2023/0143275 A1 | 5/2023 | Opara et al. | |
| 2023/0188674 A1 | 6/2023 | Van Os et al. | |
| 2023/0213764 A1 | 7/2023 | Arngren et al. | |
| 2023/0236723 A1 | 7/2023 | Yang et al. | |
| 2023/0246857 A1 | 8/2023 | Boucheron et al. | |
| 2023/0262196 A1 | 8/2023 | Cranfill et al. | |
| 2023/0262317 A1 | 8/2023 | O'Leary et al. | |
| 2023/0319413 A1 | 10/2023 | Manzari et al. | |
| 2023/0370507 A1 | 11/2023 | Chang et al. | |
| 2023/0386145 A1 | 11/2023 | Faulkner | |
| 2023/0388357 A1 | 11/2023 | Faulkner et al. | |
| 2023/0393616 A1 | 12/2023 | Chao et al. | |
| 2024/0036804 A1 | 2/2024 | Chang et al. | |
| 2024/0048600 A1* | 2/2024 | Yerli | H04L 65/403 |
| 2024/0064270 A1 | 2/2024 | Van Os et al. | |
| 2024/0064395 A1 | 2/2024 | O'Leary et al. | |
| 2024/0103678 A1 | 3/2024 | Dryer et al. | |
| 2024/0104819 A1 | 3/2024 | Chand et al. | |
| 2024/0111333 A1 | 4/2024 | Yang et al. | |
| 2024/0118793 A1 | 4/2024 | Triverio et al. | |
| 2024/0163365 A1 | 5/2024 | De Vries et al. | |
| 2024/0259669 A1 | 8/2024 | Missig et al. | |
| 2024/0377922 A1 | 11/2024 | Rajam et al. | |
| 2025/0039011 A1 | 1/2025 | Meyer et al. | |
| 2025/0138697 A1 | 5/2025 | Smith et al. | |
| 2025/0165123 A1 | 5/2025 | Anzures et al. | |
| 2025/0165124 A1 | 5/2025 | Sundstrom et al. | |
| 2025/0202961 A1 | 6/2025 | Triverio et al. | |
| 2025/0224859 A1 | 7/2025 | Kim et al. | |
| 2025/0294237 A1 | 9/2025 | Manzari et al. | |

(56) References Cited

U.S. PATENT DOCUMENTS

| | | | |
|---|---|---|---|
| 2025/0330554 A1 | 10/2025 | Cranfill et al. | |
| 2025/0343854 A1 | 11/2025 | De Vries et al. | |

FOREIGN PATENT DOCUMENTS

| | | | |
|---|---|---|---|
| CA | 2845537 A1 | 9/2014 | |
| CA | 2917174 A1 | 1/2015 | |
| CN | 1473430 A | 2/2004 | |
| CN | 1525723 A | 9/2004 | |
| CN | 1689327 A | 10/2005 | |
| CN | 1801926 A | 7/2006 | |
| CN | 1890996 A | 1/2007 | |
| CN | 1918533 A | 2/2007 | |
| CN | 1985319 A | 6/2007 | |
| CN | 101075173 A | 11/2007 | |
| CN | 101226444 A | 7/2008 | |
| CN | 101296356 A | 10/2008 | |
| CN | 101356493 A | 1/2009 | |
| CN | 101409743 A | 4/2009 | |
| CN | 101431564 A | 5/2009 | |
| CN | 101443727 A | 5/2009 | |
| CN | 101535938 A | 9/2009 | |
| CN | 101566866 A | 10/2009 | |
| CN | 101682622 A | 3/2010 | |
| CN | 101828166 A | 9/2010 | |
| CN | 101853132 A | 10/2010 | |
| CN | 101854247 A | 10/2010 | |
| CN | 101854261 A | 10/2010 | |
| CN | 101917529 A | 12/2010 | |
| CN | 101950236 A | 1/2011 | |
| CN | 102111454 A | 6/2011 | |
| CN | 102111505 A | 6/2011 | |
| CN | 102215217 A | 10/2011 | |
| CN | 102239740 A | 11/2011 | |
| CN | 102262506 A | 11/2011 | |
| CN | 102289446 A | 12/2011 | |
| CN | 102317887 A | 1/2012 | |
| CN | 102388355 A | 3/2012 | |
| CN | 102439558 A | 5/2012 | |
| CN | 102572369 A | 7/2012 | |
| CN | 102609210 A | 7/2012 | |
| CN | 102651731 A | 8/2012 | |
| CN | 102707994 A | 10/2012 | |
| CN | 102750086 A | 10/2012 | |
| CN | 102821180 A | 12/2012 | |
| CN | 102929917 A | 2/2013 | |
| CN | 103019681 A | 4/2013 | |
| CN | 103039064 A | 4/2013 | |
| CN | 103049274 A | 4/2013 | |
| CN | 103179283 A | 6/2013 | |
| CN | 103222247 A | 7/2013 | |
| CN | 103235688 A | 8/2013 | |
| CN | 103237191 A | 8/2013 | |
| CN | 103250138 A | 8/2013 | |
| CN | 103336651 A | 10/2013 | |
| CN | 103384235 A | 11/2013 | |
| CN | 103442774 A | 12/2013 | |
| CN | 103458215 A | 12/2013 | |
| CN | 103582873 A | 2/2014 | |
| CN | 103649985 A | 3/2014 | |
| CN | 103718152 A | 4/2014 | |
| CN | 103748610 A | 4/2014 | |
| CN | 103765385 A | 4/2014 | |
| CN | 103777842 A | 5/2014 | |
| CN | 104010158 A | 8/2014 | |
| CN | 104025538 B | 9/2014 | |
| CN | 104035663 A | 9/2014 | |
| CN | 104081335 A | 10/2014 | |
| CN | 104090720 A | 10/2014 | |
| CN | 104169855 A | 11/2014 | |
| CN | 104182123 A | 12/2014 | |
| CN | 104270597 A | 1/2015 | |
| CN | 104317516 A | 1/2015 | |
| CN | 104331246 A | 2/2015 | |
| CN | 104375741 A | 2/2015 | |
| CN | 104423841 A | 3/2015 | |
| CN | 104427288 A | 3/2015 | |
| CN | 104469143 A | 3/2015 | |
| CN | 104503689 A | 4/2015 | |
| CN | 104584488 A | 4/2015 | |
| CN | 104602133 A | 5/2015 | |
| CN | 104615430 A | 5/2015 | |
| CN | 104834439 A | 8/2015 | |
| CN | 104869046 A | 8/2015 | |
| CN | 104980578 A | 10/2015 | |
| CN | 105094551 A | 11/2015 | |
| CN | 105094957 A | 11/2015 | |
| CN | 105141498 A | 12/2015 | |
| CN | 105204846 A | 12/2015 | |
| CN | 105264473 A | 1/2016 | |
| CN | 105308634 A | 2/2016 | |
| CN | 105389173 A | 3/2016 | |
| CN | 105391778 A | 3/2016 | |
| CN | 105554429 A | 5/2016 | |
| CN | 105578111 A | 5/2016 | |
| CN | 105637451 A | 6/2016 | |
| CN | 105900376 A | 8/2016 | |
| CN | 106210855 A | 12/2016 | |
| CN | 106303648 A | 1/2017 | |
| CN | 106471793 A | 3/2017 | |
| CN | 106664389 A | 5/2017 | |
| CN | 106713946 A | 5/2017 | |
| CN | 106716954 A | 5/2017 | |
| CN | 106843626 A | 6/2017 | |
| CN | 107066523 A | 8/2017 | |
| CN | 107122049 A | 9/2017 | |
| CN | 107491257 A | 12/2017 | |
| CN | 107533417 A | 1/2018 | |
| CN | 107534656 A | 1/2018 | |
| CN | 107704177 A | 2/2018 | |
| CN | 107728876 A | 2/2018 | |
| CN | 107992248 A | 5/2018 | |
| CN | 108933965 A | 12/2018 | |
| CN | 109196825 A | 1/2019 | |
| CN | 110456971 A | 11/2019 | |
| CN | 111095165 A | 5/2020 | |
| CN | 111108740 A | 5/2020 | |
| CN | 111601065 A | 8/2020 | |
| CN | 111913630 A | 11/2020 | |
| CN | 112088530 A | 12/2020 | |
| CN | 112214275 A | 1/2021 | |
| CN | 112261338 A | 1/2021 | |
| CN | 112416223 A | 2/2021 | |
| EP | 0483777 A2 | 5/1992 | |
| EP | 0584392 A1 | 3/1994 | |
| EP | 1215575 A2 | 6/2002 | |
| EP | 1517228 A2 | 3/2005 | |
| EP | 1760584 A1 | 3/2007 | |
| EP | 1903791 A2 | 3/2008 | |
| EP | 1986431 A2 | 10/2008 | |
| EP | 2056568 A1 | 5/2009 | |
| EP | 2151745 A2 | 2/2010 | |
| EP | 2219105 A1 | 8/2010 | |
| EP | 2237534 A1 | 10/2010 | |
| EP | 2237536 A1 | 10/2010 | |
| EP | 2521080 A2 | 11/2012 | |
| EP | 2600584 A1 | 6/2013 | |
| EP | 2682850 A1 | 1/2014 | |
| EP | 2703974 A1 | 3/2014 | |
| EP | 2725473 A1 | 4/2014 | |
| EP | 2770708 A1 | 8/2014 | |
| EP | 2787465 A1 | 10/2014 | |
| EP | 2446619 B1 | 10/2015 | |
| EP | 3038427 A1 | 6/2016 | |
| EP | 3091421 A2 | 11/2016 | |
| EP | 2761582 B1 | 3/2017 | |
| EP | 2258103 B1 | 5/2018 | |
| EP | 3163866 B1 | 5/2020 | |
| EP | 4109891 A1 | 12/2022 | |
| IN | 1038/MUM/2005 A | 6/2007 | |
| JP | 6-110881 A | 4/1994 | |
| JP | 6-282405 A | 10/1994 | |
| JP | 7-325700 A | 12/1995 | |
| JP | 8-76926 A | 3/1996 | |

(56) References Cited

FOREIGN PATENT DOCUMENTS

| | | | |
|---|---|---|---|
| JP | 8-279998 | A | 10/1996 |
| JP | 9-233384 | A | 9/1997 |
| JP | 9-265457 | A | 10/1997 |
| JP | 10-240488 | A | 9/1998 |
| JP | 2000-40158 | A | 2/2000 |
| JP | 2000-200092 | A | 7/2000 |
| JP | 2000-242390 | A | 9/2000 |
| JP | 2000-283772 | A | 10/2000 |
| JP | 2001-67099 | A | 3/2001 |
| JP | 2001-101202 | A | 4/2001 |
| JP | 2001-169166 | A | 6/2001 |
| JP | 2002-251365 | A | 9/2002 |
| JP | 2002-288125 | A | 10/2002 |
| JP | 2002-320140 | A | 10/2002 |
| JP | 2002-351802 | A | 12/2002 |
| JP | 2003-101981 | A | 4/2003 |
| JP | 2003-134382 | A | 5/2003 |
| JP | 2003-189168 | A | 7/2003 |
| JP | 2003-195998 | A | 7/2003 |
| JP | 2003-274376 | A | 9/2003 |
| JP | 2003-526820 | A | 9/2003 |
| JP | 2003-299050 | A | 10/2003 |
| JP | 2003-299051 | A | 10/2003 |
| JP | 2003-348444 | A | 12/2003 |
| JP | 2004-101708 | A | 4/2004 |
| JP | 2004-187273 | A | 7/2004 |
| JP | 2004-193860 | A | 7/2004 |
| JP | 2004-221738 | A | 8/2004 |
| JP | 2005-45744 | A | 2/2005 |
| JP | 2005-94696 | A | 4/2005 |
| JP | 2008-99330 | A | 4/2005 |
| JP | 2005-159567 | A | 6/2005 |
| JP | 2005-260289 | A | 9/2005 |
| JP | 2005-286445 | A | 10/2005 |
| JP | 2005-303736 | A | 10/2005 |
| JP | 2005-332368 | A | 12/2005 |
| JP | 2006-135495 | A | 5/2006 |
| JP | 2006-166414 | A | 6/2006 |
| JP | 2006-222822 | A | 8/2006 |
| JP | 2006-245732 | A | 9/2006 |
| JP | 2006-246019 | A | 9/2006 |
| JP | 2006-254350 | A | 9/2006 |
| JP | 2006-319742 | A | 11/2006 |
| JP | 2007-88630 | A | 4/2007 |
| JP | 2007-140060 | A | 6/2007 |
| JP | 2007-150877 | A | 6/2007 |
| JP | 2007-150917 | A | 6/2007 |
| JP | 2007-150921 | A | 6/2007 |
| JP | 2007-200329 | A | 8/2007 |
| JP | 2007-201727 | A | 8/2007 |
| JP | 2007-274034 | A | 10/2007 |
| JP | 2007-282263 | A | 10/2007 |
| JP | 2007-300452 | A | 11/2007 |
| JP | 2008-28586 | A | 2/2008 |
| JP | 2008-125105 | A | 5/2008 |
| JP | 2008-136119 | A | 6/2008 |
| JP | 2008-533838 | A | 8/2008 |
| JP | 2008-276801 | A | 11/2008 |
| JP | 2008-289014 | A | 11/2008 |
| JP | 2009-502048 | A | 1/2009 |
| JP | 2009-80710 | A | 4/2009 |
| JP | 2009-159253 | A | 7/2009 |
| JP | 9-182046 | A | 8/2009 |
| JP | 2009-188975 | A | 8/2009 |
| JP | 9-247655 | A | 9/2009 |
| JP | 2009-232290 | A | 10/2009 |
| JP | 2009-265692 | A | 11/2009 |
| JP | 2009-296577 | A | 12/2009 |
| JP | 2009-296583 | A | 12/2009 |
| JP | 2010-15239 | A | 1/2010 |
| JP | 2010-97353 | A | 4/2010 |
| JP | 2010-511939 | A | 4/2010 |
| JP | 2010-109789 | A | 5/2010 |
| JP | 2010-522935 | A | 7/2010 |
| JP | 2010-206745 | A | 9/2010 |
| JP | 2010-245940 | A | 10/2010 |
| JP | 2010-541398 | A | 12/2010 |
| JP | 2011-118662 | A | 6/2011 |
| JP | 2012-168966 | A | 9/2012 |
| JP | 2012-215938 | A | 11/2012 |
| JP | 2012-244340 | A | 12/2012 |
| JP | 2013-25357 | A | 2/2013 |
| JP | 2013-74499 | A | 4/2013 |
| JP | 2013-93699 | A | 5/2013 |
| JP | 2013-105468 | A | 5/2013 |
| JP | 2013-524683 | A | 6/2013 |
| JP | 2013-530433 | A | 7/2013 |
| JP | 2013-191065 | A | 9/2013 |
| JP | 2014-503861 | A | 2/2014 |
| JP | 2014-44724 | A | 3/2014 |
| JP | 2014-71835 | A | 4/2014 |
| JP | 2014-87126 | A | 5/2014 |
| JP | 2014-512044 | A | 5/2014 |
| JP | 2014-170982 | A | 9/2014 |
| JP | 2015-11507 | A | 1/2015 |
| JP | 2015-201087 | A | 1/2015 |
| JP | 2015-520456 | A | 7/2015 |
| JP | 2015-170234 | A | 9/2015 |
| JP | 2016-1446 | A | 1/2016 |
| JP | 2016-24557 | A | 2/2016 |
| JP | 2016-38615 | A | 3/2016 |
| JP | 2016-53929 | A | 4/2016 |
| JP | 2016-157292 | A | 9/2016 |
| JP | 2016-167806 | A | 9/2016 |
| JP | 2016-174282 | A | 9/2016 |
| JP | 6-113297 | A | 4/2017 |
| JP | 2017-532645 | A | 11/2017 |
| JP | 2017-228843 | A | 12/2017 |
| JP | 2017-229060 | A | 12/2017 |
| JP | 2018-7158 | A | 1/2018 |
| JP | 6-276335 | A | 2/2018 |
| JP | 6-276515 | A | 2/2018 |
| JP | 2018-56719 | A | 4/2018 |
| JP | 2018-136828 | A | 8/2018 |
| JP | 2018-200624 | A | 12/2018 |
| JP | 2019-114282 | A | 7/2019 |
| JP | 2020-510929 | A | 4/2020 |
| JP | 2021-40300 | A | 3/2021 |
| JP | 7-135594 | A | 9/2022 |
| KR | 1997-0031883 | A | 6/1997 |
| KR | 1999-0044201 | A | 6/1999 |
| KR | 10-2003-0016405 | A | 2/2003 |
| KR | 10-2004-0016688 | A | 2/2004 |
| KR | 10-2004-0045338 | A | 6/2004 |
| KR | 10-2005-0054684 | A | 6/2005 |
| KR | 10-2006-0031959 | A | 4/2006 |
| KR | 10-2006-0064326 | A | 6/2006 |
| KR | 10-2007-0111270 | A | 11/2007 |
| KR | 10-2008-0057326 | A | 6/2008 |
| KR | 10-2009-0040613 | A | 4/2009 |
| KR | 10-2009-0122805 | A | 12/2009 |
| KR | 10-2009-0126516 | A | 12/2009 |
| KR | 10-2012-0003323 | A | 1/2012 |
| KR | 10-2012-0088746 | A | 8/2012 |
| KR | 10-2012-0100433 | A | 9/2012 |
| KR | 10-2013-0063019 | A | 6/2013 |
| KR | 10-2013-0075783 | A | 7/2013 |
| KR | 10-2013-0082190 | A | 7/2013 |
| KR | 10-2013-0090244 | A | 8/2013 |
| KR | 10-2013-0138150 | A | 12/2013 |
| KR | 10-2013-0141688 | A | 12/2013 |
| KR | 10-2014-0016244 | A | 2/2014 |
| KR | 10-2014-0026263 | A | 3/2014 |
| KR | 10-2014-0043370 | A | 4/2014 |
| KR | 10-2016-0092820 | A | 8/2016 |
| KR | 10-2017-0128498 | A | 11/2017 |
| KR | 10-2018-0085931 | A | 7/2018 |
| KR | 10-2019-0033082 | A | 3/2019 |
| KR | 10-1989433 | B1 | 6/2019 |
| KR | 10-2006-0116902 | A | 1/2020 |
| KR | 10-2008-0096042 | A | 1/2020 |
| KR | 10-2009-0002641 | A | 1/2020 |
| KR | 10-2009-0004176 | A | 1/2020 |
| KR | 10-2009-0017901 | A | 1/2020 |

(56) References Cited

FOREIGN PATENT DOCUMENTS

| | | | |
|---|---|---|---|
| KR | 10-2009-0017906 A | 1/2020 |
| KR | 10-2009-0036226 A | 1/2020 |
| KR | 10-2009-0042499 A | 1/2020 |
| KR | 10-0891449 B1 | 1/2020 |
| KR | 10-2020-0039030 A | 4/2020 |
| TW | 201415345 A | 4/2014 |
| TW | 201416959 A | 5/2014 |
| TW | I321955 B | 1/2020 |
| WO | 2001/18665 A1 | 3/2001 |
| WO | 01/27783 A1 | 4/2001 |
| WO | 02/11022 A2 | 2/2002 |
| WO | 02/37848 A1 | 5/2002 |
| WO | 02/093344 A1 | 11/2002 |
| WO | 03/077553 A1 | 9/2003 |
| WO | 2004/032507 A1 | 4/2004 |
| WO | 2005/060501 A2 | 7/2005 |
| WO | 2005/086159 A2 | 9/2005 |
| WO | 2005/109829 A1 | 11/2005 |
| WO | 2006/048028 A1 | 5/2006 |
| WO | 2006/063343 A2 | 6/2006 |
| WO | 2007/002621 A2 | 1/2007 |
| WO | 2007/008321 A2 | 1/2007 |
| WO | 2007/063922 A1 | 6/2007 |
| WO | 2007/102110 A2 | 9/2007 |
| WO | 2008/030779 A2 | 3/2008 |
| WO | 2008/030879 A2 | 3/2008 |
| WO | 2008/040566 A1 | 4/2008 |
| WO | 2008/067498 A2 | 6/2008 |
| WO | 2008/090902 A1 | 7/2008 |
| WO | 2009/005914 A1 | 1/2009 |
| WO | 2009/012820 A1 | 1/2009 |
| WO | 2009/042579 A1 | 4/2009 |
| WO | 2009/143076 A2 | 11/2009 |
| WO | 2010/001672 A1 | 1/2010 |
| WO | 2010/065752 A2 | 6/2010 |
| WO | 2010/065752 A3 | 9/2010 |
| WO | 2010/134729 A2 | 11/2010 |
| WO | 2010/137513 A1 | 12/2010 |
| WO | 2011/126502 A1 | 10/2011 |
| WO | 2011/126505 A1 | 10/2011 |
| WO | 2011/146605 A1 | 11/2011 |
| WO | 2011/146839 A1 | 11/2011 |
| WO | 2011/161145 A1 | 12/2011 |
| WO | 2012/028773 A1 | 3/2012 |
| WO | 2012/037170 A1 | 3/2012 |
| WO | 2012/051052 A1 | 4/2012 |
| WO | 2012/079530 A1 | 6/2012 |
| WO | 2012/087939 A1 | 6/2012 |
| WO | 2012/103117 A1 | 8/2012 |
| WO | 2012/126078 A1 | 9/2012 |
| WO | 2012/154748 A1 | 11/2012 |
| WO | 2012/170118 A1 | 12/2012 |
| WO | 2012/170446 A2 | 12/2012 |
| WO | 2012/172164 A1 | 12/2012 |
| WO | 2013/097896 A1 | 7/2013 |
| WO | 2013/114821 A1 | 8/2013 |
| WO | 2013/132144 A1 | 9/2013 |
| WO | 2013/173838 A2 | 11/2013 |
| WO | 2014/004524 A2 | 1/2014 |
| WO | 2014/052871 A1 | 4/2014 |
| WO | 2014/058937 A1 | 4/2014 |
| WO | 2014/077987 A1 | 5/2014 |
| WO | 2014/101527 A1 | 7/2014 |
| WO | 2014/160327 A1 | 10/2014 |
| WO | 2014/161323 A1 | 10/2014 |
| WO | 2014/168616 A1 | 10/2014 |
| WO | 2014/197279 A1 | 12/2014 |
| WO | 2014/200730 A1 | 12/2014 |
| WO | 2015/192085 A2 | 12/2015 |
| WO | 2016/022204 A1 | 2/2016 |
| WO | 2016/040535 A1 | 3/2016 |
| WO | 2016/046589 A1 | 3/2016 |
| WO | 2016/168154 A1 | 10/2016 |
| WO | 2017/038261 A1 | 3/2017 |
| WO | 2017/218143 A1 | 12/2017 |
| WO | 2017/218153 A1 | 12/2017 |
| WO | 2018/057272 A1 | 3/2018 |
| WO | 2018/213401 A1 | 11/2018 |
| WO | 2018/213415 A1 | 11/2018 |
| WO | 2018/213844 A1 | 11/2018 |
| WO | 2018/232333 A1 | 12/2018 |
| WO | 2019/067131 A1 | 4/2019 |
| WO | 2019/217009 A1 | 11/2019 |
| WO | 2019/217477 A1 | 11/2019 |
| WO | 2020/227386 A2 | 11/2020 |
| WO | 2020/227386 A3 | 1/2021 |
| WO | 2020/227386 A4 | 3/2021 |
| WO | 2021/112983 A1 | 6/2021 |

OTHER PUBLICATIONS

Corrected Notice of Allowance received for U.S. Appl. No. 18/422,571, mailed on Apr. 3, 2025, 2 pages.

International Preliminary Report on Patentability received for PCT Patent Application No. PCT/US2023/032911, mailed on Apr. 3, 2025, 13 pages.

International Preliminary Report on Patentability received for PCT Patent Application No. PCT/US2023/033372, mailed on Apr. 3, 2025, 15 pages.

Notice of Allowance received for U.S. Appl. No. 18/140,449, mailed on Mar. 26, 2025, 10 pages.

Notice of Allowance received for U.S. Appl. No. 18/422,571, mailed on Mar. 21, 2025, 10 pages.

Notice of Allowance received for U.S. Appl. No. 18/499,848, mailed on Apr. 2, 2025, 11 pages.

Office Action received for Chinese Patent Application No. 202110409221.4, mailed on Mar. 12, 2025, 15 pages (8 pages of English Translation and 7 pages of Official Copy).

Office Action received for Japanese Patent Application No. 2024-146741, mailed on Mar. 28, 2025, 10 pages (5 pages of English Translation and 5 pages of Official Copy).

Office Action received for Korean Patent Application No. 10-2024-7043493, mailed on Mar. 19, 2025, 11 pages (4 pages of English Translation and 7 pages of Official Copy).

11. Result of Consultation received for European Patent Application No. 22705232.1, mailed on Mar. 26, 2025, 3 pages.

Applicant-Initiated Interview Summary received for U.S. Appl. No. 17/745,680, mailed on Apr. 24, 2025, 2 pages.

Board Decision received for Chinese Patent Application No. 201810375380.5, mailed on Jul. 6, 2022, 2 pages (1 page of English Translation and 1 page of Official Copy).

CNET, "Android Lollipop Lock-Screen Notification Tips", Available online at: https://www.youtube.com/watch?v=LZTxHBOwzIU, Nov. 13, 2014, 3 pages.

Decision on Appeal received for U.S. Appl. No. 16/136,178, mailed on Jun. 2, 2022, 10 pages.

Decision to Grant received for Danish Patent Application No. 201570874, mailed on Jan. 26, 2018, 2 pages.

Decision to Grant received for Danish Patent Application No. PA201570865, mailed on Mar. 19, 2018, 2 pages.

Decision to Grant received for Danish Patent Application No. PA201570867, mailed on Mar. 13, 2018. 2 pages.

Decision to Grant received for Danish Patent Application No. PA201570871, mailed on Mar. 19, 2018, 2 pages.

Decision to Grant received for European Patent Application No. 16728165.8, mailed on Sep. 12, 2019, 2 pages.

Decision to Grant received for European Patent Application No. 18196448.7, mailed on Aug. 6, 2020, 2 pages.

Decision to Grant received for European Patent Application No. 20193661.4, mailed on Sep. 7, 2023, 2 pages.

Extended European Search Report received for European Patent Application No. 18196448.7, mailed on Oct. 16, 2018, 9 pages.

Extended European Search Report received for European Patent Application No. 20193661.4, mailed on Feb. 2, 2021, 10 pages.

Final Office Action received for U.S. Appl. No. 15/835,366, mailed on Apr. 5, 2019, 17 pages.

Final Office Action received for U.S. Appl. No. 15/835,366, mailed on Oct. 21, 2019, 18 pages.

(56) References Cited

OTHER PUBLICATIONS

Final Office Action received for U.S. Appl. No. 15/835,382, mailed on Apr. 8, 2019, 20 pages.
Final Office Action received for U.S. Appl. No. 16/136,178, mailed on Jul. 10, 2020, 17 pages.
Final Office Action received for U.S. Appl. No. 18/127,535, mailed on Jul. 19, 2024, 26 pages.
Intention to Grant received for Danish Patent Appiication No. PA201576865, mailed on Jan. 3, 2018, 2 pages.
Intention to Grant received for Danish Patent Appiication No. PA201576867, mailed on Sep. 22, 2017, 2 pages.
Intention to Grant received for Danish Patent Appiication No. PA201570871, mailed on Jan. 15, 2018, 2 pages.
Intention to Grant received for Danish Patent Appiication No. PA201570874, mailed on Nov. 16, 2017, 2 pages.
Intention to Grant received for Danish Patent Appiication No. PA201570880, mailed on May 9, 2018, 2 pages.
Intention to Grant received for European Patent Appiication No. 16728165.8, mailed on Apr. 30, 2019, 7 pages.
Intention to Grant received for European Patent Appiication No. 18196448.7, mailed on Jun. 19, 2020, 7 pages.
Intention to Grant received for European Patent Appiication No. 20166552.8, mailed on Apr. 30, 2025, 9 pages.
International Preliminary Report on Patentability received for PCT Patent Application No. PCT/US2016/033528, mailed on Dec. 12, 2017, 30 pages.
International Preliminary Report and Written Opinion received for PCT Patent Application No. PCT/US2016/033528, mailed on Feb. 6, 2017, 43 pages.
International Preliminary Report and Written Opinion received for PCT Patent Application No. PCT/US204/053247, mailed on Jan. 28, 2025, 13 pages.
Non-Final Office Action received for U.S. Appl. No. 15/835,366, mailed on Feb. 6, 2020, 15 pages.
Non-Final Office Action received for U.S. Appl. No. 15/835,366, mailed on Jun. 26, 2019, 19 pages.
Non-Final Office Action received for U.S. Appl. No. 15/835,366, mailed on Nov. 16, 2018, 14 pages.
Non-Final Office Action received for U.S. Appl. No. 15/835,382, mailed on Nov. 29, 2018, 14 pages.
Non-Final Office Action received for U.S. Appl. No. 16/136,178, mailed on Jan. 6, 2020, 15 pages.
Non-Final Office Action received for U.S. Appl. No. 17/745,680, mailed on May 2, 2025, 27 pages.
Non-Final Office Action received for U.S. Appl. No. 18/127,535, mailed on Dec. 20, 2023, 20 pages.
Notice of Acceptance received for Australian Patent Appiication No. 2016276028, maiied on Aug. 6, 2019, 3 pages.
Notice of Allowance received for Chinese Patent Application No. 201680026995.6. mailed on Mar. 18, 2020, 2 pages (1 page of English Translation and 1 page of Official Copy).
Notice of Allowance received for Chinese Patent Application No. 201810368058.X, mailed on Jul. 30, 2021, 2 pages (1 page of English Translation and 1 page of Official Copy).
Notice of Allowance received for Chinese Patent Application No. 201810375380.5. mailed on Jul. 25, 2022, 2 pages (1 page of English Translation and 1 page of Official Copy).
Notice of Allowance received for Chinese Patent Application No. 201810760112.5. mailed on Sep. 21, 2020, 4 pages (1 page of English Translation and 3 pages of Official Copy).
Notice of Allowance received for U.S. Appl. No. 15/835,366, mailed on Jul. 23, 2020, 10 pages.
Notice of Allowance received for U.S. Appl. No. 16/136,178, mailed on Dec. 5, 2022, 9 pages.
Notice of Allowance received for U.S. Appl. No. 16/136,178, mailed on Sep. 9, 2022, 8 pages.
Office Action received for Australian Patent Application No. 2016278028, mailed on Aug. 9, 2018, 4 pages.
Office Action received for Australian Patent Application No. 2016278028, mailed on May 13, 2019, 4 pages.

Office Action received for Australian Patent Application No. 2019257353, mailed on Sep. 7, 2020, 4 pages.
Office Action received for Chinese Patent Application No. 201680026995.6 mailed on Oct. 22, 2019, 15 pages (6 pages of English Transiation and 9 pages of Official Copy).
Office Action received for Chinese Patent Application No. 201810368058.X, mailed on Mar. 20, 2020, 15 pages (7 pages of English Translation and 8 pages of Official Copy).
Office Action received for Chinese Patent Application No. 201810368058.X, mailed on Mar. 8, 2021, 6 pages (3 pages of English Translation and 3 pages of Official Copy).
Office Action received for Chinese Patent Application No. 201810368058.X, mailed on Nov. 3, 2020, 16 pages (7 pages of English Translation and 9 pages of Official Copy).
Office Action received for Chinese Patent Application No. 201810375380.5, mailed on Apr. 2, 2022, 11 pages (6 pages of English Translation and 5 pages of Official Copy).
Office Action received for Chinese Patent Application No. 201810375380.5, mailed on Jan. 14, 2022, 16 pages (8 pages of English Translation and 8 pages of Official Copy).
Office Action received for Chinese Patent Application No. 201810375380.5, mailed on Mar. 3, 2020, 13 pages (6 pages of English Translation and 7 pages of Official Copy).
Office Action received for Chinese Patent Application No. 201810375380.5, mailed on Nov. 12, 2020, 16 pages (8 pages of English Translation and 8 pages of Official Copy).
Office Action received for Chinese Patent Application No. 201810375380.5, mailed on Sep. 15, 2021, 10 pages (5 pages of English Translation and 5 pages of Official Copy).
Office Action received for Chinese Patent Application No. 201810760112.5, mailed on Feb. 26, 2020, 11 pages (5 pages of English Translation and 6 pages of Official Copy).
Office Action received for Chinese Patent Application No. 201810760112.5, mailed on Jul. 21, 2020, 6 pages (3 pages of English Translation and 3 pages of Official Copy).
Office Action received for Chinese Patent Application No. 202110327012.5, mailed on Mar. 31, 2025, 19 pages (1 pages of English Translation and 18 pages of Official Copy).
Office Action received for Danish Patent Application No. PA201570865, mailed on Mar. 8, 2017, 5 pages.
Office Action received for Danish Patent Application No. PA201570865, mailed on Oct. 10, 2017, 2 pages.
Office Action received for Danish Patent Application No. PA201570865, mailed on Sep. 2, 2016, 4 pages.
Office Action received for Danish Patent Application No. PA201570867, mailed on Feb. 21, 2017, 2 pages.
Office Action received for Danish Patent Application No. PA201570867, mailed on Sep. 7, 2016, 3 pages.
Office Action received for Danish Patent Application No. PA201570871, mailed on Jun. 12, 2017, 3 pages.
Office Action received for Danish Patent Application No. PA201570871, mailed on Oct. 18, 2016, 4 pages.
Office Action received for Danish Patent Application No. PA201570874, mailed on Aug. 31, 2016, 4 pages.
Office Action received for Danish Patent Application No. PA201570874, mailed on May 15, 2017, 4 pages.
Office Action received for Danish Patent Application No. PA201570880, mailed on Feb. 1, 2018, 2 pages.
Office Action received for Danish Patent Application No. PA201570880, mailed on Mar. 31, 2017, 5 pages.
Office Action received for Danish Patent Application No. PA201570880, mailed on Oct. 24, 2017, 4 pages.
Office Action received for Danish Patent Application No. PA201570880, mailed on Sep. 7, 2016, 3 pages.
Office Action received for European Patent Application No. 16728165.8, mailed on Aug. 29, 2018, 4 pages.
Office Action received for European Patent Application No. 18196448.7, mailed on Sep. 16, 2019, 4 pages.
Office Action received for European Patent Application No. 20193661.4, mailed on Sep. 13, 2021, 6 pages.
Pre-Appeal Review Report received for Japanese Patent Application No. 2023-572748, mailed on Apr. 1, 2025, 4 pages (2 pages of Enghish Translation and 2 pages of Official Copy).

(56) References Cited

OTHER PUBLICATIONS

Schulzrinne, H., "Indication of Message Camposition for Instant Messaging", Network Working Group, Columbia University, Jan. 2005, 14 pages.
Search Report and Opinion received for Danish Patent Application No. PA201570865, mailed on Mar. 30, 2016, 6 pages.
Search Report and Opinion received for Danish Patent Application No. PA201570867, mailed on Apr. 1, 2016, 6 pages.
Search Report and Opinion received for Danish Patent Application No. PA201570871, mailed on Apr. 12, 2016, 7 pages.
Search Report and Opinion received for Danish Patent Application No. PA201570874, mailed on Mar. 30, 2016, 7 pages.
Search Report and Opinion received for Danish Patent Application No. PA201570880, mailed on Apr. 4, 2016, 6 pages.
Applicant-Initiated Interview Summary received for U.S. Appl. No. 17/484,899, mailed on Jun. 24, 2024, 4 pages.
Anonymous, "Split Your Screen with IPEVO Visualizer Software", On IPEVO, Available online at: https://medium.com/ipevo/split-your-screen-with-ipevo-visualizer-software-e9641024d24f, Feb. 24, 2020, 10 pages.
Applicant-Initiated Interview Summary received for U.S. Appl. No. 17/950,868, mailed on Jul. 19, 2024, 2 pages.
Applicant-Initiated Interview Summary received for U.S. Appl. No. 17/970,417, mailed on Jun. 26, 2024, 2 pages.
Applicant-Initiated Interview Summary received for U.S. Appl. No. 18/067,350, mailed on Jul. 29, 2024, 3 pages.
Applicant-Initiated Interview Summary received for U.S. Appl. No. 18/165,144, mailed on Jul. 15, 2024, 4 pages.
Avery, William, et al., "Kinect", Wikipedia, Feb. 26, 2015, 14 pages.
Cosmic Mook, "Line laboratory, New function Exhaustive Coverage! LINE 120% Application Guide, Inc.", Jan. 24, 2018, 7 pages (Official Copy only). See Communication under Rule 37 CFR § 1.98(a) (3).
Examiner-Initiated Interview Summary received for U.S. Appl. No. 17/950,868, mailed on Jul. 5, 2024, 2 pages.
Extended European Search Report received for European Patent Application No. 24160234.1, mailed on May 28, 2024, 6 pages.
Extended European Search Report received for European Patent Application No. 24164409.5, mailed on Jun. 14, 2024, 5 pages.
Final Office Action received for U.S. Appl. No. 18/165.144, mailed on Jun. 11, 2024, 32 pages.
Myoko, Mori, "Line Perfect Guide Book [Revised Version]", Sotec Co. Ltd., Dec. 31, 2013, 5 pages (Official Copy only). See Communication under Rule 37 CFR § 1.98(a) (3).
Non-Final Office Action received for U.S. Appl. No. 18/067,350, mailed on May 28, 2024, 43 pages.
Non-Final Office Action received for U.S. Appl. No. 18/380,116, mailed on Jul. 18, 2024, 16 pages.
Non-Final Office Action received for U.S. Appl. No. 18/389,655, mailed on Aug. 23, 2024, 23 pages.
Notice of Acceptance received for Australian Patent Application No. 2024202768, mailed on Jun. 4, 2024, 3 pages.
Notice of Allowance received for Japanese Patent Application No. 2022-116534, mailed on Jun. 24, 2024, 4 pages (1 page of English Translation and 3 pages of Official Copy).
Notice of Allowance received for Japanese Patent Application No. 2023-097196, mailed on Jul. 29, 2024, 4 pages (1 page of English Translation and 3 pages of Official Copy).
Notice of Allowance received for Japanese Patent Application No. 2023-571161, mailed on Jul. 30, 2024, 3 pages (1 page of English Translation and 2 pages of Official Copy).
Notice of Allowance received for Korean Patent Application No. 10-2022-0053111, mailed on Jun. 25, 2024, 7 pages (2 pages of English Translation and 5 pages of Official Copy).
Notice of Allowance received for Korean Patent Application No. 10-2023-0001668, mailed on May 22, 2024, 6 pages (2 pages of English Translation and 4 pages of Official Copy).
Notice of Allowance received for Korean Patent Application No. 10-2023-7040599, mailed on Jun. 26, 2024, 7 pages (2 pages of English Translation and 5 pages of Official Copy).

Notice of Allowance received for U.S. Appl. No. 17/484,899, mailed on Aug. 26, 2024, 21 pages.
Notice of Allowance received for U.S. Appl. No. 17/684,843, mailed on Jun. 5, 2024, 5 pages.
Notice of Allowance received for U.S. Appl. No. 17/903,946, mailed on Aug. 27, 2024, 5 pages.
Octoba, "Enjoy free calls with LINE! Part 2", retrieved from: https://web.archive.org/web/20170923013859/https://octoba.net/archives/line-call2.html, Sep. 23, 2017, 13 pages (Official Copy only). See Communication under Rule 37 CFR § 1.98(a) (3).
Office Action received for Australian Patent Application No. 2023201057, mailed on Jun. 19, 2024, 5 pages.
Office Action received for Chinese Patent Application No. 201910704856.X, mailed on Jun. 11, 2024, 33 pages (1 page of English Translation and 32 pages of Official Copy).
Office Action received for Chinese Patent Application No. 201910704856.X, mailed on Jun. 23, 2024, 12 pages (6 pages of English Translation and 6 pages of Official Copy).
Office Action received for Chinese Patent Application No. 202110894284.3, mailed on Jun. 27, 2024, 10 pages (5 pages of English Translation and 5 pages of Official Copy).
Office Action received for Chinese Patent Application No. 202311185909.4, mailed on Jun. 12, 2024, 18 pages (10 pages of English Translation and 8 pages of Official Copy).
Office Action received for European Patent Application No. 22705232.1, mailed on May 27, 2024, 7 pages.
Office Action received for European Patent Application No. 22792995.7, mailed on Jun. 24, 2024, 6 pages.
Office Action received for Japanese Patent Application No. 2023-097196, mailed on Jun. 7, 2024, 7 pages (3 pages of English Translation and 4 pages of Official Copy).
Office Action received for Japanese Patent Application No. 2023-571161, mailed on May 28, 2024, 4 pages (2 pages of English Translation and 2 pages of Official Copy).
Office Action received for Japanese Patent Application No. 2023-571312, mailed on Jul. 16, 2024, 4 pages (2 pages of English Translation and 2 pages of Official Copy).
Office Action received for Japanese Patent Application No. 2024-003876, mailed on Jul. 2, 2024, 3 pages (1 page of English Translation and 2 pages of Official Copy).
Office Action received for Korean Patent Application No. 10-2024-7019962, mailed on Jul. 16, 2024, 6 pages (2 pages of English Translation and 4 pages of Official Copy).
That Guy who Loves METV and SSBB Mods. "Kinect Party Gameplay". Available online at: https://youtu.be/bkbOlzfyLzc?si=QAAKh_V4aqY0iegL, Oct. 20, 2021, 2 pages.
Xbox, "Kinect Tips, Part 3: Gesture Controls", Available online at: https://youtu.be/VXhhE-l96qQ?si=gLmHbp9jOm-w0fNW, May 7, 2014, 3 pages.
Applicant-Initiated Interview Summary received for U.S. Appl. No. 18/165,144, mailed on Dec. 23, 2024, 4 pages.
Applicant-Initiated Interview Summary received for U.S. Appl. No. 18/422,571, mailed on Jan. 2, 2025, 2 pages.
Notice of Allowance received for U.S. Appl. No. 15/784,806, mailed on Jan. 2, 2025, 5 pages.
Notice of Hearing received for Indian Patent Application No. 202015013360, mailed on Dec. 26, 2024, 2 pages.
Office Action received for Australian Patent Application No. 2023201057, mailed on Dec. 19, 2024, 4 pages.
Extended European Search Report received for European Patent Application No. 24215184.3, mailed on Jan. 24, 2025, 11 pages.
Final Office Action received for U.S. Appl. No. 18/380,116, mailed on Jan. 30, 2025, 17 pages.
Notice of Allowance received for Chinese Patent Application No. 202311831154.0, mailed on Jan. 17, 2025, 4 pages (1 page of English Translation and 3 pages of Official Copy).
Notice of Allowance received for U.S. Appl. No. 17/483,679, mailed on Jan. 29, 2025, 5 pages.
Notice of Allowance received for U.S. Appl. No. 18/140,449, mailed on Jan. 21, 2025, 10 pages.
Office Action received for Australian Patent Application No. 2023201057, mailed on Jan. 28, 2025, 3 pages.

(56) References Cited

OTHER PUBLICATIONS

Office Action received for Chinese Patent Application No. 202110894284.3, mailed on Jan. 10, 2025, 9 pages (4 pages of English Translation and 5 pages of Official Copy).
Office Action received for Japanese Patent Application No. 2023-572748, mailed on Nov. 21, 2024, 31 pages (28 pages of English Translation and 3 pages of Official Copy).
Supplemental Notice of Allowance received for U.S. Appl. No. 17/484,899, mailed on Feb. 3, 2025, 5 pages.
"6. Voice chat with friends through QQ", Online available at: https://v.qq.com/x/page/a0166p7xrt0.html, Sep. 22, 2015, 1 page.
Jiutian Technology, "Windows 8 Chinese version from entry to proficiency", Jan. 1, 2014, 5 pages.
Kimura Ryoji, "Keynote presentation practice guide for iPad & iPhone", K.K. Rutles, first edition, Feb. 29, 2012, 4 pages.
Issued by the Chinese Patent Office in related Patent Application No. 201620051290.7, on Jun. 22, 2016.
Issued by the Japanese Patent Office in related Patent Application No. 2015-095183, on Apr. 21, 2017.
Issued by the Japanese Patent Office in related Patent Application No. 2016-130565, on Aug. 28, 2017.
Issued by the Korean Patent Office in related Patent Application No. 10-2013-7022057 on Apr. 27, 2015.
Issued by the Taiwanese Patent Office in related Patent Application No. 104117041, on Feb. 24, 2017.
Issued by the Chinese Patent Office in related Patent Application No. 201080064125.0 on Jun. 10, 2014.
Issued by the Hong Kong Patent Office in related Patent Application No. 151051633, on Jun. 5, 2015.
Issued by the Japanese Patent Office in related Patent Application No. 2013-550664 on Jun. 10, 2016.
Issued by the Korean Patent Office in related Patent Application No. 10-2012-7020548 on Oct. 10, 2013.
Issued by the Korean Patent Office in related Patent Application No. 10-2014-7033660 on Feb. 23, 2015.
QQ, "Method of QQ voice chat", Online Available at: https://www.taodocs.com/p-47909082.html, May 25, 2016, 3 pages.
Shangmeng, Li, "The Design and Implementation of Mobile Terminal System of Multimedia Conference Based on Symbian Operating System", China Academic Journal Electronic Publishing House, online available at: http://www.cnki.net, 2011, 66 pages.
Song Jianhua, "Guidelines for Network", Feb. 29, 2008, 11 pages.
Applicant-Initiated Interview Summary received for U.S. Appl. No. 18/499,848, mailed on Feb. 12, 2025, 2 pages.
Decision to Grant received for Japanese Patent Application No. 2024-173274, mailed on Feb. 10, 2025, 3 pages (1 page of English Translation and 2 pages of Official Copy).
Examiner-Initiated Interview Summary received for U.S. Appl. No. 18/499,848, mailed on Feb. 14, 2025, 3 pages.
Non-Final Office Action received for U.S. Appl. No. 18/499,848, mailed on Jan. 27, 2025, 18 pages.
Notice of Allowance received for U.S. Appl. No. 17/950,868, mailed on Feb. 12, 2025, 6 pages.
Notice of Allowance received for U.S. Appl. No. 17/970,417, mailed on Feb. 5, 2025, 6 pages.
Office Action received for Chinese Patent Application No. 202311835200.4, mailed on Dec. 26, 2024, 11 pages (6 pages of English Translation and 5 pages of Official Copy).
Office Action received for European Patent Application No. 22705232.1, mailed on Feb. 4, 2025, 10 pages.
Office Action received for Japanese Patent Application No. 2024-173274, mailed on Jan. 6, 2025, 3 pages (2 pages of English Translation and 1 page of Official Copy).
Applicant-Initiated Interview Summary received for U.S. Appl. No. 18/067,350, mailed on Nov. 26, 2024, 3 pages.
Applicant-Initiated Interview Summary received for U.S. Appl. No. 18/140,449, mailed on Nov. 26, 2024, 2 pages.
Corrected Notice of Allowance received for U.S. Appl. No. 17/950,868, mailed on Nov. 27, 2024, 3 pages.

Corrected Notice of Allowance received for U.S. Appl. No. 18/138,348, mailed on Nov. 27, 2024, 2 pages.
International Preliminary Report on Patentability received for PCT Patent Application No. PCT/US2023/020569, mailed on Nov. 21, 2024, 16 pages.
Notice of Allowance received for U.S. Appl. No. 17/483,679, mailed on Nov. 21, 2024, 8 pages.
Notice of Allowance received for U.S. Appl. No. 18/389,655, mailed on Nov. 27, 2024, 8 pages.
Applicant-Initiated Interview Summary received for U.S. Appl. No. 17/476,404, mailed on Oct. 31, 2023, 4 pages.
Applicant-Initiated Interview Summary received for U.S. Appl. No. 17/483,679, mailed on Dec. 18, 2023, 2 pages.
Applicant-Initiated Interview Summary received for U.S. Appl. No. 17/684,843, mailed on Oct. 5, 2023, 4 pages.
Applicant-Initiated Interview Summary received for U.S. Appl. No. 18/067,350, mailed on Sep. 11, 2023, 4 pages.
Corrected Notice of Allowance received for U.S. Appl. No. 17/483,542, mailed on Feb. 5, 2024, 3 pages.
Corrected Notice of Allowance received for U.S. Appl. No. 17/666,971, mailed on Jan. 16, 2024, 2 pages.
Corrected Notice of Allowance received for U.S. Appl. No. 17/666,971, mailed on Sep. 29, 2023, 2 pages.
Corrected Notice of Allowance received for U.S. Appl. No. 17/732,204, mailed on Dec. 4, 2023, 5 pages.
Corrected Notice of Allowance received for U.S. Appl. No. 17/732,204, mailed on Jan. 18, 2024, 5 pages.
Corrected Notice of Allowance received for U.S. Appl. No. 17/732,204, mailed on Nov. 16, 2023, 6 pages.
Corrected Notice of Allowance received for U.S. Appl. No. 17/740,104, mailed on Jan. 2, 2024, 2 pages.
Corrected Notice of Allowance received for U.S. Appl. No. 17/872,736, mailed on Oct. 13, 2023, 4 pages.
Corrected Notice of Allowance received for U.S. Appl. No. 17/950,922, mailed on Oct. 2, 2023, 3 pages.
Decision to Refuse received for Japanese Patent Application No. 2022-116534, mailed on Jan. 29, 2024, 5 pages (2 pages of English Translation and 3 pages of Official Copy).
Examiner's Answer to Appeal Brief received for U.S. Appl. No. 15/784,806, mailed on Dec. 22, 2023, 27 pages.
Extended European Search Report received for European Patent Application No. 23172038.4, mailed on Oct. 11, 2023, 10 pages.
Extended European Search Report received for European Patent Application No. 23203414.0, mailed on Jan. 26, 2024, 10 pages.
Final Office Action received for U.S. Appl. No. 17/483,679, mailed on Feb. 6, 2024, 45 pages.
Final Office Action received for U.S. Appl. No. 17/484,899, mailed on Nov. 6, 2023, 39 pages.
Final Office Action received for U.S. Appl. No. 17/732,355, mailed on Nov. 3, 2023, 21 pages.
Final Office Action received for U.S. Appl. No. 18/067,350, mailed on Dec. 13, 2023, 44 pages.
Intention to Grant received for European Patent Application No. 15714698.6, mailed on Dec. 8, 2023, 9 pages.
Intention to Grant received for European Patent Application No. 21728781.2, mailed on Dec. 12, 2023, 9 pages.
International Preliminary Report on Patentability received for PCT Patent Application No. PCT/US2022/029261, mailed on Nov. 30, 2023, 12 pages.
International Preliminary Report on Patentability received for PCT Patent Application No. PCT/US2022/029273, mailed on Nov. 30, 2023, 14 pages.
International Preliminary Report on Patentability received for PCT Patent Application No. PCT/US2022/029580, mailed on Nov. 30, 2023, 14 pages.
International Search Report and Written Opinion received for PCT Patent Application No. PCT/US2023/017280, mailed on Jun. 26, 2023, 20 pages.
International Search Report and Written Opinion received for PCT Patent Application No. PCT/US2023/020569, mailed on Nov. 13, 2023, 23 pages.

(56) References Cited

OTHER PUBLICATIONS

International Search Report and Written Opinion received for PCT Patent Application No. PCT/US2023/032911, mailed on Jan. 4, 2024, 18 pages.
Invitation to Pay Additional Fees and Partial International Search Report received for PCT Patent Application No. PCT/US2023/020569, mailed on Sep. 21, 2023, 14 pages.
Non-Final Office Action received for U.S. Appl. No. 18/067,350, mailed on Aug. 3, 2023, 41 pages.
Non-Final Office Action received for U.S. Appl. No. 18/165,144, mailed on Dec. 27, 2023, 20 pages.
Notice of Acceptance received for Australian Patent Application No. 2023248185, mailed on Jan. 23, 2024, 3 pages.
Notice of Allowance received for Korean Patent Application No. 10-2023-7024157, mailed on Sep. 19, 2023, 7 pages (2 pages of English Translation and 5 pages of Official Copy).
Notice of Allowance received for U.S. Appl. No. 17/479,897, mailed on Oct. 3, 2023, 5 pages.
Notice of Allowance received for U.S. Appl. No. 17/483,542, mailed on Dec. 20, 2023, 6 pages.
Notice of Allowance received for U.S. Appl. No. 17/666,971, mailed on Dec. 15, 2023, 8 pages.
Notice of Allowance received for U.S. Appl. No. 17/732,204, mailed on Oct. 12, 2023, 8 pages.
Notice of Allowance received for U.S. Appl. No. 17/740,104, mailed on Oct. 4, 2023, 5 pages.
Office Action received for Australian Patent Application No. 2023201057, mailed on Jan. 25, 2024, 6 pages.
Office Action received for Australian Patent Application No. 2023204396, mailed on Jan. 8, 2024, 5 pages.
Office Action received for Australian Patent Application No. 2023248185, mailed on Nov. 22, 2023, 2 pages.
Office Action received for Australian Patent Application No. 2023248185, mailed on Oct. 20, 2023, 3 pages.
Office Action received for European Patent Application No. 20166552.8, mailed on Nov. 3, 2023, 3 pages.
Office Action received for Korean Patent Application No. 10-2022-0053111, mailed on Oct. 23, 2023, 10 pages (5 pages of English Translation and 5 pages of Official Copy).
Office Action received for Korean Patent Application No. 10-2023-0001668, mailed on Nov. 3, 2023, 5 pages (2 pages of English Translation and 3 pages of Official Copy).
Advisory Action received for U.S. Appl. No. 17/950,868, mailed on Sep. 24, 2024, 3 pages.
Applicant-Initiated Interview Summary received for U.S. Appl. No. 18/389,655, mailed on Sep. 20, 2024, 6 pages.
Intention to Grant received for European Patent Application No. 22734711.9, mailed on Sep. 13, 2024, 7 pages.
Non-Final Office Action received for U.S. Appl. No. 18/422,571, mailed on Sep. 26, 2024, 19 pages.
Non-Final Office Action received for U.S. Appl. No. 18/535,820, mailed on Sep. 25, 2024, 27 pages.
Office Action received for Chinese Patent Application No. 202311753064.4, mailed on Aug. 23, 2024, 18 pages (11 pages of English Translation and 7 pages of Official Copy).
Office Action received for Chinese Patent Application No. 202311831154.0, mailed on Aug. 30, 2024, 13 pages (7 pages of English Translation and 6 pages of Official Copy). .
Office Action received for Chinese Patent Application No. 202311835200.4, mailed on Aug. 29, 2024, 16 pages (7 pages of English Translation and 9 pages of Official Copy).
Office Action received for Japanese Patent Application No. 2023-572748, mailed on Jul. 29, 2024, 4 pages (2 pages of English Translation and 2 pages of Official Copy).
Supplemental Notice of Allowance received for U.S. Appl. No. 17/484,899, mailed on Sep. 30, 2024, 5 pages.
Corrected Notice of Allowance received for U.S. Appl. No. 17/970,417, mailed on Feb. 20, 2025, 2 pages.
Corrected Notice of Allowance received for U.S. Appl. No. 18/389,655, mailed on Feb. 24, 2025, 2 pages.

Final Office Action received for U.S. Appl. No. 18/165,144, mailed on Feb. 27, 2025, 37 pages.
Final Office Action received for U.S. Appl. No. 18/535,820, mailed on Feb. 27, 2025, 35 pages.
Intention to Grant received for European Patent Application No. 22792995.7, mailed on Feb. 17, 2025, 9 pages.
Non-Final Office Action received for U.S. Appl. No. 17/745,680, mailed on Feb. 20, 2025, 28 pages.
Office Action received for Chinese Patent Application No. 202110327012.5, mailed on Feb. 10, 2025, 22 pages (13 pages of English Translation and 9 pages of Official Copy).
Office Action received for Chinese Patent Application No. 202410030102.1, mailed on Jan. 22, 2025, 14 pages (8 pages of English Translation and 6 pages of Official Copy).
Office Action received for European Patent Application No. 22733778.9, mailed on Feb. 20, 2025, 4 pages.
Office Action received for European Patent Application No. 24160234.1, mailed on Feb. 20, 2025, 3 pages.
Koyama, Kaori, "Mac Fan Macintosh Master Book Mac OS X v10.4 "Tiger" & iLife", '06 version, Mainichi. Communications Inc. Nobuyuki Nakagawa, Jul. 9, 2007, 4 pages.
Notice of Allowance received for U.S. Appl. No. 18/138,348, mailed on Mar. 12, 2025, 10 pages.
Office Action received for Chinese Patent Application No. 202311185909.4, mailed on Feb. 13, 2025, 16 pages (10 pages of English Translation and 6 pages of Official Copy).
Office Action received for Chinese Patent Application No. 202410924550.6, mailed on Mar. 1, 2025, 12 pages (5 pages of English Translation and 7 pages of Official Copy).
Office Action received for Chinese Patent Application No. 202410924556.3, mailed on Feb. 28, 2025, 11 pages (5 pages of English Translation and 6 pages of Official Copy).
Office Action received for European Patent Application No. 22729921.1, mailed on Mar. 13, 2025, 8 pages.
Applicant-Initiated Interview Summary received for U.S. Appl. No. 17/484,899, mailed on Feb. 14, 2024, 8 pages.
Applicant-Initiated Interview Summary received for U.S. Appl. No. 18/067,350, mailed on Mar. 13, 2024, 4 pages.
Applicant-Initiated Interview Summary received for U.S. Appl. No. 18/165,144, mailed on Feb. 27, 2024, 3 pages.
Corrected Notice of Allowance received for U.S. Appl. No. 17/684,843, mailed on Mar. 4, 2024, 2 pages.
Corrected Notice of Allowance received for U.S. Appl. No. 17/903,946, mailed on Apr. 22, 2024, 2 pages.
Decision to Grant received for European Patent Application No. 15714698.6, mailed on Apr. 5, 2024, 2 pages.
Decision to Grant received for European Patent Application No. 21728781.2, mailed on Feb. 8, 2024, 3 pages.
International Preliminary Report on Patentability received for PCT Patent Application No. PCT/US2022/044592, mailed on Apr. 4, 2024, 21 pages.
International Search Report and Written Opinion received for PCT Patent Application No. PCT/US2023/032792, mailed on Jan. 19, 2024, 15 pages.
International Search Report and Written Opinion received for PCT Patent Application No. PCT/US2023/033372, mailed on Jan. 12, 2024, 21 pages.
Invitation to Pay Additional Fees and Partial International Search Report received for PCT Patent Application No. PCT/US2023/033372, mailed on Nov. 22, 2023, 13 pages.
Non-Final Office Action received for U.S. Appl. No. 17/484,899, mailed on Mar. 21, 2024, 42 pages.
Non-Final Office Action received for U.S. Appl. No. 17/950,868, mailed on Apr. 24, 2024, 16 pages.
Non-Final Office Action received for U.S. Appl. No. 17/970,417, mailed on Apr. 10, 2024, 16 pages.
Non-Final Office Action received for U.S. Appl. No. 18/138,348, mailed on Apr. 30, 2024, 16 pages.
Notice of Acceptance received for Australian Patent Application No. 2023204396, mailed on Apr. 15, 2024, 3 pages.
Notice of Allowance received for Chinese Patent Application No. 202311042451.7, mailed on May 15, 2024, 4 pages (1 page of English Translation and 3 pages of Official Copy).

(56) References Cited

OTHER PUBLICATIONS

Notice of Allowance received for Korean Patent Application No. 10-2023-7039382, mailed on Feb. 13, 2024, 6 pages (2 pages of English Translation and 4 pages of Official Copy).
Notice of Allowance received for Korean Patent Application No. 10-2023-7044044, mailed on Mar. 14, 2024, 7 pages (2 pages of English Translation and 5 pages of Official Copy).
Notice of Allowance received for Korean Patent Application No. 10-2024-7000870, mailed on Feb. 13, 2024, 5 pages (2 pages of English Translation and 3 pages of Official Copy).
Notice of Allowance received for U.S. Appl. No. 17/684,843, mailed on Feb. 14, 2024, 8 pages.
Notice of Allowance received for U.S. Appl. No. 17/903,946, mailed on Apr. 10, 2024, 7 pages.
Office Action received for Chinese Patent Application No. 201910704856.X, mailed on Mar. 8, 2024, 13 pages (7 pages of English Translation and 6 pages of Official Copy).
Office Action received for Japanese Patent Application No. 2023-028786, mailed on Mar. 22, 2024, 10 pages (5 pages of English Translation and 5 pages of Official Copy).
Office Action received for Korean Patent Application No. 10-2023-7018775, mailed on Feb. 28, 2024, 8 pages (3 pages of English Translation and 5 pages of Official Copy).
Office Action received for Korean Patent Application No. 10-2023-7040599, mailed on Mar. 12, 2024, 6 pages (2 pages of English Translation and 4 pages of Official Copy).
6. Voice chat with friends through QQ, Online available at: https://v.qq.com/x/page/a0166p7xrt0.html, Sep. 22, 2015, 1 page (Official Copy Only). {See Communication under Rule 37 CFR § 1.98(a)(3)}.
Abdulezer et al., "Skype For Dummies", Available Online at: https://ixn.es/Skype%20For%20Dummies.pdf, 2007, 361 pages.
Advisory Action received for U.S. Appl. No. 10/179,775, mailed on Oct. 13, 2015, 4 pages.
Advisory Action received for U.S. Appl. No. 10/179,775, mailed on Oct. 14, 2010, 2 pages.
Advisory Action received for U.S. Appl. No. 10/179,775, mailed on Sep. 15, 2009, 2 pages.
Advisory Action received for U.S. Appl. No. 12/890,499, mailed on Jan. 11, 2016, 3 pages.
Advisory Action received for U.S. Appl. No. 13/077,850, mailed on Apr. 24, 2014, 3 pages.
Advisory Action received for U.S. Appl. No. 13/077,855, mailed on Jun. 15, 2016, 4 pages.
Advisory Action received for U.S. Appl. No. 13/077,862, mailed on Apr. 7, 2016, 3 pages.
Advisory Action received for U.S. Appl. No. 13/077,874, mailed on Aug. 19, 2016, 3 pages.
Advisory Action received for U.S. Appl. No. 17/483,679, mailed on Sep. 20, 2022, 8 pages.
Androidcentral, "How do I respond to group messages from notification bar?", Available online at: https://forums.androidcentral.com/ask-question/952030-how-do-i-respond-group-messages-notification-bar.html, Mar. 25, 2019, 3 pages.
Anonymous, "Chapter 13: Menus", Apple Human Interface Guidelines, available at <https://developer.apple.com/library/mac/documentation/UserExperience/Conceptual/OSXHIGuidelines/index.html>, retrieved on Aug. 20, 2009, pp. 165-190.
Appeal Decision received for U.S. Appl. No. 13/077,862, mailed on Mar. 22, 2019, 10 pages.
Apple, "iPhone User's Guide", Available at <http://mesnotices.20minutes.fr/manuel-notice-mode-emploi/APPLE/IPHONE%2D%5FE#>, Retrieved on Mar. 27, 2008, Jun. 2007, 137 pages.
Applicant-Initiated Interview Summary received for U.S. Appl. No. 14/641,304, mailed on Dec. 2, 2019, 5 pages.
Applicant-Initiated Interview Summary received for U.S. Appl. No. 14/641,304, mailed on Jul. 28, 2020, 5 pages.
Applicant-Initiated Interview Summary received for U.S. Appl. No. 15/784,806, mailed on Aug. 2, 2021, 5 pages.
Applicant-Initiated Interview Summary received for U.S. Appl. No. 16/790,619, mailed on Jul. 28, 2020, 3 pages.
Applicant-Initiated Interview Summary received for U.S. Appl. No. 16/859,101, mailed on Nov. 30, 2021, 2 pages.
Applicant-Initiated Interview Summary received for U.S. Appl. No. 17/666,971, mailed on Jun. 9, 2023, 2 pages.
Applicant-Initiated Interview Summary received for U.S. Appl. No. 15/784,806, mailed on Dec. 21, 2020, 5 pages.
Applicant-Initiated Interview Summary received for U.S. Appl. No. 15/784,806, mailed on Jan. 24, 2022, 3 pages.
Applicant-Initiated Interview Summary received for U.S. Appl. No. 15/784,806, mailed on Jun. 2, 2023, 5 pages.
Applicant-Initiated Interview Summary received for U.S. Appl. No. 15/784,806, mailed on Nov. 3, 2022, 5 pages.
Applicant-Initiated Interview Summary received for U.S. Appl. No. 16/528,941, mailed on Jun. 19, 2020, 3 pages.
Applicant-Initiated Interview Summary received for U.S. Appl. No. 16/528,941, mailed on Nov. 10, 2020, 2 pages.
Applicant-Initiated Interview Summary received for U.S. Appl. No. 16/799,481, mailed on Jul. 24, 2020, 3 pages.
Applicant-Initiated Interview Summary received for U.S. Appl. No. 17/026,818, mailed on Dec. 15, 2020, 7 pages.
Applicant-Initiated Interview Summary received for U.S. Appl. No. 17/026,818, mailed on Mar. 8, 2021, 4 pages.
Applicant-Initiated Interview Summary received for U.S. Appl. No. 17/121,610, mailed on Oct. 29, 2021, 2 pages.
Applicant-Initiated Interview Summary received for U.S. Appl. No. 17/223,794, mailed on Sep. 7, 2021, 3 pages.
Applicant-Initiated Interview Summary received for U.S. Appl. No. 17/476,404, mailed on Dec. 20, 2022, 2 pages.
Applicant-Initiated Interview Summary received for U.S. Appl. No. 17/476,404, mailed on Jul. 27, 2022, 6 pages.
Applicant-Initiated Interview Summary received for U.S. Appl. No. 17/476,404, mailed on Jun. 2, 2023, 2 pages.
Applicant-Initiated Interview Summary received for U.S. Appl. No. 17/476,404, mailed on Mar. 18, 2022, 2 pages.
Applicant-Initiated Interview Summary received for U.S. Appl. No. 17/479,897, mailed on Jun. 12, 2023, 2 pages.
Applicant-Initiated Interview Summary received for U.S. Appl. No. 17/479,897, mailed on Oct. 31, 2022, 3 pages.
Applicant-Initiated Interview Summary received for U.S. Appl. No. 17/482,977, mailed on Dec. 5, 2022, 2 pages.
Applicant-Initiated Interview Summary received for U.S. Appl. No. 17/482,987, mailed on Apr. 11, 2022, 4 pages.
Applicant-Initiated Interview Summary received for U.S. Appl. No. 17/483,542, mailed on May 22, 2023, 3 pages.
Applicant-Initiated Interview Summary received for U.S. Appl. No. 17/483,542, mailed on Nov. 23, 2022, 4 pages.
Applicant-Initiated Interview Summary received for U.S. Appl. No. 17/483,564, mailed on Apr. 21, 2023, 5 pages.
Applicant-Initiated Interview Summary received for U.S. Appl. No. 17/483,564, mailed on Jul. 21, 2022, 5 pages.
Applicant-Initiated Interview Summary received for U.S. Appl. No. 17/483,564 mailed on Jun. 21, 2023, 4 pages.
Applicant-Initiated Interview Summary received for U.S. Appl. No. 17/483,564, mailed on Mar. 14, 2022, 2 pages.
Applicant-Initiated Interview Summary received for U.S. Appl. No. 17/483,679, mailed on Apr. 29, 2022, 2 pages.
Applicant-Initiated Interview Summary received for U.S. Appl. No. 17/483,679, mailed on Aug. 18, 2023, 2 pages.
Applicant-Initiated Interview Summary received for U.S. Appl. No. 17/483,679, mailed on Aug. 23, 2022, 3 pages.
Applicant-Initiated Interview Summary received for U.S. Appl. No. 17/483,679, mailed on May 19, 2023, 3 pages.
Applicant-Initiated Interview Summary received for U.S. Appl. No. 17/484,899, mailed on Apr. 27, 2022, 5 pages.
Applicant-Initiated Interview Summary received for U.S. Appl. No. 17/484,899, mailed on Sep. 1, 2022, 5 pages.
Applicant-Initiated Interview Summary received for U.S. Appl. No. 17/484,899, mailed on Sep. 12, 2023, 6 pages.
Applicant-Initiated Interview Summary received for U.S. Appl. No. 17/484,907, mailed on Jan. 10, 2022, 2 pages.

(56) References Cited

OTHER PUBLICATIONS

Applicant-Initiated Interview Summary received for U.S. Appl. No. 17/732,355, mailed on Sep. 20, 2023, 2 pages.
Applicant-Initiated Interview Summary received for U.S. Appl. No. 17/872,736 mailed on Jul. 25, 2023, 2 pages.
Applicant-Initiated Interview Summary received for U.S. Appl. No. 17/950,900, mailed on Jan. 26, 2023, 5 pages.
Baig Ed, "Palm Pre: The Missing Manual", Safari Books Online, Available at <http://my.safaribooksonline.com/book/operating-systems/0596528264>, Aug. 27, 2009, 16 pages.
Benge et al., "Designing Custom Controls", IBM OS/2 Developer, The Magazine for Advanced Software Development, vol. 5, No. 2, 1993, pp. 72-85.
Board Decision received for Chinese Patent Application No. 201510288981.9, mailed on May 6, 2021, 31 pages (3 pages of English Translation and 28 pages of Official Copy).
Board Opinion received for Chinese Patent Application No. 201510288981.9, mailed on Jan. 4, 2021, 21 pages (9 pages of English Translation and 12 pages of Official Copy).
Brief Communication Regarding Oral Proceedings received for European Patent Application No. 20205496.1, mailed on Apr. 19, 2023, 1 page.
Certificate of Examination received for Australian Patent Application No. 2019100499, mailed on Aug. 15, 2019, 2 pages.
Certificate of Examination received for Australian Patent Application No. 2019101062, mailed on Jun. 2, 2020, 2 pages.
Certificate of Examination received for Australian Patent Application No. 2020101324, mailed on Sep. 7, 2020, 2 pages.
Chan Christine, "Handoff Your Browser to Your iPhone or iPad! Plus A Chance To Win A Copy!", Apr. 12, 2011, 2 pages.
Corrected Notice of Allowance received for U.S. Appl. No. 13/077,874, mailed on Dec. 9, 2016, 2 pages.
Corrected Notice of Allowance received for U.S. Appl. No. 14/641,298, mailed on Dec. 9, 2021, 5 pages.
Corrected Notice of Allowance received for U.S. Appl. No. 16/109,552, mailed on Jun. 13, 2019, 2 pages.
Corrected Notice of Allowance received for U.S. Appl. No. 16/144,572, mailed on Mar. 21, 2019, 3 pages.
Corrected Notice of received for U.S. Appl. No. 16/147,432, mailed on Jan. 18, 2019, 3 pages.
Corrected Notice of received for U.S. Appl. No. 16/147,432, mailed on Jul. 16, 2019, 3 pages.
Corrected Notice of Allowance received for U.S. Appl. No. 16/511,578, mailed on Feb. 13, 2020, 3 pages.
Corrected Notice of Allowance received for U.S. Appl. No. 16/790,619, mailed on Oct. 13, 2020, 3 pages.
Corrected Notice of Allowance received for U.S. Appl. No. 16/799,481, mailed on Oct. 27, 2020, 3 pages.
Corrected Notice of Allowance received for U.S. Appl. No. 16/859,101, mailed on Mar. 25, 2022, 2 pages.
Corrected Notice of Allowance received for U.S. Appl. No. 17/027,373, mailed on Jul. 12, 2022, 2 pages.
Corrected Notice of Allowance received for U.S. Appl. No. 17/027,373, mailed on Oct. 26, 2022, 2 pages.
Corrected Notice of Allowance received for U.S. Appl. No. 17/121,610, mailed on Jun. 7, 2022, 4 pages.
Corrected Notice of Allowance received for U.S. Appl. No. 17/121,610, mailed on Mar. 31, 2022, 3 pages.
Corrected Notice of Allowance received for U.S. Appl. No. 17/121,610, mailed on May 20, 2022, 4 pages.
Corrected Notice of Allowance received for U.S. Appl. No. 17/157,166, mailed on April 13, 2022, 4 pages.
Corrected Notice of Allowance received for U.S. Appl. No. 17/157,166, mailed on Apr. 25, 2022, 4 pages.
Corrected Notice of Allowance received for U.S. Appl. No. 17/151,166, mailed on Dec. 9, 2021, 4 pages.
Corrected Notice of Allowance received for U.S. Appl. No. 17/157,166, mailed on Dec. 15, 2021, 4 pages.
Corrected Notice of Allowance received for U.S. Appl. No. 17/157,166, mailed on Jan. 5, 2022, 4 pages.

Corrected Notice of Allowance received for U.S. Appl. No. 17/157,166, mailed on Jun. 29, 2022, 4 pages.
Corrected Notice of Allowance received for U.S. Appl. No. 17/479,897, mailed on Aug. 17, 2023, 2 pages.
Corrected Notice of Allowance received for U.S. Appl. No. 17/482,977, mailed on Apr. 24, 2023, 3 pages.
Corrected Notice of Allowance received for U.S. Appl. No. 17/483,542, mailed on Aug. 25, 2023, 3 pages.
Corrected Notice of Allowance received for U.S. Appl. No. 17/483,549, mailed on Aug. 24, 2022, 3 pages.
Corrected Notice of Allowance received for U.S. Appl. No. 17/483,582, mailed on Feb. 15, 2022, 2 pages.
Corrected Notice of Allowance received for U.S. Appl. No. 17/484,907, mailed on Aug. 26, 2022, 2 pages.
Corrected Notice of Allowance received for U.S. Appl. No. 17/484,907, mailed on Jun. 15, 2022, 2 pages.
Corrected Notice of Allowance received for U.S. Appl. No. 17/484,907, mailed on Mar. 18, 2022, 2 pages.
Corrected Notice of Allowance received for U.S. Appl. No. 17/950,900, mailed on Apr. 14, 2023, 2 pages.
Corrected Notice of Allowance received for U.S. Appl. No. 17/950,900, mailed on Jun. 30, 2023, 2 pages.
Corrected Notice of Allowance received for U.S. Appl. No. 17/950,922, mailed on Apr. 14, 2023, 2 pages.
Corrected Search Report and Opinion received for Danish Patent Application No. PA201870364, mailed on Sep. 5, 2018, 13 pages.
Cuyamaca LRC Computer Labs, "Topics in CommonSpace Application", Available at <http://www.cuyamaca.net/librarylab/Technical%20Help/cmspace.asp>, Retrieved on May 19, 2014, 16 pages.
Decision on Appeal received for U.S. Appl. No. 14/641,298, mailed on Nov. 1, 2021, 9 pages.
Decision on Opposition received for Australian Patent Application No. 2018271366, mailed on Mar. 3, 2023, 3 pages.
Decision to Grant received for Danish Patent Application No. PA201870362, mailed on May 15, 2020, 2 pages.
Decision to Grant received for European Patent Application No. 10799259.6, mailed on Aug. 31, 2017, 2 pages.
Decision to Grant received for European Patent Application No. 12704175.4, mailed on Jul. 19, 2018, 2 pages.
Decision to Grant received for European Patent Application No. 15713062.6, mailed on Apr. 11, 2019, 2 pages.
Decision to Grant received for European Patent Application No. 17810737.1, mailed on Nov. 11, 2021, 2 pages.
Decision to Grant received for European Patent Application No. 19729395.4, mailed on Dec. 9, 2021, 2 pages.
Decision to Grant received for German Patent Application No. 102015208532.5, mailed on Sep. 22, 2020, 10 pages (1 page of English Translation and 9 pages of Official Copy).
Decision to Grant received for Japanese Patent Application No. 2019-124728, mailed on Apr. 2, 2021, 4 pages (1 page of English Translation and 3 pages of Official Copy).
Decision to Refuse received for European Patent Application No. 20205496.1, mailed on May 12, 2023, 16 pages.
Dolan Tim, "How To Make a Laptop Webcam into a Document Camera—IPEVO Mirror-Cam Review", Retrieved from the Internet: URL: https://www.youtube.com/watch?v =-K8jyZ1hbbg, Aug. 29, 2020, 1 page.
Esther, "Instructions for Kobo Books: How to change to scrolling mode and do table of contents navigation—Google Groups", XP055513050, retrieved from the Internet: URL: https://groups.google.com/forum/print/msg/viphone/-dkqODh_31N8acJK2dGPe8J?ctz=4607561_ 48_52_123900_ 48_ 436380 [retrieved on Oct. 5, 2018]., Aug. 28, 2010, 3 pages.
Evaluation Report for Utility Model Patent received for Chinese Patent Application No. 201620051290.7, completed on Sep. 19, 2016, 11 pages (6 pages of English translation and 5 pages of Official Copy).
Ex-Parte Quayle Action received for U.S. Appl. No. 17/121,610, mailed on Dec. 9, 2021, 7 pages.
Examiner Initiated-Interview Summary received for U.S. Appl. No. 16/528,941, mailed on Dec. 1, 2020, 2 pages.
Examiner Interview Summary received for U.S. Appl. No. 17/903,946, mailed on Jun. 28, 2023, 2 pages.

(56)  References Cited

OTHER PUBLICATIONS

Examiner-Initiated Interview Summary received for U.S. Appl. No. 16/859,101, mailed on Dec. 1, 2021, 2 pages.

Examiner-Initiated Interview Summary received for U.S. Appl. No. 17/027,373, mailed on Mar. 31, 2022, 4 pages.

Examiner's Answer to Appeal Brief received for U.S. Appl. No. 14/641,298, mailed on Mar. 22, 2021, 19 pages.

Examiner's Initiated Interview Summary received for U.S. Appl. No. 14/641,298, mailed on Mar. 10, 2020, 4 pages.

Ex-Parte Quayle Action received for U.S. Appl. No. 17/903,946, mailed on Aug. 4, 2023, 4 pages.

Extended European Search Report received for European Patent Application No. 17810737.1, mailed on Oct. 28, 2019, 11 pages.

Extended European Search Report received for European Patent Application No. 18185408.4, mailed on Oct. 17, 2018, 10 pages.

Extended European Search Report received for European Patent Application No. 20166552.8, mailed on Jun. 12, 2020, 9 pages.

Extended European Search Report received for European Patent Application No. 20205496.1, mailed on Mar. 11, 2021, 11 pages.

Extended European Search Report received for European Patent Application No. 21206800.1, mailed on Jan. 24, 2022, 8 pages.

Fahey M., "The iPad Blows Up iPhone Apps Real Good", Available at <www.kotaku.com.au/2010/01/the-ipad-blows-up-iphone-apps-real-good/>, Jan. 28, 2010, 3 pages.

Fehily C., "Visual QuickStart Guide: Microsoft Windows 7", Peachpit Press, Sep. 8, 2009, pp. x,34-37, 40, 71, 76, and 267.

Final Office Action received for U.S. Appl. No. 10/179,775, mailed on Apr. 5, 2006, 14 pages.

Final Office Action received for U.S. Appl. No. 10/179,775, mailed on Aug. 16, 2013, 12 pages.

Final Office Action received for U.S. Appl. No. 10/179,775, mailed on Jul. 8, 2009, 11 pages.

Final Office Action received for U.S. Appl. No. 10/179,775, mailed on Jun. 22, 2010, 13 pages.

Final Office Action received for U.S. Appl. No. 10/179,775, mailed on May 22, 2015, 15 pages.

Final Office Action received for U.S. Appl. No. 10/179,775, mailed on Oct. 8, 2008, 12 pages.

Final Office Action Received for U.S. Appl. No. 12/843,814, mailed on Apr. 23, 2015, 28 pages.

Final Office Action Received for U.S. Appl. No. 12/843,814, mailed on Jan. 31, 2014, 20 pages.

Final Office Action received for U.S. Appl. No. 12/843,814, mailed on Nov. 14, 2012, 13 pages.

Final Office Action Received for U.S. Appl. No. 12/890,472, mailed on Feb. 6, 2013, 10 pages.

Final Office Action Received for U.S. Appl. No. 12/890,482, mailed on Sep. 12, 2013, 10 pages.

Final Office Action Received for U.S. Appl. No. 12/890,489, mailed on Aug. 14, 2013, 9 pages.

Final Office Action Received for U.S. Appl. No. 12/890,499, mailed on Jul. 8, 2013, 17 pages.

Final Office Action received for U.S. Appl. No. 12/890,499, mailed on May 22, 2017, 17 pages.

Final Office Action received for U.S. Appl. No. 12/890,499, mailed on Oct. 19, 2015, 14 pages.

Final Office Action Received for U.S. Appl. No. 13/077,850, mailed on Nov. 7, 2013, 14 pages.

Final Office Action Received for U.S. Appl. No. 13/077,855, mailed on Mar. 17, 2014, 11 pages.

Final Office Action Received for U.S. Appl. No. 13/077,855, mailed on Nov. 7, 2013, 14 pages.

Final Office Action Received for U.S. Appl. No. 13/077,862, mailed on Nov. 8, 2013, 15 pages.

Final Office Action received for U.S. Appl. No. 13/077,862, mailed on Oct. 22, 2015, 16 pages.

Final Office Action Received for U.S. Appl. No. 13/077,867, mailed on May 23, 2013, 10 pages.

Final Office Action received for U.S. Appl. No. 13/077,874, mailed on Dec. 3, 2014, 23 pages.

Final Office Action received for U.S. Appl. No. 13/077,874, mailed on May 5, 2016, 26 pages.

Final Office Action received for U.S. Appl. No. 13/333,909, mailed on Dec. 5, 2013, 24 pages.

Final Office Action received for U.S. Appl. No. 14/641,289, mailed on Jul. 1, 2016., 32 pages.

Final Office Action received for U.S. Appl. No. 14/641,298, mailed on Jun. 26, 2020, 50 pages.

Final Office Action received for U.S. Appl. No. 14/641,298, mailed on May 16, 2019, 50 pages.

Final Office Action received for U.S. Appl. No. 14/641,298, mailed on Oct. 4, 2017, 30 pages.

Final Office Action received for U.S. Appl. No. 14/641,304, mailed on Jul. 24, 2018, 19 pages.

Final Office Action received for U.S. Appl. No. 14/641,304, mailed on Oct. 15, 2019, 21 pages.

Final Office Action received for U.S. Appl. No. 15/784,806, mailed on Aug. 3, 2020, 33 pages.

Final Office Action received for U.S. Appl. No. 15/784,806, mailed on May 22, 2019, 38 pages.

Final Office Action received for U.S. Appl. No. 15/784,806, mailed on Nov. 9, 2021, 42 pages.

Final Office Action received for U.S. Appl. No. 15/784,806, mailed on Nov. 25, 2022, 52 pages.

Final Office Action received for U.S. Appl. No. 16/528,941, mailed on Jul. 13, 2020, 15 pages.

Final Office Action received for U.S. Appl. No. 17/026,818, mailed on Jan. 29, 2021, 21 pages.

Final Office Action received for U.S. Appl. No. 17/476,404, mailed on May 5, 2022, 30 pages.

Final Office Action received for U.S. Appl. No. 17/476,404, mailed on Sep. 12, 2023, 30 pages.

Final Office Action received for U.S. Appl. No. 17/479,897, mailed on Jan. 10, 2023, 15 pages.

Final Office Action received for U.S. Appl. No. 17/483,564, mailed on Apr. 18, 2022, 23 pages.

Final Office Action received for U.S. Appl. No. 17/483,564, mailed on May 25, 2023, 26 pages.

Final Office Action received for U.S. Appl. No. 17/483,679, mailed on Jun. 13, 2023, 33 pages.

Final Office Action received for U.S. Appl. No. 17/483,679, mailed on May 24, 2022, 21 pages.

Final Office Action received for U.S. Appl. No. 17/484,899, mailed on May 12, 2022, 29 pages.

Final Office Action received for U.S. Appl. No. 17/666,971, mailed on May 12, 2023, 29 pages.

Final Office Action received for U.S. Appl. No. 17/950,900, mailed on Jan. 23, 2023, 14 pages.

Final Office Action received for U.S. Appl. No. 13/077,855, mailed on Mar. 24, 2016, 19 pages.

Final Office Action Received for U.S. Appl. No. 15/608,866, mailed on Mar. 8, 2019, 36 pages.

G Pad, LG's latest Uls that shine even more on the G-Pad, Online available at: http://bungq.com/1014., Nov. 19, 2013, 49 pages (30 pages of English Translation and 19 pages of Official Copy).

Garrison DR., "An Analysis and Evaluation of Audio Teleconferencing to Facilitate Education at a Distance", Online Available at: https://doi.org/10.1080/08923649009526713, American journal of distance education, Jol. 4, No. 3, Sep. 24, 2009, 14 pages.

Harris et al., "Inside WordPerfect 6 for Windows", New Riders Publishing, 1994, pp. 1104-1108.

HuddleCamHD SimplTrack2 Auto Tracking Camera Installation & Operation Manual, Available Online at: https://huddlecamhd.com/wp-content/uploads/2021/01/SimplTrack2-User-Manual-v1_2-6-20.pdf, Jun. 2020, 41 pages.

Intention to Grant received for Danish Patent Application No. PA201870362, mailed on Feb. 14, 2020, 2 pages.

Intention to Grant received for Danish Patent Application No. PA202070617, mailed on Nov. 15, 2021, 2 pages.

Intention to Grant received for European Patent Application No. 10799259.6, mailed on Apr. 20, 2017, 8 pages.

Intention to Grant received for European Patent Application No. 12704175.4, mailed on Mar. 22, 2018, 8 pages.

(56) References Cited

OTHER PUBLICATIONS

Intention to Grant received for European Patent Application No. 15713062.6, mailed on Mar. 25, 2019, 7 pages.
Intention to Grant received for European Patent Application No. 15713062.6, mailed on Oct. 8, 2018, 8 pages.
Intention to Grant received for European Patent Application No. 17810737.1, mailed on Jul. 5, 2021, 8 pages.
Intention to Grant received for European Patent Application No. 19729395.4, mailed on Jul. 23, 2021, 10 pages.
Intention to Grant received for European Patent Application No. 20166552.8, mailed on Jun. 29, 2023, 8 pages.
Intention to Grant received for European Patent Application No. 21728781.2, mailed on Jul. 28, 2023, 9 pages.
International Preliminary Report on Patentability received for PCT Patent Application No. PCT/US2018/032396, mailed on Nov. 28, 2019, 9 pages.
International Preliminary Report on Patentability received for PCT Patent Application No. PCT/US2010/062314, issued on Jul. 10, 2012, 14 pages.
International Preliminary Report on Patentability received for PCT Patent Application No. PCT/US2012/022401, mailed on Aug. 8, 2013, 12 pages.
International Preliminary Report on Patentability Received for PCT Patent Application No. PCT/US2015/019306, mailed on Dec. 15, 2016, 10 pages.
International Preliminary Report on Patentability Received for PCT Patent Application No. PCT/US2015/019309, mailed on Dec. 15, 2016, 10 pages.
International Preliminary Report on Patentability received for PCT Patent Application No. PCT/US2017/035326, mailed on Dec. 20, 2018, 19 pages.
International Preliminary Report on Patentability received for PCT Patent Application No. PCT/US2018/048151, mailed on Apr. 9, 2020, 14 pages.
International Preliminary Report on Patentability received for PCT Patent Application No. PCT/US2019/031202, mailed on Nov. 19, 2020, 13 pages.
International Preliminary Report on Patentability received for PCT Patent Application No. PCT/US2021/031760, mailed on Nov. 24, 2022, 11 pages.
International Preliminary Report on Patentability received for PCT Patent Application No. PCT/US2022/014271, mailed on Aug. 10, 2023, 17 pages.
International Search Report and Written Opinion received for PCT Application No. PCT/US2015/019309, mailed on Jun. 25, 2015, 15 pages.
International Search Report and Written Opinion received for PCT Patent Application No. PCT/US2010/062314, mailed on Jun. 22, 2011, 17 pages.
International Search Report and Written Opinion received for PCT Patent Application No. PCT/US2012/022401, Jul. 6, 2012, 16 pages.
International Search Report and Written Opinion received for PCT Patent Application No. PCT/US2015/019306, mailed on Jun. 17, 2015, 15 pages.
International Search Report and Written Opinion received for PCT Patent Application No. PCT/US2017/035326, mailed on Oct. 5, 2017, 22 pages.
International Search Report and Written Opinion received for PCT Patent Application No. PCT/US2018/032396, mailed on Jul. 30, 2018, 13 pages.
International Search Report and Written Opinion received for PCT Patent Application No. PCT/US2018/048151, mailed on Jan. 10, 2019, 23 pages.
International Search Report and Written Opinion received for PCT Patent Application No. PCT/US2019/031202, mailed on Oct. 4, 2019, 19 pages.
International Search Report and Written Opinion received for PCT Patent Application No. PCT/US2021/031760, mailed on Sep. 16, 2021, 18 pages.

International Search Report and Written Opinion received for PCT Patent Application No. PCT/US2022/014271, mailed on Jul. 4, 2022, 23 pages.
International Search Report and Written Opinion received for PCT Patent Application No. PCT/US2022/029261, mailed on Oct. 20, 2022, 18 pages.
International Search Report and Written Opinion received for PCT Patent Application No. PCT/US2022/029273, mailed on Oct. 27, 2022, 19 pages.
International Search Report and Written Opinion received for PCT Patent Application No. PCT/US2022/029580, mailed on Nov. 7, 2022, 20 pages.
International Search Report and Written Opinion received for PCT Patent Application No. PCT/US2022/044592, mailed on Mar. 14, 2023, 22 pages.
International Search Report received for PCT Patent Application No. PCT/US95/11025, mailed on Jan. 3, 1996, 3 pages.
Invitation to Pay Additional Fee received for PCT Patent Application No. PCT/US2017/035326, mailed on Aug. 7, 2017, 2 pages.
Invitation to Pay Additional Fees and Partial International Search Report received for PCT Patent Application No. PCT/US2022/014271, mailed on May 12, 2022, 20 pages.
Invitation to Pay Additional Fees and Partial International Search Report received for PCT Patent Application No. PCT/US2022/029261, mailed on Aug. 29, 2022, 16 pages.
Invitation to Pay Additional Fees and Partial International Search Report received for PCT Patent Application No. PCT/US2022/029580, mailed on Sep. 5, 2022, 13 pages.
Invitation to Pay Additional Fees received for PCT Patent Application No. PCT/US2012/022401, May 4, 2012, 8 pages.
Invitation to Pay Additional Fees received for PCT Patent Application No. PCT/US2018/048151, mailed on Nov. 6, 2018, 18 pages.
Invitation to Pay Additional Fees received for PCT Patent Application No. PCT/US2019/031202, mailed on Aug. 8, 2019, 12 pages.
Invitation to Pay Additional Fees received for PCT Patent Application No. PCT/US2022/029273, mailed on Sep. 2, 2022, 13 pages.
Invitation to Pay Additional Fees received for PCT Patent Application No. PCT/US2022/044592, mailed on Jan. 16, 2023, 21 pages.
Invitation to Pay Search Fees received for European Patent Application No. 15714698.6, mailed on Dec. 16, 2022, 4 pages.
Invitation to Pay Search Fees received for European Patent Application No. 21728781.2, mailed on Dec. 2, 2022, 3 pages.
Jiutian Technology, "Windows 8 Chinese version from entry to proficiency", Jan. 1, 2014, 5 pages (Official Copy Only). {See Communication under Rule 37 CFR § 1.98(a) (3)}.
Kimura Ryoji, "Keynote presentation practice guide for iPad & iPhone", K.K. Rutles, first edition, Feb. 29, 2012, 4 pages (Official Copy Only). {See Communication under Rule 37 CFR § 1.98(a) (3)}.
King Adrian, "Inside Windows 95", Microsoft Press., Aug. 1994, pp. 176-182.
Larson Tom, "How to Turn your Webcam into a Document Camera", Retrieved from the Internet: URL: https://www.youtube.com/watchv=UlaW22FxRZM, Nov. 7, 2020, 1 page.
LG G Pad 8.3 Tablet Q Remote User, Available at: <https://mushroomprincess.tistory.com/1320>, Dec. 26, 2013, 37 pages (20 pages of English Translation and 17 pages of Official Copy).
Microsoft Windows 3.1, available at: http://www.guidebookgallery.org/screenshots/win31, 1992, pp. 1-31.
Minutes of Oral Hearing received for German Patent Application No. 102015208532.5, mailed on Dec. 13, 2019, 21 pages (3 pages of English Translation and 18 pages of Official Copy).
Minutes of the Oral Proceedings received for European Patent Application No. 19729395.4, mailed on Jul. 21, 2021, 6 pages.
Minutes of the Oral Proceedings received for European Patent Application No. 20205496.1, mailed on May 9, 2023, 7 pages.
MR Analytical, "Samsung Gear S3 App Launcher Widget—App Review", Available Online at <https://www.youtube.com/watch?v=HEfTv17peik>, Dec. 26, 2016, 5 pages.
Office Action received for U.S. Appl. No. 16/035,422, mailed on Nov. 30, 2018, 13 pages.
Office Action received for U.S. Appl. No. 17/157,166, mailed on Jul. 9, 2021, 12 pages.

(56)        References Cited

OTHER PUBLICATIONS

Office Action received for U.S. Appl. No. 10/179,775, mailed on Aug. 14, 2014, 13 pages.
Office Action received for U.S. Appl. No. 10/179,775, mailed on Dec. 23, 2009, 13 pages.
Office Action received for U.S. Appl. No. 10/179,775, mailed on Dec. 23, 2015, 14 pages.
Office Action received for U.S. Appl. No. 10/179,775, mailed on Jan. 22, 2009, 11 pages.
Non-Final Office Action received for U.S. Appl. No. 10/179,775, mailed on Jul. 2, 2007, 12 pages.
Non-Final Office Action received for U.S. Appl. No. 10/179,775, mailed on Mar. 14, 2008, 11 pages.
Non-Final Office Action received for U.S. Appl. No. 10/179,775, mailed on Mar. 28, 2013, 11 pages.
Non-Final Office Action received for U.S. Appl. No. 10/179,775, mailed on Oct. 12, 2005, 16 pages.
Non-Final Office Action received for U.S. Appl. No. 14/456,852, mailed on Jul. 1, 2015, 19 pages.
Non-Final Office Action received for U.S. Appl. No. 14/641,289, mailed on Jul. 16, 2015, 31 pages.
Non-Final Office Action received for U.S. Appl. No. 14/641,289, mailed on Mar. 11, 2016, 26 pages.
Non-Final Office Action received for U.S. Appl. No. 12/789,436, mailed on Jun. 25, 2012, 23 pages.
Non-Final Office Action received for U.S. Appl. No. 12/843,814, mailed on Apr. 27, 2012, 26 pages.
Non-Final Office Action received for U.S. Appl. No. 12/843,814, mailed on May 28, 2013, 17 pages.
Non-Final Office Action received for U.S. Appl. No. 12/843,814, mailed on Oct. 8, 2014, 14 pages.
Non-Final Office Action received for U.S. Appl. No. 12/890,472, mailed on Jul. 5, 2012, 9 pages.
Non-Final Office Action received for U.S. Appl. No. 12/890,482, mailed on Sep. 27, 2012, 11 pages.
Non-Final Office Action received for U.S. Appl. No. 12/890,489, mailed on Nov. 6, 2014, 22 pages.
Non-Final Office Action received for U.S. Appl. No. 12/890,489, mailed on Nov. 30, 2012, 8 pages.
Non-Final Office Action received for U.S. Appl. No. 12/890,499, mailed on Apr. 6, 2015, 14 pages.
Non-Final Office Action received for U.S. Appl. No. 12/890,499, mailed on Nov. 1, 2016, 16 pages.
Non-Final Office Action received for U.S. Appl. No. 12/890,499, mailed on Nov. 26, 2012, 12 pages.
Non-Final Office Action received for U.S. Appl. No. 12/890,499, mailed on Sep. 11, 2014, 11 pages.
Non-Final Office Action received for U.S. Appl. No. 13/077,850, mailed on Mar. 28, 2013, 15 pages.
Non-Final Office Action received for U.S. Appl. No. 13/077,850, mailed on Sep. 10, 2015, 14 pages.
Non-Final Office Action received for U.S. Appl. No. 13/077,855, mailed on Aug. 13, 2015, 13 pages.
Non-Final Office Action received for U.S. Appl. No. 13/077,855, mailed on Mar. 28, 2013, 15 pages.
Non-Final Office Action received for U.S. Appl. No. 13/077,862, mailed on Dec. 29, 2014, 11 pages.
Non-Final Office Action received for U.S. Appl. No. 13/077,862, mailed on Jul. 17, 2020, 20 pages.
Non-Final Office Action received for U.S. Appl. No. 13/077,862, mailed on Mar. 15, 2013, 10 pages.
Non-Final Office Action received for U.S. Appl. No. 13/077,862, mailed on Nov. 21, 2019, 18 pages.
Non-Final Office Action received for U.S. Appl. No. 13/077,867, mailed on Dec. 21, 2012, 9 pages.
Non-Final Office Action received for U.S. Appl. No. 13/077,867, mailed on Jul. 20, 2012, 10 pages.
Non-Final Office Action received for U.S. Appl. No. 13/077,874. mailed on Jun. 19, 2014, 15 pages.

Non-Final Office Action received for U.S. Appl. No. 13/333,909, mailed on Mar. 19, 2013, 18 pages.
Non-Final Office Action received for U.S. Appl. No. 14/641,298, mailed on Mar. 6, 2017, 26 pages.
Non-Final Office Action received for U.S. Appl. No. 14/641,298, mailed on Nov. 29, 2019, 47 pages.
Non-Final Office Action received for U.S. Appl. No. 14/641,298, mailed on Sep. 19, 2018, 41 pages.
Non-Final Office Action received for U.S. Appl. No. 14/641,304, mailed on Feb. 27, 2019, 18 pages.
Non-Final Office Action received for U.S. Appl. No. 14/641,304, mailed on Mar. 4, 2020, 21 pages.
Non-Final Office Action received for U.S. Appl. No. 14/641,304, mailed on Sep. 11, 2017, 18 pages.
Non-Final Office Action received for U.S. Appl. No. 15/608,866, mailed on Nov. 2, 2018, 46 pages.
Non-Final Office Action received for U.S. Appl. No. 15/784,806, mailed on Apr. 30, 2021, 42 pages.
Non-Final Office Action received for U.S. Appl. No. 15/784,806, mailed on Jan. 4, 2019, 27 pages.
Non-Final Office Action received for U.S. Appl. No. 15/784,806, mailed on Mar. 13, 2020, 36 pages.
Non-Final Office Action received for U.S. Appl. No. 15/784,806, mailed on Oct. 5, 2022, 41 pages.
Non-Final Office Action received for U.S. Appl. No. 16/109,552, mailed on Oct. 17, 2018, 16 pages.
Non-Final Office Action received for U.S. Appl. No. 16/144,572, mailed on Nov. 30, 2018, 8 pages.
Non-Final Office Action received for U.S. Appl. No. 16/383,403, mailed on Aug. 23, 2019, 10 pages.
Non-Final Office Action received for U.S. Appl. No. 16/528,941, mailed on Dec. 7, 2020, 15 pages.
Non-Final Office Action received for U.S. Appl. No. 16/528,941, mailed on Jan. 30, 2020, 14 pages.
Non-Final Office Action received for U.S. Appl. No. 16/790,619, mailed on May 4, 2020, 13 pages.
Non-Final Office Action received for U.S. Appl. No. 16/799,481, mailed on May 1, 2020, 13 pages.
Non-Final Office Action received for U.S. Appl. No. 16/859,101, mailed on Aug. 5, 2021, 19 pages.
Non-Final Office Action received for U.S. Appl. No. 17/026,818, mailed on Nov. 25, 2020, 20 pages.
Non-Final Office Action received for U.S. Appl. No. 17/027,373, mailed on Feb. 2, 2022, 17 pages.
Non-Final Office Action received for U.S. Appl. No. 17/121,610, mailed on May 13, 2021, 17 pages.
Non-Final Office Action received for U.S. Appl. No. 17/223,794, mailed on Jun. 16, 2021, 32 pages.
Non-Final Office Action received for U.S. Appl. No. 17/476,404, mailed on Feb. 8, 2022, 26 pages.
Non-Final Office Action received for U.S. Appl. No. 17/476,404, mailed on Mar. 30, 2023, 29 pages.
Non-Final Office Action received for U.S. Appl. No. 17/476,404, mailed on Sep. 14, 2022, 31 pages.
Non-Final Office Action received for U.S. Appl. No. 17/479,897, mailed on Apr. 25, 2023, 14 pages.
Non-Final Office Action received for U.S. Appl. No. 17/479,897, mailed on Aug. 30, 2022, 10 pages.
Non-Final Office Action received for U.S. Appl. No. 17/482,977, mailed on Oct. 13, 2022, 20 pages.
Non-Final Office Action received for U.S. Appl. No. 17/482,987, mailed on Jan. 18, 2022, 25 pages.
Non-Final Office Action received for U.S. Appl. No. 17/483,542, mailed on Jan. 31, 2023, 14 pages.
Non-Final Office Action received for U.S. Appl. No. 17/483,542, mailed on Sep. 22, 2022, 18 pages.
Non-Final Office Action received for U.S. Appl. No. 17/483,549, mailed on Jan. 11, 2022, 5 pages.
Non-Final Office Action received for U.S. Appl. No. 17/483,564, mailed on Jan. 6, 2022, 23 pages.
Non-Final Office Action received for U.S. Appl. No. 17/483,564, mailed on Nov. 28, 2022, 24 pages.

(56) References Cited

OTHER PUBLICATIONS

Non-Final Office Action received for U.S. Appl. No. 17/483,679, mailed on Dec. 9, 2022, 31 pages.
Non-Final Office Action received for U.S. Appl. No. 17/483,679, mailed on Feb. 1, 2022, 19 pages.
Non-Final Office Action received for U.S. Appl. No. 17/483,679, mailed on Sep. 13, 2023, 32 pages.
Non-Final Office Action received for U.S. Appl. No. 17/484,899, mailed on Jan. 24, 2022, 24 pages.
Non-Final Office Action received for U.S. Appl. No. 17/484,899, mailed on Jun. 14, 2023, 41 pages.
Non-Final Office Action received for U.S. Appl. No. 17/484,907, mailed on Nov. 19, 2021, 24 pages.
Non-Final Office Action received for U.S. Appl. No. 17/666,971, mailed on Dec. 8, 2022, 26 pages.
Non-Final Office Action received for U.S. Appl. No. 17/684,843, mailed on Aug. 11, 2023, 23 pages.
Non-Final Office Action received for U.S. Appl. No. 17/732,204, mailed on Aug. 4, 2023, 18 pages.
Non-Final Office Action received for U.S. Appl. No. 17/732,355, mailed on Aug. 4, 2023, 19 pages.
Non-Final Office Action received for U.S. Appl. No. 17/740,104, mailed on Aug. 2, 2023, 15 pages.
Non-Final Office Action received for U.S. Appl. No. 17/872,736, mailed on May 11, 2023, 17 pages.
Non-Final Office Action received for U.S. Appl. No. 17/903,946, mailed on Apr. 14, 2023, 17 pages.
Non-Final Office Action received for U.S. Appl. No. 17/950,900, mailed on Dec. 1, 2022, 14 pages.
Non-Final Office Action received for U.S. Appl. No. 13/077,874, mailed on Dec. 3, 2015, 23 pages.
Notice of Acceptance received for Australian Patent Application No. 2010339636, mailed on Jul. 3, 2014, 2 pages.
Notice of Acceptance received for Australian Patent Application No. 2012209199, mailed on Jan. 27, 2016, 3 pages.
Notice of Acceptance received for Australian Patent Application No. 2015201884, mailed on Oct. 4, 2016, 3 pages.
Notice of Acceptance received for Australian Patent Application No. 2018271366, mailed on Mar. 31, 2023, 3 pages.
Notice of Acceptance received for Australian Patent Application No. 2019266225, mailed on Dec. 23, 2020, 3 pages.
Notice of Acceptance received for Australian Patent Application No. 2020239711, mailed on Dec. 16, 2021, 3 pages.
Notice of Acceptance received for Australian Patent Application No. 2021200789, mailed on Feb. 26, 2021, 3 pages.
Notice of Acceptance received for Australian Patent Application No. 2021201243, mailed on Feb. 23, 2023, 3 pages.
Notice of Acceptance received for Australian Patent Application No. 2021203903, mailed on May 25, 2022, 3 pages.
Notice of Acceptance received for Australian Patent Application No. 2022201532, mailed on May 22, 2023, 3 pages.
Notice of Allowance received for Australian Patent Application No. 2016202837, mailed on Apr. 21, 2017, 3 pages.
Notice of Allowance received for Australian Patent Application No. 2022228207, mailed on Jul. 3, 2023, 3 pages.
Notice of Allowance received for Chinese Patent Application No. 201910400179.2, mailed on Oct. 9, 2022, 4 pages (1 page of English Translation and 3 pages of Official Copy).
Notice of Allowance received for Chinese Patent Application No. 201080064125.0, mailed on Sep. 8, 2015, 3 pages (1 page of English Translation and 2 pages of Official Copy).
Notice Of Allowance received for Chinese Patent Application No. 201280006317.5, mailed on Feb. 17, 2017, 2 pages (1 page of English Translation and 1 page of Official Copy).
Notice of Allowance received for Chinese Patent Application No. 201620051290.7, mailed on Jun. 22, 2016, 2 pages (Official Copy only). {See Communication under Rule 37 CFR § 1.98(a) (3)}.
Notice of Allowance received for Chinese Patent Application No. 201710240907.9, mailed on Nov. 25, 2019, 2 pages (1 page of English Translation and 1 page of Official Copy).

Notice of Allowance received for Chinese Patent Application No. 201780033771.2, mailed on Feb. 3, 2021, 2 pages (1 page of English Translation and 1 page of Official Copy).
Notice of Allowance received for Chinese Patent Application No. 201880056514.5, mailed on Jan. 11, 2021, 2 pages (1 page of English Translation and 1 page of Official Copy).
Notice of Allowance received for Chinese Patent Application No. 201910055588.3, mailed on Mar. 2, 2022, 2 pages (1 page of English Translation and 1 page of Official Copy).
Notice of Allowance received for Chinese Patent Application No. 201910400180.5, mailed on Nov. 5, 2020, 2 pages (1 page of English Translation and 1 page of Official Copy).
Notice of Allowance received for Chinese Patent Application No. 202011243876.0, mailed on Sep. 8, 2021, 4 pages (1 page of English Translation and 3 pages of Official Copy).
Notice of Allowance received for Chinese Patent Application No. 202110328601.5, mailed on Jul. 5, 2023, 5 pages (1 page of English Translation and 4 pages of Official Copy).
Notice of Allowance received for Chinese Patent Application No. 202110409273.1, mailed on Aug. 2, 2022, 4 pages (1 page of English Translation and 3 pages of Official Copy).
Notice of Allowance received for Chinese Patent Application No. 201520364847.8, mailed on Nov. 5, 2015, 9 pages (7 page of English Translation and 2 pages of Official Copy).
Notice of Allowance received for Japanese Patent Application No. 2015-095183, mailed on Apr. 21, 2017, 3 pages. (Official Copy Only). {See Communication under Rule 37 CFR § 1.98(a) (3)}.
Notice of Allowance received for Japanese Patent Application No. 2016-130565, mailed on Aug. 28, 2017, 3 pages (Official Copy Only). {See Communication under Rule 37 CFR § 1.98(a) (3)}.
Notice of Allowance received for Japanese Patent Application No. 2017-101107, mailed on Jun. 3, 2019, 5 pages (1 page of English Translation and 4 pages of Official Copy).
Notice of Allowance received for Japanese Patent Application No. 2018-183504, mailed on Sep. 27, 2019, 4 pages (1 page of English Translation and 3 pages of Official Copy).
Notice of Allowance received for Japanese Patent Application No. 2019-194597, mailed on Nov. 19, 2021, 4 pages (1 page of English Translation and 3 pages of Official Copy).
Notice of Allowance received for Japanese Patent Application No. 2020-159840, mailed on Jul. 8, 2022, 4 pages (1 page of English Translation and 3 pages of Official Copy).
Notice of Allowance received for Japanese Patent Application No. 2021-074395, mailed on Jun. 27, 2022, 4 pages (1 page of English Translation and 3 pages of Official Copy).
Notice of Allowance received for Japanese Patent Application No. 2021-206121, mailed on May 15, 2023, 4 pages (1 page of English Translation and 3 pages of Official Copy).
Notice of Allowance received for Japanese Patent Application No. 2022-125792, mailed on Jan. 27, 2023, 4 pages (1 page of English Translation and 3 pages of Official Copy).
Notice of Allowance received for Korean Patent Application No. 10-2013-7022057, mailed on Apr. 27, 2015, 2 pages (Official Copy only). {See Communication under Rule 37 CFR § 1.98(a) (3)}.
Notice of Allowance received for Korean Patent Application No. 10-2014-7033660, issued on Sep. 25, 2015, 3 pages (1 page of English Translation and 2 pages of Official Copy).
Notice of Allowance received for Korean Patent Application No. 10-2015-0072162, mailed on Dec. 27, 2017, 4 pages (2 pages of English Translation and 2 pages of Official Copy).
Notice of Allowance received for Korean Patent Application No. 10-2015-7013849, mailed on Mar. 28, 2016, 3 pages (1 page of English Translation and 2 pages of Official Copy).
Notice of Allowance received for Korean Patent Application No. 10-2016-7017508, issued on Apr. 27, 2017, 3 pages (1 page of English translation and 2 pages of Official Copy).
Notice of Allowance received for Korean Patent Application No. 10-2018-0035949, mailed on Nov. 28, 2019, 3 pages (1 page of English Translation and 2 pages of Official Copy).
Notice of Allowance received for Korean Patent Application No. 10-2020-0024632, mailed on Jul. 26, 2021, 3 pages (1 page of English Translation and 2 pages of Official Copy).

(56) References Cited

OTHER PUBLICATIONS

Notice of Allowance received for Korean Patent Application No. 10-2020-0123805, mailed on Jun. 19, 2022, 5 pages (2 pages of English Translation and 3 pages of Official Copy).

Notice of Allowance received for Korean Patent Application No. 10-2020-7032110, mailed on Mar. 8, 2021, 4 pages (1 page of English Translation and 3 pages of Official Copy).

Notice of Allowance received for Korean Patent Application No. 10-2021-0143923, mailed on Jan. 27, 2022, 4 pages (1 page of English Translation and 3 pages of Official Copy).

Notice of Allowance received for Korean Patent Application No. 10-2021-7017731, mailed on Feb. 28, 2023, 5 pages (2 pages of English Translation and 3 pages of Official Copy).

Notice of Allowance received for Korean Patent Application No. 10-2022-0091730, mailed on Oct. 4, 2022, 5 pages (2 pages of English Translation and 3 pages of Official Copy).

Notice of Allowance Received for Taiwanese Patent Application No. 104117041, mailed on Feb. 24, 2017, 3 pages. (Official Copy Only). {See Communication under Rule 37 CFR § 1.98(a) (3)}.

Notice of Allowance received for Taiwanese Patent Application No. 106144804, mailed on Jun. 27, 2018, 6 pages (2 pages of English Translation and 4 pages of Official Copy).

Notice of Allowance received for Taiwanese Patent Application No. 104117042, mailed on Nov. 17, 2017, 5 pages (2 pages of English Translation and 3 pages of Official Copy).

Notice of Allowance received for U.S. Appl. No. 16/035,422, mailed on Apr. 10, 2019, 6 pages.

Notice of Allowance received for U.S. Appl. No. 16/528,941, mailed on Aug. 10, 2021, 5 pages.

Notice of Allowance received for U.S. Appl. No. 16/528,941, mailed on May 19, 2021, 5 pages.

Notice of Allowance received for U.S. Appl. No. 17/157,166, mailed on Nov. 16, 2021, 6 pages.

Notice of Allowance received for U.S. Appl. No. 10/179,775, mailed on Aug. 24, 2017, 3 pages.

Notice of Allowance received for U.S. Appl. No. 10/179,775, mailed on Jul. 13, 2017, 11 pages.

Notice of Allowance received for U.S. Appl. No. 12/789,436, mailed on Jan. 7, 2013, 9 pages.

Notice of Allowance received for U.S. Appl. No. 12/843,814, mailed on Jun. 22, 2016, 13 pages.

Notice of Allowance received for U.S. Appl. No. 12/890,482, mailed on May 8, 2014, 5 pages.

Notice of Allowance received for U.S. Appl. No. 12/890,489, mailed on Jul. 27, 2015, 8 pages.

Notice of Allowance received for U.S. Appl. No. 13/077,850, mailed on May 5, 2016, 15 pages.

Notice of Allowance received for U.S. Appl. No. 13/077,855, mailed on Jan. 30, 2017, 7 pages.

Notice of Allowance received for U.S. Appl. No. 13/077,862, mailed on Jun. 20, 2019, 9 pages.

Notice of Allowance received for U.S. Appl. No. 13/077,862, mailed on Sep. 20, 2019, 2 pages.

Notice of Allowance received for U.S. Appl. No. 13/077,867, mailed on Mar. 12, 2014, 7 pages.

Notice of Allowance received for U.S. Appl. No. 13/077,867, mailed on Sep. 18, 2013, 8 pages.

Notice of Allowance received for U.S. Appl. No. 13/077,874, mailed on Nov. 22, 2016, 13 pages.

Notice of Allowance received for U.S. Appl. No. 13/333,909, mailed on Mar. 31, 2014, 20 pages.

Notice of Allowance received for U.S. Appl. No. 14/456,852, mailed on Jul. 31, 2015, 8 pages.

Notice of Allowance received for U.S. Appl. No. 14/641,289, mailed on Aug. 24, 2017, 6 pages.

Notice of Allowance received for U.S. Appl. No. 14/641,289, mailed on Dec. 12, 2017, 5 pages.

Notice of Allowance received for U.S. Appl. No. 14/641,298, mailed on Nov. 29, 2021, 8 pages.

Notice of Allowance received for U.S. Appl. No. 14/641,304, mailed on Sep. 9, 2020, 15 pages.

Notice of Allowance received for U.S. Appl. No. 15/608,866, mailed on Feb. 28, 2020, 2 pages.

Notice of Allowance received for U.S. Appl. No. 16/ 109,552, mailed on Mar. 13, 2019, 25 pages.

Notice of Allowance received for U.S. Appl. No. 16/109,552, mailed on May 13, 2019, 2 pages.

Notice of Allowance received for U.S. Appl. No. 16/144,572, mailed on Feb. 28, 2019, 7 pages.

Notice of Allowance received for U.S. Appl. No. 16/147,432, mailed on Dec. 18, 2018, 13 pages.

Notice of Allowance received for U.S. Appl. No. 16/147,432, mailed on May 20, 2019, 6 pages.

Notice of Allowance received for U.S. Appl. No. 16/383,403, mailed on Jan. 10, 2020, 11 pages.

Notice of Allowance received for U.S. Appl. No. 16/511,578, mailed on Nov. 18, 2019, 12 pages.

Notice of Allowance received for U.S. Appl. No. 16/790,619, mailed on Sep. 8, 2020, 6 pages.

Notice of Allowance received for U.S. Appl. No. 16/799,481, mailed on Sep. 8, 2020, 6 pages.

Notice of Allowance received for U.S. Appl. No. 16/859,101, mailed on Jan. 18, 2022, 10 pages.

Notice of Allowance received for U.S. Appl. No. 17/026,818, mailed on May 13, 2021, 10 pages.

Notice of Allowance received for U.S. Appl. No. 17/027,373, mailed on Aug. 2, 2022, 2 pages.

Notice of Allowance received for U.S. Appl. No. 17/027,373, mailed on Jun. 3, 2022, 8 pages.

Notice of Allowance received for U.S. Appl. No. 17/027,373, mailed on Oct. 3, 2022, 5 pages.

Notice of Allowance received for U.S. Appl. No. 17/121,610, mailed on Jul. 7, 2022, 5 pages.

Notice of Allowance received for U.S. Appl. No. 17/121,610, mailed on Jul. 13, 2022, 4 pages.

Notice of Allowance received for U.S. Appl. No. 17/121,610, mailed on Mar. 11, 2022, 5 pages.

Notice of Allowance received for U.S. Appl. No. 17/157,166, mailed on Mar. 30, 2022, 6 pages.

Notice of Allowance received for U.S. Appl. No. 17/479,897, mailed on Jul. 26, 2023, 7 pages.

Notice of Allowance received for U.S. Appl. No. 17/482,977, mailed on Jan. 24, 2023, 10 pages.

Notice of Allowance received for U.S. Appl. No. 17/482,987, mailed on Jun. 23, 2022, 9 pages.

Notice of Allowance received for U.S. Appl. No. 17/482,987, mailed on May 11, 2022, 10 pages.

Notice of Allowance received for U.S. Appl. No. 17/483,542, mailed on Aug. 11, 2023, 9 pages.

Notice of Allowance received for U.S. Appl. No. 17/483,549, mailed on Apr. 15, 2022, 10 pages.

Notice of Allowance received for U.S. Appl. No. 17/483,564, mailed on Jul. 17, 2023, 46 pages.

Notice of Allowance received for U.S. Appl. No. 17/483,582, mailed on Apr. 19, 2022, 5 pages.

Notice of Allowance received for U.S. Appl. No. 17/483,582, mailed on Jan. 20, 2022, 10 pages.

Notice of Allowance received for U.S. Appl. No. 17/484,907, mailed on Jul. 25, 2022, 10 pages.

Notice of Allowance received for U.S. Appl. No. 17/484,907, mailed on Mar. 2, 2022, 13 pages.

Notice of Allowance received for U.S. Appl. No. 17/484,907, mailed on May 20, 2022, 13 pages.

Notice of Allowance received for U.S. Appl. No. 17/666,971, mailed on Aug. 16, 2023, 8 pages.

Notice of Allowance received for U.S. Appl. No. 17/872,736, mailed on Aug. 21, 2023, 6 pages.

Notice of Allowance received for U.S. Appl. No. 17/872,736, mailed on Aug. 30, 2023, 4 pages.

Notice of Allowance received for U.S. Appl. No. 17/950,900, mailed on Jun. 16, 2023, 6 pages.

(56)        References Cited

OTHER PUBLICATIONS

Notice of Allowance received for U.S. Appl. No. 17/950,900, mailed on Mar. 7, 2023, 10 pages.
Notice of Allowance received for U.S. Appl. No. 17/950,922, mailed on Apr. 5, 2023, 10 pages.
Notice of Allowance received for U.S. Appl. No. 17/950,922, mailed on Sep. 20, 2023, 6 pages.
Notice of Allowance received for U.S. Appl. No. 15/608,866, mailed on Dec. 18, 2019, 9 pages.
Notice of Hearing received for Indian Patent Application No. 201814036860, mailed on Sep. 8, 2023, 2 pages.
Office Action received for Australian Patent Application No. 2015201884, mailed on Oct. 12, 2015, 4 pages.
Office Action received for Australian Patent Application No. 2010339636, issued on Jun. 19, 2013, 3 pages.
Office Action received for Australian Patent Application No. 2012209199, issued on Jan. 15, 2015, 3 pages.
Office Action received for Australian Patent Application No. 2015100490, issued on Jun. 9, 2015, 6 pages.
Office Action received for Australian Patent Application No. 2015100490, mailed on Dec. 15, 2016, 2 pages.
Office Action received for Australian Patent Application No. 2016202837, mailed on Jan. 10, 2017, 2 pages.
Office Action received for Australian Patent Application No. 2016266010, mailed on Aug. 23, 2018, 4 pages.
Office Action received for Australian Patent Application No. 2016266010, mailed on May 4, 2018, 4 pages.
Office Action received for Australian Patent Application No. 2016266010, mailed on Nov. 28, 2018, 5 pages.
Office Action received for Australian Patent Application No. 2016266010, mailed on Nov. 30, 2017, 5 pages.
Office Action received for Australian Patent Application No. 2018271366, mailed on Feb. 25, 2020, 5 pages.
Office Action received for Australian Patent Application No. 2018271366, mailed on Jan. 19, 2021, 5 pages.
Office Action received for Australian Patent Application No. 2018271366, mailed on May 17, 2021, 5 pages.
Office Action received for Australian Patent Application No. 2018271366, mailed on Oct. 26, 2020, 5 pages.
Office Action received for Australian Patent Application No. 2019100499, mailed on Jun. 28, 2019, 4 pages.
Office Action received for Australian Patent Application No. 2019101062, mailed on Apr. 22, 2020, 2 pages.
Office Action received for Australian Patent Application No. 2019101062, mailed on Dec. 5, 2019, 3 pages.
Office Action received for Australian Patent Application No. 2019266225, mailed on Nov. 23, 2020, 4 pages.
Office Action received for Australian Patent Application No. 2020239711, mailed on Sep. 13, 2021, 5 pages.
Office Action received for Australian Patent Application No. 2021201243, mailed on Dec. 12, 2022, 3 pages.
Office Action received for Australian Patent Application No. 2021201243, mailed on Feb. 17, 2022, 4 pages.
Office Action received for Australian Patent Application No. 2021201243, mailed on Jun. 1, 2022, 5 pages.
Office Action received for Australian Patent Application No. 2021203903, mailed on Feb. 24, 2022, 3 pages.
Office Action received for Australian Patent Application No. 2022201532, mailed on Dec. 19, 2022, 5 pages.
Office Action received for Australian Patent Application No. 2022228207, mailed on Apr. 28, 2023, 3 pages.
Office Action received for Chinese Patent Application No. 201080064125.0, mailed on Jun. 10, 2014, 8 pages (Official Copy only). {See Communication under Rule 37 CFR § 1.98(a) (3)}.
Office Action received for Chinese Patent Application No. 201080064125.0, mailed on Mar. 11, 2015, 7 pages (2 pages of English Translation and 5 pages of Official Copy).
Office Action Received for Chinese Patent Application No. 201280006317.5, mailed on Jan. 11, 2016, 10 pages (5 pages of English Translation and 5 pages of official Copy).

Office Action received for Chinese Patent Application No. 201280006317.5, mailed on Jul. 11, 2016, 6 pages (1 page of English Translation and 5 pages of Official Copy).
Office Action received for Chinese Patent Application No. 201510288981.9, mailed on Jul. 1, 2019, 16 pages (8 pages of English Translation and 8 pages of Official Copy).
Office Action received for Chinese Patent Application No. 201510288981.9, mailed on Jul. 3, 2018, 19 pages (8 pages of English Translation and 11 pages of official Copy).
Office Action received for Chinese Patent Application No. 201510288981.9, mailed on Mar. 6, 2019, 20 pages (10 pages of English Translation and 10 pages of Official Copy).
Office Action received for Chinese Patent Application No. 201710240907.9, mailed on Jun. 5, 2019, 10 pages (5 pages of English Translation and 5 pages of Official Copy).
Office Action received for Chinese Patent Application No. 201780033771.2, mailed on Jul. 15, 2020, 18 pages (9 pages of English Translation and 9 pages of Official Copy).
Office Action received for Chinese Patent Application No. 201880056514.5, mailed on Sep. 2, 2020, 7 pages (1 page of English Translation and 6 pages of Official Copy).
Office Action received for Chinese Patent Application No. 201910055588.3, mailed on Nov. 24, 2021, 24 pages (14 pages of English Translation and 10 pages of Official Copy).
Office Action received for Chinese Patent Application No. 201910400179.2, mailed on Dec. 27, 2021, 32 pages (13 pages of English Translation and 19 pages of Official Copy).
Office Action received for Chinese Patent Application No. 201910400180.5, mailed on Jun. 1, 2020, 11 pages (5 pages of English Translation and 6 pages of Official Copy).
Office Action received for Chinese Patent Application No. 201910704856.X, mailed on Apr. 6, 2021, 13 pages (7 pages of English Translation and 6 pages of Official Copy).
Office Action received for Chinese Patent Application No. 201910704856.X, mailed on Dec. 9, 2020, 23 pages (13 pages of English Translation and 10 pages of Official Copy).
Office Action received for Chinese Patent Application No. 201910704856.X, mailed on May 27, 2020, 26 pages (14 pages of English Translation and 12 pages of Official Copy).
Office Action received for Chinese Patent Application No. 202010126661.4, mailed on Feb. 3, 2021, 16 pages (9 pages of English Translation and 7 pages of Official Copy).
Office Action received for Chinese Patent Application No. 202010126661.4, mailed on Jun. 2, 2022, 11 pages (7 pages of English Translation and 4 pages of Official Copy).
Office Action received for Chinese Patent Application No. 202010126661.4, mailed on Mar. 4, 2022, 13 pages (8 pages of English Translation and 5 pages of Official Copy).
Office Action received for Chinese Patent Application No. 202011243876.0, mailed on Apr. 6, 2021, 11 pages (5 pages of English Translation and 6 pages of Official Copy).
Office Action received for Chinese Patent Application No. 202110327012.5, mailed on Apr. 29, 2022, 17 pages (10 pages of English Translation and 7 pages of Official Copy).
Office Action received for Chinese Patent Application No. 202110327012.5, mailed on Mar. 16, 2023, 12 pages (7 pages of English Translation and 5 pages of Official Copy).
Office Action received for Chinese Patent Application No. 202110327012.5, mailed on Nov. 28, 2022, 16 pages (10 pages of English Translation and 6 pages of Official Copy).
Office Action received for Chinese Patent Application No. 202110328597.2, mailed on Apr. 15, 2022, 18 pages (9 pages of English Translation and 9 pages of Official Copy).
Office Action received for Chinese Patent Application No. 202110328597.2, mailed on Jul. 18, 2023, 21 pages (6 pages of English Translation and 15 pages of Official Copy).
Office Action received for Chinese Patent Application No. 202110328597.2, mailed on May 15, 2023, 13 pages (6 pages of English Translation and 7 pages of Official Copy).
Office Action received for Chinese Patent Application No. 202110328597.2, mailed on Oct. 10, 2022, 13 pages (7 pages of English Translation and 6 pages of Official Copy).

(56)                  References Cited

OTHER PUBLICATIONS

Office Action received for Chinese Patent Application No. 202110328601.5, mailed on Apr. 27, 2022, 25 pages (14 pages of English Translation and 11 pages of Official Copy).

Office Action received for Chinese Patent Application No. 202110328601.5, mailed on Mar. 24, 2023, 25 pages (15 pages of English Translation and 10 pages of Official Copy).

Office Action received for Chinese Patent Application No. 202110328601.5, mailed on Nov. 2, 2022, 29 pages (19 pages of English Translation and 10 pages of Official Copy).

Office Action received for Chinese Patent Application No. 202110328602.X, mailed on Dec. 1, 2022, 28 pages (17 pages of English Translation 11 pages of Official Copy).

Office Action received for Chinese Patent Application No. 202110328602.X, mailed on Jun. 29, 2023, 27 pages (18 pages of English Translation and 9 pages of Official Copy).

Office Action received for Chinese Patent Application No. 202110328602.X, mailed on Mar. 24, 2022, 6 pages (3 pages of English Translation and 3 pages of Official Copy).

Office Action received for Chinese Patent Application No. 202110409273.1, mailed on Jan. 11, 2022, 11 pages (6 pages of English Translation and 5 pages of Official Copy).

Office Action received for Chinese Patent Application No. 202111652452.4, mailed on Aug. 29, 2022, 23 pages (12 pages of English Translation and 11 pages of Official Copy).

Office Action received for Chinese Patent Application No. 202111652452.4, mailed on Feb. 11, 2023, 28 pages (13 pages of English Translation and 15 pages of Official Copy).

Office Action received for Chinese Patent Application No. 202111652452.4, mailed on May 19, 2023, 15 pages (8 pages of English Translation and 7 pages of Official Copy).

Office Action received for Danish Patent Application No. PA201570256, mailed on Jul. 7, 2015, 2 pages.

Office Action received for Danish Patent Application No. PA201570256, mailed on Mar. 17, 2016, 5 pages.

Office Action received for Danish Patent Application No. PA201570256, mailed on May 23, 2017, 3 pages.

Office Action received for Danish Patent Application No. PA201570256, mailed on Oct. 10, 2016, 3 pages.

Office Action received for Danish Patent Application No. PA201870362, mailed on Aug. 22, 2019, 4 pages.

Office Action received for Danish Patent Application No. PA201870362, mailed on Dec. 18, 2018, 2 pages.

Office Action received for Danish Patent Application No. PA201870363, mailed on Mar. 26, 2019, 3 pages.

Office Action received for Danish Patent Application No. PA201870364, mailed on Jan. 28, 2019, 8 pages.

Office Action received for Danish Patent Application No. PA201870364, mailed on Jun. 11, 2019, 11 pages.

Office Action received for Danish Patent Application No. PA202070617, mailed on Sep. 24, 2021, 4 pages.

Office Action received for European Patent Application No. 10799259.6, mailed on Jun. 1, 2015, 9 pages.

Office Action received for European Patent Application No. 15713062.6, mailed on Dec. 6, 2017, 7 pages.

Office Action received for European Patent Application No. 15714698.6, mailed on Apr. 18, 2023, 14 pages.

Office Action received for European Patent Application No. 15714698.6, mailed on Oct. 13, 2021, 2 pages.

Office Action received for European Patent Application No. 17810737.1, mailed on Jan. 20, 2021, 6 pages.

Office Action received for European Patent Application No. 18779093.6, mailed on Dec. 11, 2020, 4 pages.

Office Action received for European Patent Application No. 18779093.6, mailed on Jun. 28, 2023, 4 pages.

Office Action received for European Patent Application No. 18779093.6, mailed on Mar. 17, 2022, 4 pages.

Office Action received for European Patent Application No. 19729395.4, mailed on Jul. 15, 2020, 4 pages.

Office Action received for European Patent Application No. 19729395.4, mailed on Sep. 29, 2020, 10 pages.

Office Action received for European Patent Application No. 20166552.8, mailed on Mar. 24, 2021, 8 pages.

Office Action received for European Patent Application No. 20205496.1, mailed on Nov. 10, 2021, 5 pages.

Office Action received for European Patent Application No. 21206800.1, mailed on Jun. 30, 2023, 6 pages.

Office Action received for European Patent Application No. 21728781.2, mailed on Mar. 1, 2023, 13 pages.

Office Action received for German Patent Application No. 102015208532.5, mailed on Apr. 1, 2019, 20 pages (10 pages of English Translation and 10 pages of Official Copy).

Office Action received for German Patent Application No. 102015208532.5, mailed on Apr. 21, 2020, 3 pages (1 page of English Translation and 2 pages of Official Copy).

Office Action received for German Patent Application No. 102015208532.5, mailed on Aug. 21, 2019, 15 pages (5 pages of English Translation and 10 pages of Official Copy).

Office Action received for Hong Kong Patent Application No. 151051633, mailed on Jun. 5, 2015, 11 pages (Official Copy Only). {See Communication under Rule 37 CFR § 1.98(a) (3)}.

Office Action received for Indian Patent Application No. 201814036860, mailed on Jul. 29, 2021, 8 pages.

Office Action received for Indian Patent Application No. 202014041529, mailed on Dec. 6, 2021, 6 pages.

Office Action received for Indian Patent Application No. 202015013360, mailed on Mar. 17, 2023, 7 pages.

Office Action received for Indian Patent Application No. 202215025360, mailed on Mar. 29, 2023, 6 pages.

Office Action received for Indian Patent Application No. 202215025361, mailed on Mar. 29, 2023, 6 pages.

Office Action received for Indian Patent Application No. 202215025363, mailed on Mar. 29, 2023, 6 pages.

Office Action received for Indian Patent Application No. 202215025364, mailed on Mar. 29, 2023, 6 pages.

Office Action received for Japanese Patent Application No. 2013-550664, mailed on Jun. 10, 2016, 3 pages (Official Copy only). {See Communication under Rule 37 CFR § 1.98(a) (3)}.

Office Action received for Japanese Patent Application No. 2013-550664, mailed on Aug. 24, 2015, 9 pages (4 pages of English Translation and 5 pages of Official Copy).

Office Action received for Japanese Patent Application No. 2013-550664, mailed on Sep. 12, 2014, 10 pages (6 pages of English Translation and 4 pages of Official Copy).

Office Action received for Japanese Patent Application No. 2015-095183, mailed on Jun. 3, 2016, 13 pages (6 pages of English Translation and 7 pages of Official Copy).

Office Action received for Japanese Patent Application No. 2017-101107, mailed on Sep. 7, 2018, 14 pages (7 pages of English Translation and 7 pages of Official Copy).

Office Action received for Japanese Patent Application No. 2019-124728, mailed on Dec. 14, 2020, 4 pages (2 pages of English Translation and 2 pages of Official Copy).

Office Action received for Japanese Patent Application No. 2019-124728, mailed on Sep. 18, 2020, 6 pages (3 pages of English Translation and 3 pages of Official Copy).

Office Action received for Japanese Patent Application No. 2019-194597, mailed on Jan. 18, 2021, 10 pages (5 pages of English Translation and 5 pages of Official Copy).

Office Action received for Japanese Patent Application No. 2020-159840, mailed on Dec. 10, 2021, 13 pages (7 pages of English Translation and 6 pages of Official Copy).

Office Action received for Japanese Patent Application No. 2020-159840, mailed on Mar. 28, 2022, 6 pages (3 pages of English Translation and 3 pages of Official Copy).

Office Action received for Japanese Patent Application No. 2021-206121, mailed on Feb. 20, 2023, 7 pages (3 pages of English Translation and 4 pages of Official Copy).

Office Action received for Japanese Patent Application No. 2022-116534, mailed on Aug. 28, 2023, 10 pages (5 pages of English Translation and 5 pages of Official Copy).

(56) References Cited

OTHER PUBLICATIONS

Office Action received for Korean Patent Application No. 10-2012-7020548, mailed on Oct. 10, 2013, 5 pages (Official Copy only). {See Communication under Rule 37 CFR § 1.98(a) (3)}.

Office Action received for Korean Patent Application No. 10-2013-7022057, mailed on May 28, 2014, 7 pages (3 pages of English Translation and 4 pages of Official Copy).

Office Action received for Korean Patent Application No. 10-2014-7033660, mailed on Feb. 23, 2015, 3 pages (Official Copy only). {See Communication under Rule 37 CFR § 1.98(a) (3)}.

Office Action received for Korean Patent Application No. 10-2015-0072162, mailed on Apr. 20, 2016, 11 pages (6 pages of English Translation and 5 pages of Official Copy).

Office Action received for Korean Patent Application No. 10-2015-0072162, mailed on Feb. 27, 2017, 12 pages (6 pages of English Translation and 6 pages of Official Copy).

Office Action received for Korean Patent Application No. 10-2015-7013849, mailed on Aug. 20, 2015, 5 pages (2 pages of English Translation and 3 pages of Official Copy).

Office Action received for Korean Patent Application No. 10-2016-7017508, mailed on Oct. 20, 2016, 5 pages (2 pages of English Translation and 3 pages of Official Copy).

Office Action received for Korean Patent Application No. 10-2018-0035949, mailed on Apr. 24, 2019, 9 pages (4 pages of English Translation and 5 pages of Official Copy).

Office Action received for Korean Patent Application No. 10-2018-0035949, mailed on Dec. 24, 2018, 7 pages (3 pages of English Translation and 4 pages of Official Copy).

Office Action received for Korean Patent Application No. 10-2018-0035949, mailed on Jun. 20, 2018, 9 pages (4 pages of English Translation and 5 pages of Official Copy).

Office Action received for Korean Patent Application No. 10-2020-0024632, mailed on Dec. 29, 2020, 11 pages (5 pages of English Translation and 6 pages of Official Copy).

Office Action received for Korean Patent Application No. 10-2020-0024632, mailed on May 18, 2020, 11 pages (5 pages of English Translation and 6 pages of Official Copy).

Office Action received for Korean Patent Application No. 10-2020-7032110, mailed on Dec. 15, 2020, 6 pages (2 pages of English Translation and 4 pages of official Copy).

Office Action received for Korean Patent Application No. 10-2021-7017731, mailed on May 30, 2022, 5 pages (2 pages of English Translation and 3 pages of Official Copy).

Office Action received for Korean Patent Application No. 10-2022-0053111, mailed on Dec. 12, 2022, 9 pages (4 pages of English Translation and 5 pages of Official Copy).

Office Action received for Korean Patent Application No. 10-2022-0053111, mailed on Jun. 29, 2023, 7 pages (3 pages of English Translation and 4 pages of Official Copy).

Office Action Received for Taiwanese Patent Application No. 104117041, mailed on Aug. 22, 2016, 6 pages (3 pages of English Translation and 3 pages of Official Copy).

Office Action received for Taiwanese Patent Application No. 104117042, mailed on Apr. 20, 2017, 18 pages (7 pages of English Translation and 11 pages of Official Copy).

Office Action Report received for Australian Patent Application No. 2012209199, mailed on Dec. 17, 2015, 3 pages.

Pogue David, "Windows Vista for Starters: The Missing Manual", available at <http://academic.safaribooksonline.com/book/operating-systems/0596528264>, Jan. 25, 2007, 18 pages.

QPair, When I connected to LG G Pad 8.3 Q pair G Flex.-G Pad 8.3 review, Posting of a blog, Online Available at: <http://www.leaderyou.co.kr/2595>, Dec. 7, 2013, 28 pages (15 page of English Translation and 13 pages of Official Copy).

QPair, online available at: http://mongri.net/entry/G-Pad-83-Qpair, Retrieved on Mar. 6, 2017, Dec. 20, 2013, 22 pages (10 pages of English translation and 12 pages of Official Copy).

QQ, "Method of QQ voice chat", Online Available at: https://www.taodocs.com/p-47909082.html, May 25, 2016, 3 pages (Official Copy only). {See Communication under Rule 37 CFR § 1.98(a) (3)}.

Record of Oral Hearing received for U.S. Appl. No. 14/641,298, mailed on Oct. 8, 2021, 17 pages.

Result of Consultation received for European Patent Application No. 19729395.4, mailed on Jun. 22, 2021, 3 pages.

Result of Consultation received for European Patent Application No. 19729395.4, mailed on Jun. 23, 2021, 3 pages.

Result of Consultation received for European Patent Application No. 20205496.1, mailed on Apr. 18, 2023, 3 pages.

Rossignol Joe, "iOS 10 Concept Simplifies Lock Screen With Collapsed Notifications", Available online at: https://www.macrumors.com/2016/06/16/ios-10-collapsed-notifications-concept/, Jun. 16, 2016, 10 pages.

Search Report and Opinion received for Danish Patent Application No. PA201870362, mailed on Sep. 7, 2018, 9 pages.

Search Report and Opinion received for Danish Patent Application No. PA201870363, mailed on Sep. 11, 2018, 12 pages.

Search Report and Opinion received for Danish Patent Application No. PA201870364, mailed on Sep. 4, 2018, 12 pages.

Search Report and Opinion received for Danish Patent Application No. PA202070617, mailed on Dec. 23, 2020, 8 pages.

Search Report received For Netherlands Patent Application No. 2014737, mailed on Oct. 29, 2015, 9 pages.

Senicar et al., "User-Centered Design and Development of an Intelligent Light Switch for Sensor Systems", Technical Gazette, vol. 26, No. 2, available online at: https://hrcak.srce.hr/file/320403, 2019, pp. 339-345.

Shangmeng Li, "The Design and Implementation of Mobile Terminal System of Multimedia Conference Based on Symbian Operating System", China Academic Journal Electronic Publishing House, Online available at: http://www.cnki.net, 2011, 66 pages (Official Copy only). {See Communication under Rule 37 CFR § 1.98(a) (3)}.

Song Jianhua, "Guidelines for Network", Feb. 29, 2008, 11 pages (Official Copy Only). {See Communication under Rule 37 CFR § 1.98(a) (3)}.

Summons to Attend oral proceedings received for European Application No. 10799259.6, mailed on Aug. 2, 2016, 16 pages.

Summons to Attend Oral Proceedings received for European Patent Application No. 19729395.4, mailed on Mar. 11, 2021, 7 pages.

Summons to Attend Oral Proceedings received for European Patent Application No. 19729395.4, mailed on Mar. 19, 2021, 9 pages.

Summons to Attend Oral Proceedings received for European Patent Application No. 20205496.1, mailed on Sep. 8, 2022, 9 pages.

Supplemental Notice of Allowance received for U.S. Appl. No. 15/608,866, mailed on Feb. 20, 2020, 2 pages.

Supplemental Notice of Allowance received for U.S. Appl. No. 16/859,101, mailed on Feb. 7, 2022, 2 pages.

Supplemental Notice of Allowance received for U.S. Appl. No. 16/859,101, mailed on Feb. 25, 2022, 2 pages.

Trish's World, "Samsung Gear S3 Apps Launcher", Available Online at <https://www.youtube.com/watch?v=zlamYA-4XSQ>, Feb. 5, 2017, 1 page.

Wolfe Joanna, "Annotation Technologies: A Software and Research Review", Computers and Composition, vol. 19, No. 4, 2002, pp. 471-497.

Written Opinion received for PCT Patent Application No. PCT/US95/11025, mailed on Oct. 4, 1996, 6 pages.

Ziegler Chris, "Palm® Pre. TM. for Dummies®", For Dummies, Oct. 19, 2009, 9 pages.

Advisory Action received for U.S. Appl. No. 14/263,889, mailed on May 26, 2016, 4 pages.

Advisory Action received for U.S. Appl. No. 15/725,868, mailed on Dec. 10, 2018, 5 pages.

Advisory Action received for U.S. Appl. No. 16/666,073, mailed on Jul. 07. 2020, 5 pages.

Applicant-Initiated Interview Summary received for U.S. Appl. No. 14/263,889, mailed on Apr. 15, 2016, 3 pages.

Applicant-Initiated Interview Summary received for U.S. Appl. No. 15/725,868, mailed on Jul. 25. 2018, 3 pages.

(56) References Cited

OTHER PUBLICATIONS

Applicant-Initiated Interview Summary received for U.S. Appl. No. 15/725,868, mailed on May 13, 2019, 3 pages.

Applicant-Initiated Interview Summary received for U.S. Appl. No. 15/725,868, mailed on Nov. 20, 2018, 3 pages.

Applicant-Initiated Interview Summary received for U.S. Appl. No. 17/970,417, mailed on Nov. 4, 2024, 2 pages.

Applicant-Initiated Interview Summary received for U.S. Appl. No. 18/140,449, mailed on Aug. 27, 2024, 2 pages.

Baudisch et al., "Back-of-device interaction allows creating very small touch devices", Chi 2009—Digital Life, New World:Conference Proceedings And Extended Abstracts; The 27th Annual Chi Conference On Human Factors In Computing Systems Available online at: <http://dx.doi.org/10.1145/1518701.1518995>, Apr. 9, 2009, pp. 1923-1932.

Corrected Notice of Allowance received for U.S. Appl. No. 15/725,868, mailed on Aug. 23, 2019, 2 pages.

Corrected Notice of Allowance received for U.S. Appl. No. 15/725,868, mailed on Sep. 30, 2019, 3 pages.

Corrected Notice of Allowance received for U.S. Appl. No. 16/666,073, mailed on Apr. 6, 2021, 3 pages.

Corrected Notice of Allowance received for U.S. Appl. No. 16/666,073, mailed on Apr. 26, 2021, 4 pages.

Corrected Notice of Allowance received for U.S. Appl. No. 16/666,073, mailed on Feb. 22, 2021, 3 pages.

Corrected Notice of Allowance received for U.S. Appl. No. 16/666,073, mailed on Mar. 11, 2021, 3 pages.

Decision on Appeal received for Korean Patent Application No. 10-2020-7034959, mailed on Jul. 25, 2022, 28 pages (5 pages of English Translation and 23 pages of Official Copy).

Decision to Grant received for European Patent Application No. 10763539.3, mailed on Jul. 19, 2018, 3 pages.

Decision to Grant received for European Patent Appiicatian No. 18188433.9, mailed on Aug. 13, 2020. 3 pages.

Decision to Refuse received for Japanese Patent Apptication No. 2013-5037311 mailed on Jun. 23, 2014, 4 pages (2 pages of English Transiation and 2 pages of Official Copy).

Examiner's Pre-Review Report received for Japanese Patent Application No. 2014-212867, mailed on Nov. 4, 2016, 5 pages (2 pages of English Translation and 3 pages of Official Copy).

Extended European Search Report received for European Patent Application No 18188433.9, mailed on Oct. 29, 2018, 8 pages.

Final Office Action received for U.S. Appl. No. 12/794,766, mailed on Nov. 28, 2012, 23 pages.

Final Office Action received for U.S. Appl. No. 14/263,889, mailed on Jan. 4, 2016, 9 pages.

Final Office Action received for U.S. Appl. No. 15/725,868, mailed on Sep. 27, 2018, 25 pages.

Final Office Action received for U.S. Appl. No. 16/666,073, mailed on Apr. 17, 2020, 18 pages.

Final Office Action received for U.S. Appl. No. 17/332,829, mailed on Feb. 6, 2023, 19 pages.

Final Office Action received for U.S. Appl. No. 18/067,350, mailed on Oct. 31, 2024, 44 pages.

Final Office Action received for U.S. Appl. No. 18/138,348, mailed on Oct. 18, 2024, 10 pages.

Final Office Action received for U.S. Appl. No. 18/140,449, mailed on Oct. 18, 2024, 11 pages.

Intention to Grant received for European Patent Application No. 10763539.3, mailed on Mar. 15, 2018, 6 pages.

Intention to Grant received for European Patent Application No. 18188433.9, mailed on Apr. 6, 2020, 9 pages.

International Preliminary Report on Patentability received for PCT Patent Application No. PCT/US2010/050311, mailed on Oct. 18, 2012, 11 pages.

International Preliminary Report on Patentability received for PCT Patent Application No. PCT/US2023/017280, mailed on Oct. 17, 2024, 15 pages.

International Search Report and Written Opinion received for PCT Patent Appiication No. PCT/US2010/050311, mailed on Aug. 24, 2011, 15 pages.

Invitation to Pay Additional Fees and Partial International Search Report received for PCT Patent Application No. PCT/US2010/050311, mailed on Dec. 21, 2010, 6 pages.

Koyama Kaori. "Mac Fan Macintosh Master Beak Mac OS X v10.4" "Tiger" & iLife, '06 version, Mainichi Communications Inc. Nobuyuki Nakagawa, Jul. 9, 2001, 4 pages (Official Copy Only). {See Communication Under Rule 37 CFR §1.98(a)(3)}.

Non-Final Office Action received for U.S. Appl. No. 12/794,766, mailed on Aug. 5, 2013, 9 pages.

Non-Final Office Action received for U.S. Appl. No. 12/794,766, mailed on Jun. 25, 2012, 18 pages.

Non-Final Office Action received for U.S. Appl. No. 12/794,768, mailed on Oct. 10, 2012, 14 pages.

Non-Final Office Action received for U.S. Appl. No. 14/263,889, mailed on Jul. 2, 2015, 9 pages.

Non-Final Office Action received for U.S. Appl. No. 14/263,889, mailed on Jul. 26, 2016, 11 pages.

Non-Final Office Action received for U.S. Appl. No 15/725,868, mailed on Apr. 27, 2018, 17 pages.

Non-Final Office Action received for U.S. Appl. No. 15/725,868, mailed on Feb. 12, 2019, 26 pages.

Non-Final Office Action received for U.S. Appl. No. 16/666,073, mailed on Dec. 10, 2019, 16 pages.

Non-Final Office Action received for U.S. Appl. No. 17/332,829, mailed on Aug. 1, 2022, 17 pages.

Non-Final Office Action received for U.S. Appl. No. 18/140,449, mailed on May 24, 2024, 19 pages.

Notice of Acceptance received for Australian Patent Application No. 2010350749, mailed on Jan. 13, 2015, 3 pages.

Notice of Acceptance received for Australian Patent Application No. 2015201127, mailed on Feb. 14, 2017, 3 pages.

Notice of Allowance received for Brazilian Patent Application No. BR112012025746-3, mailed on Jul. 6, 2021, 3 pages (1 page of English Translation and 2 pages of Offcial Copy).

Notice of Allowance received for Chinese Patent Application No. 201010602653.9, mailed on Nov. 15, 2014, 2 pages (1 page of English Translation and 1 page of Official Copy).

Notice of Allowance received for Chinese Patent Application No. 20101066006234, mailed on Aug. 11, 2014, 4 pages (1 page of English Translation and 3 pages of Official Copy).

Notice of Allowance received for Chinese Patent Application No. 201410575145.4, mailed on May 10, 2018, 3 pages (1 page of English Translation and 2 pages of Offcial Copy).

Notice of Allowance received for Japanese Patent Application No. 2014-212867, mailed on Mar. 30, 2018, 3 pages (1 page of English Translation and 2 pages of Official Copy).

Notice of Allowance received for Japanese Patent Appiication No. 2016-151497, mailed on Jun. 4. 2018, 4 pages (1 page of English Translation and 3 pages of Official Copy).

Notice of Allowance received for Japanese Patent Application No. 2019-182484, mailed on Aug. 30, 2021, 4 pages (1 page of English Translation and 3 pages of Official Copy).

Notice of Allowance received for Japanese Patent Application No. 2021-154573, mailed on Nov. 11, 2022, 4 pages (1 page of English Translation and 3 pages of Official Copy).

Notice of Allowance received for Japanese Patent Application No. 2022-197327, mailed on May 31, 2024, 4 pages (1 page of English Translation and 3 pages of Official Copy).

Notice of Allowance received for Korean Patent Application No. 10-2012-7028535, mailed on Jul. 16, 2014, 5 pages (1 page of English Translation and 4 pages of Official Copy).

Notice of Allowance received for Korean Patent Application No. 10-2014-7005164, mailed on Dec. 21, 2014, 4 pages (1 page of English Translation and 3 pages of Official Copy).

Notice of Allowance received for Korean Patent Application No. 10-2014-7029838, mailed on Jul. 28, 2015, 4 pages (1 page of Enghlsh Translation and 3 pages of Official Copy).

Notice of Allowance received for Korean Patent Application No. 10-2015-7007050, mailed on Feb. 26, 2016, 4 pages (1 page of English Translation and 3 pages of Official Copy).

(56) References Cited

OTHER PUBLICATIONS

Notice of Allowance received for Korean Patent Application No. 10-2016-7014580, mailed on Dec. 17, 2019, 6 pages (2 pages of English Translation and 4 pages of Official Copy).

Notice of Allowance received for Korean Patent Application No. 10-2018-7036975, mailed on Sep. 18, 2019, 6 pages (2 pages of English Translation and 4 pages of Official Copy).

Notice of Allowance received for Korean Patent Application No. 10-2020-7002845, mailed on Sep. 24, 2020, 5 pages (1 page of English Translatian and 4 pages of Official Copy).

Notice of Allowance received for Korean Patent Application No. 10-2023-7005442, mailed on Jan. 22, 2024, 8 pages (2 pages of English Translation and 6 pages of Official Copy).

Notice of Allowance received for Korean Patent Application No. 10-2023-7040599, mailed on Oct. 18, 2024, 7 pages (2 pages of English Translation and 5 pages of Official Copy).

Notice of Allowance received for Mexican Patent Application No. MX/a/2012/011623, mailed on Jan. 16, 2014, 2 pages (1 page of English Translation and 1 page of Official Copy).

Notice of Allowance received for Mexican Patent Application No. MX/a/2014/004295, mailed on May 21, 2015, 2 pages (1 page of English Translation and 1 page of Official Copy).

Notice of Allowance received for Mexican Patent Application No. MX/a/2015/010523, mailed on May 25, 2016, 2 pages (1 page of English Translation and 1 page of Official Copy).

Notice of Allowance received for Mexican Patent Application No. MX/a/2016/012174, mailed on Jan. 17, 2020, 3 pages (1 page of English Translation and 2 pages of Official Copy).

Notice of Allowance received for Mexican Patent Application No. MX/a/2020/003290, mailed on Feb. 9, 2023, 4 pages (1 page of English Translation and 3 pages of Official Copy).

Notice of Allowance received for Taiwanese Patent Application No. 099132253, mailed on Apr. 27, 2016, 3 pages (1 page of English Translation and 2 pages of Official Copy).

Notice of Allowance received for Taiwanese Patent Application No. 099132254, mailed on Feb. 18, 2014, 3 pages (1 page of English Translation and 2 pages of Official Copy).

Notice of Allowance received for U.S. Appl. No. 12/794/766, mailed on Jan. 17, 2014, 8 pages.

Notice of Allowance received for U.S. Appl. No. 12/794,768, mailed on Mar. 22, 2013, 6 pages.

Notice of Allowance received for U.S. Appl. No. 14/263,889, mailed on Feb. 1, 2017, 10 pages.

Notice of Allowance received for U.S. Appl. No. 14/263,889, mailed on Jun. 18, 2017, 8 pages.

Notice of Allowance received for U.S. Appl. No. 15/725,868, mailed on Jun. 12, 2017, 9 pages.

Notice of Allowance received for U.S. Appl. No. 15/784,806, mailed on Oct. 18, 2017, 5 pages.

Notice of Allowance received for U.S. Appl. No. 16/666,073, mailed on Jan. 21, 2021, 11 pages.

Notice of Allowance received for U.S. Appl. No. 17/950,868, mailed on Oct. 23, 2024, 10 pages.

Office Action received for Australian Patent Application No. 2010350749, mailed on Oct. 16, 2013, 3 pages.

Office Action received for Australian Patent Application No. 2015201127. mailed on Mar. 21, 2016, 3 pages.

Office Action received for Australian Patent Application No. 2023201057, mailed on Oct. 24, 2024, 3 pages.

Office Action received for Brazilian Patent Application No. BR112012025746-3, mailed on Jun. 2, 2020, 7 pages (4 pages of English Translation and 3 pages of Official Copy).

Office Action received for Chinese Patent Application No. 201010602653.9, mailed on Apr. 1, 2013, 21 pages (13 pages of English Translation and 8 pages of Official Copy).

Office Action received for Chinese Patent Application No. 201010602653.9, mailed on Dec. 9, 2013, 10 pages (6 pages of English Translation and 4 pages of Official Copy).

Office Action received for Chinese Patent Application No. 201010602653.9, mailed on May 15, 2014, 6 pages (3 pages of English Translation and 3 pages of Official Copy).

Office Action received for Chinese Patent Application No. 2010106600623.4, mailed on Apr. 28, 2014, 7 pages (4 pages of English Translation and 3 pages of Official Copy).

Office Action received for Chinese Patent Application No. 2010106600623.4, mailed on Jan. 24, 2014, 7 pages (4 pages of English Translation and 3 pages of Official Copy).

Office Action received for Chinese Patent Application No. 2010106600623.4. mailed on May 2, 2013, 27 pages (15 pages of English Translation and 12 pages of Official Copy).

Office Action received for Chinese Patent Application No. 201410575145.4, mailed on Feb. 13, 2017, 18 pages (11 pages of English Translation and 7 pages of Official Copy).

Office Action received for Chinese Patent Application No. 201410575145.4, mailed on Nov. 30, 2017, 17 pages (11 pages of English Translation and 6 pages of Official Copy).

Office Action received for European Patent Application No. 10763539. 3, mailed on Jun. 13, 2016, 5 pages.

Office Action received for European Patent Application No. 22733778. 9, mailed on Oct. 22, 2024, 6 pages.

Office Action received for European Patent Application No. 22792995. 7, mailed on Oct. 15, 2024, 8 pages.

Office Action received for Japanese Patent Application No. 2013-503731, mailed on Mar. 3, 2014, 8 pages (2 pages of English Translation and 6 pages of Official Copy).

Office Action received for Japanese Patent Application No. 2013-503731, mailed on Sep. 24, 2013, 3 pages (1 page of English Translation and 2 pages of Official Copy).

Office Action received for Japanese Patent Application No. 2014-212867, mailed on Aug. 18, 2017, 4 pages (1 page of English Translation and 3 pages of Official Copy).

Office Action received for Japanese Patent Application No. 2014-212867, mailed on Jun. 29, 2015, 8 pages (4 pages of English Translation and 4 pages of Official Copy).

Office Action received for Japanese Patent Application No. 2016-151497, mailed on Sep. 25, 2017, 7 pages (2 pages of English Translation and 5 pages of Official Copy).

Office Action received for Japanese Patent Application No. 2018-127760, mailed on Feb. 22, 2019, 10 pages (5 pages of English Translation and 5 pages of Official Copy).

Office Action received for Japanese Patent Application No. 2018-127760, mailed on Jul. 5, 2018, 4 pages (1 page of English Translation and 3 pages of Official Copy).

Office Action received for Japanese Patent Application No. 2019-182484, mailed on Dec. 4, 2020, 5 pages (1 page of English Translation and 5 pages of Official Copy).

Office Action received for Japanese Patent Application No. 2022-197327, mailed on Mar. 1, 2024, 14 pages (7 pages of English Translation and 7 pages of Official Copy).

Office Action received for Korean Patent Application No. 10-2012-7028535, mailed on Nov. 26, 2013, 10 pages (4 pages of English Translation and 6 pages of Official Copy).

Office Action received for Korean Patent Application No. 10-2014-7005164, mailed on May 23, 2014, 15 pages (6 pages of English Translation and 8 pages of Official Copy).

Office Action received for Korean Patent Application No. 10-2014-7029838, mailed on Dec. 20, 2014, 13 pages (5 pages of English Translation and 8 pages of Official Copy).

Office Action received for Korean Patent Application No. 10-2015-7007050, mailed on Apr. 18, 2015, 14 pages (6 pages of English Translation and 8 pages of Official Copy).

Office Action received for Korean Patent Application No. 10-2015-7007050, mailed on Oct. 23, 2015, 7 pages (3 pages of English Translation and 4 pages of Official Copy).

Office Action received for Korean Patent Application No. 10-2016-7014580, mailed on Jan. 30, 2018, 10 pages (4 pages of English Translation and 6 pages of Official Copy).

Office Action received for Korean Patent Application No. 10-2016-7014580, mailed on Jul. 30, 2018, 7 pages (3 pages of English Translation and 4 pages of Official Copy).

(56) References Cited

OTHER PUBLICATIONS

Office Action received for Korean Patent Application No. 10-2016-7014580, mailed on Jun. 29, 2017, 7 pages (1 page of English Translation and 6 pages of Official Copy).

Office Action received for Korean Patent Application No. 10-2016-7014580, mailed on Sep. 19, 2018, 7 pages (3 pages of English Translation and 4 pages of Official Copy).

Office Action received for Korean Patent Application No. 10-2016-7014580, mailed on Sep. 27, 2016, 9 pages (4 pages of English Translation and 5 pages of Official Copy).

Office Action received for Korean Patent Application No. 10-2017-7002774, mailed on Apr. 18, 2017, 10 pages (4 pages of English Translation and 8 pages of Official Copy).

Office Action received for Korean Patent Application No. 10-2017-7002774, mailed on Jul. 30, 2018, 6 pages (3 pages of English Translation and 3 pages of Official Copy).

Office Action received for Korean Patent Application No. 10-2017-7002774, mailed on Sep. 20, 2018, 12 pages (6 pages of English Translation and 6 pages of Official Copy).

Office Action received for Korean Patent Application No. 10-2018-7036975, mailed on Mar. 22, 2019, 11 pages (5 pages of English Translation and 6 pages of Official Copy).

Office Action received for Korean Patent Application No. 10-2020-7002845, mailed on Feb. 17, 2020, 14 pages (6 pages of English Translation and 8 pages of Official Copy).

Office Action received for Korean Patent Application No. 10-2020-7034959, mailed on Jan. 27, 2022, 7 pages (3 pages of English Translation and 4 pages of Official Copy).

Office Action received for Korean Patent Application No. 10-2020-7034959, mailed on Mar. 2, 2021, 12 pages (5 pages of English Translation and 7 pages of Official Copy).

Office Action received for Korean Patent Application No. 10-2020-7034959 mailed on Oct. 27, 2021, 8 pages (4 pages of English Translation and 4 pages of Official Copy).

Office Action received for Korean Patent Application No. 10-2022-7006973, mailed on May 19, 2022, 10 pages (4 pages of English Translation and 8 pages of Official Copy).

Office Action received for Korean Patent Application No. 10-2022-7006973, mailed on Nov. 24, 2022, 6 pages (3 pages of English Transtation and 3 pages of Official Copy).

Office Action received for Korean Patent Application No. 10-2023-7005442, mailed on Jul. 25, 2023, 10 pages (4 pages of English Translation and 6 pages of Official Copy).

Office Action received for Korean Patent Application No. 10-2024-7019962, mailed on Sep. 25, 2024, 7 pages (2 pages ef English Translation and 5 pages of Official Copy).

Office Action received for Mexican Patent Application No. MX/a/2014/004295, mailed on Aug. 21, 2014, 4 pages (2 pages of English Translation and 2 pages of Official Copy).

Office Action received for Mexican Patent Application No. MX/a/2014/004295, mailed on Jan. 20, 2015, 4 pages (1 page of English Translation and 3 pages of Official Copy).

Office Action received for Mexican Patent Application No. MX/a/2015/010523, mailed on Jan. 26, 2016, 4 pages (2 pages of English Translation and 2 pages of Official Copy).

Office Action received for Mexican Patent Application No. MX/a/2016/012174, mailed on Apr. 10, 2019, 7 pages (4 pages of English Translation and 3 pages of Official Copy).

Office Action received for Mexican Patent Application No. MX/a/2016/012174, mailed on Aug. 8, 2019, 7 pages (2 pages of English Translation and 5 pages of Official Copy).

Office Action received for Mexican Patent Application No. MX/a/2020/003290, mailed on Nov. 11, 2022, 7 pages (2 pages of English Translation and 5 pages of Official Copy).

Office Action received for Mexican Patent Application No. MX/a/2020/003290, mailed on Oct. 26, 2022, 8 pages (3 pages of English Translation and 5 pages of Official Copy).

Office Action received for Mexican Patent Application No. MX/a/2023/005388, mailed on Dec. 15, 2023, 18 pages (9 pages of English Translation and 9 pages of Official Copy).

Office Action received for Mexican Patent Application No. MX/a/2023/005388, mailed on Jun. 2, 2023, 24 pages (12 pages of English Translation and 12 pages of Official Copy).

Office Action received for Taiwanese Patent Application No. 099132253, mailed on Jun. 24, 2013, 16 pages (8 pages of English Translation and 8 pages of Official Copy).

Office Action received for Taiwanese Patent Application No. 099132253, mailed on Mar. 27, 2014, 10 pages (4 pages of English Translation and 6 pages of Official Copy).

Office Action received for Taiwanese Patent Application No. 099132254, mailed on May 27, 2013, 24 pages (12 pages of English Translation and 12 pages of Official Copy).

Sharf et al., "SnapPaste:an interactive technique for easy mesh composition", The Visual Computer; International Journal Of Computer Graphics, Springer, Berlin, De, vol. 22, No. 9-11 Available Online at <http://dx.doi.org/10.1007/s00371-006-0068-5>, Aug. 25, 2006, pp. 835-844.

Supplemental Notice of Allowance received for U.S. Appl. No. 17/484,899, mailed on Oct. 29, 2024, 5 pages.

Corrected Notice of Allowance received for U.S. Appl. No. 17/684,843, mailed on Oct. 7, 2024, 2 pages.

Notice of Allowance received for Chinese Patent Application No. 201910704856.X, mailed on Sep. 30, 2024, 4 pages (1 page of English Translation and 3 pages of Official Copy).

Notice of Allowance received for Korean Patent Application No. 10-2023-7018775, mailed on Sep. 30, 2024, 7 pages (2 pages of English Translation and 5 pages of Official Copy).

Office Action received for European Patent Application No. 22705232.1, mailed on Sep. 26, 2024, 8 pages.

Corrected Notice of Allowance received for U.S. Appl. No. 15/784,806, mailed on Jan. 17, 2025, 2 pages.

Decision to Grant received for European Patent Application No. 22734711.9, mailed on Jan. 7, 2025, 2 pages.

Intention to Grant received for European Patent Application No. 21206800.1, mailed on Jan. 7, 2025, 9 pages.

Intention to Grant received for European Patent Application No. 24164409.5, mailed on Jan. 14, 2025, 8 pages.

Notice of Allowance received for U.S. Appl. No. 17/484,899, mailed on Jan. 16, 2025, 16 pages.

Corrected Notice of Allowance received for U.S. Appl. No. 17/745,680, mailed on Nov. 20, 2024, 2 pages.

Intention to Grant received for European Patent Application No. 24160234.1, mailed on Nov. 4, 2024, 9 pages.

International Search Report and Written Opinion received for PCT Patent Application No. PCT/US2024/023231, mailed on Oct. 23, 2024, 24 pages.

Invitation to Pay Additional Fees and Partial International Search Report received for PCT Patent Application No. PCT/US2024/023231, mailed on Aug. 29, 2024, 17 pages.

Notice of Allowance received for U.S. Appl. No. 17/745,680, mailed on Nov. 12, 2024, 8 pages.

Notice of Allowance received for U.S. Appl. No. 18/138,348, mailed on Nov. 13, 2024, 10 pages.

Applicant-Initiated Interview Summary received for U.S. Appl. No. 18/165,144, mailed on Apr. 22, 2025, 2 pages.

Corrected Notice of Allowance received for U.S. Appl. No. 18/138,348, mailed on Apr. 16, 2025, 2 pages.

International Preliminary Report on Patentability received for PCT Patent Application No. PCT/US2023/032792, mailed on Apr. 3, 2025, 10 pages.

Non-Final Office Action received for U.S. Appl. No. 18/067,350, mailed on Apr. 17, 2025. 49 pages.

Non-Final Office Action received for U.S. Appl. No. 18/077,154, mailed on Apr. 10, 2025, 27 pages.

Applicant-Initiated Interview Summary received for U.S. Appl. No. 17/950,868, mailed on Sep. 10, 2024, 3 pages.

Corrected Notice of Allowance received for U.S. Appl. No. 17/903,946, mailed on Sep. 3, 2024, 2 pages.

Decision on Appeal received for U.S. Appl. No. 15/784,806, mailed on Sep. 4, 2024, 15 pages.

Decision to Grant received for Japanese Patent Application No. 2023-571312, mailed on Aug. 29, 2024, 3 pages (1 page of English Translation and 2 pages of Official Copy).

(56) References Cited

OTHER PUBLICATIONS

Decision to Grant received for Japanese Patent Application No. 2024-003876, mailed on Sep. 2, 2024, 3 pages (1 page of English Translation and 2 pages of Official Copy).

Extended European Search Report received for European Patent Application No. 24159026.4, mailed on Jul. 10, 2024, 9 pages,.

Final Office Action received for U.S. Appl. No. 17/950,868, mailed on Aug. 29, 2024, 13 pages.

Final Office Action received for U.S. Appl. No. 17/970,417, mailed on Sep. 18, 2024, 24 pages.

International Search Report and Written Opinion received for PCT Patent Application No. PCT/US2024/017017, mailed on Aug. 2, 2024, 27 pages.

Invitation to Pay Additional Fees received for PCT Patent Application No. PCT/US2024/017017, mailed on May 15, 2024, 3 pages.

Non-Final Office Action received for U.S. Appl. No. 18/165,144, mailed on Sep. 11, 2024, 25 pages.

Notice of Allowance received for U.S. Appl. No. 17/684,843, mailed on Sep. 17, 2024, 5 pages.

Office Action received for Chinese Patent Application No. 202410030102.1, mailed on Jul. 23, 2024, 18 pages (9 pages of English Translation and 9 pages of Official Copy).

Office Action received for Japanese Patent Application No. 2023-028786, mailed on Aug. 23, 2024, 10 pages (5 pages of English Translation and 5 pages of Official Copy).

Record of Oral Hearing received for U.S. Appl. No. 15/784,806, mailed on Aug. 28, 2024, 16 pages.

Advisory Action received for U.S. Appl. No. 17/970,417, mailed on Dec. 12, 2024, 7 pages.

Notice of Allowance received for Japanese Patent Application No. 2023-028786, mailed on Dec. 2, 2024, 4 pages (1 page of English Translation and 3 pages of Official Copy).

Notice of Allowance received for Korean Patent Application No. 10-2024-0112016, mailed on Dec. 2, 2024, 6 pages (2 pages of English Translation and 4 pages of Official Copy).

Notice of Allowance received for U.S. Appl. No. 17/745,680, mailed on Dec. 12, 2024, 2 pages.

Office Action received for Japanese Patent Application No. 2024-146741, mailed on Nov. 25, 2024, 12 pages (6 pages of English Translation and 6 pages of Official Copy).

Applicant-Initiated Interview Summary received for U.S. Appl. No. 17/745,680, mailed on Jun. 30, 2025, 2 pages.

Applicant-Initiated Interview Summary received for U.S. Appl. No. 18/077,154, mailed on Jul. 2, 2025, 2 pages.

Applicant-Initiated Interview Summary received for U.S. Appl. No. 18/242,363, mailed on Jun. 4, 2025, 3 pages.

Corrected Notice of Allowance received for U.S. Appl. No. 18/422,571, mailed on Jun. 17, 2025, 2 pages.

Corrected Notice of Allowance received for U.S. Appl. No. 18/422,571, mailed on May 30, 2025, 2 pages.

Decision to Grant received for European Patent Application No. 24164409.5, mailed on May 22, 2025, 3 pages.

Examiner-Initiated Interview Summary received for U.S. Appl. No. 18/067,350, mailed on Jun. 26, 2025, 4 pages.

European Search Report received for European Patent Application No. 25170895.4, mailed on Jul. 3, 2025, 11 pages.

Intention to Grant received for European Patent Application No. 22792995.7, mailed on Jun. 10, 2025, 9 pages.

Intention to Grant received for European Patent Application No. 24160234.1, mailed on Jun. 20, 2025, 9 pages.

Notice of Allowance received for Chinese Patent Application No. 202410924550.6, mailed on Jun. 30, 2025, 4 pages (1 page of English Translation and 3 pages of Official Copy).

Notice of Allowance received for Chinese Patent Application No. 202410924556.3, mailed on Jun. 30, 2025, 4 pages (1 page of English Translation and 3 pages of Official Copy).

Notice of Allowance received for U.S. Appl. No. 17/745,680, mailed on Jul. 18, 2025, 8 pages.

Notice of Allowance received for U.S. Appl. No. 18/165,144, mailed on Jul. 2, 2025, 7 pages.

Notice of Allowance received for U.S. Appl. No. 18/498,779, mailed on Jul. 14, 2025, 9 pages.

Notice of Allowance received for U.S. Appl. No. 18/499,848, mailed on Jun. 16, 2025, 7 pages.

Office Action received for Chinese Patent Application No. 202311835200.4, mailed on Apr. 29, 2025, 9 pages (5 pages of English Translation and 4 pages of Official Copy).

Office Action received for Chinese Patent Application No. 202410030102.1, mailed on Apr. 24, 2025, 11 pages (6 pages of English Translation and 5 pages of Official Copy).

Office Action received for European Patent Application No. 22733778.9, mailed on Jun. 20, 2025, 4 pages.

Office Action received for European Patent Application No. 23172038.4, mailed on May 22, 2025, 6 pages.

Office Action received for Indian Patent Application No. 202315041189, mailed on Jun. 26, 2025, 7 pages.

Office Action received for Japanese Patent Application No. 2024-146741, mailed on Jun. 20, 2025, 6 pages (3 pages of English Translation and 3 pages of Official Copy).

Office Action received for Korean Patent Application No. 10-2023-7039401, mailed on May 19, 2025, 7 pages (3 pages of English Translation and 4 pages of Official Copy).

Result of Consultation received for European Patent Application No. 22729921.1, mailed on Jun. 12, 2025, 3 pages.

Result of Consultation received for European Patent Application No. 22729921.1, mailed on Jun. 27, 2025, 3 pages.

Advisory Action received for U.S. Appl. No. 18/380,116, mailed on May 21, 2025, 4 pages.

Corrected Notice of Allowance received for U.S. Appl. No. 18/499,848, mailed on May 19, 2025, 3 pages.

Decision to Grant received for European Patent Application No. 21206800.1, mailed on May 15, 2025, 2 pages.

Intention to Grant received for European Patent Application No. 18779093.6, mailed on May 9, 2025, 9 pages.

Non-Final Office Action received for U.S. Appl. No. 18/242,363, mailed on May 13, 2025, 29 pages.

Notice of Allowance received for Chinese Patent Application No. 202110894284.3, mailed on May 13, 2025, 4 pages (1 page of English Translation and 3 pages of Official Copy).

Notice of Allowance received for Chinese Patent Application No. 202311185909.4, mailed on Apr. 30, 2025, 3 pages (2 pages of English Translation and 1 page of Official Copy).

Notice of Allowance received for Chinese Patent Application No. 202311753064.4, mailed on May 12, 2025, 6 pages (2 pages of English Translation and 4 pages of Official Copy).

Corrected Notice of Allowance received for U.S. Appl. No. 17/745,680, mailed on Jul. 28, 2025, 3 pages.

Corrected Notice of Allowance received for U.S. Appl. No. 18/165,144, mailed on Jul. 22, 2025, 2 pages.

Final Office Action received for U.S. Appl. No. 18/242,363, mailed on Jul. 30, 2025, 51 pages.

Notice of Allowance received for U.S. Appl. No. 18/077,154, mailed on Jul. 28, 2025, 14 pages.

Office Action received for Japanese Patent Application No. 2024-106235, mailed on Jul. 22, 2025, 14 pages (7 pages of English Translation and 7 pages of Official Copy).

Result of Consultation received for European Patent Application No. 22733778.9, mailed on Jul. 21, 2025, 3 pages.

Summons to Attend Oral Proceedings received for European Patent Application No. 22705232.1, mailed on Jul. 23, 2025, 12 pages.

Applicant-Initiated Interview Summary received for U.S. Appl. No. 18/416,784, mailed on Sep. 25, 2025, 2 pages.

Corrected Notice of Allowance received for U.S. Appl. No. 18/498,779, mailed on Sep. 17, 2025, 4 pages.

Corrected Notice of Allowance received for U.S. Appl. No. 18/498,779, mailed on Sep. 30, 2025, 3 pages.

Extended European Search Report received for European Patent Application No. 25181591.6, mailed on Sep. 16, 2025, 10 pages.

Gamexplain, "Making a Call in the Nintendo Switch Online App (Splatoon 2 Voice Chat Test!)", Online available at: https://www.youtube.com/watch?v=HYtBLcw08_s, Jul. 19, 2017, 1 page.

Non-Final Office Action received for U.S. Appl. No. 18/242,363, mailed on Sep. 24, 2025, 59 pages.

(56)                    References Cited

OTHER PUBLICATIONS

Non-Final Office Action received for U.S. Appl. No. 18/428,549, mailed on Sep. 24, 2025, 13 pages.

Corrected Notice of Allowance received for U.S. Appl. No. 18/535,820, mailed on Sep. 3, 2025, 2 pages.

Decision to Grant received for European Patent Application No. 20166552.8, mailed on Aug. 28, 2025, 4 pages.

International Preliminary Report on Patentability received for PCT Patent Application No. PCT/US2024/017017, mailed on Sep. 4, 2025, 23 pages.

Notice of Allowance received for Korean Patent Application No. 10-2024-7043493, mailed on Aug. 26, 2025, 7 pages (2 pages of English Translation and 5 pages of Official Copy).

Office Action received for European Patent Application No. 24215184.3, mailed on Sep. 5, 2025, 6 pages.

Office Action received for Japanese Patent Application No. 2024-146741, mailed on Aug. 25, 2025, 4 pages (2 pages of English Translation and 2 pages of Official Copy).

Corrected Notice of Allowance received for U.S. Appl. No. 18/498,779, mailed on Aug. 6, 2025, 2 pages.

Office Action received for Chinese Patent Application No. 202310585927.5, mailed on Jun. 27, 2025, 17 pages (9 pages of English Translation and 8 pages of Official Copy).

Office Action received for European Patent Application No. 23203414.0, mailed on Jul. 29, 2025, 6 pages.

Applicant-Initiated Interview Summary received for U.S. Appl. No. 18/242,363, mailed on Aug. 18, 2025, 3 pages.

Board Opinion received for Chinese Patent Application No. 202010126661.4, mailed on Jul. 31, 2025, 16 pages (9 pages of English Translation and 7 pages of Official Copy).

Non-Final Office Action received for U.S. Appl. No. 18/416,784, mailed on Aug. 22, 2025, 23 pages.

Notice of Allowance received for Korean Patent Application No. 10-2025-0026405, mailed on Jul. 22, 2025, 7 pages (2 pages of English Translation and 5 pages of Official Copy).

Notice of Allowance received for U.S. Appl. No. 18/535,820, mailed on Aug. 20, 2025, 9 pages.

Applicant-Initiated Interview Summary received for U.S. Appl. No. 18/242,363, mailed on Oct. 7, 2025, 5 pages.

Board Decision received for Chinese Patent Application No. 202010126661.4, mailed on Sep. 26, 2025, 27 pages (11 pages of English Translation and 16 pages of Official Copy).

Brief Communication Regarding Oral Proceedings received for European Patent Application No. 22705232.1, mailed on Nov. 10, 2025, 11 pages.

Corrected Notice of Allowance received for U.S. Patent Application No. 18/380, 116, mailed on Oct. 14, 2025, 20 pages.

Decision to Grant received for European Patent Application No. 22792995.7, mailed on Oct. 9, 2025, 4 pages.

Decision to Grant received for European Patent Application No. 24160234.1, mailed on Oct. 2, 2025, 4 pages.

Examiner-Initiated Interview Summary received for U.S. Appl. No. 18/428,549, mailed on Nov. 20, 2025, 2 pages.

Extended European Search Report received for European Patent Application No. 25201688.6, mailed on Sep. 29, 2025, 9 pages.

Extended European Search Report received for European Patent Application No. 25203910.2, mailed on Nov. 25, 2025, 11 pages.

Final Office Action received for U.S. Appl. No. 18/067,350, mailed on Oct. 16, 2025, 55 pages.

Final Office Action received for U.S. Appl. No. 18/416,784, mailed on Nov. 13, 2025, 28 pages.

Intention to Grant received for European Patent Application No. 22705232.1, mailed on Nov. 26, 2025, 9 pages.

International Preliminary Report on Patentability received for PCT Patent Application No. PCT/US2024/023231, mailed on Nov. 20, 2025, 19 pages.

Noda, Yuki, "Windows Vista Perfect Master [Home Basic Home Premium Business Correspondence]", Available in 1st Edition Microsoft Windows Vista, Shuwa System Co. Ltd., Apr. 14, 2007, 3 pages (Official Copy Only). {See Communication under Rule 37 CFR § 1.98(a) (3)}.

Notice of Allowance received for Chinese Patent Application No. 202110409221.4, mailed on Nov. 25, 2025, 2 pages (1 page of English Translation and 1 page of Official Copy).

Notice of Allowance received for Japanese Patent Application No. 2024-077441, mailed on Oct. 24, 2025, 4 pages (1 page of English Translation and 3 pages of Official Copy).

Notice of Allowance received for Japanese Patent Application No. 2024-146741, mailed on Nov. 25, 2025, 4 pages (1 page of English Translation and 3 pages of Official Copy).

Notice of Allowance received for U.S. Appl. No. 18/077,154, mailed on Nov. 25, 2025, 14 pages.

Notice of Allowance received for U.S. Appl. No. 18/380,116, mailed on Oct. 6, 2025, 25 pages.

Office Action received for Chinese Patent Application No. 202310585927.5, mailed on Oct. 30, 2025, 7 pages (4 pages of English Translation and 3 pages of Official Copy).

Office Action received for Chinese Patent Application No. 202510503352.7, mailed on Nov. 4, 2025, 12 pages (6 pages of English Translation and 6 pages of Official Copy).

Office Action received for European Patent Application No. 22733778.9, mailed on Nov. 18, 2025, 8 pages.

Office Action received for European Patent Application No. 25170895.4, mailed on Nov. 21, 2025, 9 pages.

Office Action received for Indian Patent Application No. 202318051670, mailed on Nov. 28, 2025, 7 pages.

Office Action received for Japanese Patent Application No. 2023-572748, mailed on Oct. 30, 2025, 6 pages (3 pages of English Translation and 3 pages of Official Copy).

Office Action received for Japanese Patent Application No. 2024-077441, mailed on May 9, 2025, 8 pages (4 pages of English Translation and 4 pages of Official Copy).

Office Action received for Korean Patent Application No. 10-2024-7013375, mailed on Dec. 2, 2025, 13 pages (5 pages of English Translation and 8 pages of Official Copy).

Applicant-Initiated Interview Summary received for U.S. Appl. No. 18/416,784, mailed on Dec. 19, 2025, 2 pages.

Corrected Notice of Allowance received for U.S. Appl. No. 18/380,116, mailed on Dec. 22, 2025, 20 pages.

Decision to Refuse received for Japanese Patent Application No. 2024-106235, mailed on Dec. 12, 2025, 23 pages (11 pages of English Translation and 12 pages of Official Copy).

* cited by examiner

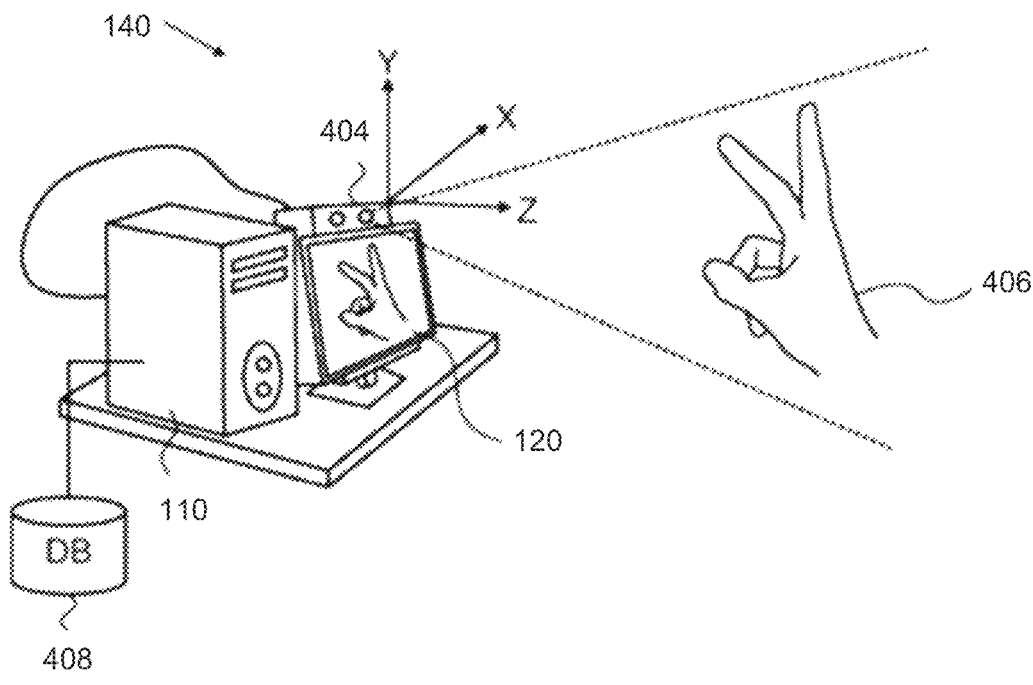
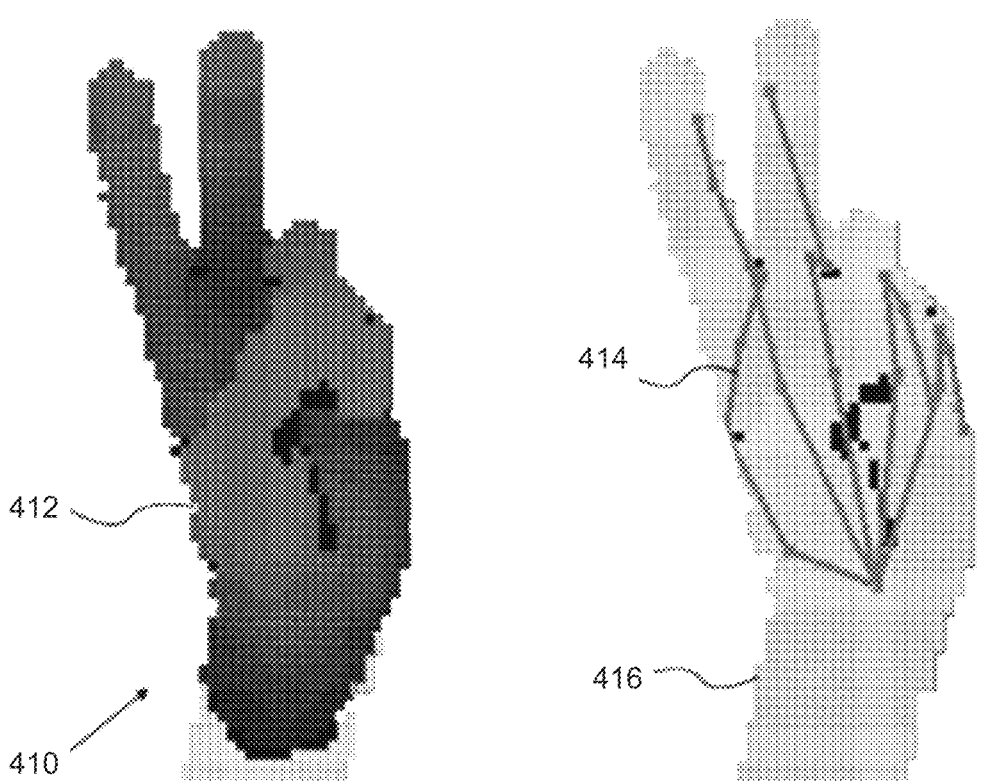
*FIG. 4*

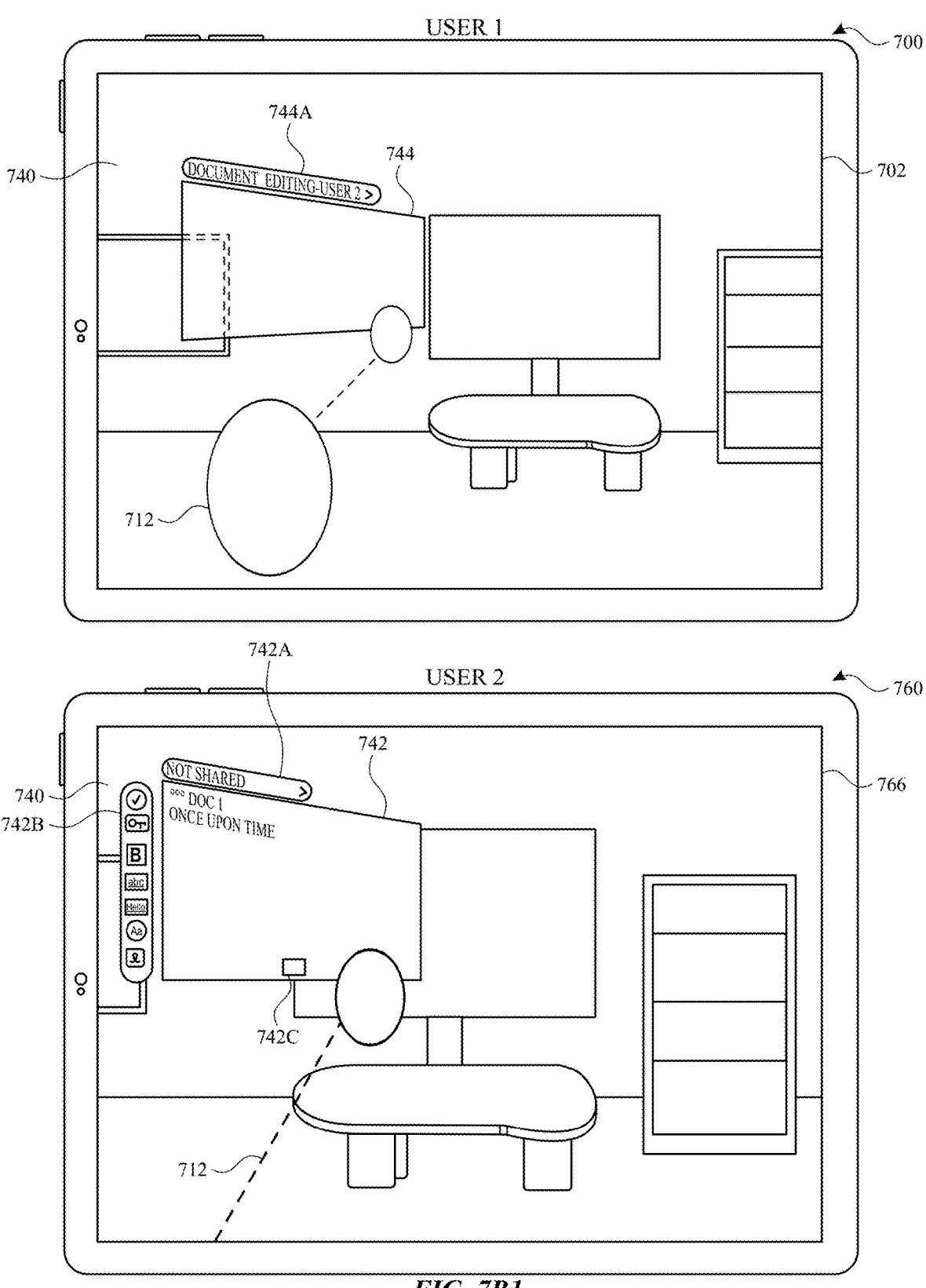
USER 1
USER 2
*FIG. 7B1*

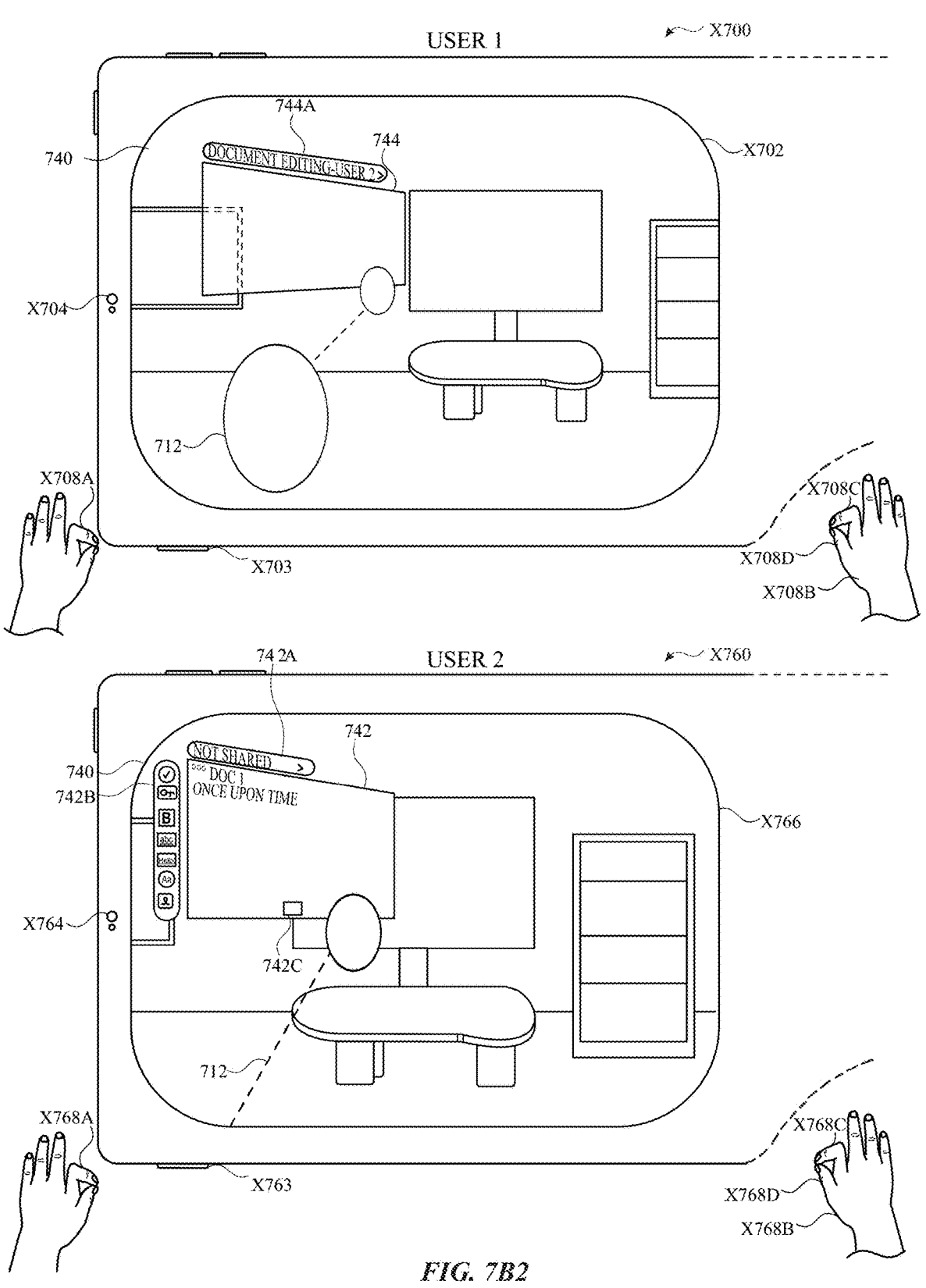
*FIG. 7B2*

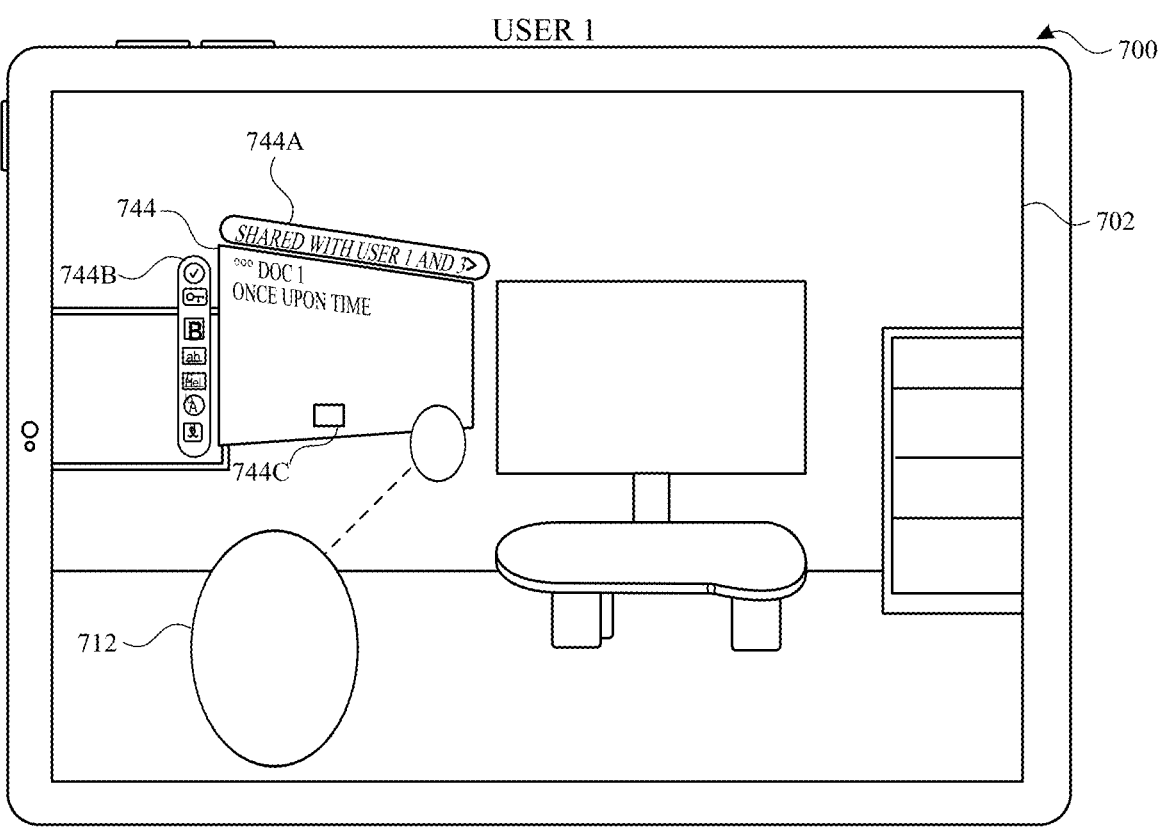
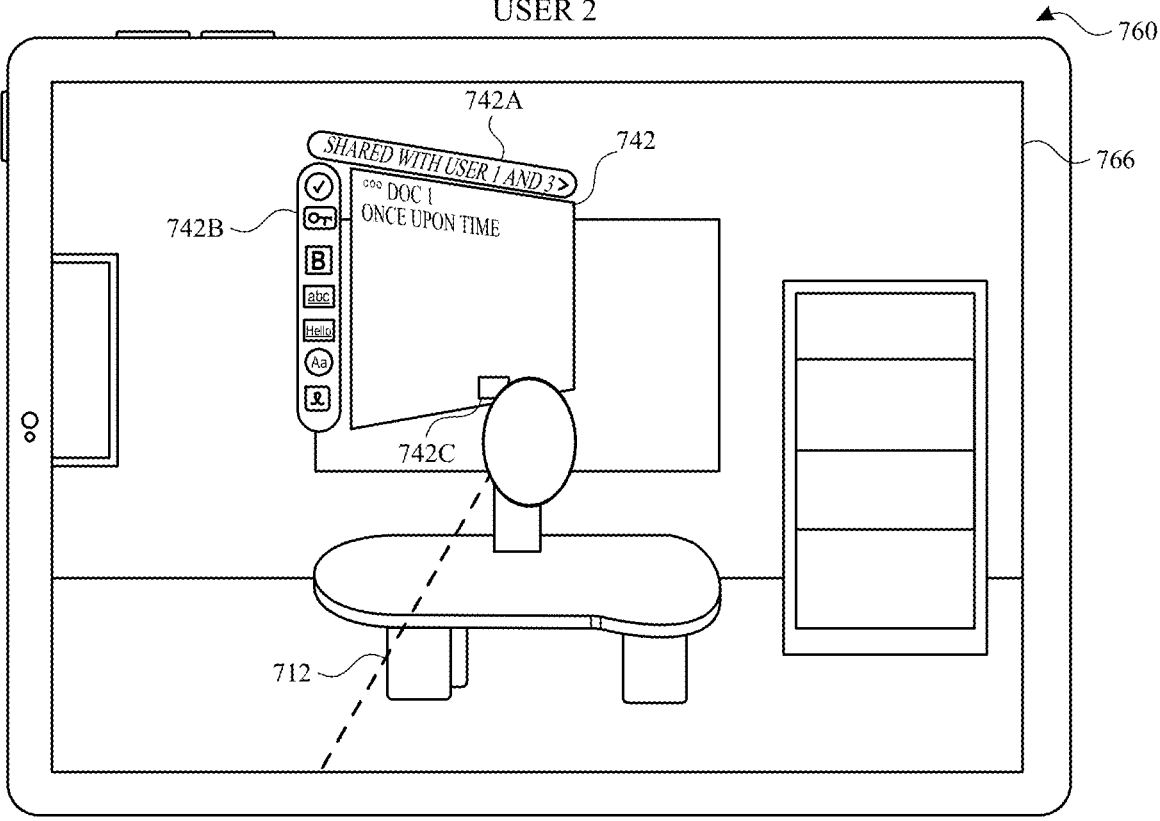
*FIG. 7C*

USER 1
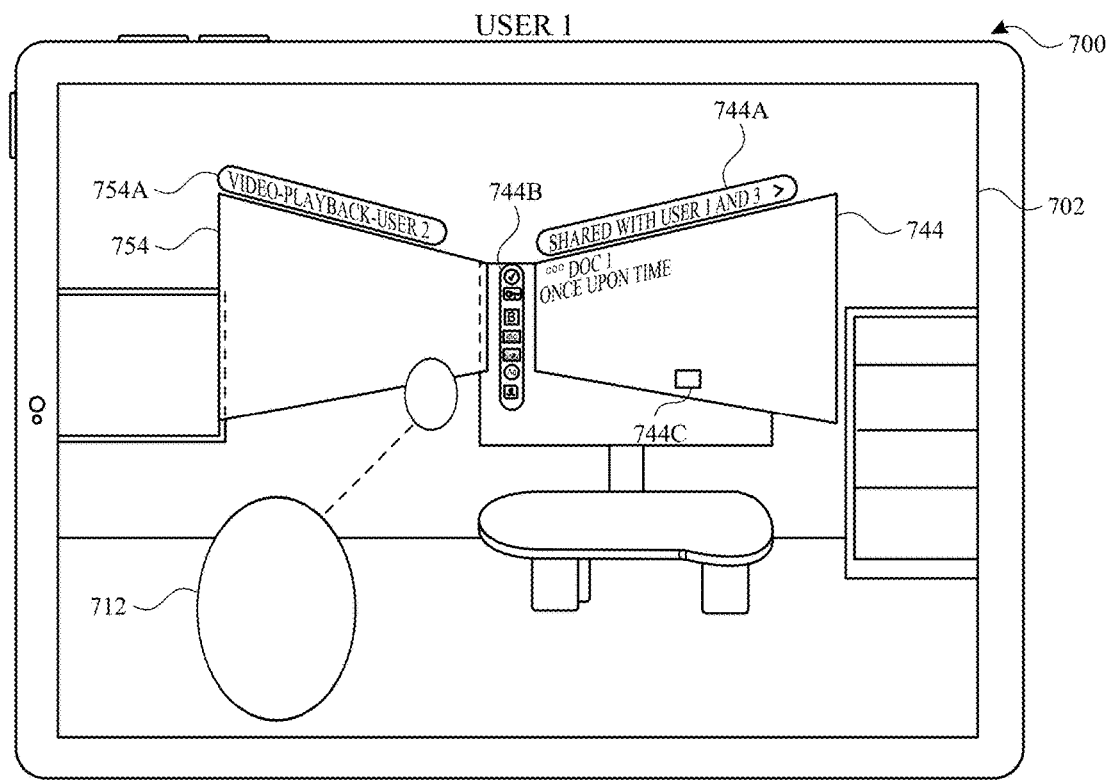
USER 2
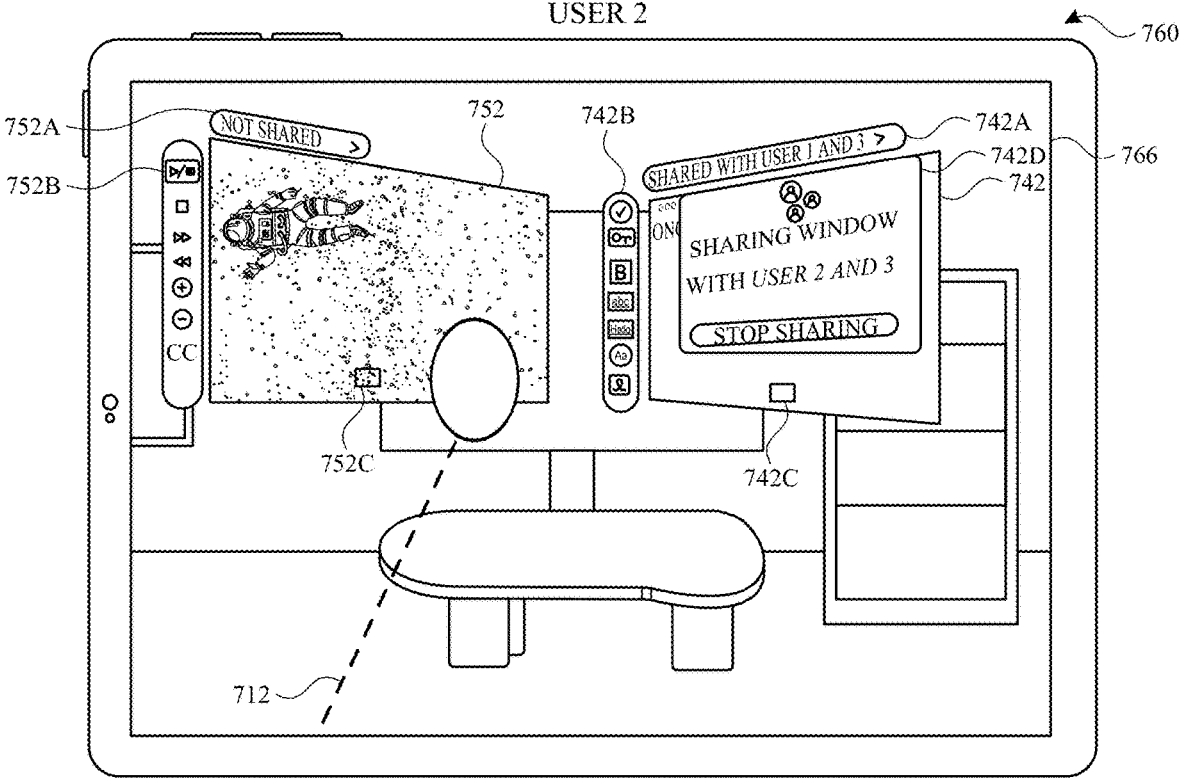
*FIG. 7D*

USER 1
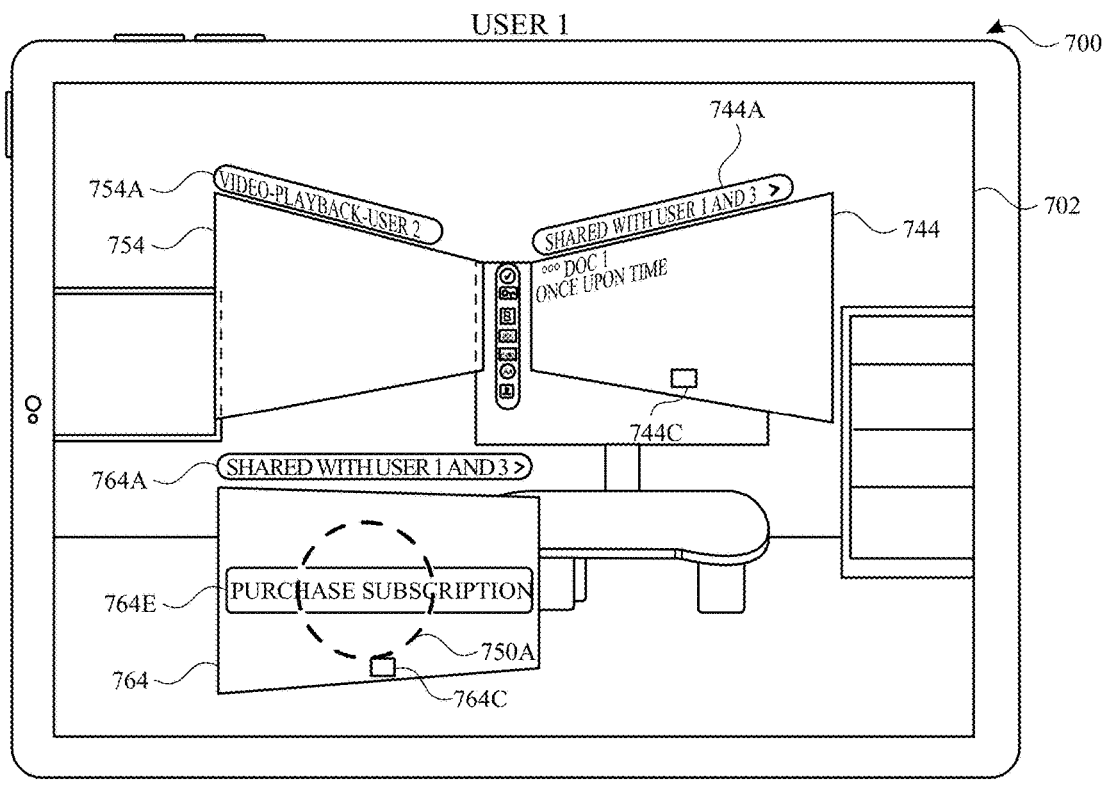
USER 2
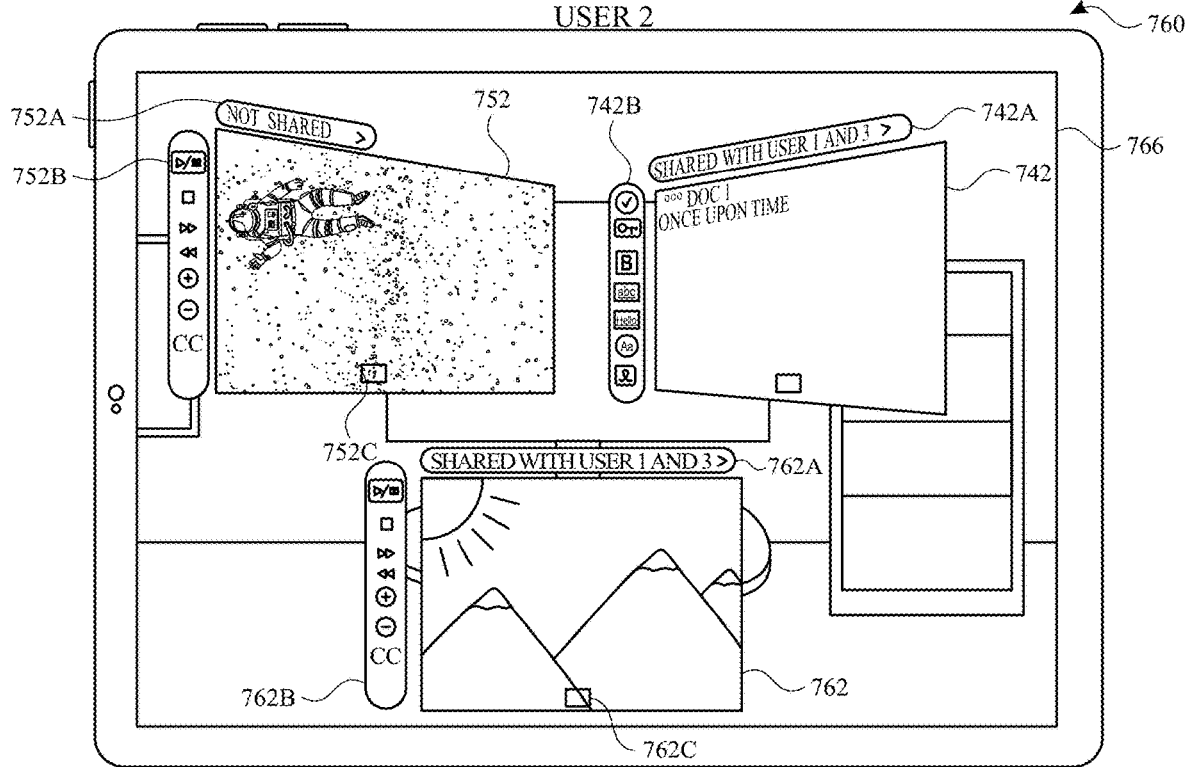
*FIG. 7E1*

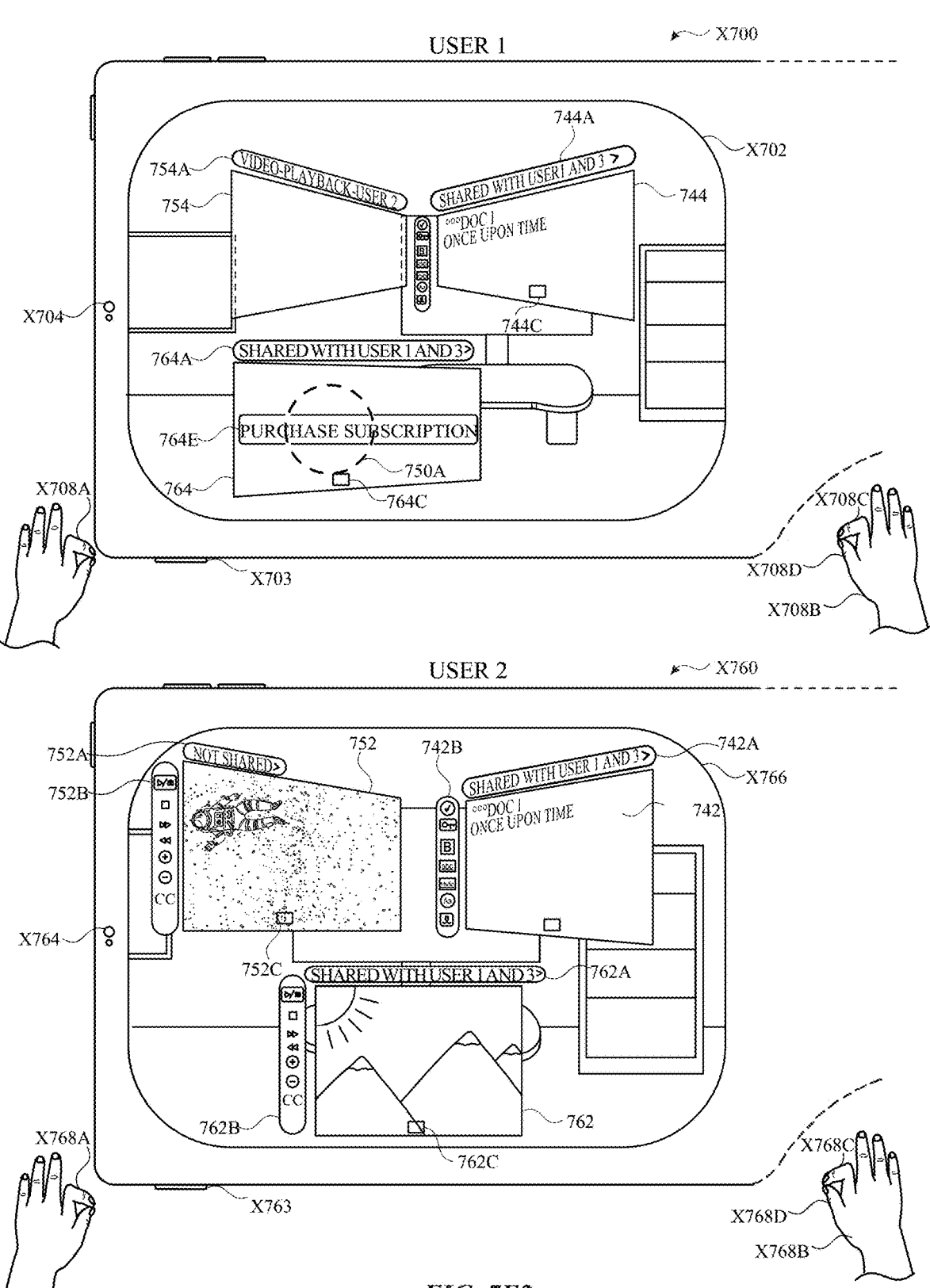
FIG. 7E2

USER 1
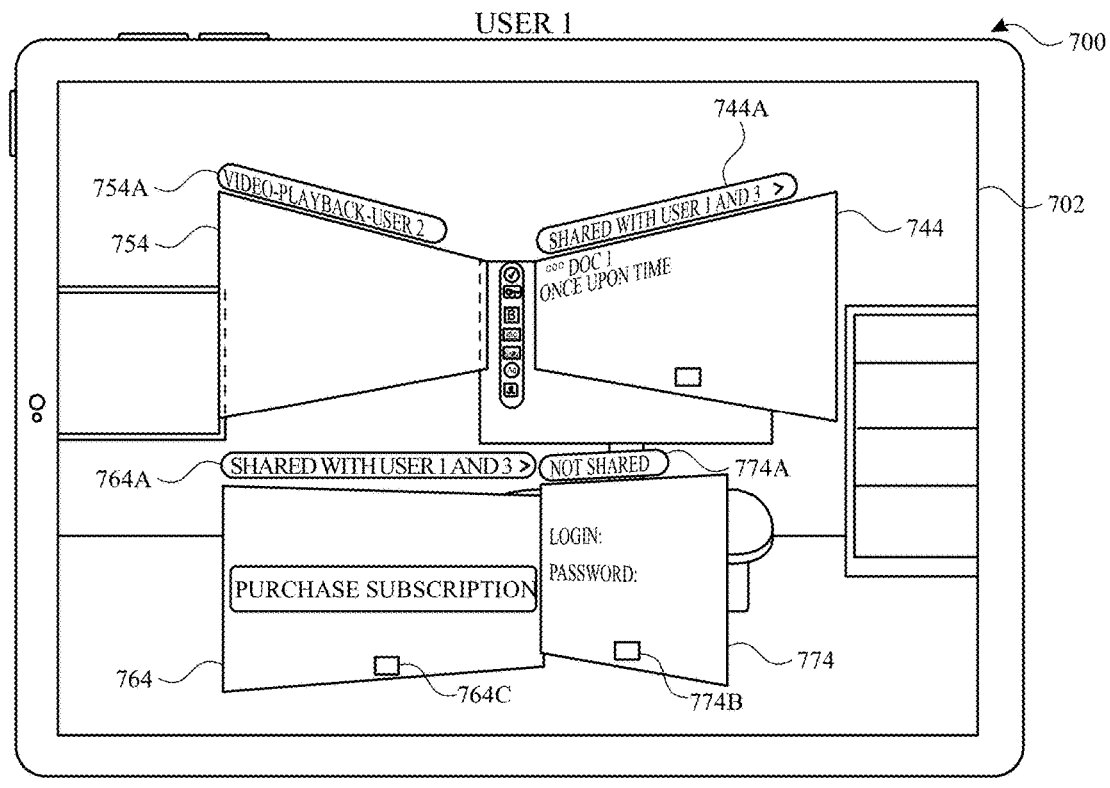
USER 2
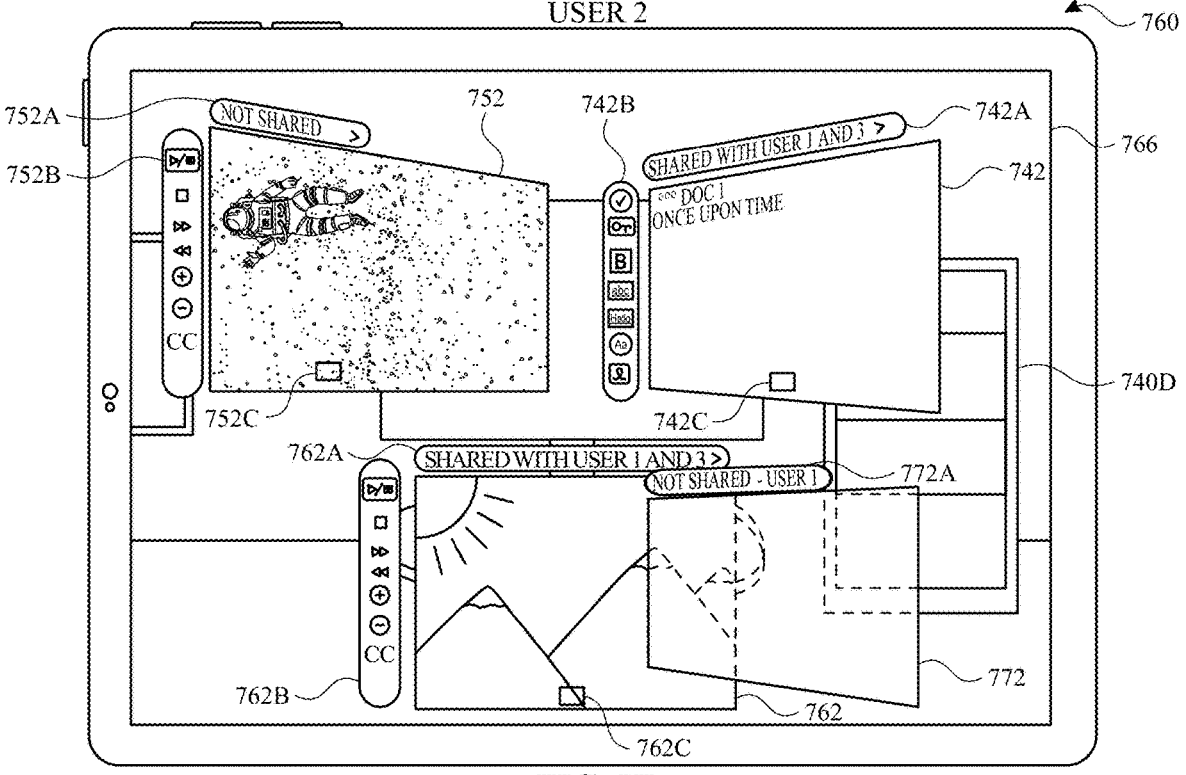
*FIG. 7F*

USER 1
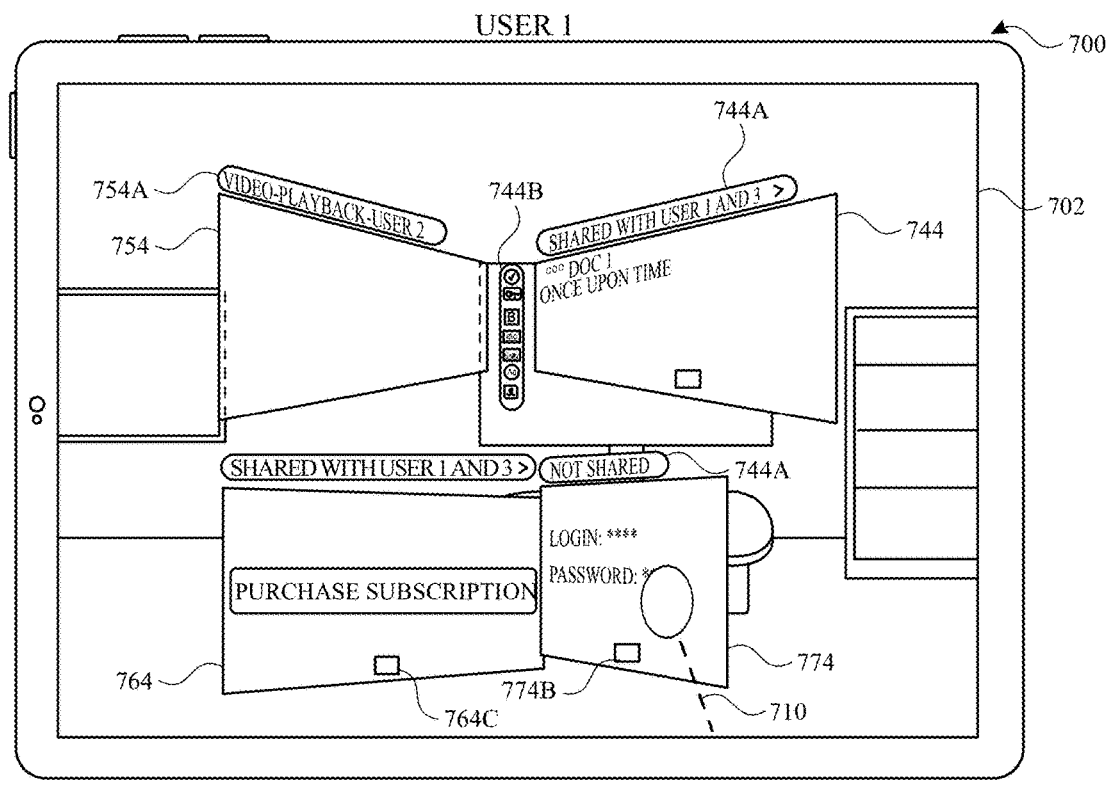
USER 2
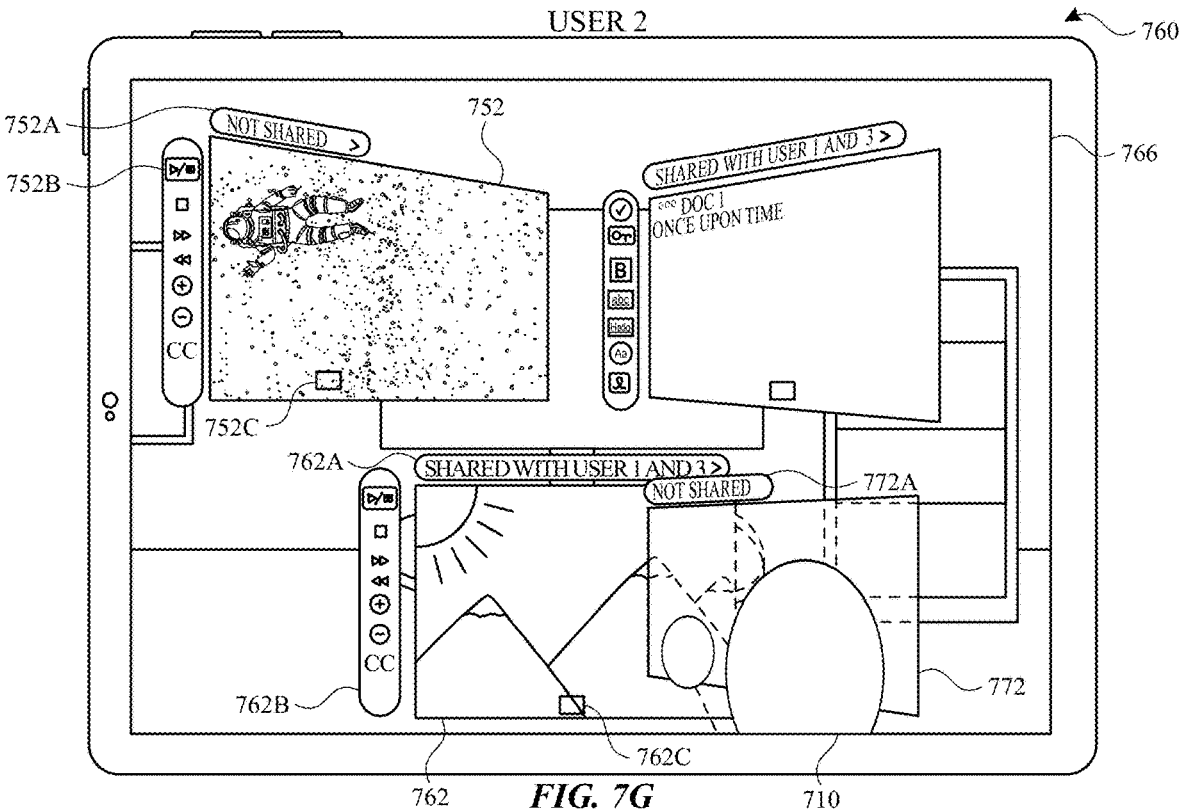
*FIG. 7G*

USER 1
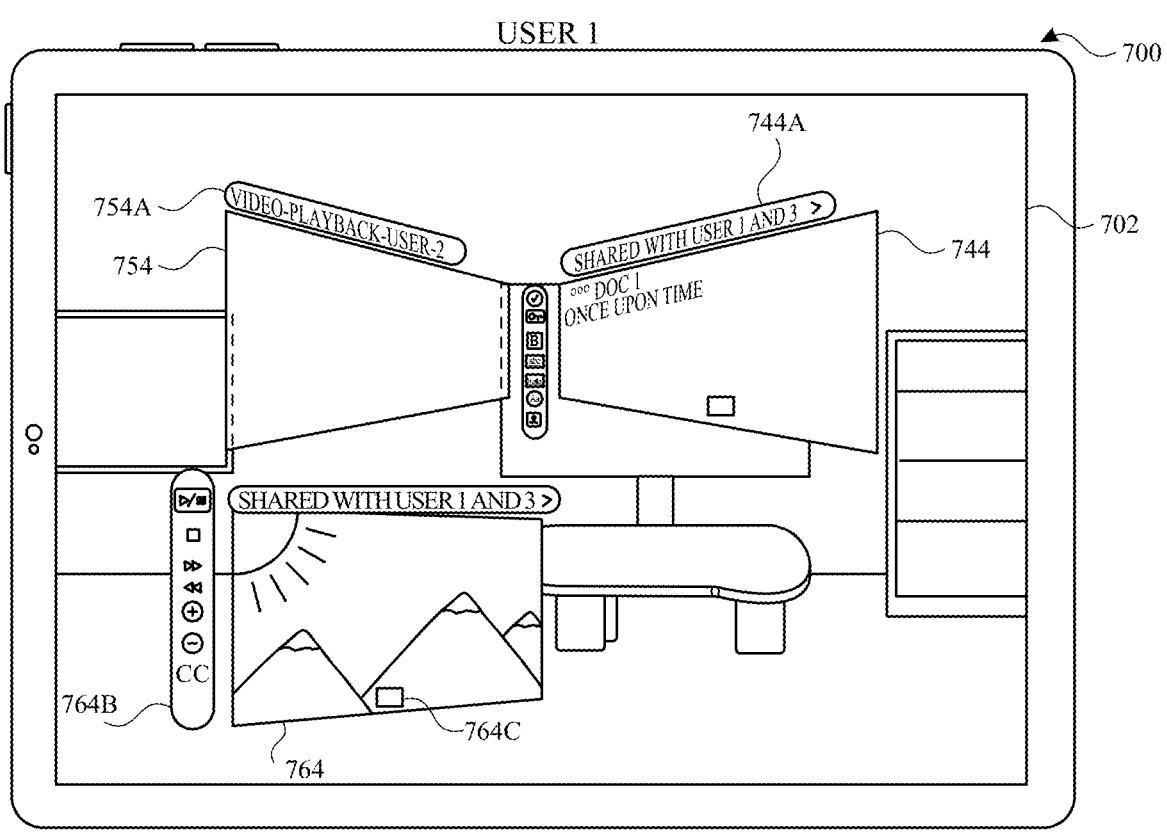
USER 2
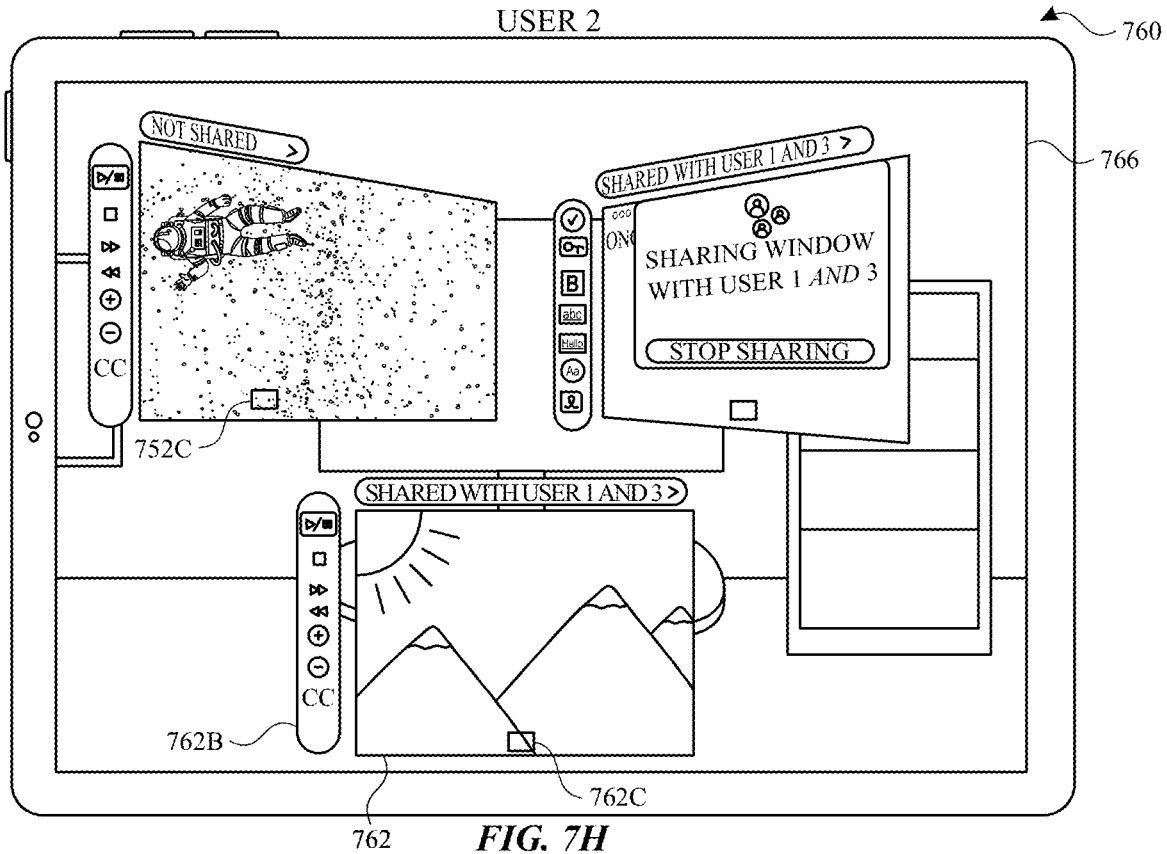
*FIG. 7H*

USER 1
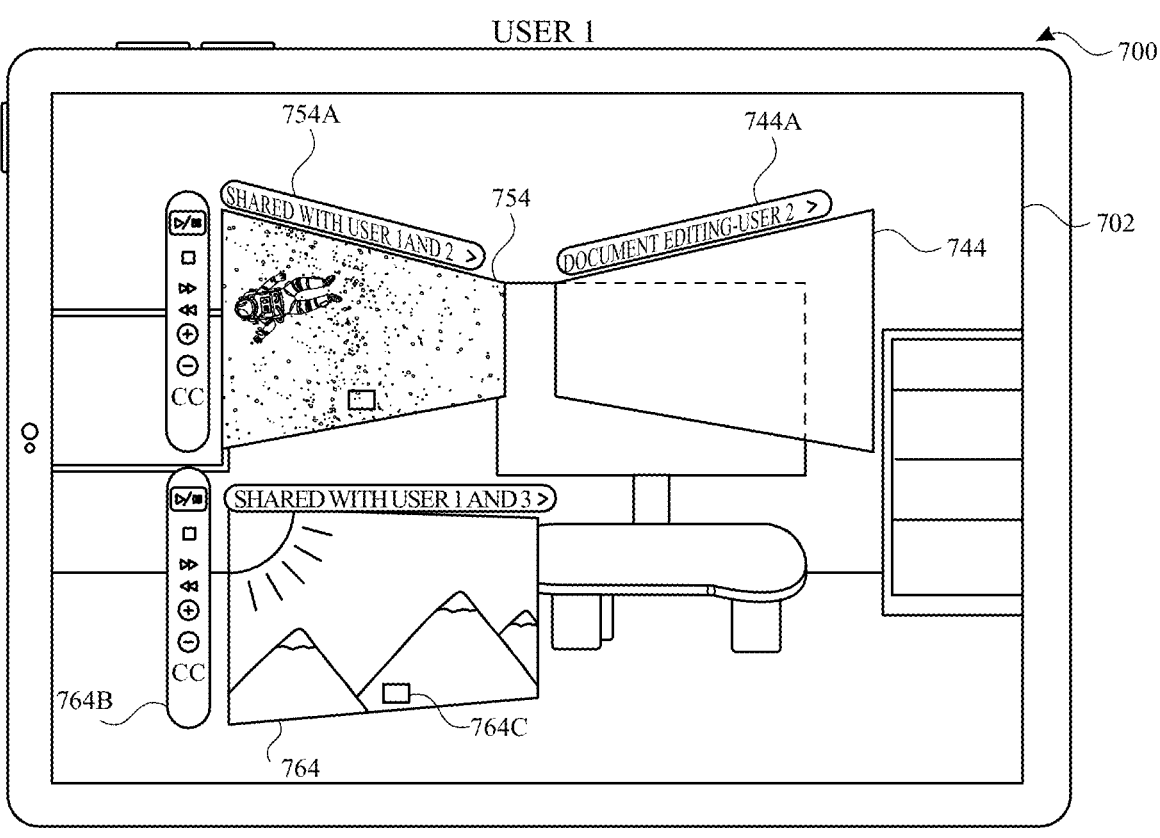
USER 2
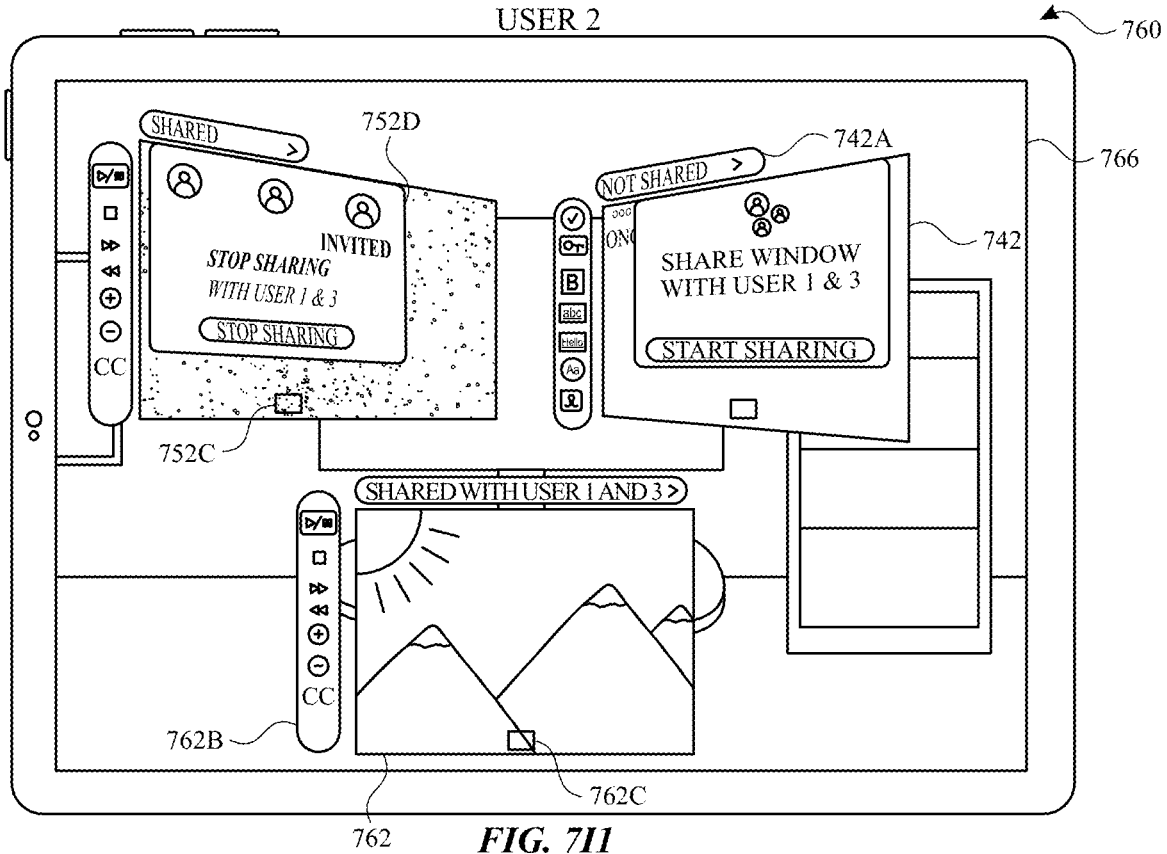
*FIG. 7I1*

800 ⬊

---

802
While a first participant is participating in a real-time communication session that includes a shared spatial arrangement in which one or more virtual objects that are visible to multiple participants in the real-time communication session have a consistent spatial relationship from viewpoints of different participants in the real-time communication session, displaying a representation of a second participant in a three-dimensional environment.

---

804
While displaying the representation of the second participant, detecting the occurrence of an event corresponding to displaying respective content to one or more of the participants in the real-time communication session.

---

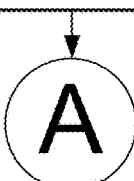

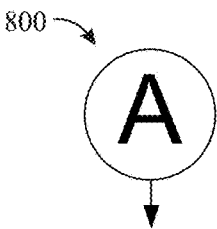

806
In response to detecting the occurrence of the event, displaying a new virtual object corresponding to the respective content in the shared spatial arrangement in the three-dimensional environment, wherein:

808
A spatial relationship between a first user interface object that represents the respective content to a first participant and a viewpoint of the first participant from a perspective of the first participant is consistent with a spatial relationship between a second user interface object that represents the respective content to the second participant and a representation of the first participant from the perspective of the second participant.

810
A spatial relationship between the second user interface object that represents the respective content to the second participant and a viewpoint of the second participant from the perspective of the second participant is consistent with a spatial relationship between the first user interface object that represents the respective content to the first participant and a representation of the second participant from the perspective of the first participant.

812
Displaying the new virtual object includes:

814
In accordance with a determination that the respective content includes private content for the second participant, the first user interface object that represents the respective content to the first participant indicates a spatial location of the respective content in the shared spatial arrangement without revealing the private content for the second participant.

816
In accordance with a determination that the respective content includes shared content that is shared between the first participant and the second participant, the first user interface object that represents the respective content to the first participant indicates the spatial location of the respective content in the shared spatial arrangement and reveals the shared content.

*FIG. 8B*

900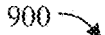

<div style="border:1px solid">

902
In response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including:

904
in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content.

906
In accordance with a determination that the first participant does not have entitlement to access the respective content, the first virtual object that corresponds to the respective content and indicates the spatial location of the respective content in the respective spatial arrangement for the first participant does not include the respective content.

</div>

*FIG. 9*

1000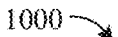

---

1002
During a real-time communication session, detecting, via the one or more sensors, a sequence of one or more inputs corresponding to a request to share respective content with one or more participants of the real-time communication session.

↓

1004
In response to detecting the sequence of one or more inputs corresponding to the request to share the respective content with the one or more participants of the real-time communication session, initiating a process for sharing the respective content with the one or more participants of the real-time communication session.

↓

1006
While the respective content is shared with the one or more participants of the real-time communication session and a representation of the respective content is displayed at a first location in a user interface, displaying, via the one or more display generation components, a sharing indicator that indicates that the respective content is shared with one or more other participants in the real-time communication session, wherein the sharing indicator has a respective spatial relationship to the representation of the respective content in the user interface.

↓

1008
Detecting a request to move the representation of the respective content to a different location in the user interface.

↓

1010
In response to detecting the request to move the representation of the respective content to the different location in the user interface, displaying, via the one or more display generation components, the representation of the respective content at a second location in the user interface that is different from the first location in the user interface and displaying, via the one or more display generation components, the sharing indicator with the respective spatial relationship to the representation of the respective content in the user interface.

*FIG. 10*

USER INTERFACES FOR MANAGING SHARING OF CONTENT IN THREE-DIMENSIONAL ENVIRONMENTS

CROSS-REFERENCE TO RELATED APPLICATIONS

This application claims priority to U.S. Provisional Patent Application No. 63/527,526, entitled "USER INTERFACES FOR MANAGING SHARING OF CONTENT IN THREE-DIMENSIONAL ENVIRONMENTS," filed Jul. 18, 2023, U.S. Provisional Patent Application No. 63/470,450, entitled "USER INTERFACES FOR MANAGING SHARING OF CONTENT IN THREE-DIMENSIONAL ENVIRON-MENTS," filed Jun. 1, 2023, and to U.S. Provisional Patent Application No. 63/409,414, entitled "USER INTERFACES FOR MANAGING SHARING OF CONTENT IN THREE-DIMENSIONAL ENVIRONMENTS," filed Sep. 23, 2022. The contents of each of these applications are incorporated herein by reference in their entirety.

TECHNICAL FIELD

The present disclosure relates generally to computer systems that are in communication with a display generation component and, optionally, one or more sensor, that provide computer-generated experiences, including, but not limited to, electronic devices that provide virtual reality and mixed reality experiences via a display.

BACKGROUND

The development of computer systems for augmented reality has increased significantly in recent years. Example augmented reality environments include at least some virtual elements that replace or augment the physical world. Input devices, such as cameras, controllers, joysticks, touch-sensitive surfaces, and touch-screen displays for computer systems and other electronic computing devices are used to interact with virtual/augmented reality environments. Example virtual elements include virtual objects, such as digital images, video, text, icons, and control elements such as buttons and other graphics.

SUMMARY

Some methods and interfaces for managing sharing of content in three-dimensional environments are cumbersome, inefficient, and limited. For example, systems that provide insufficient feedback for performing actions associated with virtual objects, systems that require a series of inputs to achieve a desired outcome in an augmented reality environment, and systems in which manipulation of virtual objects are complex, tedious, and error-prone, create a significant cognitive burden on a user, and detract from the experience with the virtual/augmented reality environment. For another example, systems that In addition, these methods take longer than necessary, thereby wasting energy of the computer system. This latter consideration is particularly important in battery-operated devices.

Accordingly, there is a need for computer systems with improved methods and interfaces for managing sharing of content in three-dimensional environments more efficient and intuitive for a user. Such methods and interfaces optionally complement or replace conventional methods for managing content sharing in three-dimensional environments. Such methods and interfaces reduce the number, extent, and/or nature of the inputs from a user by helping the user to understand the connection between provided inputs and device responses to the inputs, thereby creating a more efficient human-machine interface.

The above deficiencies and other problems associated with user interfaces for computer systems are reduced or eliminated by the disclosed systems. In some embodiments, the computer system is a desktop computer with an associated display. In some embodiments, the computer system is portable device (e.g., a notebook computer, tablet computer, or handheld device). In some embodiments, the computer system is a personal electronic device (e.g., a wearable electronic device, such as a watch, or a head-mounted device). In some embodiments, the computer system has a touchpad. In some embodiments, the computer system has one or more cameras. In some embodiments, the computer system has a touch-sensitive display (also known as a "touch screen" or "touch-screen display"). In some embodiments, the computer system has one or more eye-tracking components. In some embodiments, the computer system has one or more hand-tracking components. In some embodiments, the computer system has one or more output devices in addition to the display generation component, the output devices including one or more tactile output generators and/or one or more audio output devices. In some embodiments, the computer system has a graphical user interface (GUI), one or more processors, memory and one or more modules, programs or sets of instructions stored in the memory for performing multiple functions. In some embodiments, the user interacts with the GUI through a stylus and/or finger contacts and gestures on the touch-sensitive surface, movement of the user's eyes and hand in space relative to the GUI (and/or computer system) or the user's body as captured by cameras and other movement sensors, and/or voice inputs as captured by one or more audio input devices. In some embodiments, the functions performed through the interactions optionally include image editing, drawing, presenting, word processing, spreadsheet making, game playing, telephoning, video conferencing, e-mailing, instant messaging, workout support, digital photographing, digital videoing, web browsing, digital music playing, note taking, and/or digital video playing. Executable instructions for performing these functions are, optionally, included in a transitory and/or non-transitory computer readable storage medium or other computer program product configured for execution by one or more processors.

There is a need for electronic devices with improved methods and interfaces for managing content sharing in three-dimensional environments. Such methods and interfaces may complement or replace conventional methods for managing content sharing in three-dimensional environments. Such methods and interfaces reduce the number, extent, and/or the nature of the inputs from a user and produce a more efficient human-machine interface. For battery-operated computing devices, such methods and interfaces conserve power and increase the time between battery charges.

In some embodiments, a computer system displays a set of controls associated with controlling playback of media content (e.g., transport controls and/or other types of controls) in response to detecting a gaze and/or gesture of the user. In some embodiments, the computer system initially displays a first set of controls in a reduced-prominence state (e.g., with reduced visual prominence) in response to detecting a first input, and then displays a second set of controls (which optionally includes additional controls) in an increased-prominence state in response to detecting a second input. In this manner, the computer system optionally provides feedback to the user that they have begun to invoke display of the controls without unduly distracting the user from the content (e.g., by initially displaying controls in a less visually prominent manner), and then, based on detecting a user input indicating that the user wishes to further interact with the controls, displaying the controls in a more visually prominent manner to allow for easier and more-accurate interactions with the computer system.

In some embodiments, a method is disclosed. The method comprises: at a computer system that is in communication with one or more display generation components: while a first participant is participating in a real-time communication session that includes a shared spatial arrangement in which one or more virtual objects that are visible to multiple participants in the real-time communication session have a consistent spatial relationship from viewpoints of different participants in the real-time communication session, displaying a representation of a second participant in a three-dimensional environment; while displaying the representation of the second participant, detecting the occurrence of an event corresponding to displaying respective content to one or more of the participants in the real-time communication session; and in response to detecting the occurrence of the event, displaying a new virtual object corresponding to the respective content in the shared spatial arrangement in the three-dimensional environment, wherein: a spatial relationship between a first user interface object that represents the respective content to a first participant and a viewpoint of the first participant from a perspective of the first participant is consistent with a spatial relationship between a second user interface object that represents the respective content to the second participant and a representation of the first participant from the perspective of the second participant; a spatial relationship between the second user interface object that represents the respective content to the second participant and a viewpoint of the second participant from the perspective of the second participant is consistent with a spatial relationship between the first user interface object that represents the respective content to the first participant and a representation of the second participant from the perspective of the first participant; and displaying the new virtual object includes: in accordance with a determination that the respective content includes private content for the second participant, the first user interface object that represents the respective content to the first participant indicates a spatial location of the respective content in the shared spatial arrangement without revealing the private content for the second participant; and in accordance with a determination that the respective content includes shared content that is shared between the first participant and the second participant, the first user interface object that represents the respective content to the first participant indicates the spatial location of the respective content in the shared spatial arrangement and reveals the shared content.

In some embodiments, a non-transitory computer-readable storage medium is disclosed. The non-transitory computer-readable storage medium stores one or more programs configured to be executed by one or more processors of a computer system that is in communication with one or more display generation components, the one or more programs including instructions for: while a first participant is participating in a real-time communication session that includes a shared spatial arrangement in which one or more virtual objects that are visible to multiple participants in the real-time communication session have a consistent spatial relationship from viewpoints of different participants in the real-time communication session, displaying a representation of a second participant in a three-dimensional environment; while displaying the representation of the second participant, detecting the occurrence of an event corresponding to displaying respective content to one or more of the participants in the real-time communication session; and in response to detecting the occurrence of the event, displaying a new virtual object corresponding to the respective content in the shared spatial arrangement in the three-dimensional environment, wherein: a spatial relationship between a first user interface object that represents the respective content to a first participant and a viewpoint of the first participant from a perspective of the first participant is consistent with a spatial relationship between a second user interface object that represents the respective content to the second participant and a representation of the first participant from the perspective of the second participant; a spatial relationship between the second user interface object that represents the respective content to the second participant and a viewpoint of the second participant from the perspective of the second participant is consistent with a spatial relationship between the first user interface object that represents the respective content to the first participant and a representation of the second participant from the perspective of the first participant; and displaying the new virtual object includes: in accordance with a determination that the respective content includes private content for the second participant, the first user interface object that represents the respective content to the first participant indicates a spatial location of the respective content in the shared spatial arrangement without revealing the private content for the second participant; and in accordance with a determination that the respective content includes shared content that is shared between the first participant and the second participant, the first user interface object that represents the respective content to the first participant indicates the spatial location of the respective content in the shared spatial arrangement and reveals the shared content.

In some embodiments, a transitory computer-readable storage medium is disclosed. The transitory computer-readable storage medium stores one or more programs configured to be executed by one or more processors of a computer system that is in communication with one or more display generation components, the one or more programs including instructions for: while a first participant is participating in a real-time communication session that includes a shared spatial arrangement in which one or more virtual objects that are visible to multiple participants in the real-time communication session have a consistent spatial relationship from viewpoints of different participants in the real-time communication session, displaying a representation of a second participant in a three-dimensional environment; while displaying the representation of the second participant, detecting the occurrence of an event corresponding to displaying respective content to one or more of the participants in the real-time communication session; and in response to detecting the occurrence of the event, displaying a new virtual object corresponding to the respective content in the shared spatial arrangement in the three-dimensional environment, wherein: a spatial relationship between a first user interface object that represents the respective content to a first participant and a viewpoint of the first participant from a perspective of the first participant is consistent with a spatial relationship between a second user interface object that represents the respective content to the second participant and a representation of the first participant from the perspective of the second participant; a spatial relationship between the second user interface object that represents the respective content to the second participant and a viewpoint of the second participant from the perspective of the second participant is consistent with a spatial relationship between the first user interface object that represents the respective content to the first participant and a representation of the second participant from the perspective of the first participant; and displaying the new virtual object includes: in accordance with a determination that the respective content includes private content for the second participant, the first user interface object that represents the respective content to the first participant indicates a spatial location of the respective content in the shared spatial arrangement without revealing the private content for the second participant; and in accordance with a determination that the respective content includes shared content that is shared between the first participant and the second participant, the first user interface object that represents the respective content to the first participant indicates the spatial location of the respective content in the shared spatial arrangement and reveals the shared content.

In some embodiments, a computer system is disclosed. The computer system is configured to communicate with one or more display generation components. The computer system comprises: one or more processors; and memory storing one or more programs configured to be executed by the one or more processors, the one or more programs including instructions for: while a first participant is participating in a real-time communication session that includes a shared spatial arrangement in which one or more virtual objects that are visible to multiple participants in the real-time communication session have a consistent spatial relationship from viewpoints of different participants in the real-time communication session, displaying a representation of a second participant in a three-dimensional environment; while displaying the representation of the second participant, detecting the occurrence of an event corresponding to displaying respective content to one or more of the participants in the real-time communication session; and in response to detecting the occurrence of the event, displaying a new virtual object corresponding to the respective content in the shared spatial arrangement in the three-dimensional environment, wherein: a spatial relationship between a first user interface object that represents the respective content to a first participant and a viewpoint of the first participant from a perspective of the first participant is consistent with a spatial relationship between a second user interface object that represents the respective content to the second participant and a representation of the first participant from the perspective of the second participant; a spatial relationship between the second user interface object that represents the respective content to the second participant and a viewpoint of the second participant from the perspective of the second participant is consistent with a spatial relationship between the first user interface object that represents the respective content to the first participant and a representation of the second participant from the perspective of the first participant; and displaying the new virtual object includes: in accordance with a determination that the respective content includes private content for the second participant, the first user interface object that represents the respective content to the first participant indicates a spatial location of the respective content in the shared spatial arrangement without revealing the private content for the second participant; and in accordance with a determination that the respective content includes shared content that is shared between the first participant and the second participant, the first user interface object that represents the respective content to the first participant indicates a spatial location of the respective content in the shared spatial arrangement and reveals the shared content.

In some embodiments, a computer system is disclosed. The computer system is configured to communicate with one or more display generation components. The computer system comprises: means, while a first participant is participating in a real-time communication session that includes a shared spatial arrangement in which one or more virtual objects that are visible to multiple participants in the real-time communication session have a consistent spatial relationship from viewpoints of different participants in the real-time communication session, for displaying a representation of a second participant in a three-dimensional environment; means, while displaying the representation of the second participant, for detecting the occurrence of an event corresponding to displaying respective content to one or more of the participants in the real-time communication session; and means, responsive to detecting the occurrence of the event, for displaying a new virtual object corresponding to the respective content in the shared spatial arrangement in the three-dimensional environment, wherein: a spatial relationship between a first user interface object that represents the respective content to a first participant and a viewpoint of the first participant from a perspective of the first participant is consistent with a spatial relationship between a second user interface object that represents the respective content to the second participant and a representation of the first participant from the perspective of the second participant; a spatial relationship between the second user interface object that represents the respective content to the second participant and a viewpoint of the second participant from the perspective of the second participant is consistent with a spatial relationship between the first user interface object that represents the respective content to the first participant and a representation of the second participant from the perspective of the first participant; and displaying the new virtual object includes: in accordance with a determination that the respective content includes private content for the second participant, the first user interface object that represents the respective content to the first participant indicates a spatial location of the respective content in the shared spatial arrangement without revealing the private content for the second participant; and in accordance with a determination that the respective content includes shared content that is shared between the first participant and the second participant, the first user interface object that represents the respective content to the first participant indicates the spatial location of the respective content in the shared spatial arrangement and reveals the shared content.

In some embodiments, a computer program product is disclosed. The computer program product comprises one or more programs configured to be executed by one or more processors of a computer system that is in communication with one or more display generation components, the one or more programs including instructions for: while a first participant is participating in a real-time communication session that includes a shared spatial arrangement in which one or more virtual objects that are visible to multiple participants in the real-time communication session have a consistent spatial relationship from viewpoints of different participants in the real-time communication session, displaying a representation of a second participant in a three-dimensional environment; while displaying the representation of the second participant, detecting the occurrence of an event corresponding to displaying respective content to one or more of the participants in the real-time communication session; and in response to detecting the occurrence of the event, displaying a new virtual object corresponding to the respective content in the shared spatial arrangement in the three-dimensional environment, wherein: a spatial relationship between a first user interface object that represents the respective content to a first participant and a viewpoint of the first participant from a perspective of the first participant is consistent with a spatial relationship between a second user interface object that represents the respective content to the second participant and a representation of the first participant from the perspective of the second participant; a spatial relationship between the second user interface object that represents the respective content to the second participant and a viewpoint of the second participant from the perspective of the second participant is consistent with a spatial relationship between the first user interface object that represents the respective content to the first participant and a representation of the second participant from the perspective of the first participant; and displaying the new virtual object includes: in accordance with a determination that the respective content includes private content for the second participant, the first user interface object that represents the respective content to the first participant indicates a spatial location of the respective content in the shared spatial arrangement without revealing the private content for the second participant; and in accordance with a determination that the respective content includes shared content that is shared between the first participant and the second participant, the first user interface object that represents the respective content to the first participant indicates the spatial location of the respective content in the shared spatial arrangement and reveals the shared content.

In some embodiments, a method is disclosed. The method comprises: at a computer system that is in communication with one or more display generation components: in response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including: in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content.

In some embodiments, a non-transitory computer-readable storage medium is disclosed. The non-transitory computer-readable storage medium storing one or more programs configured to be executed by one or more processors of a computer system that is in communication with one or more display generation components, the one or more programs including instructions for: in response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including: in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content.

In some embodiments, a transitory computer-readable storage medium is disclosed. The transitory computer-readable storage medium storing one or more programs configured to be executed by one or more processors of a computer system that is in communication with one or more display generation components, the one or more programs including instructions for: in response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including: in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content.

In some embodiments, a computer system configured to communicate with one or more display generation components is disclosed. The computer system comprises: one or more processors; and memory storing one or more programs configured to be executed by the one or more processors, the one or more programs including instructions for: in response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including: in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content.

In some embodiments, a computer system is disclosed. The computer system is configured to communicate with one or more display generation components. The computer system comprises: means, responsive to respective content being selected, during a real-time communication session that occurs in a three-dimensional environment, for displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including: in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content.

In some embodiments, a computer program product is disclosed. The computer program product comprises one or more programs configured to be executed by one or more processors of a computer system that is in communication with one or more display generation components, the one or more programs including instructions for: in response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including: in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content.

In some embodiments, a method is disclosed. The method comprises: at a computer system that is in communication with one or more display generation components and one or more sensors: during a real-time communication session, detecting, via the one or more sensors, a sequence of one or more inputs corresponding to a request to share respective content with one or more participants of the real-time communication session; in response to detecting the sequence of one or more inputs corresponding to the request to share the respective content with the one or more participants of the real-time communication session, initiating a process for sharing the respective content with the one or more participants of the real-time communication session; while the respective content is shared with the one or more participants of the real-time communication session and a representation of the respective content is displayed at a first location in a user interface, displaying, via the one or more display generation components, a sharing indicator that indicates that the respective content is shared with one or more other participants in the real-time communication session, wherein the sharing indicator has a respective spatial relationship to the representation of the respective content in the user interface; detecting a request to move the representation of the respective content to a different location in the user interface; and in response to detecting the request to move the representation of the respective content to the different location in the user interface, displaying, via the one or more display generation components, the representation of the respective content at a second location in the user interface that is different from the first location in the user interface and displaying, via the one or more display generation components, the sharing indicator with the respective spatial relationship to the representation of the respective content in the user interface.

In some embodiments, a non-transitory computer-readable storage medium is disclosed. The non-transitory computer-readable storage medium stores one or more programs configured to be executed by one or more processors of a computer system that is in communication with one or more display generation components and one or more sensors, the one or more programs including instructions for: during a real-time communication session, detecting, via the one or more sensors, a sequence of one or more inputs corresponding to a request to share respective content with one or more participants of the real-time communication session; in response to detecting the sequence of one or more inputs corresponding to the request to share the respective content with the one or more participants of the real-time communication session, initiating a process for sharing the respective content with the one or more participants of the real-time communication session; while the respective content is shared with the one or more participants of the real-time communication session and a representation of the respective content is displayed at a first location in a user interface, displaying, via the one or more display generation components, a sharing indicator that indicates that the respective content is shared with one or more other participants in the real-time communication session, wherein the sharing indicator has a respective spatial relationship to the representation of the respective content in the user interface; detecting a request to move the representation of the respective content to a different location in the user interface; and in response to detecting the request to move the representation of the respective content to the different location in the user interface, displaying, via the one or more display generation components, the representation of the respective content at a second location in the user interface that is different from the first location in the user interface and displaying, via the one or more display generation components, the sharing indicator with the respective spatial relationship to the representation of the respective content in the user interface.

In some embodiments, a transitory computer-readable storage medium is disclosed. The transitory computer-readable storage medium stores one or more programs configured to be executed by one or more processors of a computer system that is in communication with one or more display generation components and one or more sensors, the one or more programs including instructions for: during a real-time communication session, detecting, via the one or more sensors, a sequence of one or more inputs corresponding to a request to share respective content with one or more participants of the real-time communication session; in response to detecting the sequence of one or more inputs corresponding to the request to share the respective content with the one or more participants of the real-time communication session, initiating a process for sharing the respective content with the one or more participants of the real-time communication session; while the respective content is shared with the one or more participants of the real-time communication session and a representation of the respective content is displayed at a first location in a user interface, displaying, via the one or more display generation components, a sharing indicator that indicates that the respective content is shared with one or more other participants in the real-time communication session, wherein the sharing indicator has a respective spatial relationship to the representation of the respective content in the user interface; detecting a request to move the representation of the respective content to a different location in the user interface; and in response to detecting the request to move the representation of the respective content to the different location in the user interface, displaying, via the one or more display generation components, the representation of the respective content at a second location in the user interface that is different from the first location in the user interface and displaying, via the one or more display generation components, the sharing indicator with the respective spatial relationship to the representation of the respective content in the user interface.

In some embodiments, a computer system is disclosed. The computer system is configured to communicate with one or more display generation components and one or more sensors. The computer system comprises: one or more processors; and memory storing one or more programs configured to be executed by the one or more processors, the one or more programs including instructions for: during a real-time communication session, detecting, via the one or more sensors, a sequence of one or more inputs corresponding to a request to share respective content with one or more participants of the real-time communication session; in response to detecting the sequence of one or more inputs corresponding to the request to share the respective content with the one or more participants of the real-time communication session, initiating a process for sharing the respective content with the one or more participants of the real-time communication session; while the respective content is shared with the one or more participants of the real-time communication session and a representation of the respective content is displayed at a first location in a user interface, displaying, via the one or more display generation components, a sharing indicator that indicates that the respective content is shared with one or more other participants in the real-time communication session, wherein the sharing indicator has a respective spatial relationship to the representation of the respective content in the user interface; detecting a request to move the representation of the respective content to a different location in the user interface; and in response to detecting the request to move the representation of the respective content to the different location in the user interface, displaying, via the one or more display generation components, the representation of the respective content at a second location in the user interface that is different from the first location in the user interface and displaying, via the one or more display generation components, the sharing indicator with the respective spatial relationship to the representation of the respective content in the user interface.

In some embodiments, a computer system is disclosed. The computer system is configured to communicate with one or more display generation components and one or more sensors. The computer system comprises: means, during a real-time communication session, for detecting, via the one or more sensors, a sequence of one or more inputs corresponding to a request to share respective content with one or more participants of the real-time communication session; means, responsive to detecting the sequence of one or more inputs corresponding to the request to share the respective content with the one or more participants of the real-time communication session, for initiating a process for sharing the respective content with the one or more participants of the real-time communication session; means, while the respective content is shared with the one or more participants of the real-time communication session and a representation of the respective content is displayed at a first location in a user interface, for displaying, via the one or more display generation components, a sharing indicator that indicates that the respective content is shared with one or more other participants in the real-time communication session, wherein the sharing indicator has a respective spatial relationship to the representation of the respective content in the user interface; means for detecting a request to move the representation of the respective content to a different location in the user interface; and means, responsive to detecting the request to move the representation of the respective content to the different location in the user interface, for displaying, via the one or more display generation components, the representation of the respective content at a second location in the user interface that is different from the first location in the user interface and displaying, via the one or more display generation components, the sharing indicator with the respective spatial relationship to the representation of the respective content in the user interface.

In some embodiments, a computer program product is disclosed. The computer program product comprises: one or more programs configured to be executed by one or more processors of a computer system that is in communication with one or more display generation components and one or more sensors, the one or more programs including instructions for: during a real-time communication session, detecting, via the one or more sensors, a sequence of one or more inputs corresponding to a request to share respective content with one or more participants of the real-time communication session; in response to detecting the sequence of one or more inputs corresponding to the request to share the respective content with the one or more participants of the real-time communication session, initiating a process for sharing the respective content with the one or more participants of the real-time communication session; while the respective content is shared with the one or more participants of the real-time communication session and a representation of the respective content is displayed at a first location in a user interface, displaying, via the one or more display generation components, a sharing indicator that indicates that the respective content is shared with one or more other participants in the real-time communication session, wherein the sharing indicator has a respective spatial relationship to the representation of the respective content in the user interface; detecting a request to move the representation of the respective content to a different location in the user interface; and in response to detecting the request to move the representation of the respective content to the different location in the user interface, displaying, via the one or more display generation components, the representation of the respective content at a second location in the user interface that is different from the first location in the user interface and displaying, via the one or more display generation components, the sharing indicator with the respective spatial relationship to the representation of the respective content in the user interface.

Note that the various embodiments described above can be combined with any other embodiments described herein. The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

For a better understanding of the various described embodiments, reference should be made to the Description of Embodiments below, in conjunction with the following drawings in which like reference numerals refer to corresponding parts throughout the figures.

FIG. 4 is a block diagram illustrating a hand tracking unit of a computer system that is configured to capture gesture inputs of the user in some embodiments.

FIGS. 8A-8B are a flow diagram of methods of displaying a user interface object that reveals content based on whether the content is private or shared, in accordance with various embodiments.

FIG. 9 is a flow diagram of methods of displaying a user interface object that includes shared content based on whether participants have entitlement to the content, in accordance with various embodiments.

FIG. 10 is a flow diagram of methods of displaying a sharing indicator that indicates that the respective content is shared with one or more other participants, in accordance with various embodiments.

DESCRIPTION OF EMBODIMENTS

Figure 1A:
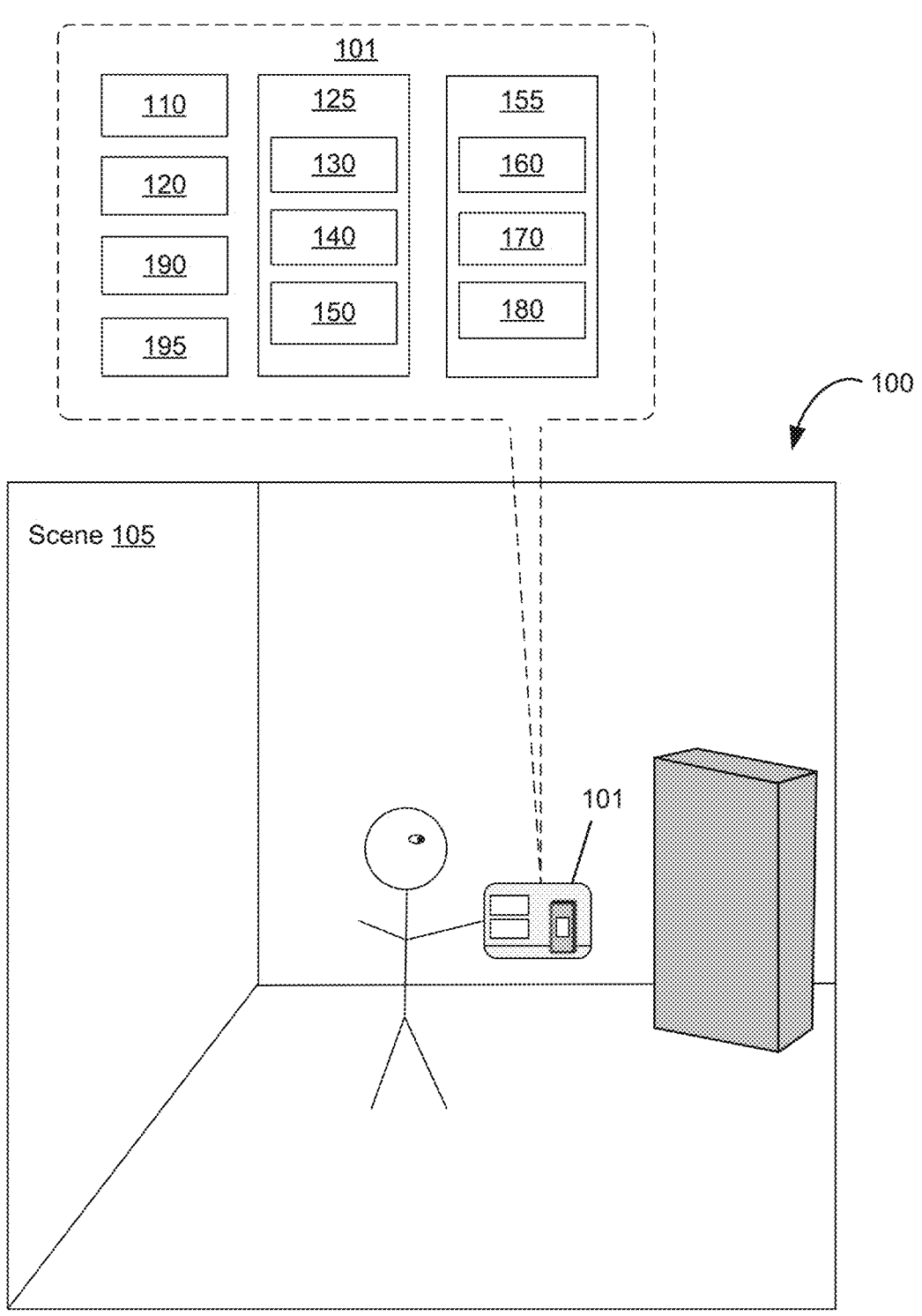
FIG. 1A is a block diagram illustrating an operating environment of a computer system for providing XR experiences in some embodiments.

The present disclosure relates to user interfaces for providing an extended reality (XR) experience to a user, in some embodiments.

The systems, methods, and GUIs described herein improve user interface interactions with virtual/augmented reality environments in multiple ways.

In some embodiments, a computer system displays content in a first region of a user interface. In some embodiments, while the computer system is displaying the content and while a first set of controls are not displayed in a first state, the computer system detects a first input from a first portion of a user. In some embodiments, in response to detecting the first input, and in accordance with a determination that a gaze of the user is directed to a second region of the user interface when the first input is detected, the computer system displays, in the user interface, the first set of one or more controls in the first state, and in accordance with a determination that the gaze of the user is not directed to the second region of the user interface when the first input is detected, the computer system forgoes displaying the first set of one or more controls in the first state.

In some embodiments, a computer system displays content in a user interface. In some embodiments, while displaying the content, the computer system detects a first input based on movement of a first portion of a user of the computer system. In some embodiments, in response to detecting the first input, the computer system displays, in the user interface, a first set of one or more controls, where the first set of one or more controls are displayed in a first state and are displayed within a first region of the user interface. In some embodiments, while displaying the first set of one or more controls in the first state: in accordance with a determination that one or more first criteria are satisfied, including a criterion that is satisfied when attention of the user is directed to the first region of the user interface based on a movement of a second portion of the user that is different from the first portion of the user, the computer system transitions from displaying the first set of one or more controls in the first state to displaying a second set of one or more controls in a second state, where the second state is different from the first state.

FIGS. 1A-6 provide a description of example computer systems for providing XR experiences to users. FIGS. 7A-7N illustrate example techniques for managing content sharing in three-dimensional environments, in some embodiments. FIGS. 8A-8B are a flow diagram of methods of displaying a user interface object that reveals content based on whether the content is private or shared, in accordance with various embodiments. FIG. 9 is a flow diagram of methods of displaying a user interface object that includes shared content based on whether participants have entitlement to the content, in accordance with various embodiments. FIG. 10 is a flow diagram of methods of displaying a sharing indicator that indicates that the respective content is shared with one or more other participants, in accordance with various embodiments. The user interfaces in FIGS. 7A-7N are used to illustrate the processes in FIGS. 8A-10.

The processes described below enhance the operability of the devices and make the user-device interfaces more efficient (e.g., by helping the user to provide proper inputs and reducing user mistakes when operating/interacting with the device) through various techniques, including by providing improved visual feedback to the user, reducing the number of inputs needed to perform an operation, providing additional control options without cluttering the user interface with additional displayed controls, performing an operation when a set of conditions has been met without requiring further user input, improving privacy and/or security, providing a more varied, detailed, and/or realistic user experience while saving storage space, and/or additional techniques. These techniques also reduce power usage and improve battery life of the device by enabling the user to use the device more quickly and efficiently. Saving on battery power, and thus weight, improves the ergonomics of the device. These techniques also enable real-time communication, allow for the use of fewer and/or less precise sensors resulting in a more compact, lighter, and cheaper device, and enable the device to be used in a variety of lighting conditions. These techniques reduce energy usage, thereby reducing heat emitted by the device, which is particularly important for a wearable device where a device well within operational parameters for device components can become uncomfortable for a user to wear if it is producing too much heat.

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

In some embodiments, as shown in FIG. 1A, the XR experience is provided to the user via an operating environment 100 that includes a computer system 101. The computer system 101 includes a controller 110 (e.g., processors of a portable electronic device or a remote server), a display generation component 120 (e.g., a head-mounted device (HMD), a display, a projector, a touch-screen, etc.), one or more input devices 125 (e.g., an eye tracking device 130, a hand tracking device 140, other input devices 150), one or more output devices 155 (e.g., speakers 160, tactile output generators 170, and other output devices 180), one or more sensors 190 (e.g., image sensors, light sensors, depth sensors, tactile sensors, orientation sensors, proximity sensors, temperature sensors, location sensors, motion sensors, velocity sensors, etc.), and optionally one or more peripheral devices 195 (e.g., home appliances, wearable devices, etc.). In some embodiments, one or more of the input devices 125, output devices 155, sensors 190, and peripheral devices 195 are integrated with the display generation component 120 (e.g., in a head-mounted device or a handheld device).

When describing a XR experience, various terms are used to differentially refer to several related but distinct environments that the user may sense and/or with which a user may interact (e.g., with inputs detected by a computer system 101 generating the XR experience that cause the computer system generating the XR experience to generate audio, visual, and/or tactile feedback corresponding to various inputs provided to the computer system 101). The following is a subset of these terms:

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Extended reality: In contrast, an extended reality (XR) environment refers to a wholly or partially simulated environment that people sense and/or interact with via an electronic system. In XR, a subset of a person's physical motions, or representations thereof, are tracked, and, in response, one or more characteristics of one or more virtual objects simulated in the XR environment are adjusted in a manner that comports with at least one law of physics. For example, a XR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a XR environment may be made in response to representations of physical motions (e.g., vocal commands). A person may sense and/or interact with a XR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some XR environments, a person may sense and/or interact only with audio objects.

Examples of XR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationary with respect to the physical ground.

Examples of mixed realities include augmented reality and augmented virtuality.

Augmented reality: An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

Augmented virtuality: An augmented virtuality (AV) environment refers to a simulated environment in which a virtual or computer-generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

In an augmented reality, mixed reality, or virtual reality environment, a view of a three-dimensional environment is visible to a user. The view of the three-dimensional environment is typically visible to the user via one or more display generation components (e.g., a display or a pair of display modules that provide stereoscopic content to different eyes of the same user) through a virtual viewport that has a viewport boundary that defines an extent of the three-dimensional environment that is visible to the user via the one or more display generation components. In some embodiments, the region defined by the viewport boundary is smaller than a range of vision of the user in one or more dimensions (e.g., based on the range of vision of the user, size, optical properties or other physical characteristics of the one or more display generation components, and/or the location and/or orientation of the one or more display generation components relative to the eyes of the user). In some embodiments, the region defined by the viewport boundary is larger than a range of vision of the user in one or more dimensions (e.g., based on the range of vision of the user, size, optical properties or other physical characteristics of the one or more display generation components, and/or the location and/or orientation of the one or more display generation components relative to the eyes of the user). The viewport and viewport boundary typically move as the one or more display generation components move (e.g., moving with a head of the user for a head mounted device or moving with a hand of a user for a handheld device such as a tablet or smartphone). A viewpoint of a user determines what content is visible in the viewport, a viewpoint generally specifies a location and a direction relative to the three-dimensional environment, and as the viewpoint shifts, the view of the three-dimensional environment will also shift in the viewport. For a head mounted device, a viewpoint is typically based on a location an direction of the head, face, and/or eyes of a user to provide a view of the three-dimensional environment that is perceptually accurate and provides an immersive experience when the user is using the head-mounted device. For a handheld or stationed device, the viewpoint shifts as the handheld or stationed device is moved and/or as a position of a user relative to the handheld or stationed device changes (e.g., a user moving toward, away from, up, down, to the right, and/or to the left of the device). For devices that include display generation components with virtual passthrough, portions of the physical environment that are visible (e.g., displayed, and/or projected) via the one or more display generation components are based on a field of view of one or more cameras in communication with the display generation components which typically move with the display generation components (e.g., moving with a head of the user for a head mounted device or moving with a hand of a user for a handheld device such as a tablet or smartphone) because the viewpoint of the user moves as the field of view of the one or more cameras moves (and the appearance of one or more virtual objects displayed via the one or more display generation components is updated based on the viewpoint of the user (e.g., displayed positions and poses of the virtual objects are updated based on the movement of the viewpoint of the user)). For display generation components with optical passthrough, portions of the physical environment that are visible (e.g., optically visible through one or more partially or fully transparent portions of the display generation component) via the one or more display generation components are based on a field of view of a user through the partially or fully transparent portion(s) of the display generation component (e.g., moving with a head of the user for a head mounted device or moving with a hand of a user for a handheld device such as a tablet or smartphone) because the viewpoint of the user moves as the field of view of the user through the partially or fully transparent portions of the display generation components moves (and the appearance of one or more virtual objects is updated based on the viewpoint of the user).

In some embodiments a representation of a physical environment (e.g., displayed via virtual passthrough or optical passthrough) can be partially or fully obscured by a virtual environment. In some embodiments, the amount of virtual environment that is displayed (e.g., the amount of physical environment that is not displayed) is based on an immersion level for the virtual environment (e.g., with respect to the representation of the physical environment). For example, increasing the immersion level optionally causes more of the virtual environment to be displayed, replacing and/or obscuring more of the physical environment, and reducing the immersion level optionally causes less of the virtual environment to be displayed, revealing portions of the physical environment that were previously not displayed and/or obscured. In some embodiments, at a particular immersion level, one or more first background objects (e.g., in the representation of the physical environment) are visually de-emphasized (e.g., dimmed, blurred, and/or displayed with increased transparency) more than one or more second background objects, and one or more third background objects cease to be displayed. In some embodiments, a level of immersion includes an associated degree to which the virtual content displayed by the computer system (e.g., the virtual environment and/or the virtual content) obscures background content (e.g., content other than the virtual environment and/or the virtual content) around/behind the virtual content, optionally including the number of items of background content displayed and/or the visual characteristics (e.g., colors, contrast, and/or opacity) with which the background content is displayed, the angular range of the virtual content displayed via the display generation component (e.g., 60 degrees of content displayed at low immersion, 120 degrees of content displayed at medium immersion, or 180 degrees of content displayed at high immersion), and/or the proportion of the field of view displayed via the display generation component that is consumed by the virtual content (e.g., 33% of the field of view consumed by the virtual content at low immersion, 66% of the field of view consumed by the virtual content at medium immersion, or 100% of the field of view consumed by the virtual content at high immersion). In some embodiments, the background content is included in a background over which the virtual content is displayed (e.g., background content in the representation of the physical environment). In some embodiments, the background content includes user interfaces (e.g., user interfaces generated by the computer system corresponding to applications), virtual objects (e.g., files or representations of other users generated by the computer system) not associated with or included in the virtual environment and/or virtual content, and/or real objects (e.g., pass-through objects representing real objects in the physical environment around the user that are visible such that they are displayed via the display generation component and/or a visible via a transparent or translucent component of the display generation component because the computer system does not obscure/prevent visibility of them through the display generation component). In some embodiments, at a low level of immersion (e.g., a first level of immersion), the background, virtual and/or real objects are displayed in an unobscured manner. For example, a virtual environment with a low level of immersion is optionally displayed concurrently with the background content, which is optionally displayed with full brightness, color, and/or translucency. In some embodiments, at a higher level of immersion (e.g., a second level of immersion higher than the first level of immersion), the background, virtual and/or real objects are displayed in an obscured manner (e.g., dimmed, blurred, or removed from display). For example, a respective virtual environment with a high level of immersion is displayed without concurrently displaying the background content (e.g., in a full screen or fully immersive mode). As another example, a virtual environment displayed with a medium level of immersion is displayed concurrently with darkened, blurred, or otherwise de-emphasized background content. In some embodiments, the visual characteristics of the background objects vary among the background objects. For example, at a particular immersion level, one or more first background objects are visually de-emphasized (e.g., dimmed, blurred, and/or displayed with increased transparency) more than one or more second background objects, and one or more third background objects cease to be displayed. In some embodiments, a null or zero level of immersion corresponds to the virtual environment ceasing to be displayed and instead a representation of a physical environment is displayed (optionally with one or more virtual objects such as application, windows, or virtual three-dimensional objects) without the representation of the physical environment being obscured by the virtual environment. Adjusting the level of immersion using a physical input element provides for quick and efficient method of adjusting immersion, which enhances the operability of the computer system and makes the user-device interface more efficient.

Viewpoint-locked virtual object: A virtual object is viewpoint-locked when a computer system displays the virtual object at the same location and/or position in the viewpoint of the user, even as the viewpoint of the user shifts (e.g., changes). In embodiments where the computer system is a head-mounted device, the viewpoint of the user is locked to the forward facing direction of the user's head (e.g., the viewpoint of the user is at least a portion of the field-of-view of the user when the user is looking straight ahead); thus, the viewpoint of the user remains fixed even as the user's gaze is shifted, without moving the user's head. In embodiments where the computer system has a display generation component (e.g., a display screen) that can be repositioned with respect to the user's head, the viewpoint of the user is the augmented reality view that is being presented to the user on a display generation component of the computer system. For example, a viewpoint-locked virtual object that is displayed in the upper left corner of the viewpoint of the user, when the viewpoint of the user is in a first orientation (e.g., with the user's head facing north) continues to be displayed in the upper left corner of the viewpoint of the user, even as the viewpoint of the user changes to a second orientation (e.g., with the user's head facing west). In other words, the location and/or position at which the viewpoint-locked virtual object is displayed in the viewpoint of the user is independent of the user's position and/or orientation in the physical environment. In embodiments in which the computer system is a head-mounted device, the viewpoint of the user is locked to the orientation of the user's head, such that the virtual object is also referred to as a "head-locked virtual object."

Environment-locked virtual object: A virtual object is environment-locked (alternatively, "world-locked") when a computer system displays the virtual object at a location and/or position in the viewpoint of the user that is based on (e.g., selected in reference to and/or anchored to) a location and/or object in the three-dimensional environment (e.g., a physical environment or a virtual environment). As the viewpoint of the user shifts, the location and/or object in the environment relative to the viewpoint of the user changes, which results in the environment-locked virtual object being displayed at a different location and/or position in the viewpoint of the user. For example, an environment-locked virtual object that is locked onto a tree that is immediately in front of a user is displayed at the center of the viewpoint of the user. When the viewpoint of the user shifts to the right (e.g., the user's head is turned to the right) so that the tree is now left-of-center in the viewpoint of the user (e.g., the tree's position in the viewpoint of the user shifts), the environment-locked virtual object that is locked onto the tree is displayed left-of-center in the viewpoint of the user. In other words, the location and/or position at which the environment-locked virtual object is displayed in the viewpoint of the user is dependent on the position and/or orientation of the location and/or object in the environment onto which the virtual object is locked. In some embodiments, the computer system uses a stationary frame of reference (e.g., a coordinate system that is anchored to a fixed location and/or object in the physical environment) in order to determine the position at which to display an environment-locked virtual object in the viewpoint of the user. An environment-locked virtual object can be locked to a stationary part of the environment (e.g., a floor, wall, table, or other stationary object) or can be locked to a moveable part of the environment (e.g., a vehicle, animal, person, or even a representation of portion of the users body that moves independently of a viewpoint of the user, such as a user's hand, wrist, arm, or foot) so that the virtual object is moved as the viewpoint or the portion of the environment moves to maintain a fixed relationship between the virtual object and the portion of the environment.

In some embodiments a virtual object that is environment-locked or viewpoint-locked exhibits lazy follow behavior which reduces or delays motion of the environment-locked or viewpoint-locked virtual object relative to movement of a point of reference which the virtual object is following. In some embodiments, when exhibiting lazy follow behavior the computer system intentionally delays movement of the virtual object when detecting movement of a point of reference (e.g., a portion of the environment, the viewpoint, or a point that is fixed relative to the viewpoint, such as a point that is between 5-300 cm from the viewpoint) which the virtual object is following. For example, when the point of reference (e.g., the portion of the environment or the viewpoint) moves with a first speed, the virtual object is moved by the device to remain locked to the point of reference but moves with a second speed that is slower than the first speed (e.g., until the point of reference stops moving or slows down, at which point the virtual object starts to catch up to the point of reference). In some embodiments, when a virtual object exhibits lazy follow behavior the device ignores small amounts of movement of the point of reference (e.g., ignoring movement of the point of reference that is below a threshold amount of movement such as movement by 0-5 degrees or movement by 0-50 cm). For example, when the point of reference (e.g., the portion of the environment or the viewpoint to which the virtual object is locked) moves by a first amount, a distance between the point of reference and the virtual object increases (e.g., because the virtual object is being displayed so as to maintain a fixed or substantially fixed position relative to a viewpoint or portion of the environment that is different from the point of reference to which the virtual object is locked) and when the point of reference (e.g., the portion of the environment or the viewpoint to which the virtual object is locked) moves by a second amount that is greater than the first amount, a distance between the point of reference and the virtual object initially increases (e.g., because the virtual object is being displayed so as to maintain a fixed or substantially fixed position relative to a viewpoint or portion of the environment that is different from the point of reference to which the virtual object is locked) and then decreases as the amount of movement of the point of reference increases above a threshold (e.g., a "lazy follow" threshold) because the virtual object is moved by the computer system to maintain a fixed or substantially fixed position relative to the point of reference. In some embodiments the virtual object maintaining a substantially fixed position relative to the point of reference includes the virtual object being displayed within a threshold distance (e.g., 1, 2, 3, 5, 15, 20, 50 cm) of the point of reference in one or more dimensions (e.g., up/down, left/right, and/or forward/backward relative to the position of the point of reference).

Hardware: There are many different types of electronic systems that enable a person to sense and/or interact with various XR environments. Examples include head-mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mounted system may include speakers and/or other audio output devices integrated into the head-mounted system for providing audio output. A head-mounted system may have one or more speaker(s) and an integrated opaque display. Alternatively, a head-mounted system may be configured to accept an external opaque display (e.g., a smartphone). The head-mounted system may incorporate one or more imaging sensors to capture images or video of the physical environment, and/or one or more microphones to capture audio of the physical environment. Rather than an opaque display, a head-mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. In some embodiments, the controller 110 is configured to manage and coordinate a XR experience for the user. In some embodiments, the controller 110 includes a suitable combination of software, firmware, and/or hardware. The controller 110 is described in greater detail below with respect to FIG. 2. In some embodiments, the controller 110 is a computing device that is local or remote relative to the scene 105 (e.g., a physical environment). For example, the controller 110 is a local server located within the scene 105. In another example, the controller 110 is a remote server located outside of the scene 105 (e.g., a cloud server, central server, etc.). In some embodiments, the controller 110 is communicatively coupled with the display generation component 120 (e.g., an HMD, a display, a projector, a touchscreen, etc.) via one or more wired or wireless communication channels 144 (e.g., BLUETOOTH, IEEE 802.11x, IEEE 802.16x, IEEE 802.3x, etc.). In another example, the controller 110 is included within the enclosure (e.g., a physical housing) of the display generation component 120 (e.g., an HMD, or a portable electronic device that includes a display and one or more processors, etc.), one or more of the input devices 125, one or more of the output devices 155, one or more of the sensors 190, and/or one or more of the peripheral devices 195, or share the same physical enclosure or support structure with one or more of the above.

In some embodiments, the display generation component 120 is configured to provide the XR experience (e.g., at least a visual component of the XR experience) to the user. In some embodiments, the display generation component 120 includes a suitable combination of software, firmware, and/or hardware. The display generation component 120 is described in greater detail below with respect to FIG. 3. In some embodiments, the functionalities of the controller 110 are provided by and/or combined with the display generation component 120.

According to some embodiments, the display generation component 120 provides a XR experience to the user while the user is virtually and/or physically present within the scene 105.

In some embodiments, the display generation component is worn on a part of the user's body (e.g., on his/her head, on his/her hand, etc.). As such, the display generation component 120 includes one or more XR displays provided to display the XR content. For example, in various embodiments, the display generation component 120 encloses the field-of-view of the user. In some embodiments, the display generation component 120 is a handheld device (such as a smartphone or tablet) configured to present XR content, and the user holds the device with a display directed towards the field-of-view of the user and a camera directed towards the scene 105. In some embodiments, the handheld device is optionally placed within an enclosure that is worn on the head of the user. In some embodiments, the handheld device is optionally placed on a support (e.g., a tripod) in front of the user. In some embodiments, the display generation component 120 is a XR chamber, enclosure, or room configured to present XR content in which the user does not wear or hold the display generation component 120. Many user interfaces described with reference to one type of hardware for displaying XR content (e.g., a handheld device or a device on a tripod) could be implemented on another type of hardware for displaying XR content (e.g., an HMD or other wearable computing device). For example, a user interface showing interactions with XR content triggered based on interactions that happen in a space in front of a handheld or tripod mounted device could similarly be implemented with an HMD where the interactions happen in a space in front of the HMD and the responses of the XR content are displayed via the HMD. Similarly, a user interface showing interactions with XR content triggered based on movement of a handheld or tripod mounted device relative to the physical environment (e.g., the scene 105 or a part of the user's body (e.g., the user's eye(s), head, or hand)) could similarly be implemented with an HMD where the movement is caused by movement of the HMD relative to the physical environment (e.g., the scene 105 or a part of the user's body (e.g., the user's eye(s), head, or hand)).

While pertinent features of the operating environment 100 are shown in FIG. 1A, those of ordinary skill in the art will appreciate from the present disclosure that various other features have not been illustrated for the sake of brevity and so as not to obscure more pertinent aspects of the example embodiments disclosed herein.

Figure 1B:
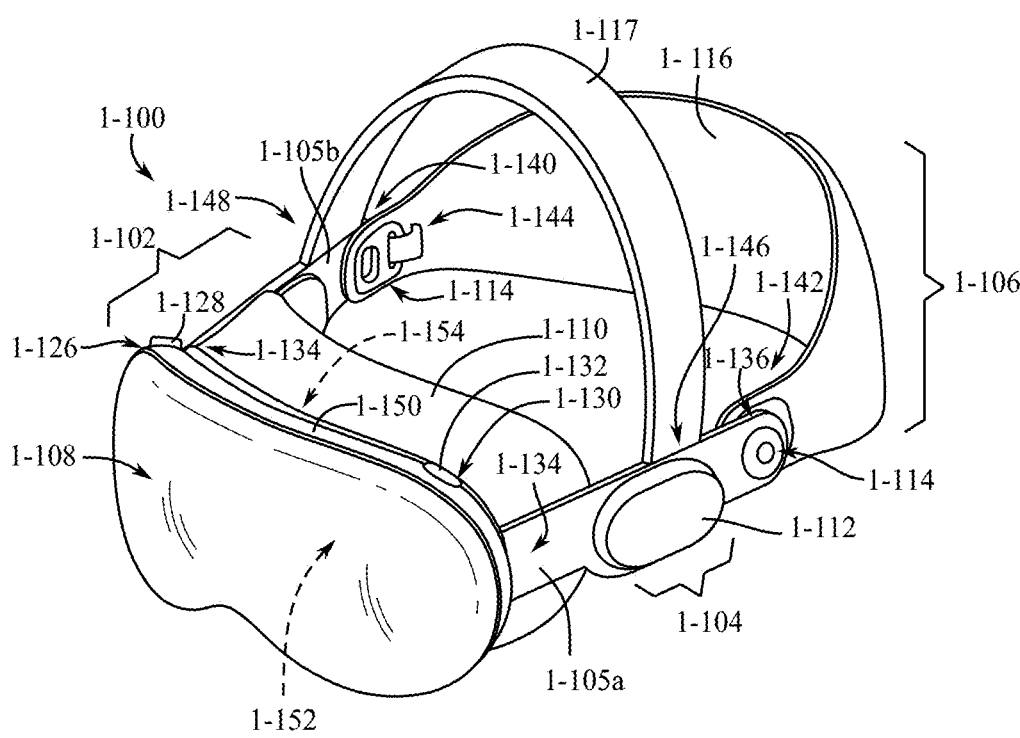
FIGS. 1B-1P are examples of a computer system for providing XR experiences in the operating environment of FIG. 1A.
Figure 1C:
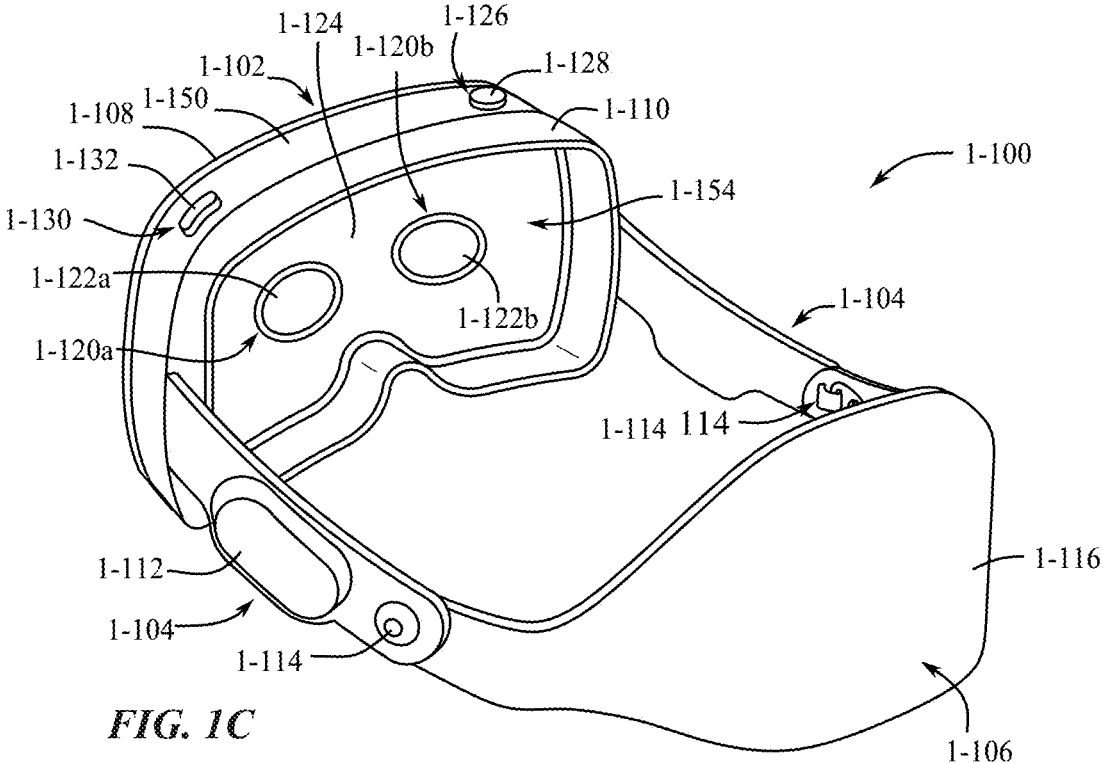
Figure 1D:
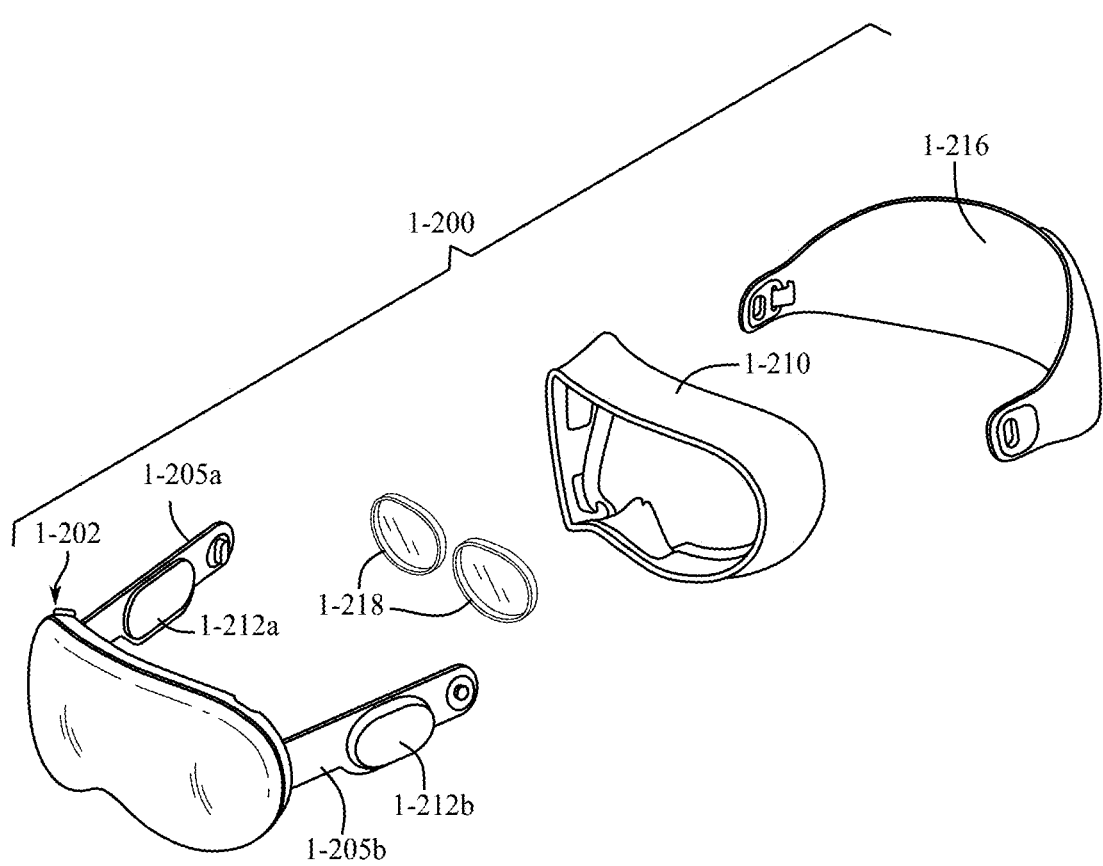
Figure 1E:
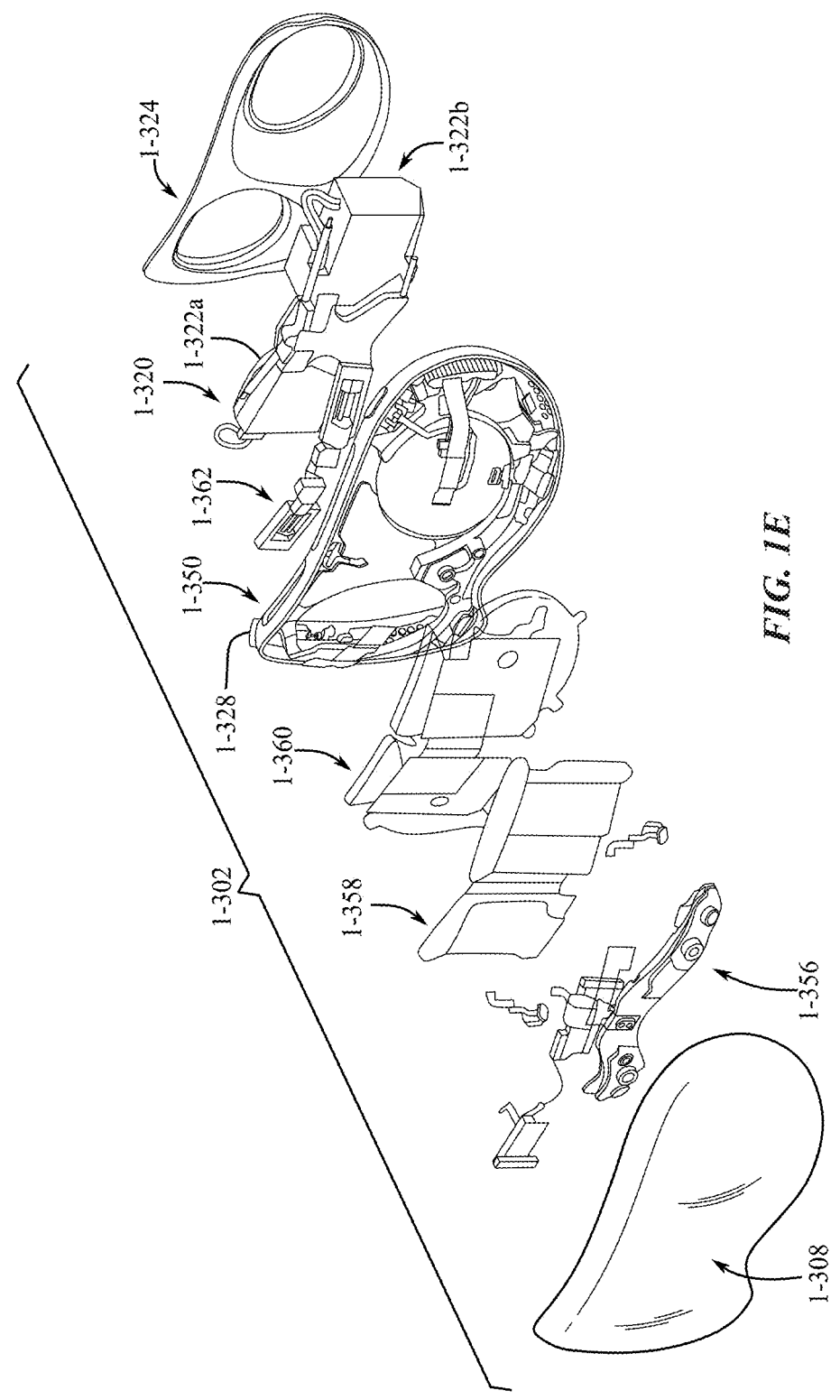
Figure 1F:
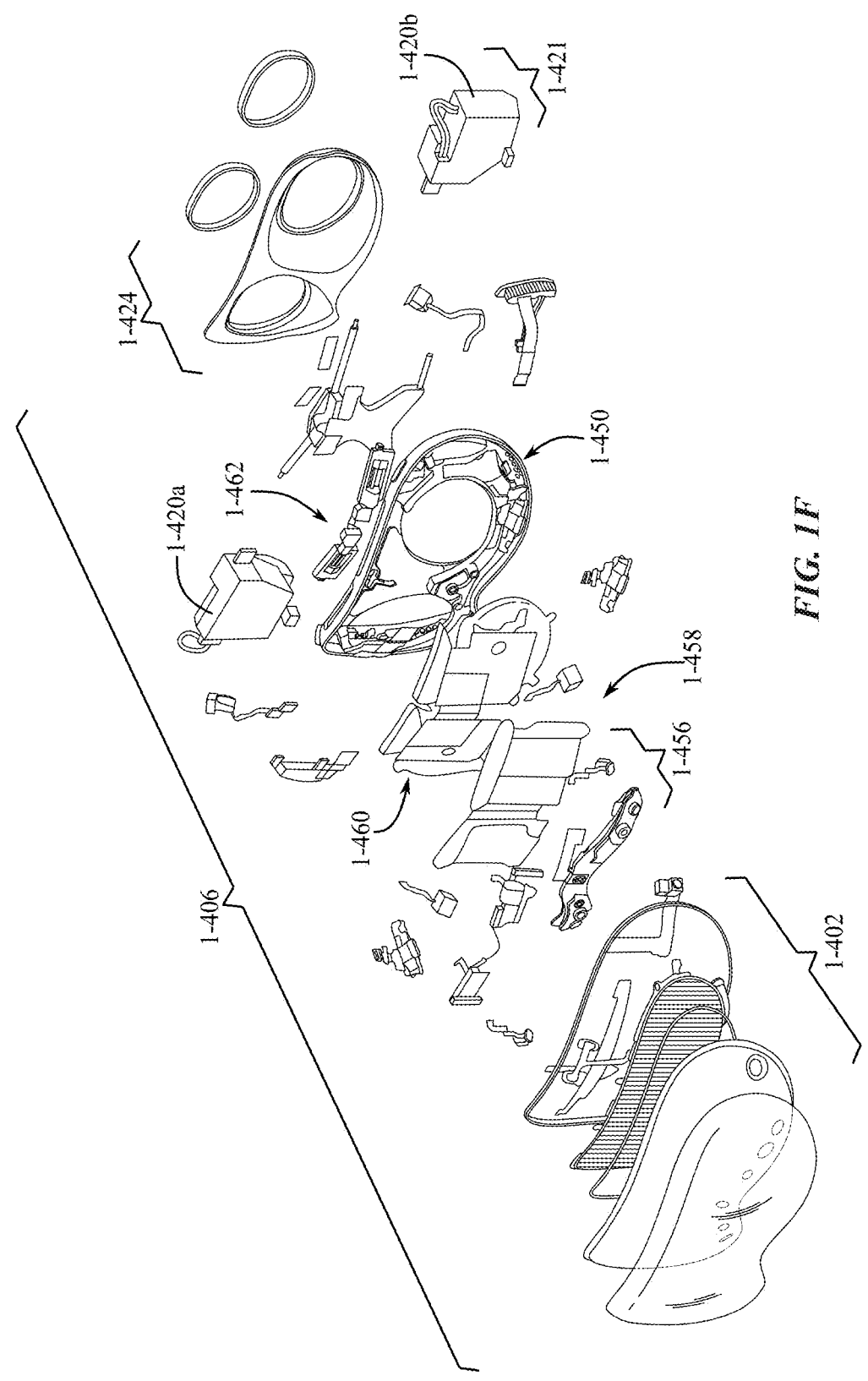
Figure 1G:
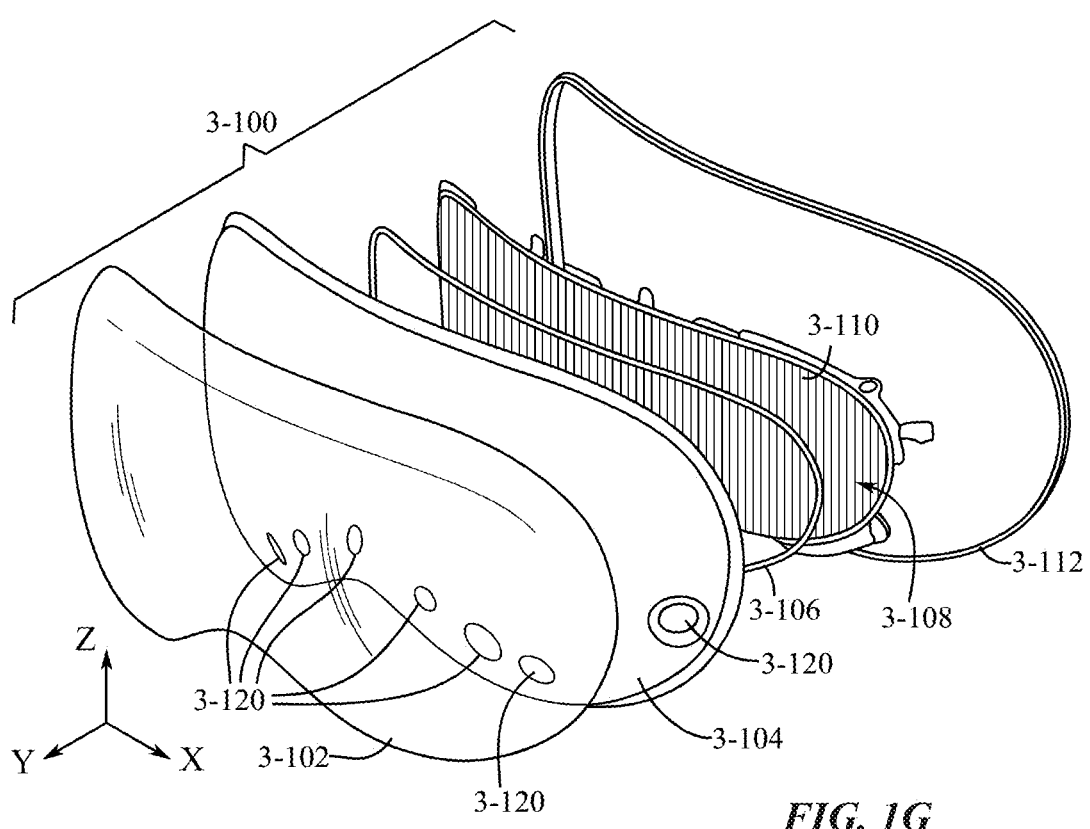
Figure 1H:
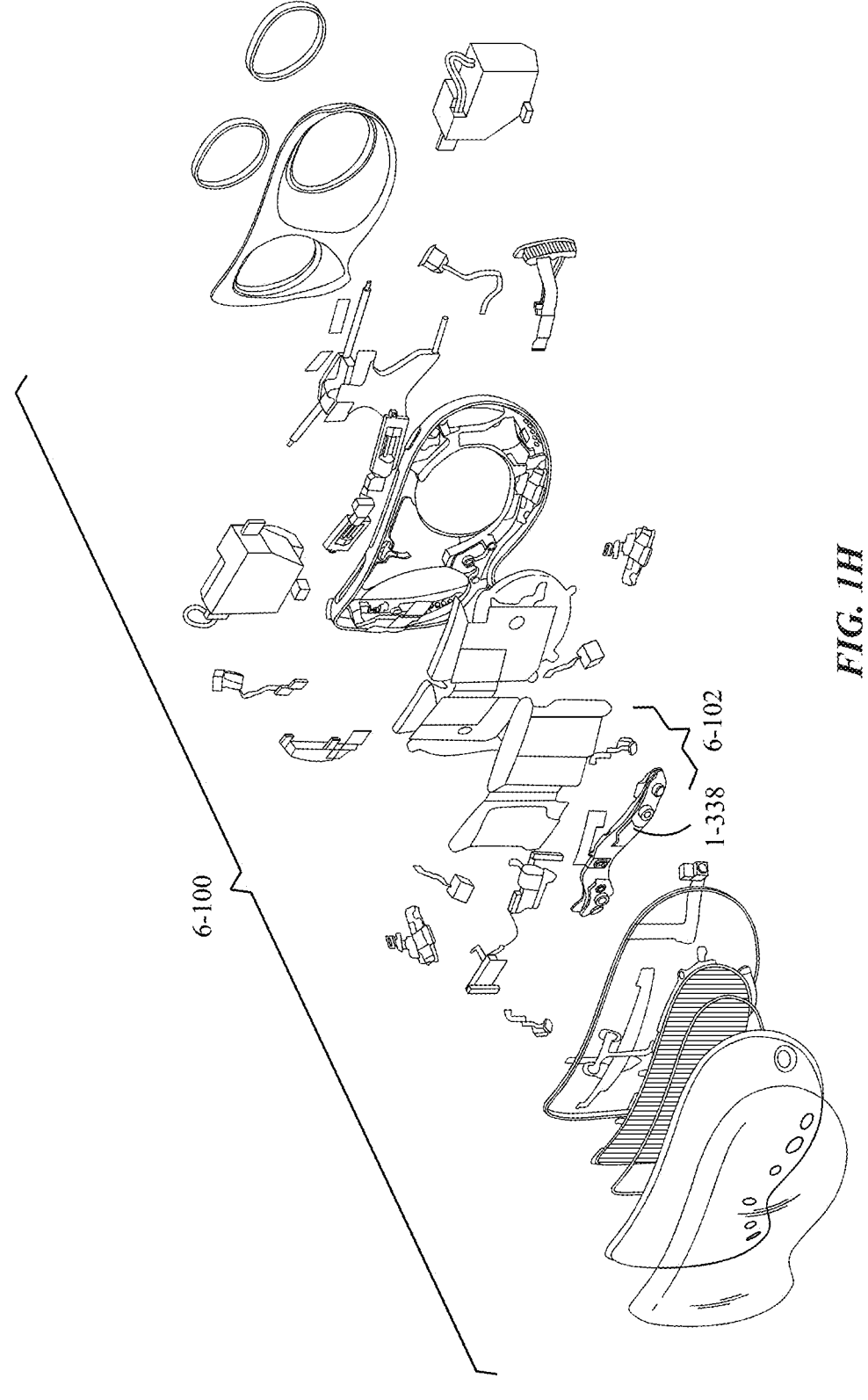
Figure 1I:
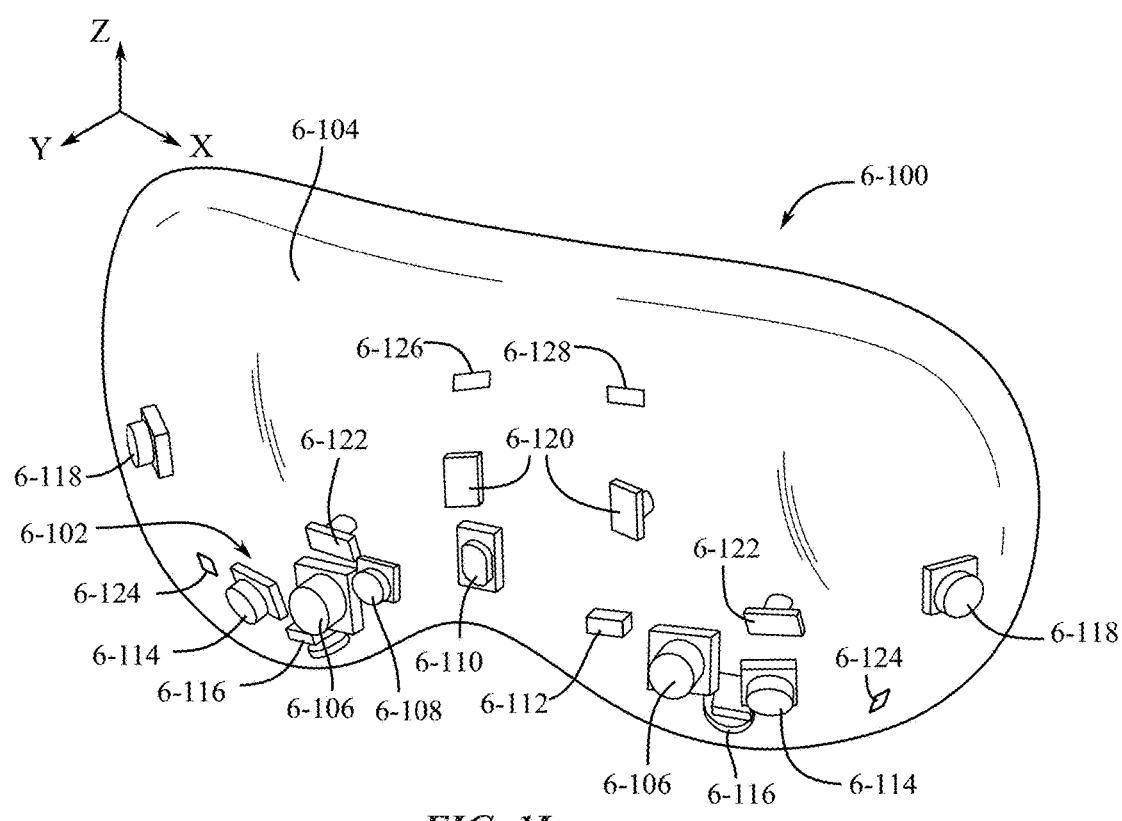
Figure 1J:
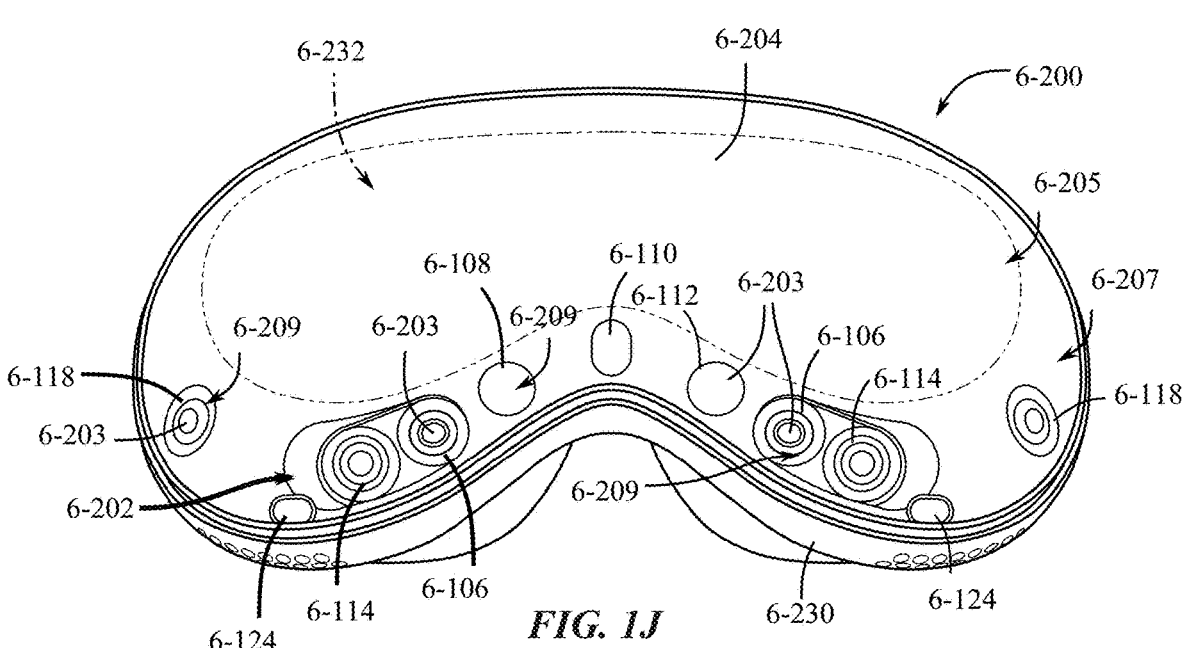
Figure 1K:
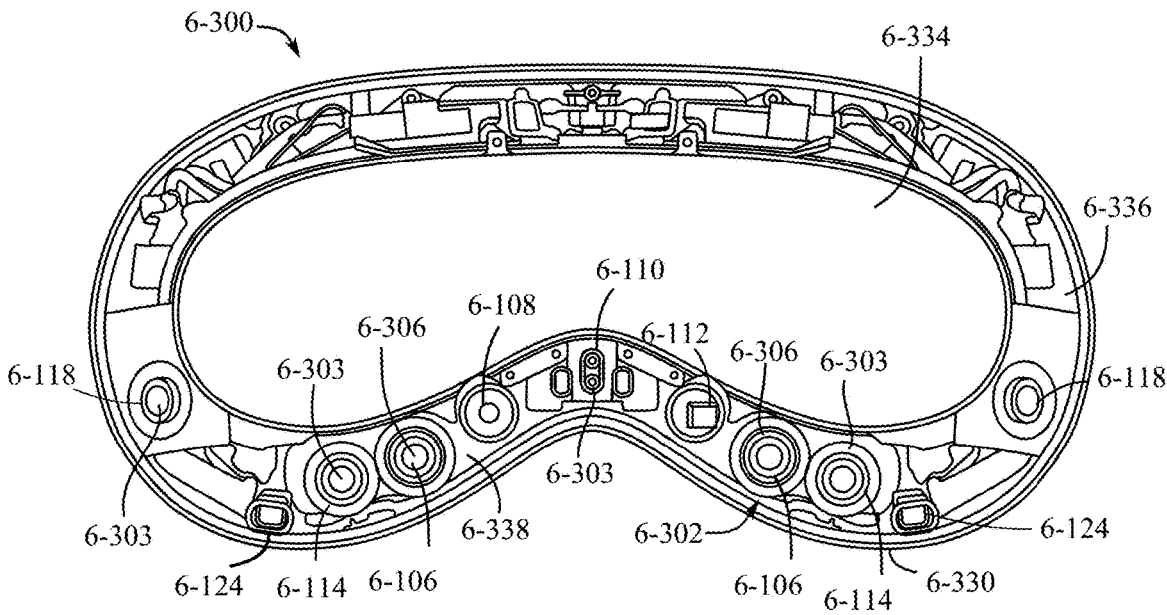
Figure 1L:
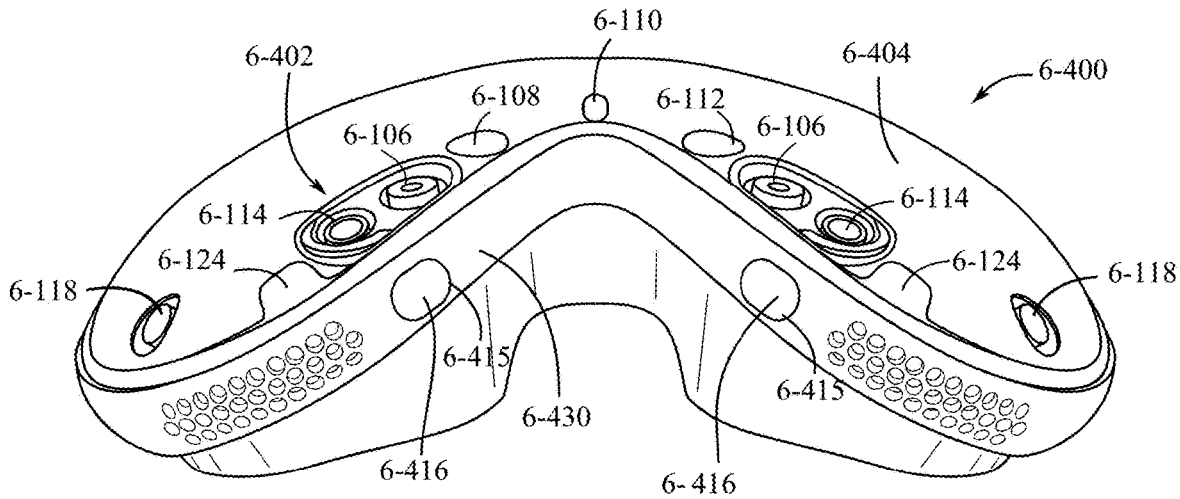
Figure 1M:
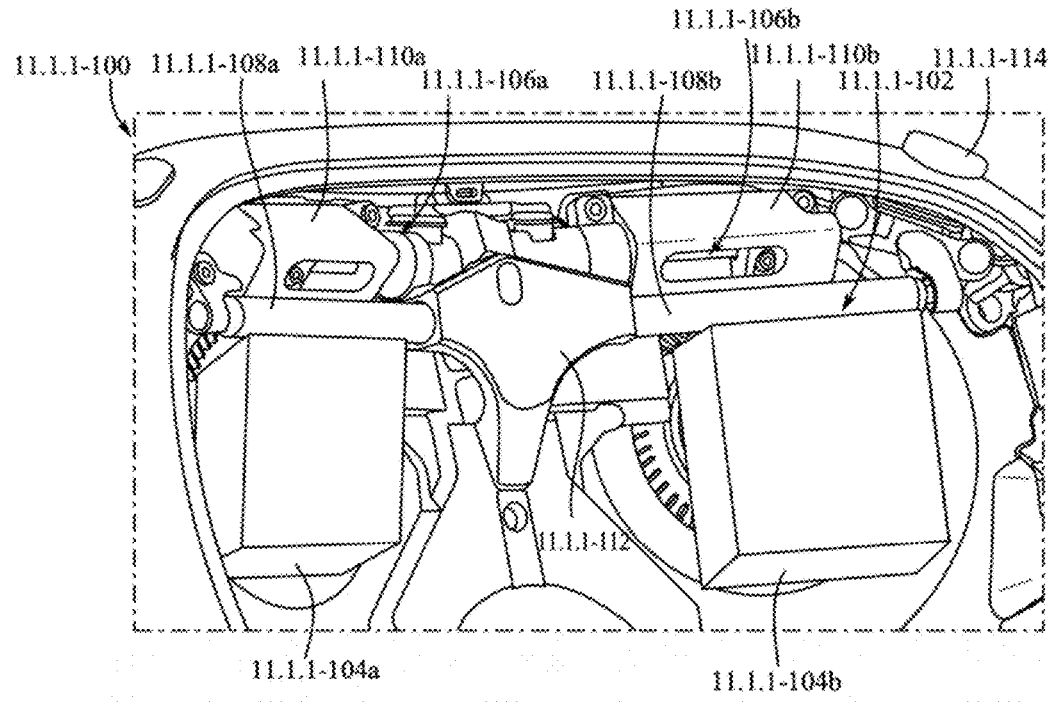
Figure 1N:
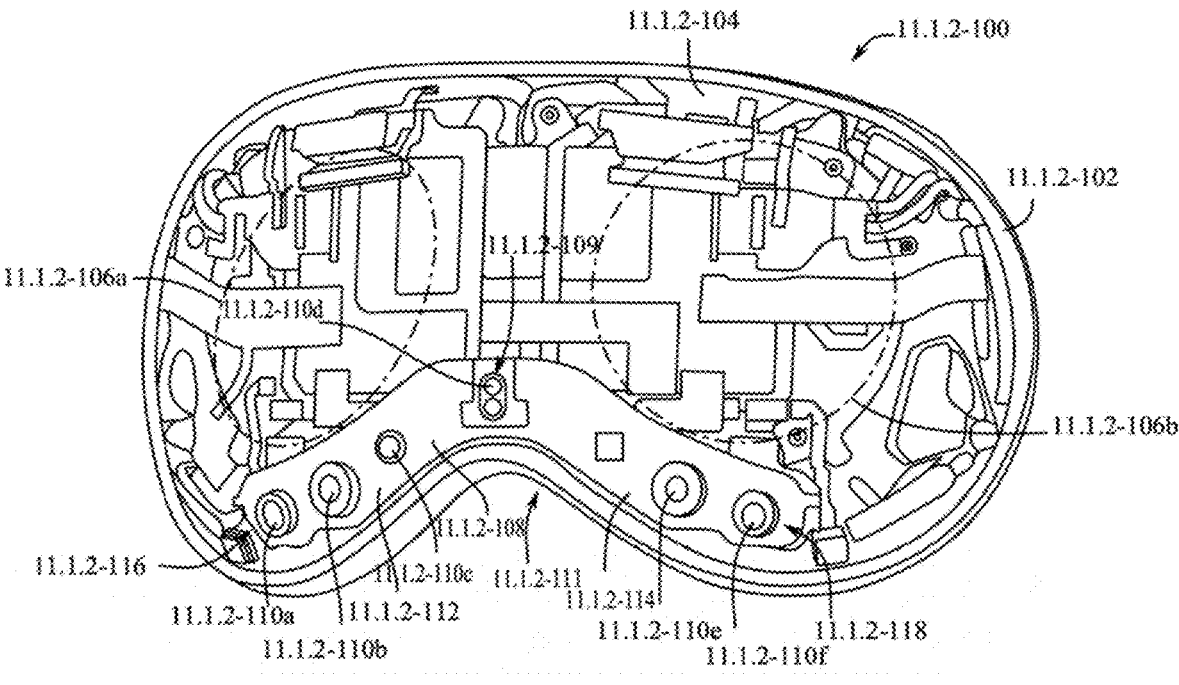
Figure 1O:
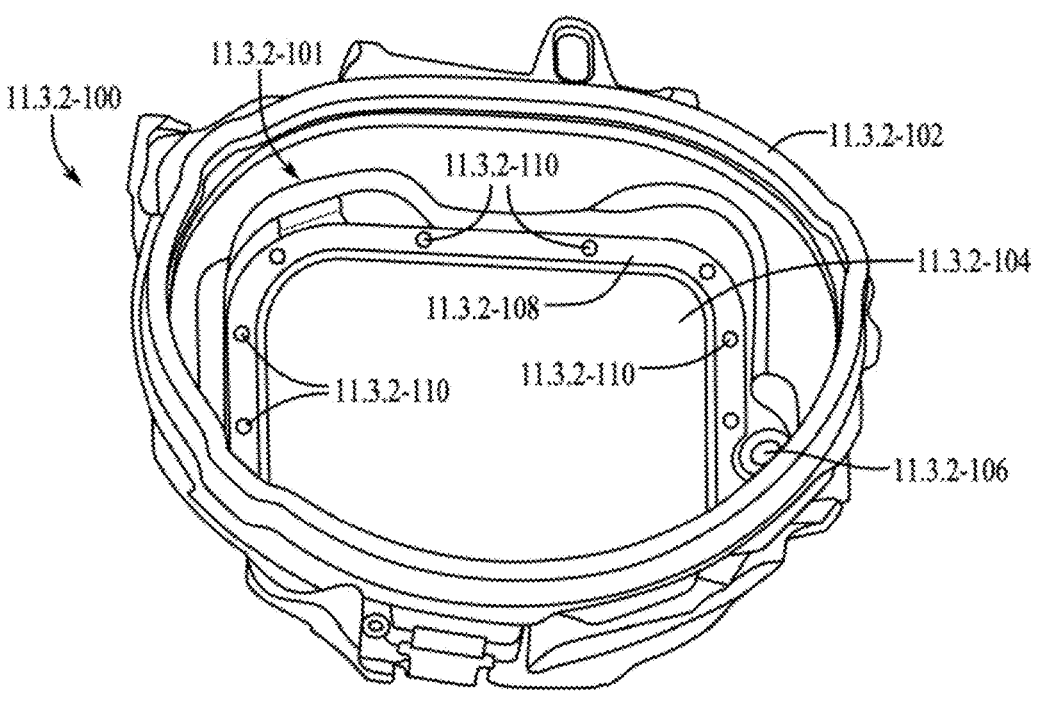
Figure 1P:
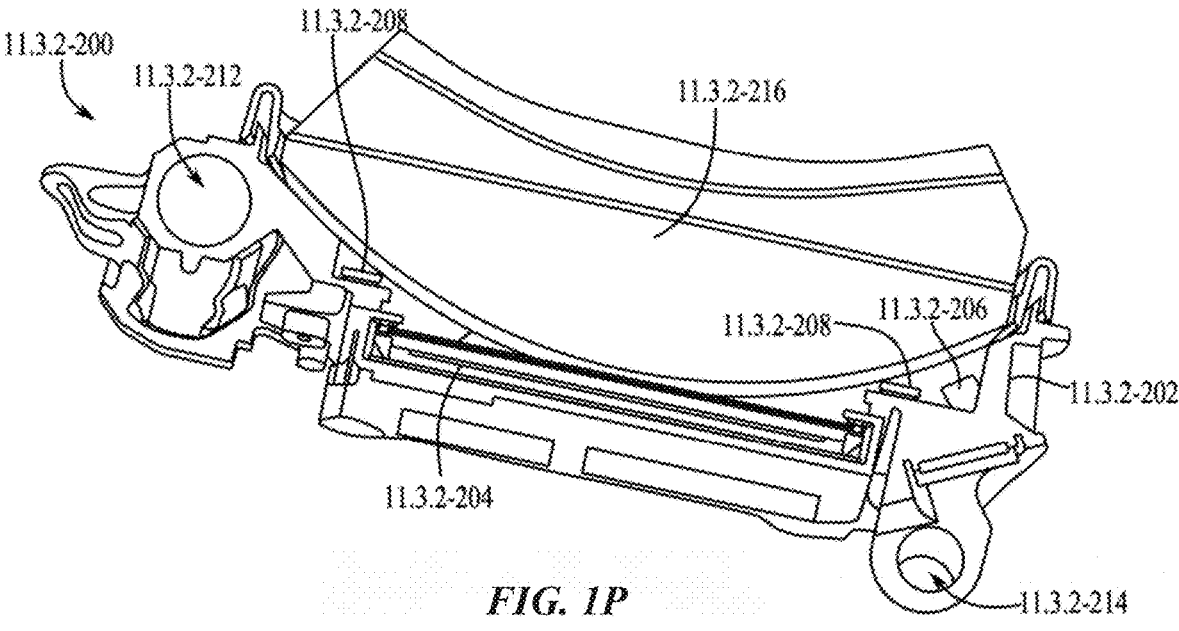

FIGS. 1A-1P illustrate various examples of a computer system that is used to perform the methods and provide audio, visual and/or haptic feedback as part of user interfaces described herein. In some embodiments, the computer system includes one or more display generation components (e.g., first and second display assemblies 1-120a, 1-120b and/or first and second optical modules 11.1.1-104a and 11.1.1-104b) for displaying virtual elements and/or a representation of a physical environment to a user of the computer system, optionally generated based on detected events and/or user inputs detected by the computer system. User interfaces generated by the computer system are optionally corrected by one or more corrective lenses 11.3.2-216 that are optionally removably attached to one or more of the optical modules to enable the user interfaces to be more easily viewed by users who would otherwise use glasses or contacts to correct their vision. While many user interfaces illustrated herein show a single view of a user interface, user interfaces in a HMD are optionally displayed using two optical modules (e.g., first and second display assemblies 1-120a, 1-120b and/or first and second optical modules 11.1.1-104a and 11.1.1-104b), one for a user's right eye and a different one for a user's left eye, and slightly different images are presented to the two different eyes to generate the illusion of stereoscopic depth, the single view of the user interface would typically be either a right-eye or left-eye view and the depth effect is explained in the text or using other schematic charts or views. In some embodiments, the computer system includes one or more external displays (e.g., display assembly 1-108) for displaying status information for the computer system to the user of the computer system (when the computer system is not being worn) and/or to other people who are near the computer system, optionally generated based on detected events and/or user inputs detected by the computer system. In some embodiments, the computer system includes one or more audio output components (e.g., electronic component 1-112) for generating audio feedback, optionally generated based on detected events and/or user inputs detected by the computer system. In some embodiments, the computer system includes one or more input devices for detecting input such as one or more sensors (e.g., one or more sensors in sensor assembly 1-356, and/or FIG. 1I) for detecting information about a physical environment of the device which can be used (optionally in conjunction with one or more illuminators such as the illuminators described in FIG. 1I) to generate a digital passthrough image, capture visual media corresponding to the physical environment (e.g., photos and/or video), or determine a pose (e.g., position and/or orientation) of physical objects and/or surfaces in the physical environment so that virtual objects ban be placed based on a detected pose of physical objects and/or surfaces. In some embodiments, the computer system includes one or more input devices for detecting input such as one or more sensors for detecting hand position and/or movement (e.g., one or more sensors in sensor assembly 1-356, and/or FIG. 1I) that can be used (optionally in conjunction with one or more illuminators such as the illuminators 6-124 described in FIG. 1I) to determine when one or more air gestures have been performed. In some embodiments, the computer system includes one or more input devices for detecting input such as one or more sensors for detecting eye movement (e.g., eye tracking and gaze tracking sensors in FIG. 1I) which can be used (optionally in conjunction with one or more lights such as lights 11.3.2-110 in FIG. 1O) to determine attention or gaze position and/or gaze movement which can optionally be used to detect gaze-only inputs based on gaze movement and/or dwell. A combination of the various sensors described above can be used to determine user facial expressions and/or hand movements for use in generating an avatar or representation of the user such as an anthropomorphic avatar or representation for use in a real-time communication session where the avatar has facial expressions, hand movements, and/or body movements that are based on or similar to detected facial expressions, hand movements, and/or body movements of a user of the device. Gaze and/or attention information is, optionally, combined with hand tracking information to determine interactions between the user and one or more user interfaces based on direct and/or indirect inputs such as air gestures or inputs that use one or more hardware input devices such as one or more buttons (e.g., first button 1-128, button 11.1.1-114, second button 1-132, and or dial or button 1-328), knobs (e.g., first button 1-128, button 11.1.1-114, and/or dial or button 1-328), digital crowns (e.g., first button 1-128 which is depressible and twistable or rotatable, button 11.1.1-114, and/or dial or button 1-328), trackpads, touch screens, keyboards, mice and/or other input devices. One or more buttons (e.g., first button 1-128, button 11.1.1-114, second button 1-132, and or dial or button 1-328) are optionally used to perform system operations such as recentering content in three-dimensional environment that is visible to a user of the device, displaying a home user interface for launching applications, starting real-time communication sessions, or initiating display of virtual three-dimensional backgrounds. Knobs or digital crowns (e.g., first button 1-128 which is depressible and twistable or rotatable, button 11.1.1-114, and/or dial or button 1-328) are optionally rotatable to adjust parameters of the visual content such as a level of immersion of a virtual three-dimensional environment (e.g., a degree to which virtual-content occupies the viewport of the user into the three-dimensional environment) or other parameters associated with the three-dimensional environment and the virtual content that is displayed via the optical modules (e.g., first and second display assemblies 1-120a, 1-120b and/or first and second optical modules 11.1.1-104a and 11.1.1-104b).

FIG. 1B illustrates a front, top, perspective view of an example of a head-mountable display (HMD) device 1-100 configured to be donned by a user and provide virtual and altered/mixed reality (VR/AR) experiences. The HMD 1-100 can include a display unit 1-102 or assembly, an electronic strap assembly 1-104 connected to and extending from the display unit 1-102, and a band assembly 1-106 secured at either end to the electronic strap assembly 1-104. The electronic strap assembly 1-104 and the band 1-106 can be part of a retention assembly configured to wrap around a user's head to hold the display unit 1-102 against the face of the user.

In at least one example, the band assembly 1-106 can include a first band 1-116 configured to wrap around the rear side of a user's head and a second band 1-117 configured to extend over the top of a user's head. The second strap can extend between first and second electronic straps 1-105a, 1-105b of the electronic strap assembly 1-104 as shown. The strap assembly 1-104 and the band assembly 1-106 can be part of a securement mechanism extending rearward from the display unit 1-102 and configured to hold the display unit 1-102 against a face of a user.

In at least one example, the securement mechanism includes a first electronic strap 1-105a including a first proximal end 1-134 coupled to the display unit 1-102, for example a housing 1-150 of the display unit 1-102, and a first distal end 1-136 opposite the first proximal end 1-134. The securement mechanism can also include a second electronic strap 1-105b including a second proximal end 1-138 coupled to the housing 1-150 of the display unit 1-102 and a second distal end 1-140 opposite the second proximal end 1-138. The securement mechanism can also include the first band 1-116 including a first end 1-142 coupled to the first distal end 1-136 and a second end 1-144 coupled to the second distal end 1-140 and the second band 1-117 extending between the first electronic strap 1-105a and the second electronic strap 1-105b. The straps 1-105a-b and band 1-116 can be coupled via connection mechanisms or assemblies 1-114. In at least one example, the second band 1-117 includes a first end 1-146 coupled to the first electronic strap 1-105a between the first proximal end 1-134 and the first distal end 1-136 and a second end 1-148 coupled to the second electronic strap 1-105b between the second proximal end 1-138 and the second distal end 1-140.

In at least one example, the first and second electronic straps 1-105a-b include plastic, metal, or other structural materials forming the shape the substantially rigid straps 1-105a-b. In at least one example, the first and second bands 1-116, 1-117 are formed of elastic, flexible materials including woven textiles, rubbers, and the like. The first and second bands 1-116, 1-117 can be flexible to conform to the shape of the user' head when donning the HMD 1-100.

In at least one example, one or more of the first and second electronic straps 1-105a-b can define internal strap volumes and include one or more electronic components disposed in the internal strap volumes. In one example, as shown in FIG. 1B, the first electronic strap 1-105a can include an electronic component 1-112. In one example, the electronic component 1-112 can include a speaker. In one example, the electronic component 1-112 can include a computing component such as a processor.

In at least one example, the housing 1-150 defines a first, front-facing opening 1-152. The front-facing opening is labeled in dotted lines at 1-152 in FIG. 1B because the display assembly 1-108 is disposed to occlude the first opening 1-152 from view when the HMD 1-100 is assembled. The housing 1-150 can also define a rear-facing second opening 1-154. The housing 1-150 also defines an internal volume between the first and second openings 1-152, 1-154. In at least one example, the HMD 1-100 includes the display assembly 1-108, which can include a front cover and display screen (shown in other figures) disposed in or across the front opening 1-152 to occlude the front opening 1-152. In at least one example, the display screen of the display assembly 1-108, as well as the display assembly 1-108 in general, has a curvature configured to follow the curvature of a user's face. The display screen of the display assembly 1-108 can be curved as shown to compliment the user's facial features and general curvature from one side of the face to the other, for example from left to right and/or from top to bottom where the display unit 1-102 is pressed.

In at least one example, the housing 1-150 can define a first aperture 1-126 between the first and second openings 1-152, 1-154 and a second aperture 1-130 between the first and second openings 1-152, 1-154. The HMD 1-100 can also include a first button 1-128 disposed in the first aperture 1-126 and a second button 1-132 disposed in the second aperture 1-130. The first and second buttons 1-128, 1-132 can be depressible through the respective apertures 1-126, 1-130. In at least one example, the first button 1-126 and/or second button 1-132 can be twistable dials as well as depressible buttons. In at least one example, the first button 1-128 is a depressible and twistable dial button and the second button 1-132 is a depressible button.

FIG. 1C illustrates a rear, perspective view of the HMD 1-100. The HMD 1-100 can include a light seal 1-110 extending rearward from the housing 1-150 of the display assembly 1-108 around a perimeter of the housing 1-150 as shown. The light seal 1-110 can be configured to extend from the housing 1-150 to the user's face around the user's eyes to block external light from being visible. In one example, the HMD 1-100 can include first and second display assemblies 1-120a, 1-120b disposed at or in the rearward facing second opening 1-154 defined by the housing 1-150 and/or disposed in the internal volume of the housing 1-150 and configured to project light through the second opening 1-154. In at least one example, each display assembly 1-120a-b can include respective display screens 1-122a, 1-122b configured to project light in a rearward direction through the second opening 1-154 toward the user's eyes.

In at least one example, referring to both FIGS. 1B and 1C, the display assembly 1-108 can be a front-facing, forward display assembly including a display screen configured to project light in a first, forward direction and the rear facing display screens 1-122a-b can be configured to project light in a second, rearward direction opposite the first direction. As noted above, the light seal 1-110 can be configured to block light external to the HMD 1-100 from reaching the user's eyes, including light projected by the forward facing display screen of the display assembly 1-108 shown in the front perspective view of FIG. 1B. In at least one example, the HMD 1-100 can also include a curtain 1-124 occluding the second opening 1-154 between the housing 1-150 and the rear-facing display assemblies 1-120a-b. In at least one example, the curtain 1-124 can be elastic or at least partially elastic.

Any of the features, components, and/or parts, including the arrangements and configurations thereof shown in FIGS. 1B and 1C can be included, either alone or in any combination, in any of the other examples of devices, features, components, and parts shown in FIGS. 1D-1F and described herein. Likewise, any of the features, components, and/or parts, including the arrangements and configurations thereof shown and described with reference to FIGS. 1D-1F can be included, either alone or in any combination, in the example of the devices, features, components, and parts shown in FIGS. 1B and 1C.

FIG. 1D illustrates an exploded view of an example of an HMD 1-200 including various portions or parts thereof separated according to the modularity and selective coupling of those parts. For example, the HMD 1-200 can include a band 1-216 which can be selectively coupled to first and second electronic straps 1-205a, 1-205b. The first securement strap 1-205a can include a first electronic component 1-212a and the second securement strap 1-205b can include a second electronic component 1-212b. In at least one example, the first and second straps 1-205a-b can be removably coupled to the display unit 1-202.

In addition, the HMD 1-200 can include a light seal 1-210 configured to be removably coupled to the display unit 1-202. The HMD 1-200 can also include lenses 1-218 which can be removably coupled to the display unit 1-202, for example over first and second display assemblies including display screens. The lenses 1-218 can include customized prescription lenses configured for corrective vision. As noted, each part shown in the exploded view of FIG. 1D and described above can be removably coupled, attached, re-attached, and changed out to update parts or swap out parts for different users. For example, bands such as the band 1-216, light seals such as the light seal 1-210, lenses such as the lenses 1-218, and electronic straps such as the straps 1-205a-b can be swapped out depending on the user such that these parts are customized to fit and correspond to the individual user of the HMD 1-200.

Any of the features, components, and/or parts, including the arrangements and configurations thereof shown in FIG. 1D can be included, either alone or in any combination, in any of the other examples of devices, features, components, and parts shown in FIGS. 1B, 1C, and 1E-1F and described herein. Likewise, any of the features, components, and/or parts, including the arrangements and configurations thereof shown and described with reference to FIGS. 1B, 1C, and 1E-1F can be included, either alone or in any combination, in the example of the devices, features, components, and parts shown in FIG. 1D.

FIG. 1E illustrates an exploded view of an example of a display unit 1-306 of a HMD. The display unit 1-306 can include a front display assembly 1-308, a frame/housing assembly 1-350, and a curtain assembly 1-324. The display unit 1-306 can also include a sensor assembly 1-356, logic board assembly 1-358, and cooling assembly 1-360 disposed between the frame assembly 1-350 and the front display assembly 1-308. In at least one example, the display unit 1-306 can also include a rear-facing display assembly 1-320 including first and second rear-facing display screens 1-322a, 1-322b disposed between the frame 1-350 and the curtain assembly 1-324.

In at least one example, the display unit 1-306 can also include a motor assembly 1-362 configured as an adjustment mechanism for adjusting the positions of the display screens 1-322a-b of the display assembly 1-320 relative to the frame 1-350. In at least one example, the display assembly 1-320 is mechanically coupled to the motor assembly 1-362, with at least one motor for each display screen 1-322a-b, such that the motors can translate the display screens 1-322a-b to match an interpupillary distance of the user's eyes.

In at least one example, the display unit 1-306 can include a dial or button 1-328 depressible relative to the frame 1-350 and accessible to the user outside the frame 1-350. The button 1-328 can be electronically connected to the motor assembly 1-362 via a controller such that the button 1-328 can be manipulated by the user to cause the motors of the motor assembly 1-362 to adjust the positions of the display screens 1-322a-b.

Any of the features, components, and/or parts, including the arrangements and configurations thereof shown in FIG. 1E can be included, either alone or in any combination, in any of the other examples of devices, features, components, and parts shown in FIGS. 1B-1D and 1F and described herein. Likewise, any of the features, components, and/or parts, including the arrangements and configurations thereof shown and described with reference to FIGS. 1B-1D and 1F can be included, either alone or in any combination, in the example of the devices, features, components, and parts shown in FIG. 1E.

FIG. 1F illustrates an exploded view of another example of a display unit 1-406 of a HMD device similar to other HMD devices described herein. The display unit 1-406 can include a front display assembly 1-402, a sensor assembly 1-456, a logic board assembly 1-458, a cooling assembly 1-460, a frame assembly 1-450, a rear-facing display assembly 1-421, and a curtain assembly 1-424. The display unit 1-406 can also include a motor assembly 1-462 for adjusting the positions of first and second display sub-assemblies 1-420a, 1-420b of the rear-facing display assembly 1-421, including first and second respective display screens for interpupillary adjustments, as described above.

The various parts, systems, and assemblies shown in the exploded view of FIG. 1F are described in greater detail herein with reference to FIGS. 1B-1E as well as subsequent figures referenced in the present disclosure. The display unit 1-406 shown in FIG. 1F can be assembled and integrated with the securement mechanisms shown in FIGS. 1B-1E, including the electronic straps, bands, and other components including light seals, connection assemblies, and so forth.

Any of the features, components, and/or parts, including the arrangements and configurations thereof shown in FIG. 1F can be included, either alone or in any combination, in any of the other examples of devices, features, components, and parts shown in FIGS. 1B-1E and described herein. Likewise, any of the features, components, and/or parts, including the arrangements and configurations thereof shown and described with reference to FIGS. 1B-1E can be included, either alone or in any combination, in the example of the devices, features, components, and parts shown in FIG. 1F.

FIG. 1G illustrates a perspective, exploded view of a front cover assembly 3-100 of an HMD device described herein, for example the front cover assembly 3-1 of the HMD 3-100 shown in FIG. 1G or any other HMD device shown and described herein. The front cover assembly 3-100 shown in FIG. 1G can include a transparent or semi-transparent cover 3-102, shroud 3-104 (or "canopy"), adhesive layers 3-106, display assembly 3-108 including a lenticular lens panel or array 3-110, and a structural trim 3-112. The adhesive layer 3-106 can secure the shroud 3-104 and/or transparent cover 3-102 to the display assembly 3-108 and/or the trim 3-112. The trim 3-112 can secure the various components of the front cover assembly 3-100 to a frame or chassis of the HMD device.

In at least one example, as shown in FIG. 1G, the transparent cover 3-102, shroud 3-104, and display assembly 3-108, including the lenticular lens array 3-110, can be curved to accommodate the curvature of a user's face. The transparent cover 3-102 and the shroud 3-104 can be curved in two or three dimensions, e.g., vertically curved in the Z-direction in and out of the Z-X plane and horizontally curved in the X-direction in and out of the Z-X plane. In at least one example, the display assembly 3-108 can include the lenticular lens array 3-110 as well as a display panel having pixels configured to project light through the shroud 3-104 and the transparent cover 3-102. The display assembly 3-108 can be curved in at least one direction, for example the horizontal direction, to accommodate the curvature of a user's face from one side (e.g., left side) of the face to the other (e.g., right side). In at least one example, each layer or component of the display assembly 3-108, which will be shown in subsequent figures and described in more detail, but which can include the lenticular lens array 3-110 and a display layer, can be similarly or concentrically curved in the horizontal direction to accommodate the curvature of the user's face.

In at least one example, the shroud 3-104 can include a transparent or semi-transparent material through which the display assembly 3-108 projects light. In one example, the shroud 3-104 can include one or more opaque portions, for example opaque ink-printed portions or other opaque film portions on the rear surface of the shroud 3-104. The rear surface can be the surface of the shroud 3-104 facing the user's eyes when the HMD device is donned. In at least one example, opaque portions can be on the front surface of the shroud 3-104 opposite the rear surface. In at least one example, the opaque portion or portions of the shroud 3-104 can include perimeter portions visually hiding any components around an outside perimeter of the display screen of the display assembly 3-108. In this way, the opaque portions of the shroud hide any other components, including electronic components, structural components, and so forth, of the HMD device that would otherwise be visible through the transparent or semi-transparent cover 3-102 and/or shroud 3-104.

In at least one example, the shroud 3-104 can define one or more apertures transparent portions 3-120 through which sensors can send and receive signals. In one example, the portions 3-120 are apertures through which the sensors can extend or send and receive signals. In one example, the portions 3-120 are transparent portions, or portions more transparent than surrounding semi-transparent or opaque portions of the shroud, through which sensors can send and receive signals through the shroud and through the transparent cover 3-102. In one example, the sensors can include cameras, IR sensors, LUX sensors, or any other visual or non-visual environmental sensors of the HMD device.

Any of the features, components, and/or parts, including the arrangements and configurations thereof shown in FIG. 1G can be included, either alone or in any combination, in any of the other examples of devices, features, components, and parts described herein. Likewise, any of the features, components, and/or parts, including the arrangements and configurations thereof shown and described herein can be included, either alone or in any combination, in the example of the devices, features, components, and parts shown in FIG. 1G.

FIG. 1H illustrates an exploded view of an example of an HMD device 6-100. The HMD device 6-100 can include a sensor array or system 6-102 including one or more sensors, cameras, projectors, and so forth mounted to one or more components of the HMD 6-100. In at least one example, the sensor system 6-102 can include a bracket 1-338 on which one or more sensors of the sensor system 6-102 can be fixed/secured.

FIG. 1I illustrates a portion of an HMD device 6-100 including a front transparent cover 6-104 and a sensor system 6-102. The sensor system 6-102 can include a number of different sensors, emitters, receivers, including cameras, IR sensors, projectors, and so forth. The transparent cover 6-104 is illustrated in front of the sensor system 6-102 to illustrate relative positions of the various sensors and emitters as well as the orientation of each sensor/emitter of the system 6-102. As referenced herein, "sideways," "side," "lateral," "horizontal," and other similar terms refer to orientations or directions as indicated by the X-axis shown in FIG. 1J. Terms such as "vertical," "up," "down," and similar terms refer to orientations or directions as indicated by the Z-axis shown in FIG. 1J. Terms such as "frontward," "rearward," "forward," backward," and similar terms refer to orientations or directions as indicated by the Y-axis shown in FIG. 1J.

In at least one example, the transparent cover 6-104 can define a front, external surface of the HMD device 6-100 and the sensor system 6-102, including the various sensors and components thereof, can be disposed behind the cover 6-104 in the Y-axis/direction. The cover 6-104 can be transparent or semi-transparent to allow light to pass through the cover 6-104, both light detected by the sensor system 6-102 and light emitted thereby.

As noted elsewhere herein, the HMD device 6-100 can include one or more controllers including processors for electrically coupling the various sensors and emitters of the sensor system 6-102 with one or more mother boards, processing units, and other electronic devices such as display screens and the like. In addition, as will be shown in more detail below with reference to other figures, the various sensors, emitters, and other components of the sensor system 6-102 can be coupled to various structural frame members, brackets, and so forth of the HMD device 6-100 not shown in FIG. 1I. FIG. 1I shows the components of the sensor system 6-102 unattached and un-coupled electrically from other components for the sake of illustrative clarity.

In at least one example, the device can include one or more controllers having processors configured to execute instructions stored on memory components electrically coupled to the processors. The instructions can include, or cause the processor to execute, one or more algorithms for self-correcting angles and positions of the various cameras described herein overtime with use as the initial positions, angles, or orientations of the cameras get bumped or deformed due to unintended drop events or other events.

In at least one example, the sensor system 6-102 can include one or more scene cameras 6-106. The system 6-102 can include two scene cameras 6-102 disposed on either side of the nasal bridge or arch of the HMD device 6-100 such that each of the two cameras 6-106 correspond generally in position with left and right eyes of the user behind the cover 6-103. In at least one example, the scene cameras 6-106 are oriented generally forward in the Y-direction to capture images in front of the user during use of the HMD 6-100. In at least one example, the scene cameras are color cameras and provide images and content for MR video pass through to the display screens facing the user's eyes when using the HMD device 6-100. The scene cameras 6-106 can also be used for environment and object reconstruction.

In at least one example, the sensor system 6-102 can include a first depth sensor 6-108 pointed generally forward in the Y-direction. In at least one example, the first depth sensor 6-108 can be used for environment and object reconstruction as well as user hand and body tracking. In at least one example, the sensor system 6-102 can include a second depth sensor 6-110 disposed centrally along the width (e.g., along the X-axis) of the HMD device 6-100. For example, the second depth sensor 6-110 can be disposed above the central nasal bridge or accommodating features over the nose of the user when donning the HMD 6-100. In at least one example, the second depth sensor 6-110 can be used for environment and object reconstruction as well as hand and body tracking. In at least one example, the second depth sensor can include a LIDAR sensor.

In at least one example, the sensor system 6-102 can include a depth projector 6-112 facing generally forward to project electromagnetic waves, for example in the form of a predetermined pattern of light dots, out into and within a field of view of the user and/or the scene cameras 6-106 or a field of view including and beyond the field of view of the user and/or scene cameras 6-106. In at least one example, the depth projector can project electromagnetic waves of light in the form of a dotted light pattern to be reflected off objects and back into the depth sensors noted above, including the depth sensors 6-108, 6-110. In at least one example, the depth projector 6-112 can be used for environment and object reconstruction as well as hand and body tracking.

In at least one example, the sensor system 6-102 can include downward facing cameras 6-114 with a field of view pointed generally downward relative to the HDM device 6-100 in the Z-axis. In at least one example, the downward cameras 6-114 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The downward cameras 6-114, for example, can be used to capture facial expressions and movements for the face of the user below the HMD device 6-100, including the cheeks, mouth, and chin.

In at least one example, the sensor system 6-102 can include jaw cameras 6-116. In at least one example, the jaw cameras 6-116 can be disposed on left and right sides of the HMD device 6-100 as shown and used for hand and body tracking, headset tracking, and facial avatar detection and creation for display a user avatar on the forward facing display screen of the HMD device 6-100 described elsewhere herein. The jaw cameras 6-116, for example, can be used to capture facial expressions and movements for the face of the user below the HMD device 6-100, including the user's jaw, cheeks, mouth, and chin. for hand and body tracking, headset tracking, and facial avatar In at least one example, the sensor system 6-102 can include side cameras 6-118. The side cameras 6-118 can be oriented to capture side views left and right in the X-axis or direction relative to the HMD device 6-100. In at least one example, the side cameras 6-118 can be used for hand and body tracking, headset tracking, and facial avatar detection and re-creation.

In at least one example, the sensor system 6-102 can include a plurality of eye tracking and gaze tracking sensors for determining an identity, status, and gaze direction of a user's eyes during and/or before use. In at least one example, the eye/gaze tracking sensors can include nasal eye cameras 6-120 disposed on either side of the user's nose and adjacent the user's nose when donning the HMD device 6-100. The eye/gaze sensors can also include bottom eye cameras 6-122 disposed below respective user eyes for capturing images of the eyes for facial avatar detection and creation, gaze tracking, and iris identification functions.

In at least one example, the sensor system 6-102 can include infrared illuminators 6-124 pointed outward from the HMD device 6-100 to illuminate the external environment and any object therein with IR light for IR detection with one or more IR sensors of the sensor system 6-102. In at least one example, the sensor system 6-102 can include a flicker sensor 6-126 and an ambient light sensor 6-128. In at least one example, the flicker sensor 6-126 can detect overhead light refresh rates to avoid display flicker. In one example, the infrared illuminators 6-124 can include light emitting diodes and can be used especially for low light environments for illuminating user hands and other objects in low light for detection by infrared sensors of the sensor system 6-102.

In at least one example, multiple sensors, including the scene cameras 6-106, the downward cameras 6-114, the jaw cameras 6-116, the side cameras 6-118, the depth projector 6-112, and the depth sensors 6-108, 6-110 can be used in combination with an electrically coupled controller to combine depth data with camera data for hand tracking and for size determination for better hand tracking and object recognition and tracking functions of the HMD device 6-100. In at least one example, the downward cameras 6-114, jaw cameras 6-116, and side cameras 6-118 described above and shown in FIG. 1I can be wide angle cameras operable in the visible and infrared spectrums. In at least one example, these cameras 6-114, 6-116, 6-118 can operate only in black and white light detection to simplify image processing and gain sensitivity.

Any of the features, components, and/or parts, including the arrangements and configurations thereof shown in FIG. 1I can be included, either alone or in any combination, in any of the other examples of devices, features, components, and parts shown in FIGS. 1J-1L and described herein. Likewise, any of the features, components, and/or parts, including the arrangements and configurations thereof shown and described with reference to FIGS. 1J-1L can be included, either alone or in any combination, in the example of the devices, features, components, and parts shown in FIG. 1I.

FIG. 1J illustrates a lower perspective view of an example of an HMD 6-200 including a cover or shroud 6-204 secured to a frame 6-230. In at least one example, the sensors 6-203 of the sensor system 6-202 can be disposed around a perimeter of the HDM 6-200 such that the sensors 6-203 are outwardly disposed around a perimeter of a display region or area 6-232 so as not to obstruct a view of the displayed light. In at least one example, the sensors can be disposed behind the shroud 6-204 and aligned with transparent portions of the shroud allowing sensors and projectors to allow light back and forth through the shroud 6-204. In at least one example, opaque ink or other opaque material or films/layers can be disposed on the shroud 6-204 around the display area 6-232 to hide components of the HMD 6-200 outside the display area 6-232 other than the transparent portions defined by the opaque portions, through which the sensors and projectors send and receive light and electromagnetic signals during operation. In at least one example, the shroud 6-204 allows light to pass therethrough from the display (e.g., within the display region 6-232) but not radially outward from the display region around the perimeter of the display and shroud 6-204.

In some examples, the shroud 6-204 includes a transparent portion 6-205 and an opaque portion 6-207, as described above and elsewhere herein. In at least one example, the opaque portion 6-207 of the shroud 6-204 can define one or more transparent regions 6-209 through which the sensors 6-203 of the sensor system 6-202 can send and receive signals. In the illustrated example, the sensors 6-203 of the sensor system 6-202 sending and receiving signals through the shroud 6-204, or more specifically through the transparent regions 6-209 of the (or defined by) the opaque portion 6-207 of the shroud 6-204 can include the same or similar sensors as those shown in the example of FIG. 1I, for example depth sensors 6-108 and 6-110, depth projector 6-112, first and second scene cameras 6-106, first and second downward cameras 6-114, first and second side cameras 6-118, and first and second infrared illuminators 6-124. These sensors are also shown in the examples of FIGS. 1K and 1L. Other sensors, sensor types, number of sensors, and relative positions thereof can be included in one or more other examples of HMDs.

Any of the features, components, and/or parts, including the arrangements and configurations thereof shown in FIG. 1J can be included, either alone or in any combination, in any of the other examples of devices, features, components, and parts shown in FIGS. 1I and 1K-1L and described herein. Likewise, any of the features, components, and/or parts, including the arrangements and configurations thereof shown and described with reference to FIGS. 1I and 1K-1L can be included, either alone or in any combination, in the example of the devices, features, components, and parts shown in FIG. 1J.

FIG. 1K illustrates a front view of a portion of an example of an HMD device 6-300 including a display 6-334, brackets 6-336, 6-338, and frame or housing 6-330. The example shown in FIG. 1K does not include a front cover or shroud in order to illustrate the brackets 6-336, 6-338. For example, the shroud 6-204 shown in FIG. 1J includes the opaque portion 6-207 that would visually cover/block a view of anything outside (e.g., radially/peripherally outside) the display/display region 6-334, including the sensors 6-303 and bracket 6-338.

In at least one example, the various sensors of the sensor system 6-302 are coupled to the brackets 6-336, 6-338. In at least one example, the scene cameras 6-306 include tight tolerances of angles relative to one another. For example, the tolerance of mounting angles between the two scene cameras 6-306 can be 0.5 degrees or less, for example 0.3 degrees or less. In order to achieve and maintain such a tight tolerance, in one example, the scene cameras 6-306 can be mounted to the bracket 6-338 and not the shroud. The bracket can include cantilevered arms on which the scene cameras 6-306 and other sensors of the sensor system 6-302 can be mounted to remain un-deformed in position and orientation in the case of a drop event by a user resulting in any deformation of the other bracket 6-226, housing 6-330, and/or shroud.

Any of the features, components, and/or parts, including the arrangements and configurations thereof shown in FIG. 1K can be included, either alone or in any combination, in any of the other examples of devices, features, components, and parts shown in FIGS. 1I-1J and 1L and described herein. Likewise, any of the features, components, and/or parts, including the arrangements and configurations thereof shown and described with reference to FIGS. 1I-1J and 1L can be included, either alone or in any combination, in the example of the devices, features, components, and parts shown in FIG. 1K.

FIG. 1L illustrates a bottom view of an example of an HMD 6-400 including a front display/cover assembly 6-404 and a sensor system 6-402. The sensor system 6-402 can be similar to other sensor systems described above and elsewhere herein, including in reference to FIGS. 1I-1K. In at least one example, the jaw cameras 6-416 can be facing downward to capture images of the user's lower facial features. In one example, the jaw cameras 6-416 can be coupled directly to the frame or housing 6-430 or one or more internal brackets directly coupled to the frame or housing 6-430 shown. The frame or housing 6-430 can include one or more apertures/openings 6-415 through which the jaw cameras 6-416 can send and receive signals.

Any of the features, components, and/or parts, including the arrangements and configurations thereof shown in FIG. 1L can be included, either alone or in any combination, in any of the other examples of devices, features, components, and parts shown in FIGS. 1I-1K and described herein. Likewise, any of the features, components, and/or parts, including the arrangements and configurations thereof shown and described with reference to FIGS. 1I-1K can be included, either alone or in any combination, in the example of the devices, features, components, and parts shown in FIG. 1L.

FIG. 1M illustrates a rear perspective view of an inter-pupillary distance (IPD) adjustment system 11.1.1-102 including first and second optical modules 11.1.1-104*a-b* slidably engaging/coupled to respective guide-rods 11.1.1-108*a-b* and motors 11.1.1-110*a-b* of left and right adjustment subsystems 11.1.1-106*a-b*. The IPD adjustment system 11.1.1-102 can be coupled to a bracket 11.1.1-112 and include a button 11.1.1-114 in electrical communication with the motors 11.1.1-110*a-b*. In at least one example, the button 11.1.1-114 can electrically communicate with the first and second motors 11.1.1-110*a-b* via a processor or other circuitry components to cause the first and second motors 11.1.1-110*a-b* to activate and cause the first and second optical modules 11.1.1-104*a-b*, respectively, to change position relative to one another.

In at least one example, the first and second optical modules 11.1.1-104*a-b* can include respective display screens configured to project light toward the user's eyes when donning the HMD 11.1.1-100. In at least one example, the user can manipulate (e.g., depress and/or rotate) the button 11.1.1-114 to activate a positional adjustment of the optical modules 11.1.1-104*a-b* to match the inter-pupillary distance of the user's eyes. The optical modules 11.1.1-104*a-b* can also include one or more cameras or other sensors/sensor systems for imaging and measuring the IPD of the user such that the optical modules 11.1.1-104*a-b* can be adjusted to match the IPD.

In one example, the user can manipulate the button 11.1.1-114 to cause an automatic positional adjustment of the first and second optical modules 11.1.1-104*a-b*. In one example, the user can manipulate the button 11.1.1-114 to cause a manual adjustment such that the optical modules 11.1.1-104*a-b* move further or closer away, for example when the user rotates the button 11.1.1-114 one way or the other, until the user visually matches her/his own IPD. In one example, the manual adjustment is electronically communicated via one or more circuits and power for the movements of the optical modules 11.1.1-104*a-b* via the motors 11.1.1-110*a-b* is provided by an electrical power source. In one example, the adjustment and movement of the optical modules 11.1.1-104*a-b* via a manipulation of the button 11.1.1-114 is mechanically actuated via the movement of the button 11.1.1-114.

Any of the features, components, and/or parts, including the arrangements and configurations thereof shown in FIG. 1M can be included, either alone or in any combination, in any of the other examples of devices, features, components, and parts shown in any other figures shown and described herein. Likewise, any of the features, components, and/or parts, including the arrangements and configurations thereof shown and described with reference to any other figure shown and described herein, either alone or in any combination, in the example of the devices, features, components, and parts shown in FIG. 1M.

FIG. 1N illustrates a front perspective view of a portion of an HMD 11.1.2-100, including an outer structural frame 11.1.2-102 and an inner or intermediate structural frame 11.1.2-104 defining first and second apertures 11.1.2-106*a*, 11.1.2-106*b*. The apertures 11.1.2-106*a-b* are shown in dotted lines in FIG. 1N because a view of the apertures 11.1.2-106*a-b* can be blocked by one or more other components of the HMD 11.1.2-100 coupled to the inner frame 11.1.2-104 and/or the outer frame 11.1.2-102, as shown. In at least one example, the HMD 11.1.2-100 can include a first mounting bracket 11.1.2-108 coupled to the inner frame 11.1.2-104. In at least one example, the mounting bracket 11.1.2-108 is coupled to the inner frame 11.1.2-104 between the first and second apertures 11.1.2-106*a-b*.

The mounting bracket 11.1.2-108 can include a middle or central portion 11.1.2-109 coupled to the inner frame 11.1.2-104. In some examples, the middle or central portion 11.1.2-109 may not be the geometric middle or center of the bracket 11.1.2-108. Rather, the middle/central portion 11.1.2-109 can be disposed between first and second cantilevered extension arms extending away from the middle portion 11.1.2-109. In at least one example, the mounting bracket 108 includes a first cantilever arm 11.1.2-112 and a second cantilever arm 11.1.2-114 extending away from the middle portion 11.1.2-109 of the mount bracket 11.1.2-108 coupled to the inner frame 11.1.2-104.

As shown in FIG. 1N, the outer frame 11.1.2-102 can define a curved geometry on a lower side thereof to accommodate a user's nose when the user dons the HMD 11.1.2-100. The curved geometry can be referred to as a nose bridge 11.1.2-111 and be centrally located on a lower side of the HMD 11.1.2-100 as shown. In at least one example, the mounting bracket 11.1.2-108 can be connected to the inner frame 11.1.2-104 between the apertures 11.1.2-106*a-b* such that the cantilevered arms 11.1.2-112, 11.1.2-114 extend downward and laterally outward away from the middle portion 11.1.2-109 to compliment the nose bridge 11.1.2-111 geometry of the outer frame 11.1.2-102. In this way, the mounting bracket 11.1.2-108 is configured to accommodate the user's nose as noted above. The nose bridge 11.1.2-111 geometry accommodates the nose in that the nose bridge 11.1.2-111 provides a curvature that curves with, above, over, and around the user's nose for comfort and fit.

The first cantilever arm 11.1.2-112 can extend away from the middle portion 11.1.2-109 of the mounting bracket 11.1.2-108 in a first direction and the second cantilever arm 11.1.2-114 can extend away from the middle portion 11.1.2-109 of the mounting bracket 11.1.2-10 in a second direction opposite the first direction. The first and second cantilever arms 11.1.2-112, 11.1.2-114 are referred to as "cantilevered" or "cantilever" arms because each arm 11.1.2-112, 11.1.2-114, includes a distal free end 11.1.2-116, 11.1.2-118, respectively, which are free of affixation from the inner and outer frames 11.1.2-102, 11.1.2-104. In this way, the arms 11.1.2-112, 11.1.2-114 are cantilevered from the middle portion 11.1.2-109, which can be connected to the inner frame 11.1.2-104, with distal ends 11.1.2-102, 11.1.2-104 unattached.

In at least one example, the HMD 11.1.2-100 can include one or more components coupled to the mounting bracket 11.1.2-108. In one example, the components include a plurality of sensors 11.1.2-110*a-f*. Each sensor of the plurality of sensors 11.1.2-110*a-f* can include various types of sensors, including cameras, IR sensors, and so forth. In some examples, one or more of the sensors 11.1.2-110*a-f* can be used for object recognition in three-dimensional space such that it is important to maintain a precise relative position of two or more of the plurality of sensors 11.1.2-110*a-f*. The cantilevered nature of the mounting bracket 11.1.2-108 can protect the sensors 11.1.2-110*a-f* from damage and altered positioning in the case of accidental drops by the user. Because the sensors 11.1.2-110*a-f* are cantilevered on the arms 11.1.2-112, 11.1.2-114 of the mounting bracket 11.1.2-108, stresses and deformations of the inner and/or outer frames 11.1.2-104, 11.1.2-102 are not transferred to the cantilevered arms 11.1.2-112, 11.1.2-114 and thus do not affect the relative positioning of the sensors 11.1.2-110*a-f* coupled/mounted to the mounting bracket 11.1.2-108.

Any of the features, components, and/or parts, including the arrangements and configurations thereof shown in FIG. 1N can be included, either alone or in any combination, in any of the other examples of devices, features, components, and described herein. Likewise, any of the features, components, and/or parts, including the arrangements and configurations thereof shown and described herein can be included, either alone or in any combination, in the example of the devices, features, components, and parts shown in FIG. 1N.

FIG. 10 illustrates an example of an optical module 11.3.2-100 for use in an electronic device such as an HMD, including HDM devices described herein. As shown in one or more other examples described herein, the optical module 11.3.2-100 can be one of two optical modules within an HMD, with each optical module aligned to project light toward a user's eye. In this way, a first optical module can project light via a display screen toward a user's first eye and a second optical module of the same device can project light via another display screen toward the user's second eye.

In at least one example, the optical module 11.3.2-100 can include an optical frame or housing 11.3.2-102, which can also be referred to as a barrel or optical module barrel. The optical module 11.3.2-100 can also include a display 11.3.2-104, including a display screen or multiple display screens, coupled to the housing 11.3.2-102. The display 11.3.2-104 can be coupled to the housing 11.3.2-102 such that the display 11.3.2-104 is configured to project light toward the eye of a user when the HMD of which the display module 11.3.2-100 is a part is donned during use. In at least one example, the housing 11.3.2-102 can surround the display 11.3.2-104 and provide connection features for coupling other components of optical modules described herein.

In one example, the optical module 11.3.2-100 can include one or more cameras 11.3.2-106 coupled to the housing 11.3.2-102. The camera 11.3.2-106 can be positioned relative to the display 11.3.2-104 and housing 11.3.2-102 such that the camera 11.3.2-106 is configured to capture one or more images of the user's eye during use. In at least one example, the optical module 11.3.2-100 can also include a light strip 11.3.2-108 surrounding the display 11.3.2-104. In one example, the light strip 11.3.2-108 is disposed between the display 11.3.2-104 and the camera 11.3.2-106. The light strip 11.3.2-108 can include a plurality of lights 11.3.2-110. The plurality of lights can include one or more light emitting diodes (LEDs) or other lights configured to project light toward the user's eye when the HMD is donned. The individual lights 11.3.2-110 of the light strip 11.3.2-108 can be spaced about the strip 11.3.2-108 and thus spaced about the display 11.3.2-104 uniformly or non-uniformly at various locations on the strip 11.3.2-108 and around the display 11.3.2-104.

In at least one example, the housing 11.3.2-102 defines a viewing opening 11.3.2-101 through which the user can view the display 11.3.2-104 when the HMD device is donned. In at least one example, the LEDs are configured and arranged to emit light through the viewing opening 11.3.2-101 and onto the user's eye. In one example, the camera 11.3.2-106 is configured to capture one or more images of the user's eye through the viewing opening 11.3.2-101.

As noted above, each of the components and features of the optical module 11.3.2-100 shown in FIG. 10 can be replicated in another (e.g., second) optical module disposed with the HMD to interact (e.g., project light and capture images) of another eye of the user.

Any of the features, components, and/or parts, including the arrangements and configurations thereof shown in FIG. 10 can be included, either alone or in any combination, in any of the other examples of devices, features, components, and parts shown in FIGS. 1A-1P or otherwise described herein. Likewise, any of the features, components, and/or parts, including the arrangements and configurations thereof shown and described with reference to FIGS. 1A-1P or otherwise described herein can be included, either alone or in any combination, in the example of the devices, features, components, and parts shown in FIG. 10.

FIG. 1P illustrates a cross-sectional view of an example of an optical module 11.3.2-200 including a housing 11.3.2-202, display assembly 11.3.2-204 coupled to the housing 11.3.2-202, and a lens 11.3.2-216 coupled to the housing 11.3.2-202. In at least one example, the housing 11.3.2-202 defines a first aperture or channel 11.3.2-212 and a second aperture or channel 11.3.2-214. The channels 11.3.2-212, 11.3.2-214 can be configured to slidably engage respective rails or guide rods of an HMD device to allow the optical module 11.3.2-200 to adjust in position relative to the user's eyes for match the user's interpapillary distance (IPD). The housing 11.3.2-202 can slidably engage the guide rods to secure the optical module 11.3.2-200 in place within the HMD.

In at least one example, the optical module 11.3.2-200 can also include a lens 11.3.2-216 coupled to the housing 11.3.2-202 and disposed between the display assembly 11.3.2-204 and the user's eyes when the HMD is donned. The lens 11.3.2-216 can be configured to direct light from the display assembly 11.3.2-204 to the user's eye. In at least one example, the lens 11.3.2-216 can be a part of a lens assembly including a corrective lens removably attached to the optical module 11.3.2-200. In at least one example, the lens 11.3.2-216 is disposed over the light strip 11.3.2-208 and the one or more eye-tracking cameras 11.3.2-206 such that the camera 11.3.2-206 is configured to capture images of the user's eye through the lens 11.3.2-216 and the light strip 11.3.2-208 includes lights configured to project light through the lens 11.3.2-216 to the users' eye during use.

Any of the features, components, and/or parts, including the arrangements and configurations thereof shown in FIG. 1P can be included, either alone or in any combination, in any of the other examples of devices, features, components, and parts and described herein. Likewise, any of the features, components, and/or parts, including the arrangements and configurations thereof shown and described herein can be included, either alone or in any combination, in the example of the devices, features, components, and parts shown in FIG. 1P.

Figure 2:
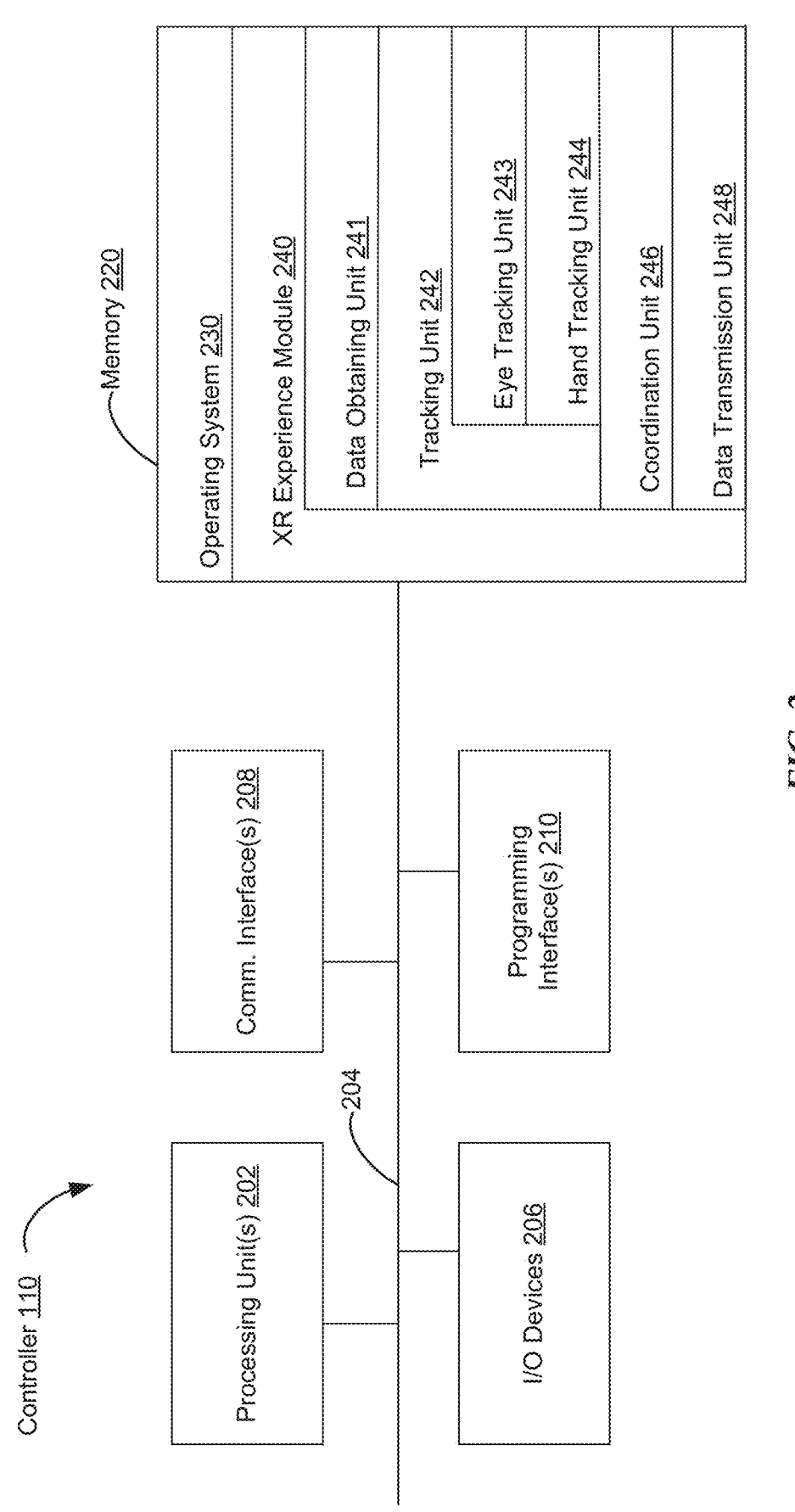
FIG. 2 is a block diagram illustrating a controller of a computer system that is configured to manage and coordinate a XR experience for the user in some embodiments.

FIG. 2 is a block diagram of an example of the controller 110 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some embodiments, the one or more communication buses 204 include circuitry that interconnects and controls communications between system components. In some embodiments, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some embodiments, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some embodiments, the memory 220 or the non-transitory computer readable storage medium of the memory 220 stores the following programs, modules and data structures, or a subset thereof including an optional operating system 230 and a XR experience module 240.

The operating system 230 includes instructions for handling various basic system services and for performing hardware dependent tasks. In some embodiments, the XR experience module 240 is configured to manage and coordinate one or more XR experiences for one or more users (e.g., a single XR experience for one or more users, or multiple XR experiences for respective groups of one or more users). To that end, in various embodiments, the XR experience module 240 includes a data obtaining unit 241, a tracking unit 242, a coordination unit 246, and a data transmitting unit 248.

In some embodiments, the data obtaining unit 241 is configured to obtain data (e.g., presentation data, interaction data, sensor data, location data, etc.) from at least the display generation component 120 of FIG. 1A, and optionally one or more of the input devices 125, output devices 155, sensors 190, and/or peripheral devices 195. To that end, in various embodiments, the data obtaining unit 241 includes instructions and/or logic therefor, and heuristics and metadata therefor.

In some embodiments, the tracking unit 242 is configured to map the scene 105 and to track the position/location of at least the display generation component 120 with respect to the scene 105 of FIG. 1A, and optionally, to one or more of the input devices 125, output devices 155, sensors 190, and/or peripheral devices 195. To that end, in various embodiments, the tracking unit 242 includes instructions and/or logic therefor, and heuristics and metadata therefor. In some embodiments, the tracking unit 242 includes hand tracking unit 244 and/or eye tracking unit 243. In some embodiments, the hand tracking unit 244 is configured to track the position/location of one or more portions of the user's hands, and/or motions of one or more portions of the user's hands with respect to the scene 105 of FIG. 1A, relative to the display generation component 120, and/or relative to a coordinate system defined relative to the user's hand. The hand tracking unit 244 is described in greater detail below with respect to FIG. 4. In some embodiments, the eye tracking unit 243 is configured to track the position and movement of the user's gaze (or more broadly, the user's eyes, face, or head) with respect to the scene 105 (e.g., with respect to the physical environment and/or to the user (e.g., the user's hand)) or with respect to the XR content displayed via the display generation component 120. The eye tracking unit 243 is described in greater detail below with respect to FIG. 5.

In some embodiments, the coordination unit 246 is configured to manage and coordinate the XR experience presented to the user by the display generation component 120, and optionally, by one or more of the output devices 155 and/or peripheral devices 195. To that end, in various embodiments, the coordination unit 246 includes instructions and/or logic therefor, and heuristics and metadata therefor.

In some embodiments, the data transmitting unit 248 is configured to transmit data (e.g., presentation data, location data, etc.) to at least the display generation component 120, and optionally, to one or more of the input devices 125, output devices 155, sensors 190, and/or peripheral devices 195. To that end, in various embodiments, the data transmitting unit 248 includes instructions and/or logic therefor, and heuristics and metadata therefor.

Although the data obtaining unit 241, the tracking unit 242 (e.g., including the eye tracking unit 243 and the hand tracking unit 244), the coordination unit 246, and the data transmitting unit 248 are shown as residing on a single device (e.g., the controller 110), it should be understood that in other embodiments, any combination of the data obtaining unit 241, the tracking unit 242 (e.g., including the eye tracking unit 243 and the hand tracking unit 244), the coordination unit 246, and the data transmitting unit 248 may be located in separate computing devices.

Moreover, FIG. 2 is intended more as functional description of the various features that may be present in a particular implementation as opposed to a structural schematic of the embodiments described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

Figure 3:
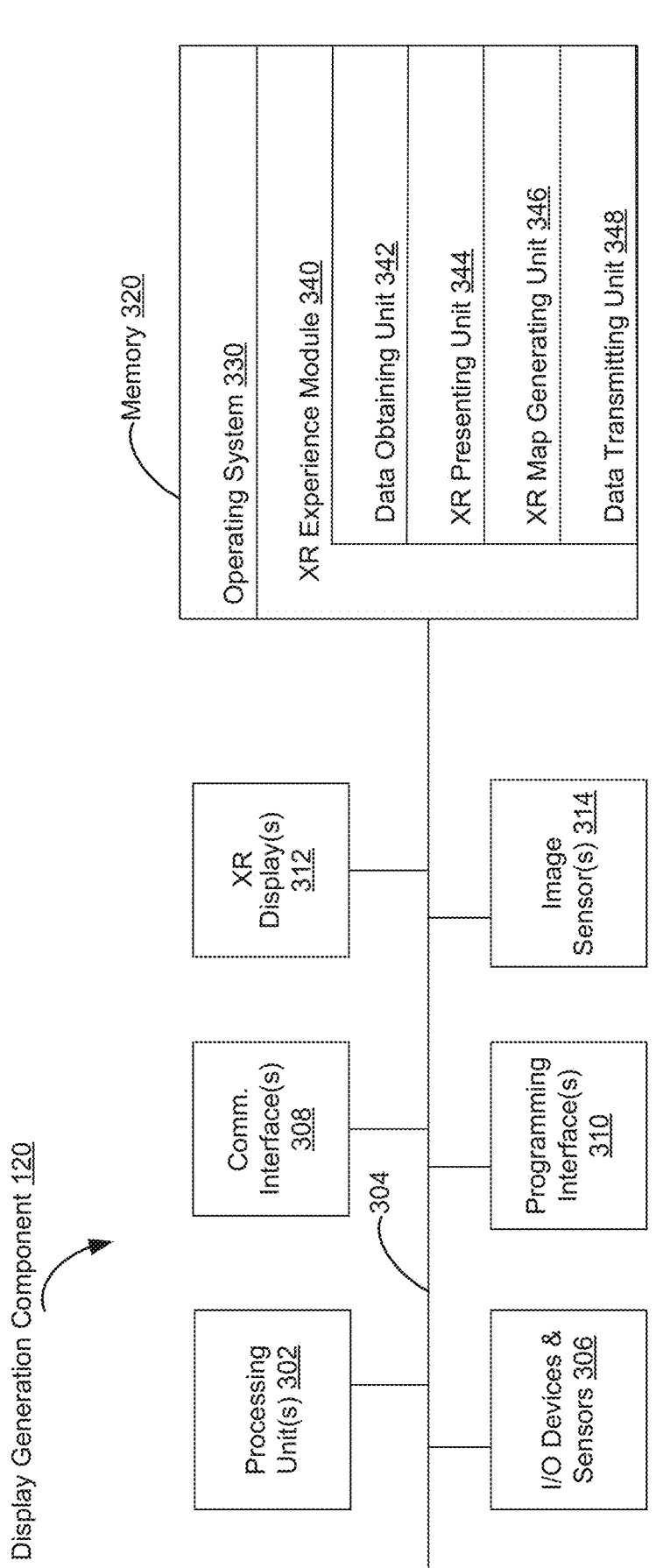
FIG. 3 is a block diagram illustrating a display generation component of a computer system that is configured to provide a visual component of the XR experience to the user in some embodiments.

FIG. 3 is a block diagram of an example of the display generation component 120 in some embodiments. While certain specific features are illustrated, those skilled in the art will appreciate from the present disclosure that various other features have not been illustrated for the sake of brevity, and so as not to obscure more pertinent aspects of the embodiments disclosed herein. To that end, as a non-limiting example, in some embodiments the display generation component 120 (e.g., HMD) includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some embodiments, the one or more communication buses 304 include circuitry that interconnects and controls communications between system components. In some embodiments, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some embodiments, the one or more XR displays 312 are configured to provide the XR experience to the user. In some embodiments, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some embodiments, the one or more XR displays 312 correspond to diffractive, reflective, polarized, holographic, etc. waveguide displays. For example, the display generation component 120 (e.g., HMD) includes a single XR display. In another example, the display generation component 120 includes a XR display for each eye of the user. In some embodiments, the one or more XR displays 312 are capable of presenting MR and VR content. In some embodiments, the one or more XR displays 312 are capable of presenting MR or VR content.

In some embodiments, the one or more image sensors 314 are configured to obtain image data that corresponds to at least a portion of the face of the user that includes the eyes of the user (and may be referred to as an eye-tracking camera). In some embodiments, the one or more image sensors 314 are configured to obtain image data that corresponds to at least a portion of the user's hand(s) and optionally arm(s) of the user (and may be referred to as a hand-tracking camera). In some embodiments, the one or more image sensors 314 are configured to be forward-facing so as to obtain image data that corresponds to the scene as would be viewed by the user if the display generation component 120 (e.g., HMD) was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some embodiments, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some embodiments, the memory 320 or the non-transitory computer readable storage medium of the memory 320 stores the following programs, modules and data structures, or a subset thereof including an optional operating system 330 and a XR presentation module 340.

The operating system 330 includes instructions for handling various basic system services and for performing hardware dependent tasks. In some embodiments, the XR presentation module 340 is configured to present XR content to the user via the one or more XR displays 312. To that end, in various embodiments, the XR presentation module 340 includes a data obtaining unit 342, a XR presenting unit 344, a XR map generating unit 346, and a data transmitting unit 348.

In some embodiments, the data obtaining unit 342 is configured to obtain data (e.g., presentation data, interaction data, sensor data, location data, etc.) from at least the controller 110 of FIG. 1A. To that end, in various embodiments, the data obtaining unit 342 includes instructions and/or logic therefor, and heuristics and metadata therefor.

In some embodiments, the XR presenting unit 344 is configured to present XR content via the one or more XR displays 312. To that end, in various embodiments, the XR presenting unit 344 includes instructions and/or logic therefor, and heuristics and metadata therefor.

In some embodiments, the XR map generating unit 346 is configured to generate a XR map (e.g., a 3D map of the mixed reality scene or a map of the physical environment into which computer-generated objects can be placed to generate the extended reality) based on media content data. To that end, in various embodiments, the XR map generating unit 346 includes instructions and/or logic therefor, and heuristics and metadata therefor.

In some embodiments, the data transmitting unit 348 is configured to transmit data (e.g., presentation data, location data, etc.) to at least the controller 110, and optionally one or more of the input devices 125, output devices 155, sensors 190, and/or peripheral devices 195. To that end, in various embodiments, the data transmitting unit 348 includes instructions and/or logic therefor, and heuristics and metadata therefor.

Although the data obtaining unit 342, the XR presenting unit 344, the XR map generating unit 346, and the data transmitting unit 348 are shown as residing on a single device (e.g., the display generation component 120 of FIG. 1A), it should be understood that in other embodiments, any combination of the data obtaining unit 342, the XR presenting unit 344, the XR map generating unit 346, and the data transmitting unit 348 may be located in separate computing devices.

Moreover, FIG. 3 is intended more as a functional description of the various features that could be present in a particular implementation as opposed to a structural schematic of the embodiments described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various embodiments. The actual number of modules and the division of particular functions and how features are allocated among them will vary from one implementation to another and, in some embodiments, depends in part on the particular combination of hardware, software, and/or firmware chosen for a particular implementation.

FIG. 4 is a schematic, pictorial illustration of an example embodiment of the hand tracking device 140. In some embodiments, hand tracking device 140 (FIG. 1A) is controlled by hand tracking unit 244 (FIG. 2) to track the position/location of one or more portions of the user's hands, and/or motions of one or more portions of the user's hands with respect to the scene 105 of FIG. 1A (e.g., with respect to a portion of the physical environment surrounding the user, with respect to the display generation component 120, or with respect to a portion of the user (e.g., the user's face, eyes, or head), and/or relative to a coordinate system defined relative to the user's hand). In some embodiments, the hand tracking device 140 is part of the display generation component 120 (e.g., embedded in or attached to a head-mounted device). In some embodiments, the hand tracking device 140 is separate from the display generation component 120 (e.g., located in separate housings or attached to separate physical support structures).

In some embodiments, the hand tracking device 140 includes image sensors 404 (e.g., one or more IR cameras, 3D cameras, depth cameras, and/or color cameras, etc.) that capture three-dimensional scene information that includes at least a hand 406 of a human user. The image sensors 404 capture the hand images with sufficient resolution to enable the fingers and their respective positions to be distinguished. The image sensors 404 typically capture images of other parts of the user's body, as well, or possibly all of the body, and may have either zoom capabilities or a dedicated sensor with enhanced magnification to capture images of the hand with the desired resolution. In some embodiments, the image sensors 404 also capture 2D color video images of the hand 406 and other elements of the scene. In some embodiments, the image sensors 404 are used in conjunction with other image sensors to capture the physical environment of the scene 105, or serve as the image sensors that capture the physical environments of the scene 105. In some embodiments, the image sensors 404 are positioned relative to the user or the user's environment in a way that a field of view of the image sensors or a portion thereof is used to define an interaction space in which hand movement captured by the image sensors are treated as inputs to the controller 110.

In some embodiments, the image sensors 404 output a sequence of frames containing 3D map data (and possibly color image data, as well) to the controller 110, which extracts high-level information from the map data. This high-level information is typically provided via an Application Program Interface (API) to an application running on the controller, which drives the display generation component 120 accordingly. For example, the user may interact with software running on the controller 110 by moving his hand 406 and changing his hand posture.

In some embodiments, the image sensors 404 project a pattern of spots onto a scene containing the hand 406 and capture an image of the projected pattern. In some embodiments, the controller 110 computes the 3D coordinates of points in the scene (including points on the surface of the user's hand) by triangulation, based on transverse shifts of the spots in the pattern. This approach is advantageous in that it does not require the user to hold or wear any sort of beacon, sensor, or other marker. It gives the depth coordinates of points in the scene relative to a predetermined reference plane, at a certain distance from the image sensors 404. In the present disclosure, the image sensors 404 are assumed to define an orthogonal set of x, y, z axes, so that depth coordinates of points in the scene correspond to z components measured by the image sensors. Alternatively, the image sensors 404 (e.g., a hand tracking device) may use other methods of 3D mapping, such as stereoscopic imaging or time-of-flight measurements, based on single or multiple cameras or other types of sensors.

In some embodiments, the hand tracking device 140 captures and processes a temporal sequence of depth maps containing the user's hand, while the user moves his hand (e.g., whole hand or one or more fingers). Software running on a processor in the image sensors 404 and/or the controller 110 processes the 3D map data to extract patch descriptors of the hand in these depth maps. The software matches these descriptors to patch descriptors stored in a database 408, based on a prior learning process, in order to estimate the pose of the hand in each frame. The pose typically includes 3D locations of the user's hand joints and finger tips.

The software may also analyze the trajectory of the hands and/or fingers over multiple frames in the sequence in order to identify gestures. The pose estimation functions described herein may be interleaved with motion tracking functions, so that patch-based pose estimation is performed only once in every two (or more) frames, while tracking is used to find changes in the pose that occur over the remaining frames. The pose, motion, and gesture information are provided via the above-mentioned API to an application program running on the controller 110. This program may, for example, move and modify images presented on the display generation component 120, or perform other functions, in response to the pose and/or gesture information.

In some embodiments, a gesture includes an air gesture. An air gesture is a gesture that is detected without the user touching (or independently of) an input element that is part of a device (e.g., computer system 101, one or more input device 125, and/or hand tracking device 140) and is based on detected motion of a portion (e.g., the head, one or more arms, one or more hands, one or more fingers, and/or one or more legs) of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments, input gestures used in the various examples and embodiments described herein include air gestures performed by movement of the user's finger(s) relative to other finger(s) (or part(s) of the user's hand) for interacting with an XR environment (e.g., a virtual or mixed-reality environment), in some embodiments. In some embodiments, an air gesture is a gesture that is detected without the user touching an input element that is part of the device (or independently of an input element that is a part of the device) and is based on detected motion of a portion of the user's body through the air including motion of the user's body relative to an absolute reference (e.g., an angle of the user's arm relative to the ground or a distance of the user's hand relative to the ground), relative to another portion of the user's body (e.g., movement of a hand of the user relative to a shoulder of the user, movement of one hand of the user relative to another hand of the user, and/or movement of a finger of the user relative to another finger or portion of a hand of the user), and/or absolute motion of a portion of the user's body (e.g., a tap gesture that includes movement of a hand in a predetermined pose by a predetermined amount and/or speed, or a shake gesture that includes a predetermined speed or amount of rotation of a portion of the user's body).

In some embodiments in which the input gesture is an air gesture (e.g., in the absence of physical contact with an input device that provides the computer system with information about which user interface element is the target of the user input, such as contact with a user interface element displayed on a touchscreen, or contact with a mouse or trackpad to move a cursor to the user interface element), the gesture takes into account the user's attention (e.g., gaze) to determine the target of the user input (e.g., for direct inputs, as described below). Thus, in implementations involving air gestures, the input gesture is, for example, detected attention (e.g., gaze) toward the user interface element in combination (e.g., concurrent) with movement of a user's finger(s) and/or hands to perform a pinch and/or tap input, as described in more detail below.

In some embodiments, input gestures that are directed to a user interface object are performed directly or indirectly with reference to a user interface object. For example, a user input is performed directly on the user interface object in accordance with performing the input gesture with the user's hand at a position that corresponds to the position of the user interface object in the three-dimensional environment (e.g., as determined based on a current viewpoint of the user). In some embodiments, the input gesture is performed indirectly on the user interface object in accordance with the user performing the input gesture while a position of the user's hand is not at the position that corresponds to the position of the user interface object in the three-dimensional environment while detecting the user's attention (e.g., gaze) on the user interface object. For example, for direct input gesture, the user is enabled to direct the user's input to the user interface object by initiating the gesture at, or near, a position corresponding to the displayed position of the user interface object (e.g., within 0.5 cm, 1 cm, 5 cm, or a distance between 0-5 cm, as measured from an outer edge of the option or a center portion of the option). For an indirect input gesture, the user is enabled to direct the user's input to the user interface object by paying attention to the user interface object (e.g., by gazing at the user interface object) and, while paying attention to the option, the user initiates the input gesture (e.g., at any position that is detectable by the computer system) (e.g., at a position that does not correspond to the displayed position of the user interface object).

In some embodiments, input gestures (e.g., air gestures) used in the various examples and embodiments described herein include pinch inputs and tap inputs, for interacting with a virtual or mixed-reality environment, in some embodiments. For example, the pinch inputs and tap inputs described below are performed as air gestures.

In some embodiments, a pinch input is part of an air gesture that includes one or more of: a pinch gesture, a long pinch gesture, a pinch and drag gesture, or a double pinch gesture. For example, a pinch gesture that is an air gesture includes movement of two or more fingers of a hand to make contact with one another, that is, optionally, followed by an immediate (e.g., within 0-1 seconds) break in contact from each other. A long pinch gesture that is an air gesture includes movement of two or more fingers of a hand to make contact with one another for at least a threshold amount of time (e.g., at least 1 second), before detecting a break in contact with one another. For example, a long pinch gesture includes the user holding a pinch gesture (e.g., with the two or more fingers making contact), and the long pinch gesture continues until a break in contact between the two or more fingers is detected. In some embodiments, a double pinch gesture that is an air gesture comprises two (e.g., or more) pinch inputs (e.g., performed by the same hand) detected in immediate (e.g., within a predefined time period) succession of each other. For example, the user performs a first pinch input (e.g., a pinch input or a long pinch input), releases the first pinch input (e.g., breaks contact between the two or more fingers), and performs a second pinch input within a predefined time period (e.g., within 1 second or within 2 seconds) after releasing the first pinch input.

In some embodiments, a pinch and drag gesture that is an air gesture includes a pinch gesture (e.g., a pinch gesture or a long pinch gesture) performed in conjunction with (e.g., followed by) a drag input that changes a position of the user's hand from a first position (e.g., a start position of the drag) to a second position (e.g., an end position of the drag). In some embodiments, the user maintains the pinch gesture while performing the drag input, and releases the pinch gesture (e.g., opens their two or more fingers) to end the drag gesture (e.g., at the second position). In some embodiments, the pinch input and the drag input are performed by the same hand (e.g., the user pinches two or more fingers to make contact with one another and moves the same hand to the second position in the air with the drag gesture). In some embodiments, the pinch input is performed by a first hand of the user and the drag input is performed by the second hand of the user (e.g., the user's second hand moves from the first position to the second position in the air while the user continues the pinch input with the user's first hand). In some embodiments, an input gesture that is an air gesture includes inputs (e.g., pinch and/or tap inputs) performed using both of the user's two hands. For example, the input gesture includes two (e.g., or more) pinch inputs performed in conjunction with (e.g., concurrently with, or within a predefined time period of) each other. For example, a first pinch gesture performed using a first hand of the user (e.g., a pinch input, a long pinch input, or a pinch and drag input), and, in conjunction with performing the pinch input using the first hand, performing a second pinch input using the other hand (e.g., the second hand of the user's two hands). In some embodiments, movement between the user's two hands (e.g., to increase and/or decrease a distance or relative orientation between the user's two hands).

In some embodiments, a tap input (e.g., directed to a user interface element) performed as an air gesture includes movement of a user's finger(s) toward the user interface element, movement of the user's hand toward the user interface element optionally with the user's finger(s) extended toward the user interface element, a downward motion of a user's finger (e.g., mimicking a mouse click motion or a tap on a touchscreen), or other predefined movement of the user's hand. In some embodiments a tap input that is performed as an air gesture is detected based on movement characteristics of the finger or hand performing the tap gesture movement of a finger or hand away from the viewpoint of the user and/or toward an object that is the target of the tap input followed by an end of the movement. In some embodiments the end of the movement is detected based on a change in movement characteristics of the finger or hand performing the tap gesture (e.g., an end of movement away from the viewpoint of the user and/or toward the object that is the target of the tap input, a reversal of direction of movement of the finger or hand, and/or a reversal of a direction of acceleration of movement of the finger or hand).

In some embodiments, attention of a user is determined to be directed to a portion of the three-dimensional environment based on detection of gaze directed to the portion of the three-dimensional environment (optionally, without requiring other conditions). In some embodiments, attention of a user is determined to be directed to a portion of the three-dimensional environment based on detection of gaze directed to the portion of the three-dimensional environment with one or more additional conditions such as requiring that gaze is directed to the portion of the three-dimensional environment for at least a threshold duration (e.g., a dwell duration) and/or requiring that the gaze is directed to the portion of the three-dimensional environment while the viewpoint of the user is within a distance threshold from the portion of the three-dimensional environment in order for the device to determine that attention of the user is directed to the portion of the three-dimensional environment, where if one of the additional conditions is not met, the device determines that attention is not directed to the portion of the three-dimensional environment toward which gaze is directed (e.g., until the one or more additional conditions are met).

In some embodiments, the detection of a ready state configuration of a user or a portion of a user is detected by the computer system. Detection of a ready state configuration of a hand is used by a computer system as an indication that the user is likely preparing to interact with the computer system using one or more air gesture inputs performed by the hand (e.g., a pinch, tap, pinch and drag, double pinch, long pinch, or other air gesture described herein). For example, the ready state of the hand is determined based on whether the hand has a predetermined hand shape (e.g., a pre-pinch shape with a thumb and one or more fingers extended and spaced apart ready to make a pinch or grab gesture or a pre-tap with one or more fingers extended and palm facing away from the user), based on whether the hand is in a predetermined position relative to a viewpoint of the user (e.g., below the user's head and above the user's waist and extended out from the body by at least 15, 20, 25, 30, or 50 cm), and/or based on whether the hand has moved in a particular manner (e.g., moved toward a region in front of the user above the user's waist and below the user's head or moved away from the user's body or leg). In some embodiments, the ready state is used to determine whether interactive elements of the user interface respond to attention (e.g., gaze) inputs.

In scenarios where inputs are described with reference to air gestures, it should be understood that similar gestures could be detected using a hardware input device that is attached to or held by one or more hands of a user, where the position of the hardware input device in space can be tracked using optical tracking, one or more accelerometers, one or more gyroscopes, one or more magnetometers, and/or one or more inertial measurement units and the position and/or movement of the hardware input device is used in place of the position and/or movement of the one or more hands in the corresponding air gesture(s). In scenarios where inputs are described with reference to air gestures, it should be understood that similar gestures could be detected using a hardware input device that is attached to or held by one or more hands of a user. User inputs can be detected with controls contained in the hardware input device such as one or more touch-sensitive input elements, one or more pressure-sensitive input elements, one or more buttons, one or more knobs, one or more dials, one or more joysticks, one or more hand or finger coverings that can detect a position or change in position of portions of a hand and/or fingers relative to each other, relative to the user's body, and/or relative to a physical environment of the user, and/or other hardware input device controls, where the user inputs with the controls contained in the hardware input device are used in place of hand and/or finger gestures such as air taps or air pinches in the corresponding air gesture(s). For example, a selection input that is described as being performed with an air tap or air pinch input could be alternatively detected with a button press, a tap on a touch-sensitive surface, a press on a pressure-sensitive surface, or other hardware input. As another example, a movement input that is described as being performed with an air pinch and drag could be alternatively detected based on an interaction with the hardware input control such as a button press and hold, a touch on a touch-sensitive surface, a press on a pressure-sensitive surface, or other hardware input that is followed by movement of the hardware input device (e.g., along with the hand with which the hardware input device is associated) through space. Similarly, a two-handed input that includes movement of the hands relative to each other could be performed with one air gesture and one hardware input device in the hand that is not performing the air gesture, two hardware input devices held in different hands, or two air gestures performed by different hands using various combinations of air gestures and/or the inputs detected by one or more hardware input devices that are described above.

In some embodiments, the software may be downloaded to the controller 110 in electronic form, over a network, for example, or it may alternatively be provided on tangible, non-transitory media, such as optical, magnetic, or electronic memory media. In some embodiments, the database 408 is likewise stored in a memory associated with the controller 110. Alternatively or additionally, some or all of the described functions of the computer may be implemented in dedicated hardware, such as a custom or semi-custom integrated circuit or a programmable digital signal processor (DSP). Although the controller 110 is shown in FIG. 4, by way of example, as a separate unit from the image sensors 404, some or all of the processing functions of the controller may be performed by a suitable microprocessor and software or by dedicated circuitry within the housing of the image sensors 404 (e.g., a hand tracking device) or otherwise associated with the image sensors 404. In some embodiments, at least some of these processing functions may be carried out by a suitable processor that is integrated with the display generation component 120 (e.g., in a television set, a handheld device, or head-mounted device, for example) or with any other suitable computerized device, such as a game console or media player. The sensing functions of image sensors 404 may likewise be integrated into the computer or other computerized apparatus that is to be controlled by the sensor output.

FIG. 4 further includes a schematic representation of a depth map 410 captured by the image sensors 404, in some embodiments. The depth map, as explained above, comprises a matrix of pixels having respective depth values. The pixels 412 corresponding to the hand 406 have been segmented out from the background and the wrist in this map. The brightness of each pixel within the depth map 410 corresponds inversely to its depth value, i.e., the measured z distance from the image sensors 404, with the shade of gray growing darker with increasing depth. The controller 110 processes these depth values in order to identify and segment a component of the image (i.e., a group of neighboring pixels) having characteristics of a human hand. These characteristics, may include, for example, overall size, shape and motion from frame to frame of the sequence of depth maps.

FIG. 4 also schematically illustrates a hand skeleton 414 that controller 110 ultimately extracts from the depth map 410 of the hand 406, in some embodiments. In FIG. 4, the hand skeleton 414 is superimposed on a hand background 416 that has been segmented from the original depth map. In some embodiments, key feature points of the hand (e.g., points corresponding to knuckles, finger tips, center of the palm, end of the hand connecting to wrist, etc.) and optionally on the wrist or arm connected to the hand are identified and located on the hand skeleton 414. In some embodiments, location and movements of these key feature points over multiple image frames are used by the controller 110 to determine the hand gestures performed by the hand or the current state of the hand, in some embodiments.

Figure 5:
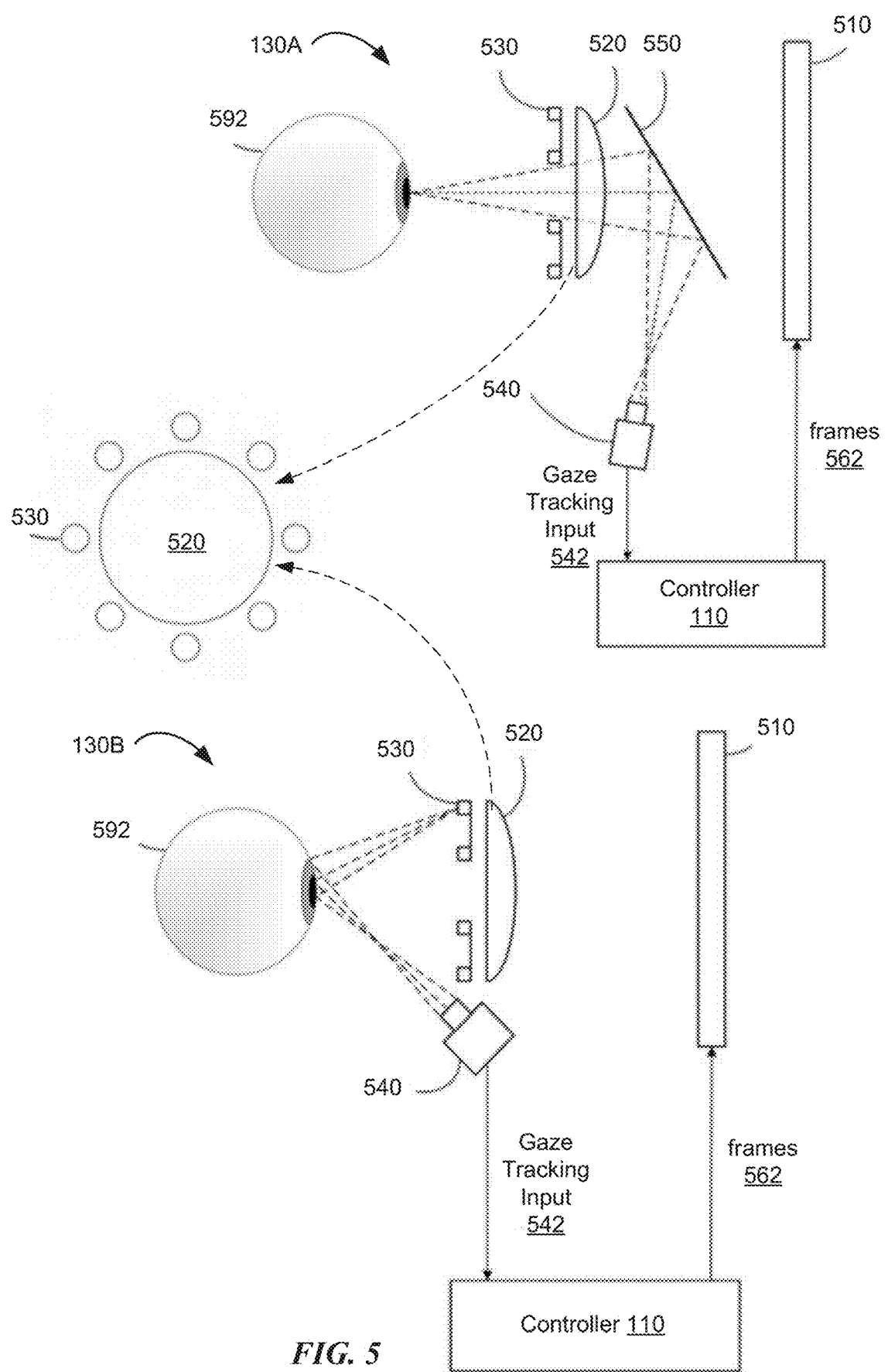
FIG. 5 is a block diagram illustrating an eye tracking unit of a computer system that is configured to capture gaze inputs of the user in some embodiments.

FIG. 5 illustrates an example embodiment of the eye tracking device 130 (FIG. 1A). In some embodiments, the eye tracking device 130 is controlled by the eye tracking unit 243 (FIG. 2) to track the position and movement of the user's gaze with respect to the scene 105 or with respect to the XR content displayed via the display generation component 120. In some embodiments, the eye tracking device 130 is integrated with the display generation component 120. For example, in some embodiments, when the display generation component 120 is a head-mounted device such as headset, helmet, goggles, or glasses, or a handheld device placed in a wearable frame, the head-mounted device includes both a component that generates the XR content for viewing by the user and a component for tracking the gaze of the user relative to the XR content. In some embodiments, the eye tracking device 130 is separate from the display generation component 120. For example, when display generation component is a handheld device or a XR chamber, the eye tracking device 130 is optionally a separate device from the handheld device or XR chamber. In some embodiments, the eye tracking device 130 is a head-mounted device or part of a head-mounted device. In some embodiments, the head-mounted eye-tracking device 130 is optionally used in conjunction with a display generation component that is also head-mounted, or a display generation component that is not head-mounted. In some embodiments, the eye tracking device 130 is not a head-mounted device, and is optionally used in conjunction with a head-mounted display generation component. In some embodiments, the eye tracking device 130 is not a head-mounted device, and is optionally part of a non-head-mounted display generation component.

In some embodiments, the display generation component 120 uses a display mechanism (e.g., left and right near-eye display panels) for displaying frames including left and right images in front of a user's eyes to thus provide 3D virtual views to the user. For example, a head-mounted display generation component may include left and right optical lenses (referred to herein as eye lenses) located between the display and the user's eyes. In some embodiments, the display generation component may include or be coupled to one or more external video cameras that capture video of the user's environment for display. In some embodiments, a head-mounted display generation component may have a transparent or semi-transparent display through which a user may view the physical environment directly and display virtual objects on the transparent or semi-transparent display. In some embodiments, display generation component projects virtual objects into the physical environment. The virtual objects may be projected, for example, on a physical surface or as a holograph, so that an individual, using the system, observes the virtual objects superimposed over the physical environment. In such cases, separate display panels and image frames for the left and right eyes may not be necessary.

As shown in FIG. 5, in some embodiments, eye tracking device 130 (e.g., a gaze tracking device) includes at least one eye tracking camera (e.g., infrared (IR) or near-IR (NIR) cameras), and illumination sources (e.g., IR or NIR light sources such as an array or ring of LEDs) that emit light (e.g., IR or NIR light) towards the user's eyes. The eye tracking cameras may be pointed towards the user's eyes to receive reflected IR or NIR light from the light sources directly from the eyes, or alternatively may be pointed towards "hot" mirrors located between the user's eyes and the display panels that reflect IR or NIR light from the eyes to the eye tracking cameras while allowing visible light to pass. The eye tracking device 130 optionally captures images of the user's eyes (e.g., as a video stream captured at 60-120 frames per second (fps)), analyze the images to generate gaze tracking information, and communicate the gaze tracking information to the controller 110. In some embodiments, two eyes of the user are separately tracked by respective eye tracking cameras and illumination sources. In some embodiments, only one eye of the user is tracked by a respective eye tracking camera and illumination sources.

In some embodiments, the eye tracking device 130 is calibrated using a device-specific calibration process to determine parameters of the eye tracking device for the specific operating environment 100, for example the 3D geometric relationship and parameters of the LEDs, cameras, hot mirrors (if present), eye lenses, and display screen. The device-specific calibration process may be performed at the factory or another facility prior to delivery of the AR/VR equipment to the end user. The device-specific calibration process may be an automated calibration process or a manual calibration process. A user-specific calibration process may include an estimation of a specific user's eye parameters, for example the pupil location, fovea location, optical axis, visual axis, eye spacing, etc. Once the device-specific and user-specific parameters are determined for the eye tracking device 130, images captured by the eye tracking cameras can be processed using a glint-assisted method to determine the current visual axis and point of gaze of the user with respect to the display, in some embodiments.

As shown in FIG. 5, the eye tracking device 130 (e.g., 130A or 130B) includes eye lens(es) 520, and a gaze tracking system that includes at least one eye tracking camera 540 (e.g., infrared (IR) or near-IR (NIR) cameras) positioned on a side of the user's face for which eye tracking is performed, and an illumination source 530 (e.g., IR or NIR light sources such as an array or ring of NIR light-emitting diodes (LEDs)) that emit light (e.g., IR or NIR light) towards the user's eye(s) 592. The eye tracking cameras 540 may be pointed towards mirrors 550 located between the user's eye(s) 592 and a display 510 (e.g., a left or right display panel of a head-mounted display, or a display of a handheld device, a projector, etc.) that reflect IR or NIR light from the eye(s) 592 while allowing visible light to pass (e.g., as shown in the top portion of FIG. 5), or alternatively may be pointed towards the user's eye(s) 592 to receive reflected IR or NIR light from the eye(s) 592 (e.g., as shown in the bottom portion of FIG. 5).

In some embodiments, the controller 110 renders AR or VR frames 562 (e.g., left and right frames for left and right display panels) and provides the frames 562 to the display 510. The controller 110 uses gaze tracking input 542 from the eye tracking cameras 540 for various purposes, for example in processing the frames 562 for display. The controller 110 optionally estimates the user's point of gaze on the display 510 based on the gaze tracking input 542 obtained from the eye tracking cameras 540 using the glint-assisted methods or other suitable methods. The point of gaze estimated from the gaze tracking input 542 is optionally used to determine the direction in which the user is currently looking.

The following describes several possible use cases for the user's current gaze direction, and is not intended to be limiting. As an example use case, the controller 110 may render virtual content differently based on the determined direction of the user's gaze. For example, the controller 110 may generate virtual content at a higher resolution in a foveal region determined from the user's current gaze direction than in peripheral regions. As another example, the controller may position or move virtual content in the view based at least in part on the user's current gaze direction. As another example, the controller may display particular virtual content in the view based at least in part on the user's current gaze direction. As another example use case in AR applications, the controller 110 may direct external cameras for capturing the physical environments of the XR experience to focus in the determined direction. The autofocus mechanism of the external cameras may then focus on an object or surface in the environment that the user is currently looking at on the display 510. As another example use case, the eye lenses 520 may be focusable lenses, and the gaze tracking information is used by the controller to adjust the focus of the eye lenses 520 so that the virtual object that the user is currently looking at has the proper vergence to match the convergence of the user's eyes 592. The controller 110 may leverage the gaze tracking information to direct the eye lenses 520 to adjust focus so that close objects that the user is looking at appear at the right distance.

In some embodiments, the eye tracking device is part of a head-mounted device that includes a display (e.g., display 510), two eye lenses (e.g., eye lens(es) 520), eye tracking cameras (e.g., eye tracking camera(s) 540), and light sources (e.g., illumination sources 530 (e.g., IR or NIR LEDs)), mounted in a wearable housing. The light sources emit light (e.g., IR or NIR light) towards the user's eye(s) 592. In some embodiments, the illumination sources may be arranged in rings or circles around each of the lenses as shown in FIG. 5. In some embodiments, eight illumination sources 530 (e.g., LEDs) are arranged around each lens 520 as an example. However, more or fewer illumination sources 530 may be used, and other arrangements and locations of light sources 530 may be used.

In some embodiments, the display 510 emits light in the visible light range and does not emit light in the IR or NIR range, and thus does not introduce noise in the gaze tracking system. Note that the location and angle of eye tracking camera(s) 540 is given by way of example, and is not intended to be limiting. In some embodiments, a single eye tracking camera 540 is located on each side of the user's face. In some embodiments, two or more NIR cameras 540 may be used on each side of the user's face. In some embodiments, a camera 540 with a wider field of view (FOV) and a camera 540 with a narrower FOV may be used on each side of the user's face. In some embodiments, a camera 540 that operates at one wavelength (e.g., 850 nm) and a camera 540 that operates at a different wavelength (e.g., 940 nm) may be used on each side of the user's face.

Embodiments of the gaze tracking system as illustrated in FIG. 5 may, for example, be used in computer-generated reality, virtual reality, and/or mixed reality applications to provide computer-generated reality, virtual reality, augmented reality, and/or augmented virtuality experiences to the user.

Figure 6:
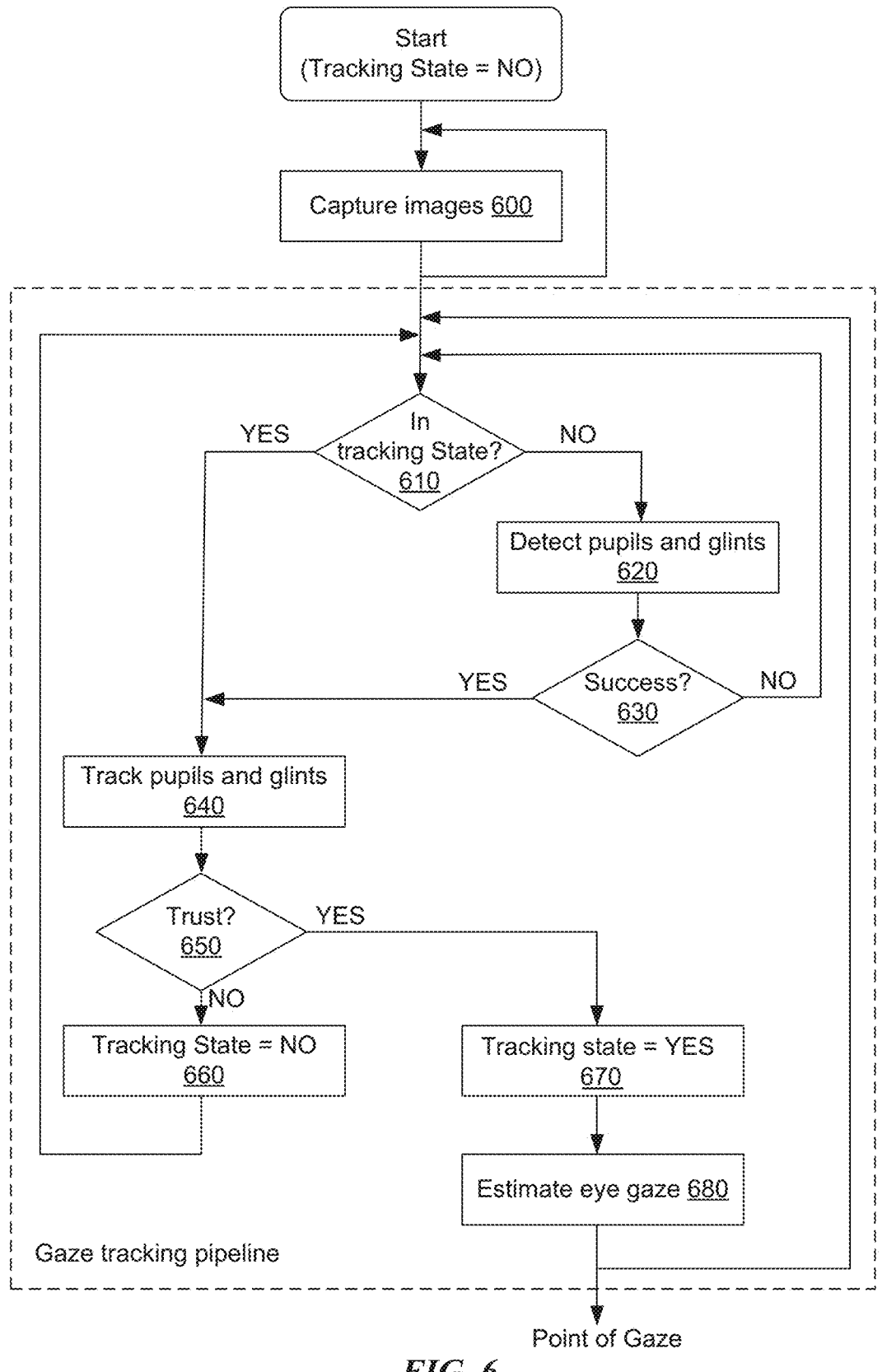
FIG. 6 is a flow diagram illustrating a glint-assisted gaze tracking pipeline in some embodiments.
Figure 7A:
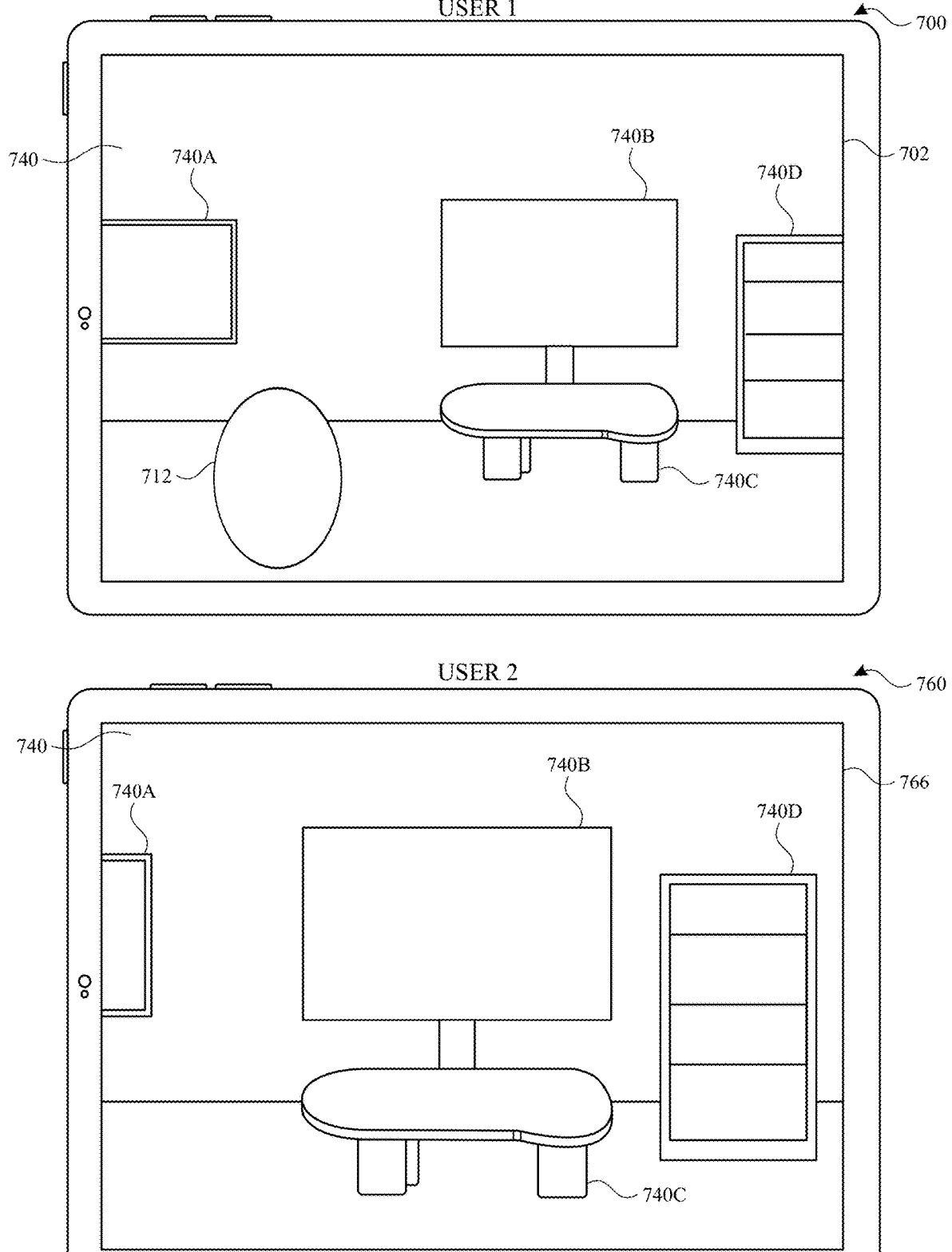
FIGS. 7A-7N illustrate example techniques for managing content sharing in three-dimensional environments, in some embodiments.
Figure 712:
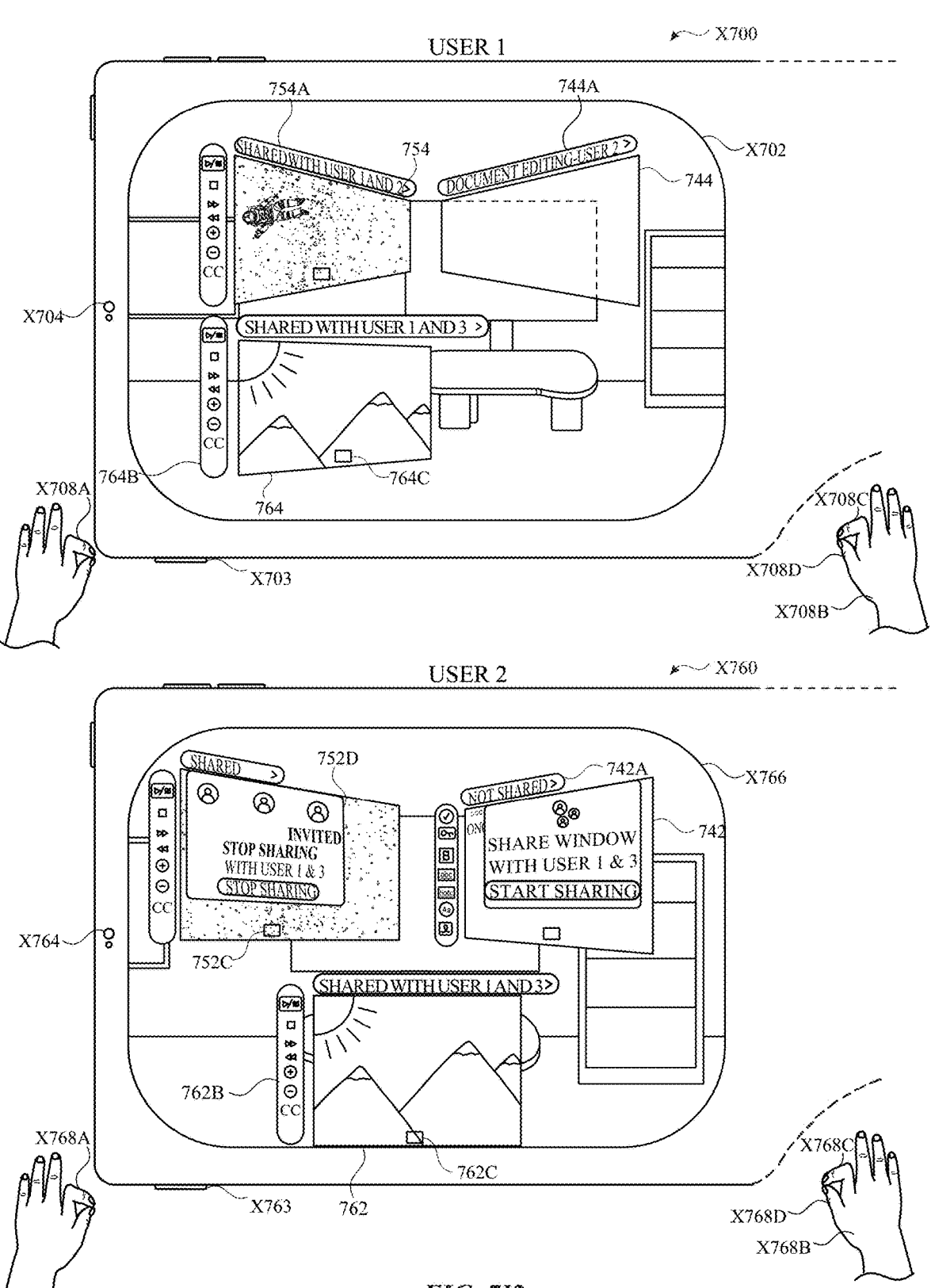

FIG. 6 illustrates a glint-assisted gaze tracking pipeline, in some embodiments. In some embodiments, the gaze tracking pipeline is implemented by a glint-assisted gaze tracking system (e.g., eye tracking device 130 as illustrated in FIGS. 1A and 5). The glint-assisted gaze tracking system may maintain a tracking state. Initially, the tracking state is off or "NO". When in the tracking state, the glint-assisted gaze tracking system uses prior information from the previous frame when analyzing the current frame to track the pupil contour and glints in the current frame. When not in the tracking state, the glint-assisted gaze tracking system attempts to detect the pupil and glints in the current frame and, if successful, initializes the tracking state to "YES" and continues with the next frame in the tracking state.

As shown in FIG. 6, the gaze tracking cameras may capture left and right images of the user's left and right eyes. The captured images are then input to a gaze tracking pipeline for processing beginning at 610. As indicated by the arrow returning to element 600, the gaze tracking system may continue to capture images of the user's eyes, for example at a rate of 60 to 120 frames per second. In some embodiments, each set of captured images may be input to the pipeline for processing. However, in some embodiments or under some conditions, not all captured frames are processed by the pipeline.

At 610, for the current captured images, if the tracking state is YES, then the method proceeds to element 640. At 610, if the tracking state is NO, then as indicated at 620 the images are analyzed to detect the user's pupils and glints in the images. At 630, if the pupils and glints are successfully detected, then the method proceeds to element 640. Otherwise, the method returns to element 610 to process next images of the user's eyes.

At 640, if proceeding from element 610, the current frames are analyzed to track the pupils and glints based in part on prior information from the previous frames. At 640, if proceeding from element 630, the tracking state is initialized based on the detected pupils and glints in the current frames. Results of processing at element 640 are checked to verify that the results of tracking or detection can be trusted. For example, results may be checked to determine if the pupil and a sufficient number of glints to perform gaze estimation are successfully tracked or detected in the current frames. At 650, if the results cannot be trusted, then the tracking state is set to NO at element 660, and the method returns to element 610 to process next images of the user's eyes. At 650, if the results are trusted, then the method proceeds to element 670. At 670, the tracking state is set to YES (if not already YES), and the pupil and glint information is passed to element 680 to estimate the user's point of gaze.

FIG. 6 is intended to serve as one example of eye tracking technology that may be used in a particular implementation. As recognized by those of ordinary skill in the art, other eye tracking technologies that currently exist or are developed in the future may be used in place of or in combination with the glint-assisted eye tracking technology describe herein in the computer system 101 for providing XR experiences to users, in accordance with various embodiments.

In some embodiments, the captured portions of real world environment 602 are used to provide a XR experience to the user, for example, a mixed reality environment in which one or more virtual objects are superimposed over representations of real world environment 602.

Thus, the description herein describes some embodiments of three-dimensional environments (e.g., XR environments) that include representations of real world objects and representations of virtual objects. For example, a three-dimensional environment optionally includes a representation of a table that exists in the physical environment, which is captured and displayed in the three-dimensional environment (e.g., actively via cameras and displays of a computer system, or passively via a transparent or translucent display of the computer system). As described previously, the three-dimensional environment is optionally a mixed reality system in which the three-dimensional environment is based on the physical environment that is captured by one or more sensors of the computer system and displayed via a display generation component. As a mixed reality system, the computer system is optionally able to selectively display portions and/or objects of the physical environment such that the respective portions and/or objects of the physical environment appear as if they exist in the three-dimensional environment displayed by the computer system. Similarly, the computer system is optionally able to display virtual objects in the three-dimensional environment to appear as if the virtual objects exist in the real world (e.g., physical environment) by placing the virtual objects at respective locations in the three-dimensional environment that have corresponding locations in the real world. For example, the computer system optionally displays a vase such that it appears as if a real vase is placed on top of a table in the physical environment. In some embodiments, a respective location in the three-dimensional environment has a corresponding location in the physical environment. Thus, when the computer system is described as displaying a virtual object at a respective location with respect to a physical object (e.g., such as a location at or near the hand of the user, or at or near a physical table), the computer system displays the virtual object at a particular location in the three-dimensional environment such that it appears as if the virtual object is at or near the physical object in the physical world (e.g., the virtual object is displayed at a location in the three-dimensional environment that corresponds to a location in the physical environment at which the virtual object would be displayed if it were a real object at that particular location).

In some embodiments, real world objects that exist in the physical environment that are displayed in the three-dimensional environment (e.g., and/or visible via the display generation component) can interact with virtual objects that exist only in the three-dimensional environment. For example, a three-dimensional environment can include a table and a vase placed on top of the table, with the table being a view of (or a representation of) a physical table in the physical environment, and the vase being a virtual object.

In a three-dimensional environment (e.g., a real environment, a virtual environment, or an environment that includes a mix of real and virtual objects), objects are sometimes referred to as having a depth or simulated depth, or objects are referred to as being visible, displayed, or placed at different depths. In this context, depth refers to a dimension other than height or width. In some embodiments, depth is defined relative to a fixed set of coordinates (e.g., where a room or an object has a height, depth, and width defined relative to the fixed set of coordinates). In some embodiments, depth is defined relative to a location or viewpoint of a user, in which case, the depth dimension varies based on the location of the user and/or the location and angle of the viewpoint of the user. In some embodiments where depth is defined relative to a location of a user that is positioned relative to a surface of an environment (e.g., a floor of an environment, or a surface of the ground), objects that are further away from the user along a line that extends parallel to the surface are considered to have a greater depth in the environment, and/or the depth of an object is measured along an axis that extends outward from a location of the user and is parallel to the surface of the environment (e.g., depth is defined in a cylindrical or substantially cylindrical coordinate system with the position of the user at the center of the cylinder that extends from a head of the user toward feet of the user). In some embodiments where depth is defined relative to viewpoint of a user (e.g., a direction relative to a point in space that determines which portion of an environment that is visible via a head mounted device or other display), objects that are further away from the viewpoint of the user along a line that extends parallel to the direction of the viewpoint of the user are considered to have a greater depth in the environment, and/or the depth of an object is measured along an axis that extends outward from a line that extends from the viewpoint of the user and is parallel to the direction of the viewpoint of the user (e.g., depth is defined in a spherical or substantially spherical coordinate system with the origin of the viewpoint at the center of the sphere that extends outwardly from a head of the user). In some embodiments, depth is defined relative to a user interface container (e.g., a window or application in which application and/or system content is displayed) where the user interface container has a height and/or width, and depth is a dimension that is orthogonal to the height and/or width of the user interface container. In some embodiments, in circumstances where depth is defined relative to a user interface container, the height and or width of the container are typically orthogonal or substantially orthogonal to a line that extends from a location based on the user (e.g., a viewpoint of the user or a location of the user) to the user interface container (e.g., the center of the user interface container, or another characteristic point of the user interface container) when the container is placed in the three-dimensional environment or is initially displayed (e.g., so that the depth dimension for the container extends outward away from the user or the viewpoint of the user). In some embodiments, in situations where depth is defined relative to a user interface container, depth of an object relative to the user interface container refers to a position of the object along the depth dimension for the user interface container. In some embodiments, multiple different containers can have different depth dimensions (e.g., different depth dimensions that extend away from the user or the viewpoint of the user in different directions and/or from different starting points). In some embodiments, when depth is defined relative to a user interface container, the direction of the depth dimension remains constant for the user interface container as the location of the user interface container, the user and/or the viewpoint of the user changes (e.g., or when multiple different viewers are viewing the same container in the three-dimensional environment such as during an in-person collaboration session and/or when multiple participants are in a real-time communication session with shared virtual content including the container). In some embodiments, for curved containers (e.g., including a container with a curved surface or curved content region), the depth dimension optionally extends into a surface of the curved container. In some situations, z-separation (e.g., separation of two objects in a depth dimension), z-height (e.g., distance of one object from another in a depth dimension), z-position (e.g., position of one object in a depth dimension), z-depth (e.g., depth of one object in a depth dimension), or simulated z dimension (e.g., depth used as a dimension of an object, dimension of an environment, a direction in space, and/or a direction in simulated space) are used to refer to the concept of depth as described above.

In some embodiments, a user is optionally able to interact with virtual objects in the three-dimensional environment using one or more hands as if the virtual objects were real objects in the physical environment. For example, as described above, one or more sensors of the computer system optionally capture one or more of the hands of the user and display representations of the hands of the user in the three-dimensional environment (e.g., in a manner similar to displaying a real world object in three-dimensional environment described above), or in some embodiments, the hands of the user are visible via the display generation component via the ability to see the physical environment through the user interface due to the transparency/translucency of a portion of the display generation component that is displaying the user interface or due to projection of the user interface onto a transparent/translucent surface or projection of the user interface onto the user's eye or into a field of view of the user's eye. Thus, in some embodiments, the hands of the user are displayed at a respective location in the three-dimensional environment and are treated as if they were objects in the three-dimensional environment that are able to interact with the virtual objects in the three-dimensional environment as if they were physical objects in the physical environment. In some embodiments, the computer system is able to update display of the representations of the user's hands in the three-dimensional environment in conjunction with the movement of the user's hands in the physical environment.

In some of the embodiments described below, the computer system is optionally able to determine the "effective" distance between physical objects in the physical world and virtual objects in the three-dimensional environment, for example, for the purpose of determining whether a physical object is directly interacting with a virtual object (e.g., whether a hand is touching, grabbing, holding, etc. a virtual object or within a threshold distance of a virtual object). For example, a hand directly interacting with a virtual object optionally includes one or more of a finger of a hand pressing a virtual button, a hand of a user grabbing a virtual vase, two fingers of a hand of the user coming together and pinching/holding a user interface of an application, and any of the other types of interactions described here. For example, the computer system optionally determines the distance between the hands of the user and virtual objects when determining whether the user is interacting with virtual objects and/or how the user is interacting with virtual objects. In some embodiments, the computer system determines the distance between the hands of the user and a virtual object by determining the distance between the location of the hands in the three-dimensional environment and the location of the virtual object of interest in the three-dimensional environment. For example, the one or more hands of the user are located at a particular position in the physical world, which the computer system optionally captures and displays at a particular corresponding position in the three-dimensional environment (e.g., the position in the three-dimensional environment at which the hands would be displayed if the hands were virtual, rather than physical, hands). The position of the hands in the three-dimensional environment is optionally compared with the position of the virtual object of interest in the three-dimensional environment to determine the distance between the one or more hands of the user and the virtual object. In some embodiments, the computer system optionally determines a distance between a physical object and a virtual object by comparing positions in the physical world (e.g., as opposed to comparing positions in the three-dimensional environment). For example, when determining the distance between one or more hands of the user and a virtual object, the computer system optionally determines the corresponding location in the physical world of the virtual object (e.g., the position at which the virtual object would be located in the physical world if it were a physical object rather than a virtual object), and then determines the distance between the corresponding physical position and the one of more hands of the user. In some embodiments, the same techniques are optionally used to determine the distance between any physical object and any virtual object. Thus, as described herein, when determining whether a physical object is in contact with a virtual object or whether a physical object is within a threshold distance of a virtual object, the computer system optionally performs any of the techniques described above to map the location of the physical object to the three-dimensional environment and/or map the location of the virtual object to the physical environment.

In some embodiments, the same or similar technique is used to determine where and what the gaze of the user is directed to and/or where and at what a physical stylus held by a user is pointed. For example, if the gaze of the user is directed to a particular position in the physical environment, the computer system optionally determines the corresponding position in the three-dimensional environment (e.g., the virtual position of the gaze), and if a virtual object is located at that corresponding virtual position, the computer system optionally determines that the gaze of the user is directed to that virtual object. Similarly, the computer system is optionally able to determine, based on the orientation of a physical stylus, to where in the physical environment the stylus is pointing. In some embodiments, based on this determination, the computer system determines the corresponding virtual position in the three-dimensional environment that corresponds to the location in the physical environment to which the stylus is pointing, and optionally determines that the stylus is pointing at the corresponding virtual position in the three-dimensional environment.

Similarly, the embodiments described herein may refer to the location of the user (e.g., the user of the computer system) and/or the location of the computer system in the three-dimensional environment. In some embodiments, the user of the computer system is holding, wearing, or otherwise located at or near the computer system. Thus, in some embodiments, the location of the computer system is used as a proxy for the location of the user. In some embodiments, the location of the computer system and/or user in the physical environment corresponds to a respective location in the three-dimensional environment. For example, the location of the computer system would be the location in the physical environment (and its corresponding location in the three-dimensional environment) from which, if a user were to stand at that location facing a respective portion of the physical environment that is visible via the display generation component, the user would see the objects in the physical environment in the same positions, orientations, and/or sizes as they are displayed by or visible via the display generation component of the computer system in the three-dimensional environment (e.g., in absolute terms and/ or relative to each other). Similarly, if the virtual objects displayed in the three-dimensional environment were physical objects in the physical environment (e.g., placed at the same locations in the physical environment as they are in the three-dimensional environment, and having the same sizes and orientations in the physical environment as in the three-dimensional environment), the location of the computer system and/or user is the position from which the user would see the virtual objects in the physical environment in the same positions, orientations, and/or sizes as they are displayed by the display generation component of the computer system in the three-dimensional environment (e.g., in absolute terms and/or relative to each other and the real world objects).

In the present disclosure, various input methods are described with respect to interactions with a computer system. When an example is provided using one input device or input method and another example is provided using another input device or input method, it is to be understood that each example may be compatible with and optionally utilizes the input device or input method described with respect to another example. Similarly, various output methods are described with respect to interactions with a computer system. When an example is provided using one output device or output method and another example is provided using another output device or output method, it is to be understood that each example may be compatible with and optionally utilizes the output device or output method described with respect to another example. Similarly, various methods are described with respect to interactions with a virtual environment or a mixed reality environment through a computer system. When an example is provided using interactions with a virtual environment and another example is provided using mixed reality environment, it is to be understood that each example may be compatible with and optionally utilizes the methods described with respect to another example. As such, the present disclosure discloses embodiments that are combinations of the features of multiple examples, without exhaustively listing all features of an embodiment in the description of each example embodiment.

User Interfaces and Associated Processes

Attention is now directed towards embodiments of user interfaces ("UI") and associated processes that may be implemented on a computer system, such as a portable multifunction device or a head-mounted device, in communication with a display generation component and (optionally) one or more sensors.

FIGS. 7A-7N illustrate example techniques for managing content sharing in three-dimensional environments, in some embodiments. FIGS. 8A-8B is a flow diagram of methods of displaying a user interface object that reveals content based on whether the content is private or shared, in accordance with various embodiments. FIG. 9 is a flow diagram of methods of displaying a user interface object that includes shared content based on whether participants have entitlement to the content, in accordance with various embodiments. FIG. 10 is a flow diagram of methods of displaying a sharing indicator that indicates that the respective content is shared with one or more other participants, in accordance with various embodiments. The user interfaces in FIGS. 7A-7N are used to illustrate the processes described below, including the processes in FIGS. 8A-10.

FIG. 7A illustrates first computer system 700 with display 702 and second computer system 760 with display 766. First computer system 700 is in use by a first user (e.g., "USER 1") and second computer system 760 is in use by a second user (e.g., "USER 2"). In some embodiments, each of first computer system 700 and/or second computer system 760 are configured to present virtual objects on one or more transparent or translucent displays (e.g., 702 and/or 766), so that a person, using the respective system, perceives virtual objects superimposed over the physical environment. In some embodiments, each of first computer system 700 and/or second computer system 760 are configured to use pass-through video, meaning one or more camera or image sensors capture images of the physical environment, and uses those images in presenting the AR environment on the opaque display (e.g., 702 and/or 766). In some embodiments, each of first computer system 700 and/or second computer system 760 are configured to present virtual objects within a virtual environment.

In some embodiments, three-dimensional environment 740 includes physical objects that include wall frame 740A, television 740B, stand 740C, and shelves 740D. In some embodiments, three-dimensional environment 740 is a virtual environment that includes virtual objects, including wall frame 740A, television 740B, stand 740C, and shelves 740D. In some embodiments, three-dimensional environment 740 is an augmented reality environment that includes both virtual objects (e.g., wall frame 740A and shelves 740D) and physical objects (e.g., television 740B and stand 740C). In some embodiments, as illustrated in FIGS. 7A-7N, the objects (physical objects and/or virtual objects) of three-dimensional environment 740 are the same or similar for both first computer system 700 and second computer system 760. In some embodiments, first computer system 700 presents a first three-dimensional environment (e.g., including aspects of the physical room that the first user is in) and second computer system 760 presents a second three-dimensional environment (e.g., including aspects of a different physical room that the second user is in) that is different from the first three-dimensional environment. Regardless of the configuration, both first computer system 700 and second computer system 760 optionally share some aspects of their respective three-dimensional environments (e.g., virtual objects, such as application windows).

At FIG. 7A, at first computer system 700, three-dimensional environment 740 is visible from a first viewpoint in three-dimensional environment 740 and at second computer system 760 three-dimensional environment 740 is visible from a second viewpoint in three-dimensional environment 740 that is different from the first viewpoint in three-dimensional environment 740. Accordingly, the same objects and/or corresponding objects in three-dimensional environment 740 are shown from two different viewpoints/angles/locations at first computer system 700 as compared to second computer system 760.

Although FIGS. 7A-7N illustrate techniques using first computer system 700 and second computer system 760 that are tablets, the techniques are optionally also applicable using head-mounted devices. In some embodiments where first computer system 700 and/or second computer system 760 are head-mounted devices, each respective computer system optionally includes two displays (one for each eye of each user), with each display displaying respective various content, to enable the respective users to perceive the various depths of the various content (e.g., physical objects and/or virtual objects) of the three-dimensional environments.

At FIG. 7A, the first user of first computer system 700 (e.g., "USER 1") and the second user of second computer system 760 (e.g., "USER 2") are participating in a real-time communication session that is occurring in extended reality in three-dimensional environment 740. First computer system 700 provides audio output (e.g., via speakers and/or headphones of first computer system 700) of audio received from second computer system 760 (e.g., the second user speaking). Second computer system 760 provides audio output (e.g., via speakers and/or headphones of second computer system 760) of audio received from first computer system 700 (e.g., the first user speaking). At first computer system 700, a portion of three-dimensional environment 740 is visible that includes avatar 712 of the second user, which is a representation of the second user of second computer system 760. As the second user provides inputs (e.g., via voice commands, touch inputs, air gestures, movements, and/or button presses), avatar 712 of the second user updates in three-dimensional environment 740 (and on display 702 of computer system 700, if avatar 712 of the second user is in the field of view of the first user) to reflect those inputs, thereby providing the first user of computer system 700 with real-time feedback based on the audio and movements of the second user. Similarly, three-dimensional environment 740 includes avatar 710 (as shown in FIG. 7G) of the first user, which is a representation of the first user of first computer system 700. As the first user provides inputs (e.g., via voice commands, touch inputs, air gestures, movements, and/or button presses), avatar 710 of the first user updates in three-dimensional environment 740 to reflect those inputs, thereby providing the second user of second computer system 760 with real-time feedback based on the audio and movements of the first user.

At FIG. 7A, while three-dimensional environment 740 that includes avatar 712 of the second user is visible at first computer system 700, second computer system 760 receives input (e.g., voice command, air gesture, and/or button press) from the second user requesting to display a user interface of a word processing application.

As illustrated at FIG. 7B1, in response to second computer system 760 receiving the input (e.g., voice command, air gesture, and/or button press) from the second user requesting to display a user interface of a word processing application, second computer system 760 displays, as part of three-dimensional environment 740, word processing window 742. In some embodiments where second computer system 760 is a head-mounted device, second computer system 760 displays word processing window 742 (e.g., using multiple displays) with a perceivable depth in three-dimensional environment 740. As illustrated at FIG. 7B1, in response to first computer system 700 detecting an event associated with the request to display a user interface of a word processing application (e.g., an event triggered by second computer system 760 based on the user request and/or based on displaying word processing window 742), first computer system 700 displays, as part of three-dimensional environment 740, window 744. In some embodiments where first computer system 700 is a head-mounted device, first computer system 700 displays word processing window 744 (e.g., using multiple displays) with a perceivable depth in three-dimensional environment 740. Window 744 corresponds to word processing window 742 and, as a result, the two windows occupy the same location within three-dimensional environment 740, have the same orientation within three-dimensional environment 740 (with respect to other objects in three-dimensional environment 740), and have the same size in three-dimensional environment 740 (with respect to other objects in three-dimensional environment 740).

At FIG. 7B1, first computer system 700 displays window 744, which does not include the contents of the document entered into the word processing window 742 by the second user because the contents are private to the second user and the second user has not shared the contents with the first user. Because word processing window 742 is private to the second user (has not been shared with the first user), corresponding window 744 is partially transparent. Accordingly, some objects that appear behind window 744 from the viewpoint of the first user are displayed by first computer system 700. In some embodiments, the portions of objects behind window 744 are displayed as blurred (represented by dashed lines in FIG. 7B1). Thus, window 744 displayed by first computer system 700 provides the first user with an indication of the location of word processing window 742 within three-dimensional environment 740 without revealing the private contents of word processing window 742. In contrast, word processing window 742 (displayed on display 766) is opaque and second computer system 760 does not display portions of objects that are behind word processing window 742 from the viewpoint in three-dimensional environment 740 of the second user.

In some embodiments, sharing indicator 744A displays the type of application of word processing window 742, an indication of which user initiated display of (and therefore owns/controls) the window (e.g., "user 2"), and that the contents of the corresponding window are not shared.

At FIG. 7B1, second computer system 760 displays word processing window 742 and the private contents (e.g., "Once upon a time"). Word processing window 742 includes sharing indicator 742A, which indicates with whom the contents of word processing window 742 are shared (e.g., no one, as indicated by the "not shared" indication). Word processing window 742 also includes control bar 742B that includes one or more controls for modifying the contents of word processing window 742 or otherwise interacting with word processing window 742. For example, the second user can activate a control (e.g., spell check button, underline button, and/or bold button) of control bar 742B by gazing at the control and concurrently performing an air gesture (such as a pinch air gesture or a tap air gesture). Word processing window 742 also includes grabber bar 742C for repositioning word processing window 742 in three-dimensional environment 740. For example, second user can perform a push or pull air gesture at a location corresponding to grabber bar 742C to reposition (translate and/or rotate) word processing window 742 in three-dimensional environment 740. At FIG. 7B1, second user of second computer system 760 is interacting with (e.g., providing inputs corresponding to) word processing window 742, as illustrated by avatar 712 of the second user interacting with word processing window 742, as seen from both the viewpoints of the first user and the second user. In some embodiments where second computer system 760 is a head-mounted device, the second user optionally interacts with word processing window 742 by placing their hand in space at a location that correspond to word processing window 742, causing a representation of their hand to be displayed as part of three-dimensional environment 740.

At FIG. 7B1, the second user provides input to second computer system 760 to reposition word processing window 742. For example, the second user provides input to cause avatar 712 of second user to grab grabber bar 742C to both rotate word processing window 742 and to drag word processing window 742 to the right in three-dimensional environment 740, as shown in FIG. 7C. At FIG. 7B1, because the contents of word processing window 742 are private to the second user, the first user cannot reposition corresponding window 744, as indicated by the lack of grabber bar for window 744 at first computer system 700.

At FIG. 7B1, second computer system 760 receives input (e.g., voice command, air gesture, and/or button press) from the second user requesting to share (e.g., via sharing window 742D) the contents of word processing window 742 with other participants of the real-time communication session. In some embodiments, the input from the second user requesting to share (e.g., via sharing window 742D) the contents of word processing window 742 with other participants of the real-time communication session includes activation of sharing indicator 742A (e.g., by the second computer system concurrently detecting the second user gazing at sharing indicator 742A and detecting the second user performing an air gesture, such as an air pinch gesture and/or an air tap gesture). At FIG. 7C, in response to second computer system 760 receiving the input (e.g., voice command, air gesture, and/or button press) from the second user requesting to share the contents of word processing window 742, second computer system 760 provides the content to the other participants (or offers to provide, if a sharing invitation is accepted) of the real-time communication session. As other participants begin accessing (e.g., displaying) the shared content, second computer system 760 updates sharing indicator 742A to indicate which participants are accessing the content (and/or to indicate with which participants the content has been shared), as shown in FIG. 7C. At FIG. 7C, second computer system 760 indicates, via sharing indicator 742A, that the first user and a third user participating in the real-time communication session are accessing the content (e.g., "Once upon a time").

In some embodiments, the techniques and user interface (s) described in FIGS. 7A-7N are provided by one or more of the devices described in FIGS. 1A-1P. For example, FIG. 7B2 illustrates an embodiment in which three-dimensional environment 740 (e.g., as described in FIGS. 7A and 7B1) is displayed on display module X702 of head-mounted device (HMD) X700 and display module X766 of head-mounted device (HMD) X760. In some embodiments, devices X700 and X760 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth. Similarly, HMD X760 includes display module X766 (which provides content to a left eye of the user) and a second display module (which provides content to a right eye of the user). In some embodiments, the second display module displays a slightly different image than display module X766 to generate the illusion of stereoscopic depth.

As illustrated at FIG. 7B2, in response to HMD X760 receiving the input (e.g., voice command, air gesture, and/or button press) from the second user requesting to display a user interface of a word processing application, HMD X760 displays, as part of three-dimensional environment 740, word processing window 742. In some embodiments, HMD X760 detects the input based on an air gesture performed by a user of HMD X760. In some embodiments, HMD X760 detects hands X768A and/or X768B of the user of HMD X760 and determines whether motion of hands X768A and/or X768B perform a predetermined air gesture corresponding a recognized input. In some embodiments, the predetermined air gesture includes a pinch gesture. In some embodiments, the pinch gesture includes detecting movement of finger X768C and thumb X768D toward one another. In some embodiments, HMD X760 detects the input based on a gaze and air gesture input performed by the user of HMD X760.

In some embodiments, HMD X760 displays word processing window 742 (e.g., using multiple displays) with a perceivable depth in three-dimensional environment 740. As illustrated at FIG. 7B2, in response to HMD X700 detecting an event associated with the request to display a user interface of a word processing application (e.g., an event triggered by HMD X760 based on the user request and/or based on displaying word processing window 742), HMD X700 displays, as part of three-dimensional environment 740, window 744. In some embodiments, HMD X700 displays word processing window 744 (e.g., using multiple displays) with a perceivable depth in three-dimensional environment 740. Window 744 corresponds to word processing window 742 and, as a result, the two windows occupy the same location within three-dimensional environment 740, have the same orientation within three-dimensional environment 740 (with respect to other objects in three-dimensional environment 740), and have the same size in three-dimensional environment 740 (with respect to other objects in three-dimensional environment 740).

At FIG. 7B2, HMD X700 displays window 744, which does not include the contents of the document entered into the word processing window 742 by the second user because the contents are private to the second user and the second user has not shared the contents with the first user. Because word processing window 742 is private to the second user (has not been shared with the first user), corresponding window 744 is partially transparent. Accordingly, some objects that appear behind window 744 from the viewpoint of the first user are displayed by HMD X700. In some embodiments, the portions of objects behind window 744 are displayed as blurred (represented by dashed lines in FIG. 7B2). Thus, window 744 displayed by first computer system 700 provides the first user with an indication of the location of word processing window 742 within three-dimensional environment 740 without revealing the private contents of word processing window 742. In contrast, word processing window 742 (displayed on display 766) is opaque and HMD X760 does not display portions of objects that are behind word processing window 742 from the viewpoint in three-dimensional environment 740 of the second user.

In some embodiments, sharing indicator 744A displays the type of application of word processing window 742, an indication of which user initiated display of (and therefore owns/controls) the window (e.g., "user 2"), and that the contents of the corresponding window are not shared.

At FIG. 7B2, HMD X760 displays word processing window 742 and the private contents (e.g., "Once upon a time"). Word processing window 742 includes sharing indicator 742A, which indicates with whom the contents of word processing window 742 are shared (e.g., no one, as indicated by the "not shared" indication). Word processing window 742 also includes control bar 742B that includes one or more controls for modifying the contents of word processing window 742 or otherwise interacting with word processing window 742. For example, the second user can activate a control (e.g., spell check button, underline button, and/or bold button) of control bar 742B by gazing at the control and concurrently performing an air gesture (such as a pinch air gesture or a tap air gesture). Word processing window 742 also includes grabber bar 742C for repositioning word processing window 742 in three-dimensional environment

740. For example, second user can perform a push or pull air gesture at a location corresponding to grabber bar 742C to reposition (translate and/or rotate) word processing window 742 in three-dimensional environment 740. At FIG. 7B2, second user of HMD X760 is interacting with (e.g., providing inputs corresponding to) word processing window 742, as illustrated by avatar 712 of the second user interacting with word processing window 742, as seen from both the viewpoints of the first user and the second user. In some embodiments, the second user optionally interacts with word processing window 742 by placing their hand in space at a location that correspond to word processing window 742, causing a representation of their hand to be displayed as part of three-dimensional environment 740.

In some embodiments, HMD X760 detects selection of word processing window 742 based on an air gesture performed by a user of HMD X760. In some embodiments, HMD X760 detects hands X768A and/or X768B of the user of HMD X760 and determines whether motion of hands X768A and/or X768B perform a predetermined air gesture corresponding to selection of word processing window 742. In some embodiments, the predetermined air gesture selecting word processing window 742 includes a pinch gesture. In some embodiments, the pinch gesture includes detecting movement of finger X768C and thumb X768D toward one another. In some embodiments, HMD X760 detects selection of word processing window 742 based on a gaze and air gesture input performed by the user of HMD X760. In some embodiments, the gaze and air gesture input includes detecting that the user of HMD X760 is looking at word processing window 742 (e.g., for more than a predetermined amount of time) and hands X768A and/or X768B of the user of HMD X760 perform a pinch gesture.

At FIG. 7B2, the second user provides input to HMD X760 to reposition word processing window 742. For example, the second user provides input to cause avatar 712 of second user to grab grabber bar 742C to both rotate word processing window 742 and to drag word processing window 742 to the right in three-dimensional environment 740, as shown in FIG. 7C. At FIG. 7B2, because the contents of word processing window 742 are private to the second user, the first user cannot reposition corresponding window 744, as indicated by the lack of grabber bar for window 744 at HMD X700.

At FIG. 7B2, HMD X760 receives input (e.g., voice command, air gesture, and/or button press) from the second user requesting to share (e.g., via sharing window 742D) the contents of word processing window 742 with other participants of the real-time communication session. In some embodiments, the input from the second user requesting to share (e.g., via sharing window 742D) the contents of word processing window 742 with other participants of the real-time communication session includes activation of sharing indicator 742A (e.g., by the second computer system concurrently detecting the second user gazing at sharing indicator 742A and detecting the second user performing an air gesture, such as an air pinch gesture and/or an air tap gesture). In some embodiments, HMD X760 detects selection of sharing indicator 742A based on an air gesture performed by a user of HMD X760. In some embodiments, HMD X760 detects hands X768A and/or X768B of the user of HMD X760 and determines whether motion of hands X768A and/or X768B perform a predetermined air gesture corresponding to selection of sharing indicator 742A. In some embodiments, the predetermined air gesture selecting word sharing indicator 742A includes a pinch gesture. In some embodiments, the pinch gesture includes detecting movement of finger X768C and thumb X768D toward one another. In some embodiments, HMD X760 detects selection of sharing indicator 742A based on a gaze and air gesture input performed by the user of HMD X760. In some embodiments, the gaze and air gesture input includes detecting that the user of HMD X760 is looking at sharing indicator 742A (e.g., for more than a predetermined amount of time) and hands X768A and/or X768B of the user of HMD X760 perform a pinch gesture.

In response to HMD X760 receiving the input (e.g., voice command, air gesture, and/or button press) from the second user requesting to share the contents of word processing window 742, second computer system X760 provides the content to the other participants (or offers to provide, if a sharing invitation is accepted) of the real-time communication session (e.g., as described in FIG. 7C). As other participants begin accessing (e.g., displaying) the shared content, HMD X760 updates sharing indicator 742A to indicate which participants are accessing the content (and/or to indicate with which participants the content has been shared) (e.g., as shown in FIG. 7C). Second computer system X760 indicates, via sharing indicator 742A, that the second user and a third user participating in the real-time communication session are accessing the content (e.g., "Once upon a time").

Any of the features, components, and/or parts, including the arrangements and configurations thereof shown in FIGS. 1B-1P can be included, either alone or in any combination, in HMD X700 and/or HMD X760. For example, in some embodiments, HMD X700 and/or HMD X760 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 and/or display module X766 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 and/or HMD X760 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, input device X703 and or input device X763 includes any of the features, components, and/or parts of any of first button 1-128, button 11.1.1-114, second button 1-132, and or dial or button 1-328, either alone or in any combination. In some embodiments, HMD X700 and/or HMD X760 includes one or more audio output components (e.g., electronic component 1-112) for generating audio feedback (e.g., audio output), optionally generated based on detected events and/or user inputs detected by the HMD X700 and/or HMD X760.

At FIG. 7C, based on an event associated with second computer system 760 having received input from the second user requesting to share the contents of word processing window 742 with other participants of the real-time communication session (e.g., the event optionally being receiving an indication that the content is shared and/or receiving user input accepting access to the shared content), first computer system 700 begins to display the (previously private, now shared) contents (e.g., "Once upon a time") as part of window 744. Similarly, sharing indicator 744A is updated to indicate the participants with whom the content is shared (e.g., "user 1 and user 3") and/or to indicate the user sharing the content. Additionally, because the content of word processing window 742 is shared with the first user, computer system 700 also displays control bar 744B (e.g., that provides controls for modifying the contents of window 744, such as spell check, bolding text, and/or underlining text) and grabber bar 744C (e.g., that can be used by the first user to reposition window 744 (and therefore word processing window 742) in three-dimensional environment 740). In some embodiments, as window 744 is repositioned (e.g., by the first user and/or by the second user repositioning word processing window 742), sharing indicator 744A, control bar 744B, and grabber bar 744C move in conjunction with window 744. At FIG. 7C, because the contents of word processing window 742 are shared with the first user, window 744 displays the shared content and becomes opaque, such that first computer system 700 does not display the portions of objects that are behind window 744 from the viewpoint of the first user.

At FIG. 7C, while the second user shares the contents of word processing window 742 with the first user (and a third user), the second user has repositioned word processing window 742 in three-dimensional environment 740 (as compared to FIG. 7B1 and/or FIG. 7B2) and, in conjunction, window 744 has been repositioned in three-dimensional environment 740 to the same position as word processing window 742, thereby providing the first user with an indication of the position of word processing window 742 in three-dimensional environment 740. At FIG. 7C, because the contents of word processing window 742 are shared with the first user, the first user can reposition corresponding window 744, as indicated by the display of grabber bar 744C for window 744 at first computer system 700.

At FIG. 7D, the second user has further repositioned word processing window 742 in three-dimensional environment 740 (while the contents of word processing window 742 are shared), as displayed by second computer system 760, and, in conjunction, window 744 has been repositioned in three-dimensional environment 740 to the same position as word processing window 742, as displayed by first computer system 700, thereby continuing to provide the first user with an indication of the position of word processing window 742 in three-dimensional environment 740. In some embodiments where second computer system 760 is a head-mounted device, as the second user (who is wearing second computer system 760) turns their head (e.g., to look at the new location of word processing window 742), second computer system 760 detects that the second computer system 760 has rotated and adjusts the content displayed accordingly, enabling the second user to look around the three-dimensional environment 740 by turning their head.

Throughout FIGS. 7B1-7D, sharing indicator 742A has automatically repositioned in conjunction with word processing window 742. For example, as word processing window 742 was rotated in three-dimensional environment 740, sharing indicator 742A also rotated. For another example, as word processing window 742 moved to the right in three-dimensional environment 740 (e.g., while the contents of word processing window 742 are and are not shared with the first user), sharing indicator 742A also moved the same amount to the right. In some embodiments where first computer system 700 is a head-mounted device, as the first user (who is wearing first computer system 700) turns their head (e.g., to look at the new location of window 744), first computer system 700 detects that the first computer system 700 has rotated and adjusts the content displayed accordingly, enabling the first user to look around the three-dimensional environment 740 by turning their head.

At FIG. 7D, second computer system 760 has also received input (e.g., voice command, air gesture, and/or button press) from the second user requesting to display a media playback window and, in response second computer system 760 displays media playback window 752, which has a corresponding sharing indicator 752A (e.g., that indicates the participants with whom the contents of the window is shared), a corresponding control bar 752B (e.g., that provides controls for modifying the contents of media playback window 752, such as by playing, pausing, and/or rewinding the content), and a corresponding grabber bar 752C (e.g., that can be used to reposition media playback window 752 in three-dimensional environment 740).

At FIG. 7D, based on an event associated with second computer system 760 having received input from the second user requesting to display media playback window 752, first computer system 700 displays window 754 at a position in three-dimensional environment 740 that corresponds to (is the same as) the position of media playback window 752. Window 754 includes a corresponding sharing indicator 754A, which optionally indicates the type of application of media playback window 752 (e.g., "video playback"), an indication of which user initiated display of (and therefore owns/controls) the window (e.g., "user 2"), and that the contents of the corresponding window are not shared. As shown in FIG. 7D, because media playback window 752 is private to the second user (has not been shared with the first user), corresponding window 754 is partially transparent. Accordingly, the portions of objects that appear behind window 754 from the viewpoint of the first user are displayed by first computer system 700. In some embodiments, the portions of objects that are behind window 754 are displayed as blurred (as indicated by dashed lines in FIG. 7D). Thus, window 754 displayed by first computer system 700 provides the first user with an indication of the location of media playback window 752 without revealing the private contents of window 752. In contrast, media playback window 752 is opaque and second computer system 760 does not display portions of objects that are behind media playback window 752 from the viewpoint in three-dimensional environment 740 of the second user. At FIG. 7D, as avatar 712 of the second user interacts with media playback window 752 (e.g., moves to activate buttons of media playback window 752), first computer system 700 similarly displays avatar 712 of the second user interacting with media playback window 754 (e.g., showing the second user moving, but not showing the buttons that are being interacted with). Because the contents (e.g., video) of media playback window 752 are private to the second user, the first user cannot reposition corresponding window 754, as indicated by the lack of grabber bar for window 754 at first computer system 700 in FIG. 7D.

At FIG. 7E1, second computer system 760 has received input (e.g., voice command, air gesture, and/or button press) from the second user requesting to display a movie window that shares a movie with other participants of the real-time communication session via the movie window. At FIG. 7E1, in response to second computer system 760 receiving the input (e.g., voice command, air gesture, and/or button press) from the second user requesting to display the movie window that shares a movie with other participants, second computer system 760 displays, as part of three-dimensional environment 740, movie window 762. As illustrated at FIG. 7D, in response to first computer system 700 detecting an event associated with the request to display movie window 762 and share the movie with the first user (e.g., an event triggered by second computer system 760), first computer system 700 displays, as part of three-dimensional environment 740, window 764. Window 764 corresponds to movie window 762 and, as a result, the two windows occupy the same location within three-dimensional environment 740.

At FIG. 7E1, movie window 762 includes a corresponding sharing indicator 762A (e.g., that indicates the participants with whom the contents of the window are shared), a corresponding control bar 762B (e.g., that provides controls for modifying the contents of movie window 762, such as by playing, pausing, and/or rewinding the content), and a corresponding grabber bar 762C (e.g., that can be used by the second user to reposition movie window 762 (and therefore window 764) in three-dimensional environment 740). At FIG. 7E1, window 764 includes a corresponding sharing indicator 764A (e.g., that indicates the participants with whom the contents of the window are shared and/or indicates who has shared the content) and corresponding grabber bar 764C (e.g., that can be used by the first user to reposition window 764 (and therefore movie window 762) in three-dimensional environment 740). However, the contents of movie window 762 that have been shared with the first user are not displayed by first computer system 700 as part of corresponding window 764 because the first user does not have entitlement to access the shared content. For example, where the shared content is a movie, the first used optionally does not have permission (and/or has not provided credentials to show proof of permission) from the copyright holder and/or owner of the movie to access the movie. Thus, rather than displaying the shared content (e.g., the movie), first computer system 700 displays selectable user interface object 764E, which (when activated) initiates a process for the first user to gain entitlement to the shared content (e.g., the movie). As shown in FIG. 7E1, although the content of movie window 762 is shared with the first user, first computer system 700 does not display a corresponding control bar for window 764 because the first user does have entitlement to access the shared content. However, regardless of whether the first user has entitlement to access the shared content, the first user can reposition (e.g., using grabber bar 764C) window 764 (and there, reposition movie window 762 at second computer system 760) because the content of movie window 762 is being shared with the first user. Further, because the contents of movie window 762 are shared with the first user, corresponding window 764 is opaque, rather than partially transparent.

At FIG. 7E1, first computer system 700 detects gaze 750A of the first user directed to a location corresponding to the selectable user interface object 764E and first computer system 700 concurrently detects a selection air gesture (e.g., an air pinch gesture and/or an air tap gesture) and, in response, activates selectable user interface object 764E. In response to detecting activation of selectable user interface object 764E, first computer system 700 initiates a process for the first user to gain entitlement to the shared content (e.g., the movie) of movie window 762, as shown in FIG. 7F. In some embodiments where first computer system 700 is a head-mounted device, as the first user (who is wearing first computer system 700) repositions their head (e.g., to the left or to the right), first computer system 700 detects the movement and adjusts the content displayed accordingly, enabling the first user to change the viewpoint from which they view the three-dimensional environment 740. Accordingly, the first user is able to move their head such that window 764 no longer obstructs (or to reduce the obstruction of) the first user's view of stand 740C.

In some embodiments, the techniques and user interface(s) described in FIG. 7E1 are provided by one or more of the devices described in FIGS. 1A-1P. FIG. 7E2 illustrates an embodiment in which three-dimensional environment 740 (e.g., as described in FIGS. 7A, 7B1, 7B2, 7C, 7D, and 7E1) is displayed on display module X702 of head-mounted device (HMD) X700 and display module X766 of head-mounted device (HMD) X760. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth. Similarly, in some embodiments, device X760 includes a pair of display modules that provide stereoscopic content to different eyes of the same user. For example, HMD X760 includes display module X766 (which provides content to a left eye of the user) and a second display module (which provides content to a right eye of the user). In some embodiments, the second display module displays a slightly different image than display module X766 to generate the illusion of stereoscopic depth.

At FIG. 7E2, HMD X760 has received input (e.g., voice command, air gesture, and/or button press) from the second user requesting to display a movie window that shares a movie with other participants of the real-time communication session via the movie window. In some embodiments, HMD X760 detects the input based on an air gesture performed by a user of HMD X760. In some embodiments, HMD X760 detects hands X768A and/or X768B of the user of HMD X760 and determines whether motion of hands X768A and/or X768B perform a predetermined air gesture corresponding a recognized input. In some embodiments, the predetermined air gesture includes a pinch gesture. In some embodiments, the pinch gesture includes detecting movement of finger X768C and thumb X768D toward one another. In some embodiments, HMD X760 detects the input based on a gaze and air gesture input performed by the user of HMD X760.

At FIG. 7E2, in response to HMD X760 receiving the input (e.g., voice command, air gesture, and/or button press) from the second user requesting to display the movie window that shares a movie with other participants, HMD X760 displays, as part of three-dimensional environment 740, movie window 762. As illustrated at FIG. 7E2, in response to HMD X700 detecting an event associated with the request to display movie window 762 and share the movie with the first user (e.g., an event triggered by HMD X760), HMD X700 displays, as part of three-dimensional environment 740, window 764. Window 764 corresponds to movie window 762 and, as a result, the two windows occupy the same location within three-dimensional environment 740.

At FIG. 7E2, movie window 762 includes a corresponding sharing indicator 762A (e.g., that indicates the participants with whom the contents of the window are shared), a corresponding control bar 762B (e.g., that provides controls for modifying the contents of movie window 762, such as by playing, pausing, and/or rewinding the content), and a corresponding grabber bar 762C (e.g., that can be used by the second user to reposition movie window 762 (and therefore window 764) in three-dimensional environment 740). At FIG. 7E2, window 764 includes a corresponding sharing indicator 764A (e.g., that indicates the participants with whom the contents of the window are shared and/or indicates who has shared the content) and corresponding grabber bar 764C (e.g., that can be used by the first user to reposition window 764 (and therefore movie window 762) in three-dimensional environment 740). However, the contents of movie window 762 that have been shared with the first user are not displayed by HMD X700 as part of corresponding window 764 because the first user does not have entitlement to access the shared content. For example, where the shared content is a movie, the first used optionally does not have permission (and/or has not provided credentials to show proof of permission) from the copyright holder and/or owner of the movie to access the movie. Thus, rather than displaying the shared content (e.g., the movie), HMD X700 displays selectable user interface object 764E, which (when activated) initiates a process for the first user to gain entitlement to the shared content (e.g., the movie). As shown in FIG. 7E2, although the content of movie window 762 is shared with the first user, HMD X700 does not display a corresponding control bar for window 764 because the first user does have entitlement to access the shared content. However, regardless of whether the first user has entitlement to access the shared content, the first user can reposition (e.g., using grabber bar 764C) window 764 (and therefore, reposition movie window 762 at HMD X760) because the content of movie window 762 is being shared with the first user. Further, because the contents of movie window 762 are shared with the first user, corresponding window 764 is opaque, rather than partially transparent.

At FIG. 7E2, HMD X700 detects gaze 750A of the first user directed to a location corresponding to the selectable user interface object 764E and HMD X700 concurrently detects a selection air gesture (e.g., an air pinch gesture and/or an air tap gesture) and, in response, activates selectable user interface object 764E. In some embodiments, HMD X700 detects selection of selectable user interface object 764E based on an air gesture performed by a user of HMD X700. In some embodiments, HMD X700 detects hands X708A and/or X708B of the user of HMD X700 and determines whether motion of hands X708A and/or X708B perform a predetermined air gesture corresponding to selection of sharing indicator 742A. In some embodiments, the predetermined air gesture selecting word sharing indicator 742A includes a pinch gesture. In some embodiments, the pinch gesture includes detecting movement of finger X708C and thumb X708D toward one another. In some embodiments, HMD X760 detects selection of sharing indicator 742A based on a gaze and air gesture input performed by the user of HMD X760. In some embodiments, the gaze and air gesture input includes detecting that the user of HMD X760 is looking at sharing indicator 742A (e.g., for more than a predetermined amount of time) and hands X708A and/or X708B of the user of HMD X760 perform a pinch gesture.

In response to detecting activation of selectable user interface object 764E, HMD X700 initiates a process for the first user to gain entitlement to the shared content (e.g., the movie) of movie window 762 (e.g., as described in FIG. 7F). In some embodiments, as the first user (who is wearing HMD X700) repositions their head (e.g., to the left or to the right), HMD X700 detects the movement and adjusts the content displayed accordingly, enabling the first user to change the viewpoint from which they view the three-dimensional environment 740. Accordingly, the first user is able to move their head such that window 764 no longer obstructs (or to reduce the obstruction of) the first user's view of stand 740C.

Any of the features, components, and/or parts, including the arrangements and configurations thereof shown in FIGS. 1B-1P can be included, either alone or in any combination, in HMD X700 and/or HMD X760. For example, in some embodiments, HMD X700 and/or HMD X760 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 and/or display module X766 includes any of the features, components, and/or parts of display unit 1-102, display unit 1-202, display unit 1-306, display unit 1-406, display generation component 120, display screens 1-122*a*-*b*, first and second rear-facing display screens 1-322*a*, 1-322*b*, display 11.3.2-104, first and second display assemblies 1-120*a*, 1-120*b*, display assembly 1-320, display assembly 1-421, first and second display sub-assemblies 1-420*a*, 1-420*b*, display assembly 3-108, display assembly 11.3.2-204, first and second optical modules 11.1.1-104*a* and 11.1.1-104*b*, optical module 11.3.2-100, optical module 11.3.2-200, lenticular lens array 3-110, display region or area 6-232, and/or display/display region 6-334, either alone or in any combination. In some embodiments, HMD X700 and/or HMD X760 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110*a*-*f*, either alone or in any combination. In some embodiments, input device X703 and or input device X763 includes any of the features, components, and/or parts of any of first button 1-128, button 11.1.1-114, second button 1-132, and or dial or button 1-328, either alone or in any combination. In some embodiments, HMD X700 and/or HMD X760 includes one or more audio output components (e.g., electronic component 1-112) for generating audio feedback (e.g., audio output), optionally generated based on detected events and/or user inputs detected by the HMD X700 and/or HMD X760.

At FIG. 7F, in response to detecting activation of selectable user interface object 764E (and as part of the process for the first user to gain entitlement to the shared content), first computer system 700 displays login window 774 in three-dimensional environment 740. Login window 774 has a corresponding sharing indicator 774A (e.g., that indicates the participants with whom the contents of the window are shared) and corresponding grabber bar 774B (e.g., that can be used by the first user to reposition window 774 (and therefore corresponding window 772) in three-dimensional environment 740). Because display of login window 774 was initiated by the first user, login window 774 is opaque.

At FIG. 7F, based on an event associated with first computer system 700 having detected activation of selectable user interface object 764E, second computer system 760 displays window 772 at a position in three-dimensional environment 740 that corresponds to (is the same as) the position of login window 774. Window 772 includes a corresponding sharing indicator 772A, which optionally indicates the type of application of media playback window 752 (e.g., "Login"), an indication of which user initiated display of (and therefore owns/controls) the window (e.g., "User 1"), and that the contents of the corresponding window are not shared. As shown in FIG. 7F, because login window 774 is private to the first user (has not been shared with the second user), corresponding window 772 is partially transparent. Accordingly, the portions of objects (e.g., shelves 740D and movie window 762) that appear behind window 772 from the viewpoint of the second user are displayed by second computer system 760. In some embodiments, the portions of objects that are behind window 772 are displayed as blurred (as indicated by dashed lines). Thus, window 772 displayed by second computer system 760 provides the second user with an indication of the location of login window 774 without revealing the private contents (e.g., an entered login or password) of login window 774. In some embodiments where second computer system 760 is a head-mounted device, as the second user (who is wearing second computer system 760) repositions their head (e.g., to the left or to the right), second computer system 760 detects the movement and adjusts the content displayed accordingly, enabling the second user to change the viewpoint from which they view the three-dimensional environment 740. Accordingly, the second user is able to move their head such that window 772 no longer obstructs (or to reduce the obstruction of) movie window 762.

At FIG. 7G, as avatar 710 of the first user interacts with login window 774 (e.g., moves to enter a login and/or password into window 774), second computer system 760 similarly displays avatar 710 of the first user interacting with window 772 (e.g., moving, but not showing the login and password being entered). Because the contents (e.g., website and/or login information) of login window 774 are private to the first user, the second user cannot reposition corresponding window 772, as indicated by the lack of grabber bar for window 772 at second computer system 760.

At FIG. 7G, the first user has entered credentials (e.g., to purchase the shared movie and/or to log into a subscription service that provides access to the shared movie) and, in response, gains access to the shared content (e.g., the movie) of movie window 762, as shown in FIG. 7H. At FIG. 7H, as a result, first computer system 700 ceases to display login window 774 and second computer system 760 ceases to display corresponding window 772. Further in response to the first user gaining access to the shared content, first computer system 700 ceases to display the selectable user interface object 764E and, instead, displays the shared content (e.g., the movie) as part of window 764, as shown in FIG. 7G. Further in response to the first user gaining access to the shared content of movie window 762, first computer system 700 displays corresponding control bar 762B (e.g., that provides controls for modifying the contents of movie window 762, such as by playing, pausing, and/or rewinding the content).

At FIG. 7H, second computer system 760 receives (e.g., via sharing window 742D) input (e.g., voice command, air gesture, and/or button press) from the second user requesting to cease sharing the contents of word processing window 742 with other participants of the real-time communication session.

At FIG. 7I1, in response to second computer system 760 receiving the input (e.g., voice command, air gesture, and/or button press) from the second user requesting to cease sharing the contents of word processing window 742 with other participants, second computer system 760 updates display of sharing window 742D and sharing indicator 742A to indicate that the contents of word processing window 742 are not being shared with other participants of the real-time communication session. At FIG. 7I1, based on an event associated with second computer system 760 having ceased sharing the contents of word processing window 742 with participants of the real-time communication session (making the contents private for the second user), first computer system 700 ceases displaying the contents as part of window 744, makes window 744 partially transparent, and ceases displaying control bar 744B and grabber bar 744C. At FIG. 7I1, second computer system 760 displays (e.g., based on user activation of sharing indicator 762A) sharing window 752D corresponding to media playback window 752. As shown in FIG. 7I1, sharing window 752D indicates the users with which the content of media playback window 752 are currently being shared and also indicates that another user (e.g., user 4) has been invited to access the content of media playback window 752, but has not accepted (and has not declined) the invitation.

In some embodiments, the techniques and user interface(s) described in FIG. 7I1 are provided by one or more of the devices described in FIGS. 1A-1P. FIG. 7I2 illustrates an embodiment in which three-dimensional environment 740 (e.g., as described in FIGS. 7A-7I1) is displayed on display module X702 of head-mounted device (HMD) X700 and display module X766 of head-mounted device (HMD) X760. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth. Similarly, in some embodiments, device X760 includes a pair of display modules that provide stereoscopic content to different eyes of the same user. For example, HMD X760 includes display module X766 (which provides content to a left eye of the user) and a second display module (which provides content to a right eye of the user). In some embodiments, the second display module displays a slightly different image than display module X766 to generate the illusion of stereoscopic depth.

At FIG. 7I2, in response to HMD X760 receiving the input (e.g., voice command, air gesture, and/or button press) from the second user requesting to cease sharing the contents of word processing window 742 with other participants, second computer system 760 updates display of sharing window 742D and sharing indicator 742A to indicate that the contents of word processing window 742 are not being shared with other participants of the real-time communication session. In some embodiments, HMD X760 detects selection of word processing window 742, sharing window 742D, and/or sharing indicator 742A based on an air gesture performed by a user of HMD X760. In some embodiments, HMD X760 detects hands X768A and/or X768B of the user of HMD X760 and determines whether motion of hands X768A and/or X768B perform a predetermined air gesture corresponding to selection of word processing window 742, sharing window 742D, and/or sharing indicator 742A. In some embodiments, the predetermined air gesture selecting word processing window 742, sharing window 742D, and/or sharing indicator 742A includes a pinch gesture. In some embodiments, the pinch gesture includes detecting movement of finger X768C and thumb X768D toward one another. In some embodiments, HMD X760 detects selection of word processing window 742, sharing window 742D, and/or sharing indicator 742A based on a gaze and air gesture input performed by the user of HMD X760. In some embodiments, the gaze and air gesture input includes detecting that the user of HMD X760 is looking at word processing window 742, sharing window 742D, and/or sharing indicator 742A (e.g., for more than a predetermined amount of time) and hands X768A and/or X768B of the user of HMD X760 perform a pinch gesture.

At FIG. 7I2, based on an event associated with HMD X760 having ceased sharing the contents of word processing window 742 with participants of the real-time communication session (making the contents private for the second user), HMD X700 ceases displaying the contents as part of window 744, makes window 744 partially transparent, and ceases displaying control bar 744B and grabber bar 744C. At FIG. 7I2, HMD X760 displays (e.g., based on user activation of sharing indicator 762A) sharing window 752D corresponding to media playback window 752. As shown in FIG. 7I2, sharing window 752D indicates the users with which the content of media playback window 752 are currently being shared and also indicates that another user (e.g., user 4) has been invited to access the content of media playback window 752, but has not accepted (and has not declined) the invitation.

Any of the features, components, and/or parts, including the arrangements and configurations thereof shown in FIGS. 1B-1P can be included, either alone or in any combination, in HMD X700 and/or HMD X760. For example, in some embodiments, HMD X700 and/or HMD X760 includes any of the features, components, and/or parts of HMD 1-100, 1-200, 3-100, 6-100, 6-200, 6-300, 6-400, 11.1.1-100, and/or 11.1.2-100, either alone or in any combination. In some embodiments, display module X702 and/or display module X766 includes any of the features, components, and/or parts of display unit 1-102, display unit 1-202, display unit 1-306, display unit 1-406, display generation component 120, display screens 1-122a-b, first and second rear-facing display screens 1-322a, 1-322b, display 11.3.2-104, first and second display assemblies 1-120a, 1-120b, display assembly 1-320, display assembly 1-421, first and second display sub-assemblies 1-420a, 1-420b, display assembly 3-108, display assembly 11.3.2-204, first and second optical modules 11.1.1-104a and 11.1.1-104b, optical module 11.3.2-100, optical module 11.3.2-200, lenticular lens array 3-110, display region or area 6-232, and/or display/display region 6-334, either alone or in any combination. In some embodiments, HMD X700 and/or HMD X760 includes a sensor that includes any of the features, components, and/or parts of any of sensors 190, sensors 306, image sensors 314, image sensors 404, sensor assembly 1-356, sensor assembly 1-456, sensor system 6-102, sensor system 6-202, sensors 6-203, sensor system 6-302, sensors 6-303, sensor system 6-402, and/or sensors 11.1.2-110a-f, either alone or in any combination. In some embodiments, input device X703 and or input device X763 includes any of the features, components, and/or parts of any of first button 1-128, button 11.1.1-114, second button 1-132, and or dial or button 1-328, either alone or in any combination. In some embodiments, HMD X700 and/or HMD X760 includes one or more audio output components (e.g., electronic component 1-112) for generating audio feedback (e.g., audio output), optionally generated based on detected events and/or user inputs detected by the HMD X700 and/or HMD X760.

In some embodiments, the techniques and user interface(s) described herein are provided by one or more of the devices described in FIGS. 1A-1P. FIGS. 7J-7N illustrate embodiments in which three-dimensional environment 740 (e.g., as described in FIGS. 7A-7I1) is displayed on display module X702 of head-mounted device (HMD) X700 and display module X766 of head-mounted device (HMD)

X760. In some embodiments, device X700 includes a pair of display modules that provide stereoscopic content to different eyes of the same user. For example, HMD X700 includes display module X702 (which provides content to a left eye of the user) and a second display module (which provides content to a right eye of the user). In some embodiments, the second display module displays a slightly different image than display module X702 to generate the illusion of stereoscopic depth. Similarly, in some embodiments, device X760 includes a pair of display modules that provide stereoscopic content to different eyes of the same user. For example, HMD X760 includes display module X766 (which provides content to a left eye of the user) and a second display module (which provides content to a right eye of the user). In some embodiments, the second display module displays a slightly different image than display module X766 to generate the illusion of stereoscopic depth.

Figure 7J:
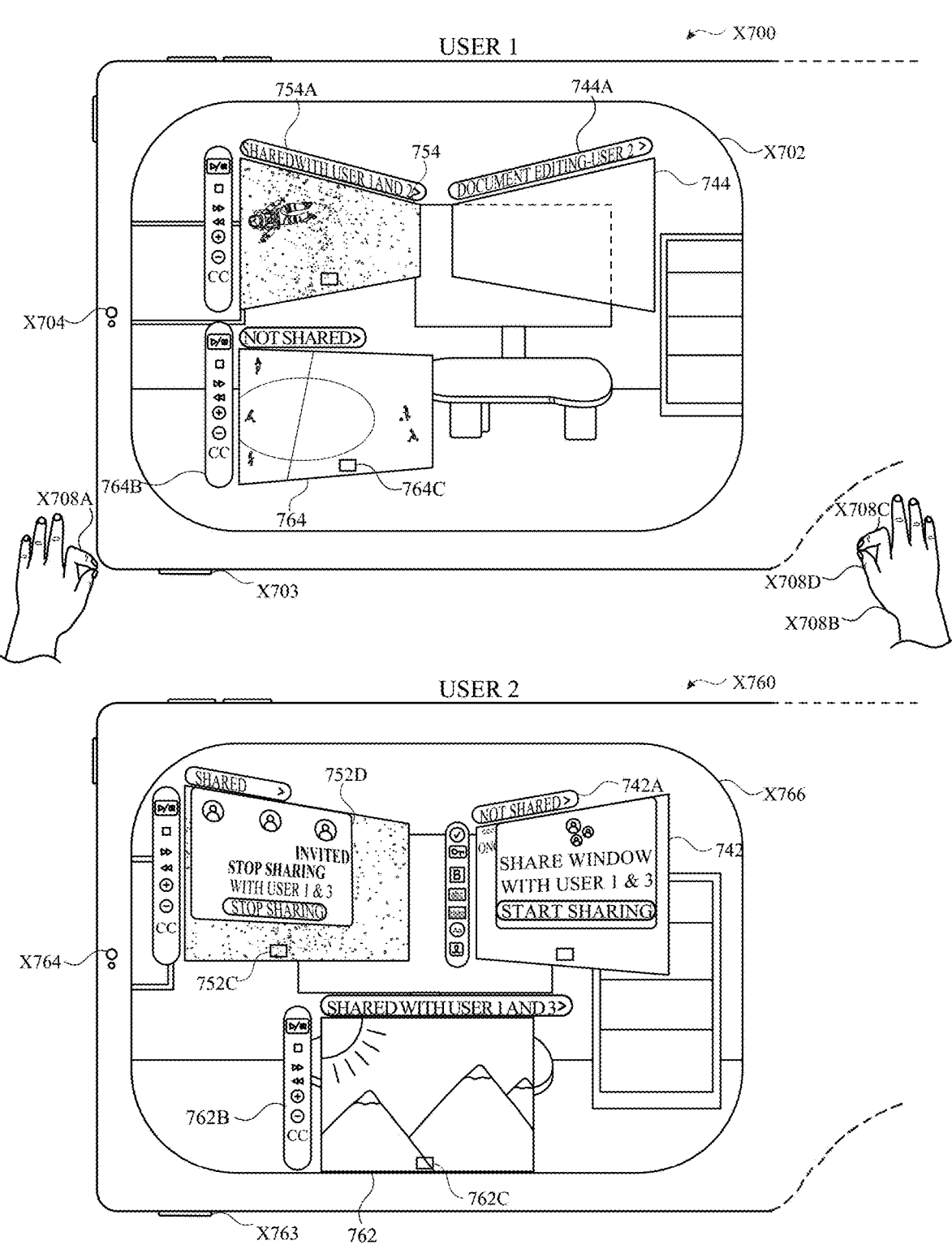

At FIG. 7J, the first HMD X700 has received, from the first user, a user input (e.g., one or more air gestures via hand X708A and/or hand X708B (e.g., one or more air tap gestures, one or more air pinch gestures, and/or one or more drag gestures) and/or one or more gaze gestures) requesting to display different content within the movie window 764. At FIG. 7J, in response to HMD X700 receiving the input from the first user requesting to display different content, HMD X700 displays second content (e.g., a soccer movie and/or a soccer match) within movie window 764. The second content displayed within movie window 764 is private content that is displayed only on HMD X700, and is not shared into the real-time communication session. While the first user watches the second content on HMD X700, second HMD X760 continues to share a first movie with the first user and a third user. Accordingly, while the first HMD X700 displays the second content within movie window 764, second HMD X760 continues to display the first movie within movie window 762, and other participants (e.g., USER 3) continue to see the first movie shared by the second user.

Figure 7K:
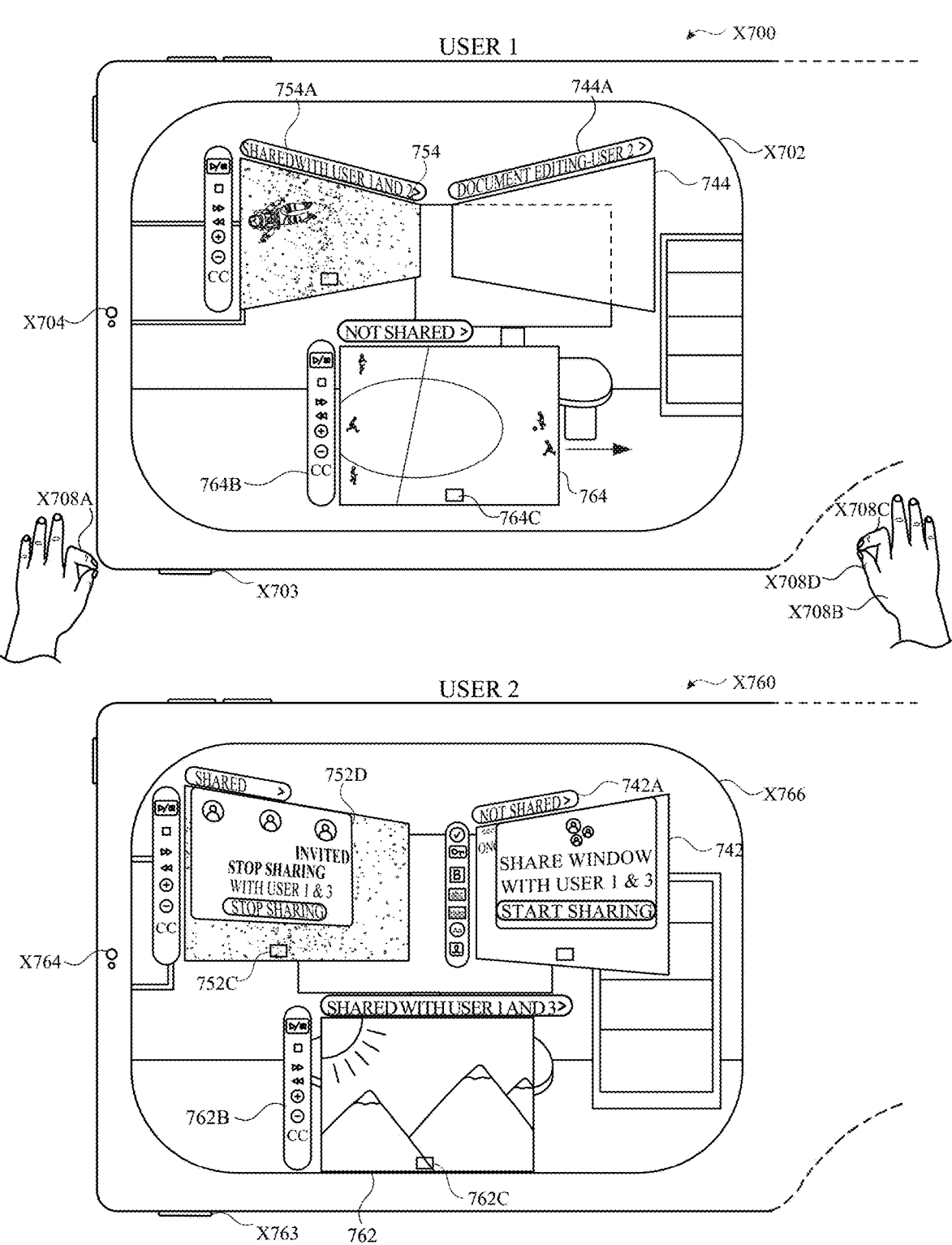

At FIG. 7K, first HMD X700 has received, from the first user, one or more user inputs (e.g., one or more air gestures via hand X708A and/or hand X708B (e.g., one or more air tap gestures, one or more air pinch gestures, and/or one or more drag gestures) and/or one or more gaze gestures) requesting to move window 764 to a different position within three-dimensional environment 740. In response to receiving the one or more user inputs requesting to move window 764, first HMD X700 displays movement of window 764 to the right.

Figure 7L:
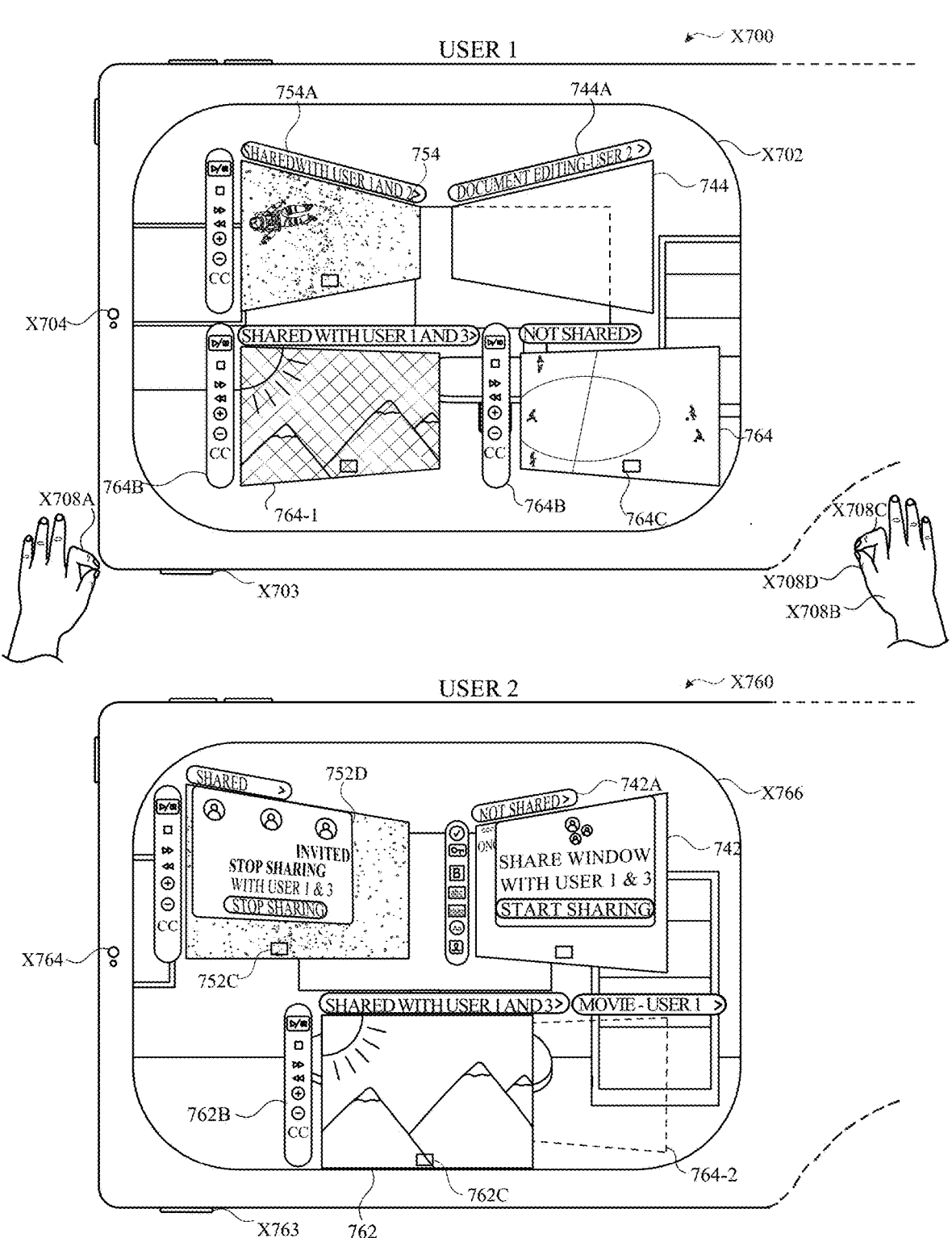

At FIG. 7L, first HMD X700 continues to receive the user input requesting to move window 764, and first HMD X700 displays further movement of window 764 to the right. At FIG. 7L, first HMD X700 detects that window 764 has been moved by a threshold amount such that window 764 no longer occupies the region in three-dimensional environment 740 occupied by movie window 762. In response to the determination that window 764 has been moved by the threshold amount, first HMD X700 displays window 764-1 that corresponds to and/or is representative of movie window 762 that has been shared by the second user into the real-time communication session. In some embodiments, window 764-1 displays the shared content that has been shared by the first user. In some embodiments, window 764-1 does not display the shared content. In some embodiments, window 764-1 displays a representation of the shared content (e.g., a screenshot, a title screen, and/or text) that is representative of the shared content but is different from the shared content. In the displayed embodiments, window 764-1 is displayed after window 764 vacates the area occupied by window 762 in three-dimensional environment 740 (which is also the area that was previously occupied by window 764). In some embodiments, window 764-1 is displayed and/or partially displayed when window 764 is moved but still occupies at least a portion of the area occupied by window 762. For example, in some embodiments, when window 764 is displayed at the position shown in FIG. 7K, rather than not showing any portion of window 764-1 (as shown in FIG. 7K), a portion of window 764-1 is displayed to the left of window 764, and more of window 764-1 is gradually displayed and/or revealed as window 764 moves further to the right. In some embodiments, the portion of window 764-1 that is displayed displays a portion of the content shared by the second user. In some embodiments, the portion of window 764-1 that is displayed displays a representation (e.g., a screenshot and/or text) of the content shared by the second user. In some embodiments, the portion of window 764-1 does not show the content shared by the second user.

At FIG. 7L, second HMD X760 displays window 764-2, which corresponds to and/or is representative of the first user's private window 764. Due to window 764 being a private window for the first user, window 764-2 does not display the contents of window 764. For example, in some embodiments, window 764-2 displays an outline of a window, or a blank window, without showing the content of window 764. However, in some embodiments, window 764-2 has the same size and/or spatial position within three-dimensional environment 740 as window 764.

Figure 7M:
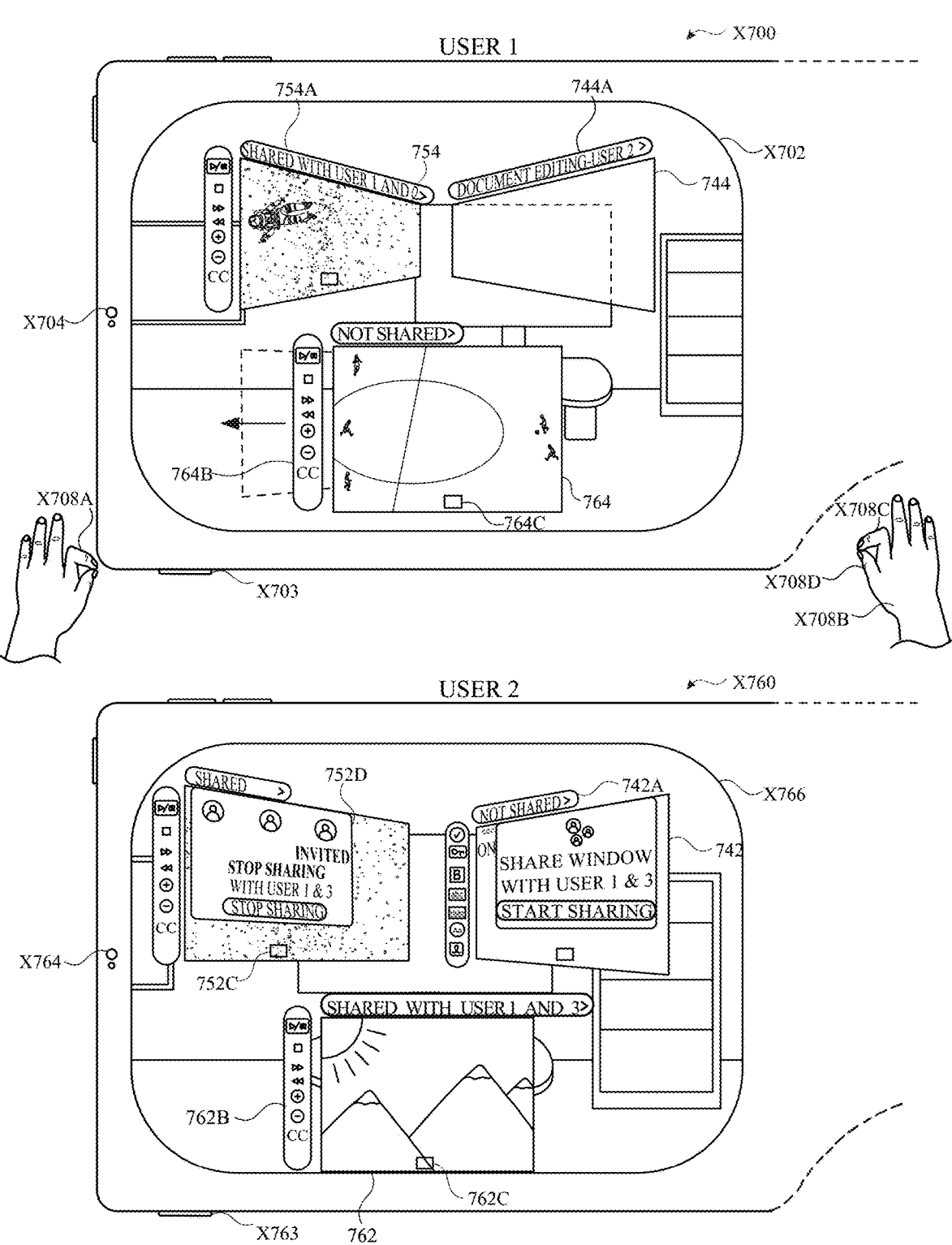
Figure 7N:
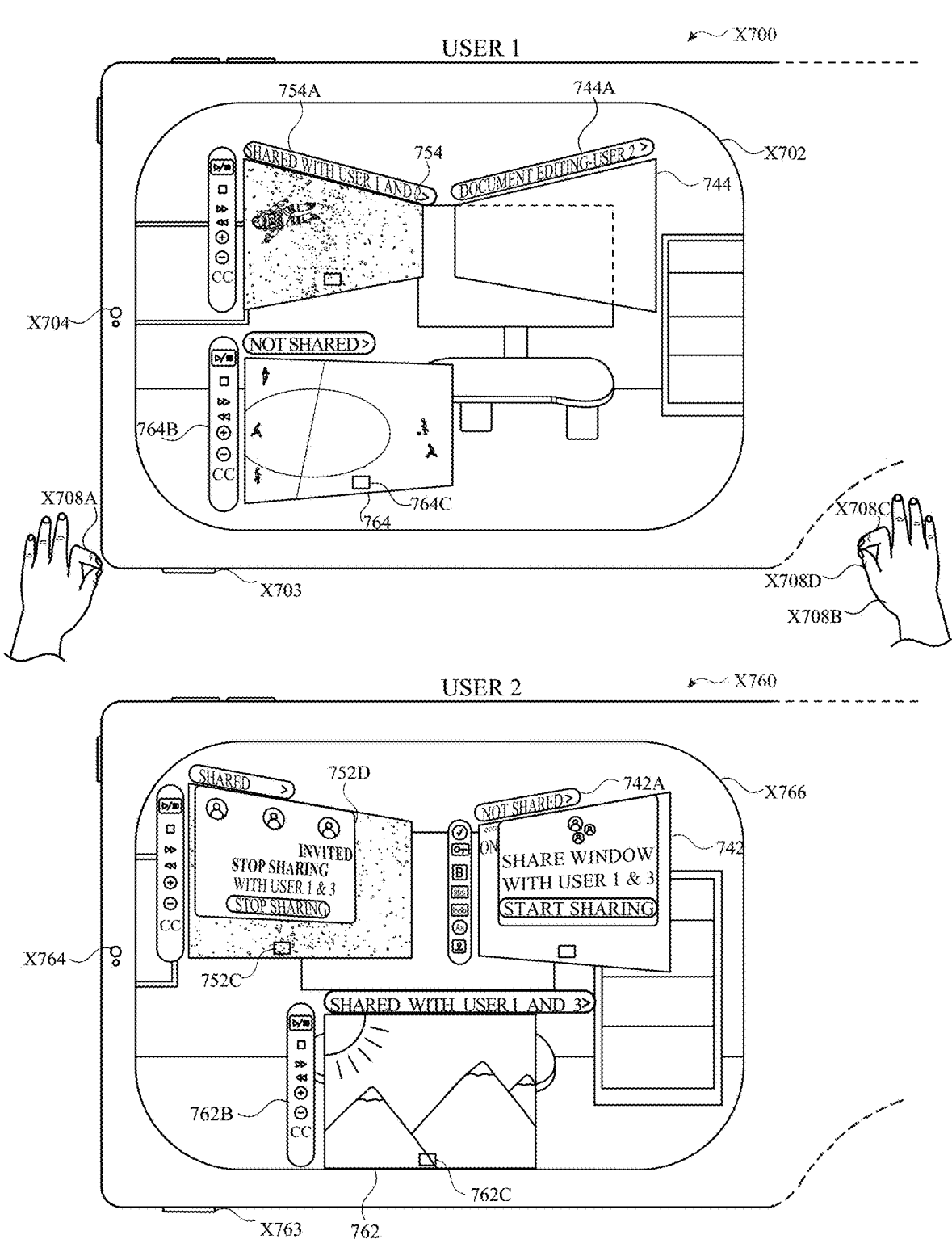

At FIG. 7M, first HMD X700 has received, from the first user, one or more user inputs (e.g., one or more air gestures (e.g., via hands X708A and/or X708B) (e.g., one or more air tap gestures, one or more air pinch gestures, and/or one or more drag gestures) and/or one or more gaze gestures) requesting to move window 764 to the left within three-dimensional environment 740. In response to receiving the one or more user inputs requesting to move window 764 to the left, first HMD X700 displays window 764 moving to the left. In some embodiments, when window 764 overlaps window 764-1, first HMD X700 ceases to display window 764-1. At FIG. 7M, window 764 overlaps the region in which window 764-1 was previously displayed and, accordingly, first HMD X700 ceases to display window 764-1. In some embodiments, rather than completely ceasing display of window 764-1, first HMD X700 gradually displays less and less of window 764-1 as window 764 moves to the left (e.g., in some embodiments, first HMD X700 displays only the portion of window 764-1 that is not overlapped by window 764). Furthermore, based on first HMD X700 receiving the one or more user inputs to move window 764 to the left, and based on window 764 being moved to a position within three-dimensional environment that overlaps window 764-1 and/or window 762, second HMD X760 ceases to display window 764-2. At FIG. 7N, first HMD X700 continues to receive the user input requesting to move window 764 to the left, and first HMD X700 displays further movement of window 764 to the left Additional descriptions regarding FIGS. 7A-7N are provided below in reference to methods 800, 900, and 1000 described with respect to FIGS. 8A-10.

FIGS. 8A-8B is a flow diagram of an exemplary method 800 for displaying a user interface object that reveals content based on whether the content is private or shared, in some embodiments. In some embodiments, method 800 is performed at a computer system (e.g., computer system 101 in FIG. 1A, first computer system 700, HMD X700, second computer system 760, and/or HMD X760) (e.g., a smartphone, a tablet, a watch, and/or a head-mounted device) that is in communication with one or more display generation components (e.g., display generation component 120 in FIGS. 1A, 3, and 4) (e.g., a visual output device, a display, a 3D display, a display having at least a portion that is transparent or translucent on which images can be projected (e.g., a see-through display), a projector, a heads-up display, and/or a display controller). In some embodiments, method 800 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 800 are, optionally, combined and/or the order of some operations is, optionally, changed.

While a first participant (e.g., a user of the computer system) is participating in a real-time communication session that includes a shared spatial arrangement in which one or more virtual objects that are visible to multiple participants in the real-time communication session have a consistent spatial relationship from viewpoints of different participants in the real-time communication session, the computer system (e.g., 700, X700, 760, and/or X760) displays (802) a representation (e.g., 712 and/or 710) of a second participant in a three-dimensional environment (e.g., 740).

While displaying the representation (e.g., 712 and/or 710) of the second participant, the computer system (e.g., 700, and/or X700) detects (804) the occurrence of an event corresponding to displaying respective content (e.g., the content of windows 742, 752, 762, and/or 774) to one or more of the participants in the real-time communication session.

In response to detecting the occurrence of the event, the computer system (e.g., 700, X700, 760, and/or X760) displays (806) a new virtual object (e.g., 744, 754, 764, and/or 772), corresponding to the respective content (e.g., the content of windows 742, 752, 762, and/or 774) in the shared spatial arrangement in the three-dimensional environment (e.g., 740).

The spatial relationship (808) between a first user interface object (e.g., 744, 754, 764, and/or 772) that represents the respective content to a first participant and a viewpoint of the first participant from a perspective of the first participant is consistent with a spatial relationship between a second user interface object (e.g., 742, 752, 762, and/or 774) that represents the respective content to the second participant and a representation of the first participant from the perspective of the second participant.

The spatial relationship (810) between the second user interface object (e.g., 742, 752, 762, and/or 774) that represents the respective content to the second participant and a viewpoint of the second participant from the perspective of the second participant is consistent with a spatial relationship between the first user interface object (e.g., 744, 754, 764, and/or 772) that represents the respective content to the first participant and a representation of the second participant from the perspective of the first participant.

Displaying (812) the new virtual object includes, in accordance with a determination that the respective content includes private content for the second participant, the first user interface object (e.g., 744 at FIG. 7B1, 744 at FIG. 7B2, 754 at FIG. 7D, 772 at FIG. 7G) that represents the respective content to the first participant indicates (814) a spatial location of the respective content in the shared spatial arrangement without revealing the private content for the second participant.

Displaying (812) the new virtual object includes, in accordance with a determination that the respective content includes shared content that is shared between the first participant and the second participant, the first user interface object (e.g., 744 at FIG. 7D and/or 764 at FIG. 7H) that represents the respective content to the first participant indicates (816) the spatial location of the respective content in the shared spatial arrangement and reveals the shared content. Displaying a placeholder window (that hides contents of the window but occupies a spatial position in three-dimensional environment) in place of a private window when a participant is interacting with the private window provides the user with feedback about the interactions that the participant is having (e.g., that the participant is interacting with a private window), thereby providing improved visual feedback.

In some embodiments, in accordance with a determination that the respective content includes private content for the first participant, the second user interface object (e.g., 744 at FIG. 7B1, 744 at FIG. 7B2, 754 at FIG. 7D, 772 at FIG. 7G) that represents the respective content to the second participant indicates the spatial location of the respective content in the shared spatial arrangement without revealing the private content for the first participant. In some embodiments, in accordance with a determination that the respective content includes shared content that is shared between the first participant and the second participant, the second user interface object (e.g., 744 at FIG. 7D and/or 764 at FIG. 7H) that represents the respective content to the second participant indicates the spatial location of the respective content in the shared spatial arrangement and reveals the shared content. Displaying a placeholder window (that hides contents of the window but occupies a spatial position in three-dimensional environment) in place of a private window when a participant is interacting with the private window provides the user with feedback about the interactions that the participant is having (e.g., that the participant is interacting with a private window), thereby providing improved visual feedback.

In some embodiments, the computer system (e.g., 700, X700, 760, and/or X760) displaying the new virtual object includes: in accordance with a determination that the event was initiated on behalf of the first participant (e.g., initiated by the first participant or by the device of the first participant), the first user interface object (e.g., 742 at FIG. 7A, 752 at FIG. 7D, 774 at FIG. 7F) that represents the respective content to the first participant indicates a spatial location of the respective content in the shared spatial arrangement and reveals the respective content without regard to whether or not the respective content is shared or private content for the first participant (e.g., because the content was intended to be viewed by the first participant). Displaying contents of a window (regardless of whether the window is private or shared) for the participant that caused the display of the window provides that participant (e.g., the owner of the window) feedback about the contents of the window and enables that participant to interact with the window, thereby providing improved visual feedback and an improved man-machine interface.

In some embodiments, in accordance with a determination that the event was initiated on behalf of the second participant (e.g., initiated by the second participant or by the device of the second participant), the second user interface object (e.g., 742 at FIG. 7A, 752 at FIG. 7D, 774 at FIG. 7F) that represents the respective content to the second participant indicates a spatial location of the respective content in the shared spatial arrangement and reveals the respective content without regard to whether or not the respective content is shared or private content for the second participant (e.g., because the content was intended to be viewed by the second participant). Displaying contents of a window (regardless of whether the window is private or shared) for the participant that caused the display of the window provides that participant (e.g., the owner of the window) feedback about the contents of the window and enables that participant to interact with the window, thereby providing improved visual feedback and an improved man-machine interface.

In some embodiments, displaying the new virtual object includes: in accordance with a determination that the event was initiated on behalf of the first participant (e.g., initiated by the first participant or by the device of the first participant), the first user interface object (e.g., 742 at FIG. 7B1, 742 at FIG. 7B2, and/or 752 at FIG. 7D) that represents the respective content to the first participant indicates a spatial location of the respective content in the shared spatial arrangement and reveals controls (e.g., 742B at FIG. 7B1, 742B at FIG. 7B2, and/or 752B at FIG. 7D) (e.g., a grabber object for moving the first user interface object, an affordance for closing the first user interface object, media playback controls, and/or sidebar (e.g., a word processor control sidebar (e.g., spell check, bold, and/or underline) and/or web browser control sidebar (e.g., back, history, and/or bookmarks))) corresponding to the respective content (e.g., without regard to whether or not the respective content is shared or private content for the first participant (e.g., because the content was intended to be viewed by the first participant)). Displaying controls for a window (regardless of whether the window is private or shared) for the participant that caused the display of the window provides that participant (e.g., the owner of the window) feedback about the controls of the window and enables that participant to interact with the controls, thereby providing improved visual feedback and an improved man-machine interface. In some embodiments, when the first participants initiates the event, the first participant sees controls that corresponds to the respective content, without regard to whether the respective content includes shared content or private content for the first participant. In some embodiments, in accordance with a determination that the event was initiated on behalf of the second participant, the second user interface object that represents the respective content to the second participant indicates a spatial location of the respective content in the shared spatial arrangement and reveals controls (e.g., a grabber object for moving the second user interface object, an affordance for closing the second user interface object, media playback controls, and/or sidebar (e.g., a word processor control sidebar (e.g., spell check, bold, and/or underline) and/or web browser control sidebar (e.g., back, history, and/or bookmarks))) corresponding to the respective content.

In some embodiments, displaying the new virtual object includes: in accordance with a determination that the respective content includes private content for the second participant, the first user interface object (e.g., 744 at FIG. 7B1, 744 at FIG. 7B2, and/or 754 at FIG. 7D) that represents the respective content to the first participant does not reveal controls (e.g., a grabber object for moving the first user interface object, an affordance for closing the first user interface object, media playback controls, and/or sidebar (e.g., a word processor control sidebar (e.g., spell check, bold, and/or underline) and/or web browser control sidebar (e.g., back, history, and/or bookmarks corresponding to the respective content (and, optionally, does or does not indicate a spatial location of the controls (e.g., a grabber object for moving the first user interface object, an affordance for closing the first user interface object, media playback controls, and/or sidebar (e.g., a word processor control sidebar (e.g., spell check, bold, and/or underline) and/or web browser control sidebar (e.g., back, history, and/or bookmarks))) corresponding to the respective content in the shared spatial arrangement). Not displaying controls for a window when the window is not shared with a participant provides that participant (e.g., that is not the owner of the window) feedback that participant cannot control aspects of the window and reduces visual clutter, thereby providing improved visual feedback. In some embodiments, in accordance with a determination that the respective content includes private content for the first participant, the second user interface object that represents the respective content to the second participant does not reveal controls (e.g., a grabber object for moving the first user interface object, an affordance for closing the first user interface object, media playback controls, and/or sidebar (e.g., a word processor control sidebar (e.g., spell check, bold, and/or underline) and/or web browser control sidebar (e.g., back, history, and/or bookmarks)) corresponding to the respective content (and, optionally, does or does not indicate a spatial location of the controls (e.g., a grabber object for moving the first user interface object, an affordance for closing the first user interface object, media playback controls, and/or sidebar (e.g., a word processor control sidebar (e.g., spell check, bold, and/or underline) and/or web browser control sidebar (e.g., back, history, and/or bookmarks) corresponding to the respective content in the shared spatial arrangement).

In some embodiments, displaying the new virtual object includes: in accordance with a determination that the respective content includes shared content (e.g., a picture and/or a video (e.g., movie, show, and/or short clip)) that is shared between the first participant and the second participant and the first participant has entitlement (e.g., authorization from an owner (e.g., copyright owner) of the content (that is different from the first participant), permission to view, and/or rights to access) to access (e.g., to display, to watch, and/or to play) the shared content, the first user interface object (e.g., 744 at FIG. 7D) that represents the respective content to the first participant reveals the shared content (and optionally indicates the spatial location of the respective content in the shared spatial arrangement), and in some embodiments, in accordance with a determination that the respective content includes shared content (e.g., a picture and/or a video (e.g., movie, show, and/or short clip)) that is shared between the first participant and the second participant and the first participant does not have entitlement to access the shared content, the first user interface object (e.g., 764 at FIG. 7E1 and/or 764 at FIG. 7E2) that represents the respective content to the first participant indicates (e.g., 764E) that the first participant does not have entitlement to access the shared content and does not reveal the shared content (and optionally indicates the spatial location of the respective content in the shared spatial arrangement without). In some embodiments, in accordance with the determination that the respective content includes shared content (e.g., a picture and/or a video (e.g., movie, show, and/or short clip)) that is shared between the first participant and the second participant and the first participant does not have entitlement to access the shared content, the first user interface object that represents the respective content to the first participant includes (a) an indication of how the first participant can gain entitlement to access the shared content and/or (b) an affordance that, when activated, initiates a process (e.g., a process to log into a service, a process to purchase a subscription, a process to purchase the shared content, and/or a process to purchase and/or download an application) to provide the first participant with entitlement to access the shared content. Displaying an indication to a participant that the participant does not have entitlement to access the content that has been shared with that participant provides that participant with feedback about why the content is not displayed, thereby providing improved visual feedback.

In some embodiments, in accordance with a determination that the respective content includes shared content (e.g., a picture and/or a video (e.g., movie, show, and/or short clip)) that is shared between the first participant and the second participant: the first participant is authorized to reposition the first user interface object (e.g., 762 and/or 764 at FIG. 7H) that represents the respective content to the first participant (e.g., the first user interface object is configured to be repositioned based on input from the first participant); and the second participant is authorized to reposition the second user interface object (e.g., 762 and/or 764 at FIG. 7H) that represents the respective content to the second participant (e.g., the second user interface object is configured to be repositioned based on input from the second participant). In some embodiments, in accordance with a determination that the respective content includes private content for the first participant (and, optionally, does not include shared content that is shared between the first participant and the second participant): the first participant is authorized to reposition the first user interface object (e.g., 774 at FIG. 7F) that represents the respective content to the first participant (e.g., the first user interface object is configured to be repositioned based on input from the first participant) and the second participant is not authorized to reposition the second user interface object (e.g., 772 at FIG. 7F) that represents the respective content to the second participant (e.g., the second user interface object is not configured to be repositioned based on input from the second participant). In some embodiments, in accordance with a determination that the respective content includes private content for the second participant (and, optionally, does not include shared content that is shared between the first participant and the second participant): the first participant is not authorized to reposition the first user interface object (e.g., 744 at FIG. 7B1 and/or 744 at FIG. 7B2) that represents the respective content to the first participant (e.g., the first user interface object is not configured to be repositioned based on input from the first participant) and the second participant is authorized to reposition the second user interface object (e.g., 742 at FIG. 7B1 and/or 742 at FIG. 7B2) that represents the respective content to the second participant (e.g., the second user interface object is configured to be repositioned based on input from the second participant). In some embodiments, when a participant repositions a user interface object that represents first content to that participant, the corresponding user interface objects that represent the first content to other participants is (e.g., concurrently and/or automatically) repositioned, thereby maintaining the consistent spatial relationship from the viewpoints of different participants in the real-time communication session. Enabling participants to reposition windows that have been shared with them enables those participants to better organize the three-dimensional environment, thereby providing an improved man-machine interface. Further, preventing participants from repositioning windows that have not been shared with them prevents those participants from hiding or otherwise obscuring windows from the participant that initiated the display of the window.

In some embodiments, the computer system (e.g., 700, X700, 760, and/or X760) detects a request (e.g., from the first participant or another participant in the real-time communication session) to reposition the new virtual object corresponding to the respective content. In response to detecting the request to reposition the new virtual object corresponding to the respective content, repositioning the first user interface object (e.g., 744 at FIG. 7B1 and/or 744 at FIG. 7B2) that represents the respective content to the first participant and repositioning the second user interface object (e.g., 742 at FIG. 7B1 and/or 742 at FIG. 7B2) that represents the respective content to the second participant to maintain the consistent spatial relationship from the viewpoints of different participants in the real-time communication session. By moving a window in the three-dimensional environment for all participants when the window is moved by one participant provides participants with feedback that the window has been moved (and to where the window has been moved), thereby providing improved visual feedback. Further, by displaying the moved window at the new location, participants can better understand the interaction other participants have with the moved window, thereby providing improved visual feedback.

In some embodiments, while displaying the first user interface object (e.g., 754 at FIG. 7H) that represents the respective content to the first participant without revealing the private content for the second participant, the computer system (e.g., 700, X700, 760, and/or X760) detects an indication that a subset of content in the private content (e.g., some or all of the private content) for the second participant has been shared between the first participant and the second participant. In response to detecting the indication that the subset of content in the private content for the second participant has been shared between the first participant and the second participant, the computer system (e.g., 700, X700, 760, and/or X760) updates display of the first user interface object (e.g., 754 at FIGS. 7I1 and/or 754 at FIG. 7I2) that represents the respective content to the first participant to reveal the subset of the content (e.g., shared content that was previously private content). In some embodiments, once private content is shared with a respective participant, the shared content (that was previously private content) is displayed as part of the respective content in the respective user interface object that represents the respective content to the respective participant. By revealing contents of a window when a (previously) private window is shared with a participant provides that participant with feedback about the contents of the window and whether it is shared with that participant, thereby providing improved visual feedback.

In some embodiments, displaying the new virtual object includes in accordance with a determination that the respective content includes private content for the second participant, the first user interface object (e.g., 744 at FIG. 7B1, 744 at FIG. 7B2, 772 at FIG. 7F) that represents the respective content to the first participant is partially transparent (e.g., 5% transparency, 25% transparency, or 80% transparency). In some embodiments, the first user interface object being partially transparent enables the computer system to display elements (e.g., virtual elements and/or physical elements) located behind the first user interface object in the three-dimensional environment. Displaying placeholder windows (that hides contents of the window but occupies a spatial position in three-dimensional environment) as partially transparent provides the user with visual feedback that a window that is not shared is at that position in the three-dimensional environment while also providing some visibility of elements that are behind the placeholder window, thereby providing the user with improved visual feedback.

In some embodiments, displaying the new virtual object includes: in accordance with a determination that the respective content includes private content for the second participant, the first user interface object that represents the respective content to the first participant includes an indication (e.g., a name, a category, and/or a type) of an application (e.g., "document editing" at 744A of FIG. 7B1 and/or 744 at FIG. 7B2) corresponding to the respective content (and/or of the application corresponding to the second user interface object). Displaying an indication of the corresponding application as part of the placeholder window provides the viewer of the placeholder window information about the application that is causing display of the placeholder window, thereby providing the user with improved visual feedback.

In some embodiments, displaying the new virtual object includes: in accordance with a determination that the respective content includes private content for the second participant, the first user interface object (e.g., 772 at FIG. 7G) that represents the respective content to the first participant does not include an indication (e.g., a name, a category, and/or a type) of an application corresponding to the respective content (and/or of the application corresponding to the second user interface object). Not displaying an indication of the corresponding application as part of the placeholder window provides the initiator (e.g., owner) of the window with additional privacy.

In some embodiments, displaying the new virtual object includes: in accordance with a determination that the respective content includes private content for the second participant, the first user interface object (e.g., 744 at FIG. 7B1 and/or 744 at FIG. 7B2) that represents the respective content to the first participant includes an indication (e.g., "User 2" at 744A) (e.g., a name or username) of a participant that initiated the event. Displaying an indication of the initiator (e.g., owner) of a placeholder window provides the viewer of the placeholder window information about which user owns the placeholder window and facilitates requesting access to view the contents of the window, thereby providing the user with improved visual feedback.

In some embodiments, displaying the new virtual object includes: in accordance with a determination that the event was not initiated on behalf of the first participant (e.g., was initiated by a participant other than the first participant, such as the second participant or a third participant), the first user interface object (e.g., 772 at FIG. 7G) that represents the respective content to the first participant does not indicate a participant that initiated the event. In some embodiments, if the first user interface object corresponds to a private window of another participant (e.g., not shared with the first participant), the first user interface object does not indicate (forgoes displaying an indication of) the participant to which the private window corresponds. Not displaying an indication of the initiator (e.g., owner) of a placeholder window provides the initiator (e.g., owner) of the window with additional privacy.

In some embodiments, while displaying the first user interface object (e.g., 744 at FIG. 7B1 and/or 744 at FIG. 7B2) that represents the respective content to the first participant (e.g., without revealing the private content for the second participant and/or with revealing shared content), the computer system (e.g., 700, X700, 760, and/or X760)

displays, via the one or more display generation components (e.g., 702, X702, 766, and/or X766), a representation (e.g., an avatar) (e.g., 712 at FIG. 7B1 and/or 712 at FIG. 7B2) of the second participant interacting with the first user interface object (and/or the respective content). In some embodiments, because the first user interface object and the second user interface object are positioned at the same location in the three-dimensional environment, when the second participant interacts with the second user interface object, the second participant appears to be interacting with the first user interface object from the viewpoint of the first participant. Displaying a representation of a participant interacting with a placeholder window provides the viewer with visual feedback about the interaction, thereby providing the viewer with improved visual feedback.

In some embodiments, while displaying the first user interface object, the computer system (e.g., 700, X700, 760, and/or X760) detects the occurrence of a second event corresponding to displaying second respective content to one or more of the participants in the real-time communication session. In response to detecting the occurrence of the second event, the computer system (e.g., 700, X700, 760, and/or X760) displays a second new virtual object (e.g., 752 and/or 754 at FIG. 7D) corresponding to the second respective content in the shared spatial arrangement in the three-dimensional environment, wherein: a spatial relationship between a third user interface object (e.g., 754 at FIG. 7D) that represents the second respective content to the first participant and the viewpoint of the first participant from the perspective of the first participant is consistent with a spatial relationship between a fourth user interface object that represents the second respective content to the second participant and the representation of the first participant from the perspective of the second participant; and a spatial relationship between the fourth user interface object (e.g., 752 at FIG. 7D) that represents the second respective content to the second participant and the viewpoint of the second participant from the perspective of the second participant is consistent with a spatial relationship between the third user interface object that represents the second respective content to the first participant and the representation of the second participant from the perspective of the first participant. In some embodiments, displaying the new virtual object includes: in accordance with a determination that the second respective content includes second private content for the second participant, the third user interface object that represents the second respective content to the first participant indicates a spatial location of the second respective content in the shared spatial arrangement without revealing the second private content for the second participant; and in accordance with a determination that the second respective content includes second shared content that is shared between the first participant and the second participant, the third user interface object that represents the second respective content to the first participant indicates the spatial location of the second respective content in the shared spatial arrangement and reveals the second shared content. Displaying multiple placeholder windows provides the viewer with feedback about the location of the windows and enables the viewer to better understand participants' interactions with the windows, thereby providing improved visual feedback.

In some embodiments, the respective content includes a system user interface (e.g., of first computer system 700, HMD X700, second computer system 760, and/or HMD X760) (e.g., a user interface provided by the operating system, a user interface that includes a plurality of user interface objects that, when selected, initiate display of a respective application, a user interface that includes control objects for settings of the computer system, including airplane mode, user interface orientation lock, display brightness, system volume, and/or enabling/disabling various wireless features, a user interface that includes recent (e.g., all recent or recent unread) notifications (corresponding to a plurality of applications) that have been received at the computer system, a user interface for modifying settings of an operating system of the computer system, and/or a user interface for modifying a user account of the computer system). A system user interface being displayed as part of a placeholder window enables the initiator (e.g., owner) of the window to keep the contents of the system user interface private (or share them, if they prefer), thereby providing increased privacy and security.

In some embodiments, the computer system (e.g., 700, X700, 760, and/or X760) detects a request (e.g., from the first participant or another participant in the real-time communication session) to resize the new virtual object corresponding to the respective content. In response to detecting the request to resize the new virtual object corresponding to the respective content, the computer system (e.g., 700, X700, 760, and/or X760) resizes the first user interface object (e.g., resizing 742 and/or 744) that represents the respective content to the first participant and resizing the second user interface object that represents the respective content to the second participant to maintain the consistent spatial relationship from the viewpoints of the different participants in the real-time communication session. In some embodiments, in response to a user interface object that represents the respective content being resized, respective user interface objects that represent the respective content to other respective participants are automatically resized to maintain the consistent spatial relationship from the viewpoints of different participants in the real-time communication session. By resizing a window in the three-dimensional environment for all participants when the window is resized by one participant provides participants with feedback that the window has been resized (and the new size of the window), thereby providing improved visual feedback. Further, by displaying the resized window at the new size, participants can better understand the interaction other participants have with the resized window, thereby providing improved visual feedback.

In some embodiments, while the second participant (e.g., "USER 2" in FIGS. 7I1 and/or 7J) is sharing third shared content (e.g., content shown in windows 762 and 764 in FIGS. 7I1 and/or 7I2) into the real-time communication session, wherein the third shared content is displayed at a first spatial position within the three-dimensional environment to one or more other participants in the real-time communication session different from the second participant, the computer system (e.g., first computer system 700 and/or HMD X700) displays, via the one or more display generation components (e.g., 702 and/or X702), third private content (e.g., content shown in window 764 in FIG. 7J) different from the third shared content at the first spatial position (e.g., without displaying the third shared content at the first spatial position (e.g., while the third shared content is displayed at the first spatial position by one or more other computer systems participating in the real-time communication session)), wherein the third private content is not shared into the real-time communication session (e.g., is not visible to and/or is not displayed to other participants in the real-time communication session other than the first participant; and/or is not displayed by other computer systems participating in the real-time communication session other than the computer system). While displaying the third private content at the first spatial position, the computer system receives (e.g., via one or more input devices in communication with the computer system) a first user input (e.g., one or more touch inputs, one or more gaze inputs, one or more gesture inputs, and/or one or more air gesture inputs) corresponding to a user request (e.g., from the first participant) to move the third private content from the first spatial position to a second spatial position in the three-dimensional environment different from the first spatial position (e.g., FIGS. 7J-7L). In response to receiving the first user input: the computer system displays movement of the third private content (e.g., content in window 764 in FIGS. 7J-7L) from the first spatial position to the second spatial position (e.g., FIGS. 7J-7L); and in accordance with a determination that the third private content has been moved by a first threshold amount from the first spatial position (e.g., a threshold number of pixels; a threshold distance; and/or a threshold simulated distance) (in some embodiments, in accordance with a determination that the third private content does not overlap the third shared content when the third shared content is displayed at the first spatial position and/or the third private content has been moved completely out of the first spatial position and/or a first spatial region corresponding to the third shared content) (in some embodiments, when the third private content is moved by the first threshold amount away from the first spatial position, the third private content partially overlaps the third shared content when the third shared content is displayed at the first spatial position), the computer system (e.g., 700 and/or X700) displays, via the one or more display generation components (e.g., 702 and/or X702), at the first spatial position, a placeholder object (e.g., 764-1) representative of the third shared content (in some embodiments, the placeholder object displays at least a portion of the third shared content; in some embodiments, the placeholder object does not display the third shared content). In some embodiments, in response to receiving the first user input: in accordance with a determination that the third private content has not been moved by the first threshold amount away from the first spatial position, the computer system forgoes displaying the placeholder object (e.g., FIG. 7K). Displaying a placeholder object when the user moves the third private content away from the first spatial position provides the user with feedback about the state of the computer system and/or the real-time communication session (e.g., other participants in the real-time communication session see shared content at the first spatial position), thereby providing improved visual feedback and an improved man-machine interface.

In some embodiments, while concurrently displaying the third private content (e.g., content in window 764 in FIG. 7L) at the second spatial position and the placeholder object (e.g., 764-1) at the first spatial position, the computer system receives (e.g., via one or more input devices in communication with the computer system) a second user input (e.g., one or more touch inputs, one or more gaze inputs, one or more gesture inputs, and/or one or more air gesture inputs) corresponding to a user request (e.g., from the first participant) to move the third private content (e.g., 764 in FIG. 7L) from the second spatial position to a third spatial position different from the second spatial position (e.g., a third spatial position that is the same as or different from the first spatial position). In response to receiving the second user input: the computer system displays movement of the third private content from the second spatial position to the third spatial position (e.g., 764 in FIGS. 7L-7N); in accordance with a determination that the third spatial position is within a threshold proximity of the first spatial position (e.g., in accordance with a determination that the third private content, when displayed at the third spatial position, overlaps the placeholder object displayed at the first spatial position), the computer system ceases display of the placeholder object (e.g., 764-1) (e.g., FIG. 7M, first HMD X700 ceases display of window 764-1); and in accordance with a determination that the third spatial position is not within the threshold proximity of the first spatial position (e.g., in accordance with a determination that the third private content, when displayed at the third spatial position, does not overlap the placeholder object displayed at the first spatial position), the computer system maintains display of the placeholder object (e.g., 764-1) at the first spatial position. Displaying a placeholder object when the user moves the third private content away from the first spatial position, and ceasing display of the placeholder object when the user moves the third private content back to the first spatial position, provides the user with feedback about the state of the computer system and/or the real-time communication session (e.g., other participants in the real-time communication session see shared content at the first spatial position), thereby providing improved visual feedback and an improved man-machine interface.

In some embodiments, aspects/operations of methods 800, 900, and 1000 may be interchanged, substituted, and/or added between these methods. For example, the techniques are applied in the same three-dimensional environment. For another example, the techniques are applied to the same objects in the three-dimensional environment. For brevity, these details are not repeated here.

FIG. 9 is a flow diagram of an exemplary method 900 for displaying a user interface object that includes shared content based on whether participants have entitlement to the content, in some embodiments. In some embodiments, method 900 is performed at a computer system (e.g., computer system 101 in FIG. 1A, first computer system 700, HMD X700, second computer system 760, and/or HMD X760) (e.g., a smartphone, a tablet, a watch, and/or a head-mounted device) that is in communication with one or more display generation components (e.g., a visual output device, a display, a 3D display, a display having at least a portion that is transparent or translucent on which images can be projected (e.g., a see-through display), a projector, a heads-up display, and/or a display controller) (e.g., display generation component 120 in FIGS. 1A, 3, and 4, 702, X702, 766, and/or X766). In some embodiments, method 900 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 900 are, optionally, combined and/or the order of some operations is, optionally, changed.

In response to respective content (e.g., a page of a digital book, a video, a movie, and/or an image) being selected (e.g., by a first participant corresponding to the user of the computer system or by a second participant corresponding to a remote user that is different from the user of the computer system) (e.g., selected for playback and/or selected to be shared with participants of the real-time communication session), during a real-time communication session that occurs in a three-dimensional environment (e.g., 740), the computer system (e.g., 700, X700, 760, and/or X760) displays (902), via the one or more display generation components (e.g., 702, X702, 766, and/or X766), a first virtual object (e.g., 754 and/or 764) (e.g., a window object, a non-window object, a 2D object, a 3D object, and/or that is located at a first location in an extended reality environment) corresponding to the respective content in the three-dimensional environment (e.g., 740), wherein the first virtual object (e.g., 754 and/or 764) has a position in the three-dimensional environment (e.g., 740) that indicates a spatial location of the respective content in a respective spatial arrangement (e.g., a shared spatial arrangement in which one or more user interface objects and/or virtual objects that are visible to multiple participants have a consistent spatial relationship (e.g., in the three-dimensional environment) from the viewpoints of different participants in the real-time communication session) of virtual objects in the three-dimensional environment (e.g., 740) (In some embodiments, the first virtual object is a newly displayed virtual object that was not displayed prior to detecting the selection of the respective content).

The computer system (e.g., 700, X700, 760, and/or X760) displaying (902) the first virtual object (e.g., 754 and/or 764) includes: in accordance with a determination that a first participant in the real-time communication session has entitlement (e.g., authorization from an owner of the content, permission to view, and/or rights to access) to access (e.g., to display, to watch, and/or to play) the respective content, the first virtual object (e.g., 754 at 7I1 and/or 754 at FIG. 7I2) (e.g., a window object, a non-window object, a 2D object, a 3D object, and/or that is located at a first location in an extended reality environment) that corresponds to the respective content and indicates the spatial location of the respective content in the respective spatial arrangement for the first participant includes (904) at least a portion of the respective content.

The computer system (e.g., 700, X700, 760, and/or X760) displaying (902) the first virtual object (e.g., 754 and/or 764) includes: in accordance with a determination that the first participant does not have entitlement (e.g., authorization from an owner of the content, permission to view, and/or rights to access) to access (e.g., to display, to watch, and/or to initiate playback of) the respective content, the first virtual object (e.g., 764 at FIG. 7G) that corresponds to the respective content and indicates the spatial location of the respective content in the respective spatial arrangement for the first participant does not include (906) the respective content (e.g., without displaying the respective content as part of the first virtual object and without displaying the respective content separate from the first virtual object for the first participant to view). Displaying the first virtual object, such as a window, that indicates the spatial location of content selected for sharing and/or playback in the real-time communication session provides the user with visual feedback about the location of the first virtual object in the three dimensional environment, thereby providing improved visual feedback. Displaying the respective content in the first virtual object provides the user with visual feedback that the user has entitlement to access the content, while not displaying the respective content in the first virtual object provides the user with visual feedback that the user does not have entitlement, thereby providing the user with improved visual feedback.

In some embodiments, the respective content is selected by a second participant (e.g., the user of second computer system 760 and/or HMD X760) in the real-time communication session, different from the first participant in the real-time communication session, wherein the second participant corresponds to a remote user that is different from a user of the computer system (e.g., 700 and/or HMD X700). In some embodiments, the remote participant has selected the respective content by providing inputs at a remote computer system to share the respective content with participants (including the first participant) in the real-time communication session. Displaying the first virtual object, such as a window, based on user input by a remote participant that is not the user of the computer system provides the user of the computer system with visual feedback that the remote participant is accessing content in the window, thereby providing the user with improved visual feedback.

In some embodiments, displaying, via the one or more display generation components, the first virtual object corresponding to the respective content in the three-dimensional environment further includes: in accordance with the determination that the first participant does not have entitlement (e.g., authorization from an owner of the content, permission to view, and/or rights to access) to access (e.g., to display, to watch, and/or to initiate playback of) the respective content, the first virtual object (e.g., 764) that corresponds to the respective content and indicates the spatial location of the respective content in the respective spatial arrangement for the first participant includes instructions (e.g., 764E at FIG. 7E1 and/or 764 at FIG. 7E2) to obtain entitlement (e.g., authorization from an owner of the content, permission to view, and/or rights to access) to access (e.g., to display, to watch, and/or to play) the respective content. Displaying instructions to obtain entitlement to access the respective content provides the user with visual feedback that the first participant does not have entitlement to access the respective content, thereby providing improved visual feedback.

In some embodiments, displaying, via the one or more display generation components, the first virtual object (e.g., 764 at FIG. 7E1 and/or 764 at FIG. 7E2) corresponding to the respective content in the three-dimensional environment further includes: in accordance with the determination that the first participant does not have entitlement (e.g., authorization from an owner of the content, permission to view, and/or rights to access) to access (e.g., to display, to watch, and/or to initiate playback of) the respective content, the first virtual object (e.g., 764 at FIG. 7E1 and/or 764 at FIG. 7E2) that corresponds to the respective content and indicates the spatial location of the respective content in the respective spatial arrangement for the first participant includes (e.g., as part of the instructions to obtain entitlement to access the respective content or separate from the instructions to obtain entitlement to access the respective content) a selectable user interface object (e.g., 764E) to initiate a process to obtain entitlement to access the respective content. In some embodiments, the computer system (e.g., 700 and/or HMD X700) detects selection of (e.g., 750A) (e.g., via a gesture (e.g., touch gesture and/or air gesture), gaze, and/or audio input) the selectable user interface object (e.g., 764E). In response to detecting selection (e.g., 750A) of the selectable user interface object (e.g., 764E), the computer system (e.g., 700 and/or HMD X700) initiates the process (e.g., including display of 774) to obtain entitlement to access the respective content. Displaying a selectable user interface object, such as a button, to initiate a process to obtain entitlement to access the respective content provides the user with visual feedback that the first participant does not have entitlement to access the respective content and provides a quick way to start the process to gain entitlement, thereby providing improved visual feedback and reducing the number of inputs required to gain entitlement to access the respective content.

In some embodiments, the process to obtain entitlement to access the respective content includes a process to purchase access to the respective content. In some embodiments, the process to purchase access to the respective content includes the computer system displaying a user interface of an online media store, receiving input to request (e.g., a server and/or a remote device) to create a user account for the first participant for the online media store, receiving user confirmation from the first participant to purchase the content, receiving payment information, and/or completing the process to purchase access to the respective content. In some embodiments, the computer system receives input from the first participant corresponding to private information, such as login/password information and/or payment information, as part of the process to purchase access to the respective content. In some embodiments, the computer system receives and/or displays such input at the second virtual object for obtaining entitlement to the respective content, which is optionally a private window for the first participant and not shared with other participants, thereby providing additional privacy benefits to the first participant. Providing the user with easy access to purchase access to the respective content enables the user to quickly and efficiently purchase access to the respective content, thereby reducing the number of inputs required to access the content.

In some embodiments, the process to obtain entitlement to access the respective content includes a process to purchase a subscription (e.g., weekly, monthly, and/or yearly) to access the respective content. In some embodiments, the process to purchase a subscription to the respective content includes the computer system displaying a user interface of an online subscription service, receiving input to request (e.g., a server and/or a remote device) to create a user account for the first participant for the online subscription service, receiving user confirmation from the first participant to purchase a subscription to the subscription service, receiving payment information, and/or completing the process to purchase the subscription to the subscription service. In some embodiments, the computer system receives input from the first participant corresponding to private information, such as login/password information and/or payment information, as part of the process to purchase the subscription that provides access to the respective content. In some embodiments, the computer system receives and/or displays such input at the second virtual object for obtaining entitlement to the respective content, which is optionally a private window for the first participant and not shared with other participants, thereby providing additional privacy benefits to the first participant. Providing the user with easy access to purchase a subscription to the respective content enables the user to quickly and efficiently purchase the subscription to the respective content, thereby reducing the number of inputs required to access the content.

In some embodiments, the process to obtain entitlement to access the respective content includes a process to download an application (e.g., that provides access to the respective content and/or that facilities obtaining entitlement to access the respective content). In some embodiments, the process to download and/or purchase an application that provides access to the respective content includes the computer system displaying a user interface of an online application store, receiving input to request (e.g., a server and/or a remote device) to create a user account for the first participant for the online application store, receiving user confirmation from the first participant to download and/or purchase the application that process access to the respective content, receiving payment information, and/or completing the process to download/purchase the application that provides access to the respective content. Providing the user with easy access to download an application to access the respective content enables the user to quickly and efficiently download the application, thereby reducing the number of inputs required to access the content.

In some embodiments, initiating the process to obtain entitlement to access the respective content includes displaying, via the one or more display generation components (and, optionally, concurrently with the first virtual object), a second virtual object (e.g., 774 at FIG. 7F) (e.g., that includes options for downloading one or more applications, that includes options for purchasing/subscribing to the respective content, and/or that enables entering credentials (e.g., login/password) (e.g., to access the respective content)), different from the first virtual object, for obtaining entitlement to the respective content. In some embodiments, the second virtual object is displayed in the three-dimensional environment and indicates the spatial location of the contents of the second virtual object in the respective spatial arrangement to a second participant in the real-time communication session, different from the first participant in the real-time communication session, wherein the second participant corresponds to a remote user that is different from a user of the computer system. In some embodiments, a visual characteristic of the first virtual object changes (e.g., the first virtual object dims and or is grayed out) when the second virtual object is displayed. In some embodiments, the computer system receives input from the first participant corresponding to private information, such as login/password information and/or payment information, as part of the process to obtain entitlement to the respective content. In some embodiments, the computer system receives and/or displays such input at the second virtual object for obtaining entitlement to the respective content, which is optionally a private window for the first participant and not shared with other participants, thereby providing additional privacy benefits to the first participant. Displaying a new virtual object, such as a new window, in the three-dimensional environment for obtaining entitlement to the respective content enables the first participant to proceed with the process to obtain entitlement without changing the contents of the first virtual object, thereby improving the man-machine interface.

In some embodiments, while displaying, via the one or more display generation components, the first virtual object (e.g., 764 at FIG. 7E1 and/or 764 at FIG. 7E2) corresponding to the respective content in the three-dimensional environment without the respective content (e.g., based on a determination that the first participant does not have entitlement (e.g., authorization from an owner of the content, permission to view, and/or rights to access) to access (e.g., to display, to watch, and/or to initiate playback of) the respective content), detecting, via one or more sensors (e.g., a touch-sensitive surface, a gyroscope, an accelerometer, a motion sensor, a movement sensor, an infrared sensor, a camera sensor, a depth camera, a visible light camera, an eye-tracking sensor, a gaze-tracking sensor, a physiological sensor, and/or an image sensor) of the computer system, input corresponding to a request to reposition the first virtual object in the three-dimensional environment. In response to detecting input corresponding to the request to reposition the first virtual object in the three-dimensional environment, the computer system (e.g., 700 and/or HMD X700) repositions the first virtual object (e.g., 764 at FIG. 7E1 and/or 764 at FIG. 7E2) in the three-dimensional environment (e.g., 740) based on the input corresponding to the request to reposition the first virtual object (e.g., 764) in the three-dimensional environment (e.g., 740). In some embodiments, although the first participant cannot access the respective content, the first participant can move the first virtual object in the three-dimensional environment, which is shared with the other participants. Thus, the first virtual object is moved from the viewpoint of the second participant and other participants, as well. In some embodiments, the input corresponding to the request to reposition the first virtual object in the three-dimensional environment includes detecting hand movement and/or hand gestures (e.g., in the form of air gestures) of the first participant that corresponds to the first participant selecting, activating, and/or grabbing the first virtual object (e.g., via a grabber bar of the first virtual object) and (while selected/activated/grabbed), detecting hand movement. In response to detecting the hand movement while the first virtual object is selected, activated, and/or grabbed, moving (based on the hand movement) the first virtual object. In some embodiments, the input corresponding to the request to reposition the first virtual object In the three-dimensional environment includes detecting selection of the first virtual object for moving and detecting user input (e.g., via gaze input and/or via air gestures) indicating a location to which to move the first virtual object (e.g., the computer system detects user selection of the first virtual object, then detects the user gazing at the location in the three-dimensional space to move the first virtual object to and, while detecting the user gazing at the location, the computer system detects an air gesture input that causes the movement of the first virtual object). Enabling the first participant to reposition the first virtual object in the three-dimensional environment allows the first participant to place the first virtual object at a location that does not obstruct and/or impede the first participant's ability to be productive in the three-dimensional environment, thereby improving the man-machine interface.

In some embodiments, while displaying, via the one or more display generation components, a third virtual object (e.g., 754 at FIG. 7D) (e.g., concurrently with the first virtual object or not concurrently with the first virtual object) corresponding to private content (that has not been shared with the first participant) of a participant in the three-dimensional environment (e.g., 740), the computer system (e.g., 700 and/or HMD X700) detects, via one or more sensors (e.g., a touch-sensitive surface, a gyroscope, an accelerometer, a motion sensor, a movement sensor, an infrared sensor, a camera sensor, a depth camera, a visible light camera, an eye-tracking sensor, a gaze-tracking sensor, a physiological sensor, and/or an image sensor) of the computer system, input corresponding to a request to reposition the third virtual object (e.g., 754 at FIG. 7D) in the three-dimensional environment (e.g., 740). In response to detecting input corresponding to the request to reposition the third virtual object in the three-dimensional environment (and in accordance with a determination that the third virtual object is not shared with the first participant), the computer system (e.g., 700 and/or HMD X700) forgoes repositioning the third virtual object (e.g., 754 at FIG. 7D) in the three-dimensional environment (e.g., 740). In some embodiments, because third virtual object has not been shared with the first participant, the first participant cannot move the third virtual object. In some embodiments, the input corresponding to the request to reposition the third virtual object in the three-dimensional environment includes detecting hand movement and/or hand gestures (e.g., in the form of air gestures) of the first participant that corresponds to the first participant requesting to select, activate, and/or grab the third virtual object (e.g., via a grabber bar of the third virtual object) and (while selected/activated/grabbed), detecting hand movement of the first participant. In response to detecting the hand movement after receiving the request to reposition the third virtual object (e.g., while the third virtual object is selected, activated, and/or grabbed), forgoing moving (based on the hand movement) the third virtual object. In some embodiments, the input corresponding to the request to reposition the third virtual object in the three-dimensional environment includes detecting a request to select the third virtual object for moving and detecting user input (e.g., via gaze input and/or via air gestures) indicating a location to which to move the third virtual object (e.g., the computer system detects user selection of the third virtual object, then detects the user gazing at the location in the three-dimensional space to move the third virtual object to and, while detecting the user gazing at the location, the computer system detects an air gesture input request movement of the third virtual object). Not enabling participants without access to a private virtual object to reposition private virtual objects in the three-dimensional environment allows the participants who have access to the private virtual object to not lose track of the private virtual object based on participants without access to the private virtual object moving the private virtual object, thereby improving the man-machine interface.

In some embodiments, while displaying, via the one or more display generation components, the first virtual object corresponding to the respective content in the three-dimensional environment (e.g., 740) (e.g., with the respective content (based on a determination that the first participant does have entitlement to access the respective content) or without the respective content (e.g., based on a determination that the first participant does not have entitlement to access the respective content)), the computer system (e.g., 700, X700, 760, and/or X760) detects an event corresponding to a request by a remote participant, different from the first participant, to reposition the first virtual object (e.g., 742 at FIG. 7C) in the three-dimensional environment (e.g., 740). In response to detecting the event corresponding to the request by the remote participant to reposition the first virtual object (e.g., 742 at FIG. 7C) in the three-dimensional environment (e.g., 740), the computer system (e.g., 700 and/or HMD X700) repositions the first virtual object (e.g., 742 at FIG. 7D) in the three-dimensional environment (e.g., 740) based on the request by the remote participant. In some embodiments, other participants can move the first virtual object in the three-dimensional environment and the first virtual object is moved from the viewpoint of all participants, including the first participant. Enabling other participants to reposition the first virtual object in the three-dimensional environment (as viewed by the first participant) provides the first participant with visual feedback that the first virtual object has been moved, thereby providing improved visual feedback and allowing the first participant to be engaged with other participants in the three-dimensional environment.

In some embodiments, while the computer system (e.g., 760 and/or HMD X760) displays, via the one or more display generation components, a fourth virtual object (e.g., 762) corresponding to media content (e.g., a movie, a show, audio, and/or video) in the three-dimensional environment (e.g., 740) and wherein the fourth virtual object (e.g., 762) includes a first selectable play button (e.g., as part of controls 762B at FIG. 7H) that is configured to initiate (e.g., in response to user input activating the first selectable play button) playback of the media content, the computer system (e.g., 760 and/or HMD X760) detects, via one or more sensors (e.g., a touch-sensitive surface, a gyroscope, an accelerometer, a motion sensor, a movement sensor, an infrared sensor, a camera sensor, a depth camera, a visible light camera, an eye-tracking sensor, a gaze-tracking sensor, a physiological sensor, and/or an image sensor) of the computer system, input corresponding to activation of the first selectable play button (e.g., as part of controls 763B at FIG. 7H). In response to detecting the input corresponding to activation of the first selectable play button: in accordance with a determination that a respective participant is (or respective participants are) participating in the real-time communication session: the computer system (e.g., 760 and/or HMD X760) initiates playback of the media content (e.g., in the fourth virtual object) at the computer system (e.g., 760 and/or HMD X760) and initiates playback of the media content (e.g., in the fourth virtual object and/or in a virtual object that is at the same location in the three-dimensional environment as the fourth virtual object) at a respective computer system (e.g., 700 and/or HMD X700) of the respective participant (or at respective computer systems of the respective participants); and in accordance with a determination that the respective participant is (or the respective participants are) not participating in (e.g., have not join and/or have already left) the real-time communication session: the computer system (e.g., 760 and/or HMD X760) initiates playback of the media content (e.g., in the fourth virtual object) at the computer system (e.g., 760 and/or HMD X760) without initiating playback of the media content (e.g., in the fourth virtual object and/or in a virtual object that is at the same location in the three-dimensional environment as the fourth virtual object) at a respective computer system of the respective participant (or at respective computer systems of the respective participants). In some embodiments, the visual appearance of the first selectable play button is a first appearance (e.g., a first color and/or "play") when the first participant is the only participant of the real-time communication session and the visual appearance of the first selectable play button is a second appearance (a second color and/or "watch together") when the first participant is not the only participant of the real-time communication session. Changing the function (and, optionally, the appearance) of a selectable affordance once other participants are participating in the real-time communication session enables the participant to quickly and easily initiate playback of the content for multiple participants and optionally provides the participant with visual feedback that the selectable affordance will initiate playback for multiple participants, thereby providing improved visual feedback.

In some embodiments, while the computer system (e.g., 700 and/or HMD X700) displays, via the one or more display generation components, the first virtual object (e.g., 764 at FIG. 7G) corresponding to the respective content in the three-dimensional environment (e.g., 740) without the respective content (e.g., based on a determination that the first participant does not have entitlement (e.g., authorization from an owner of the content, permission to view, and/or rights to access) to access (e.g., to display, to watch, and/or to initiate playback of) the respective content), the computer system (e.g., 700 and/or HMD X700) detects that the first participant has obtained entitlement to access the respective content. In response to detecting that the first participant has obtained entitlement to access the respective content, the computer system (e.g., 700 and/or HMD X700) updates display, via the one or more display generation components, of the first virtual object (e.g., 764 at FIG. 7H) corresponding to the respective content in the three-dimensional environment to include display of the respective content. In some embodiments, once the first participant completes the process to obtain entitlement to access the respective content, the first virtual object updates so that the respective content is revealed to the first participant. Displaying the respective content for the first participant once the first participant has obtained entitlement to access the respective content provides the first participant with visual feedback that the first participant has obtained entitlement to access the respective content, thereby providing improved visual feedback.

In some embodiments, while displaying, via the one or more display generation components, the first virtual object (e.g., 764 at FIG. 7H) corresponding to the respective content in the three-dimensional environment with the respective content (e.g., based on a determination that the first participant does have entitlement (e.g., authorization from an owner of the content, permission to view, and/or rights to access) to access (e.g., to display, to watch, and/or to initiate playback of) the respective content), detecting a request (e.g., at FIG. 7H) from the first participant to modify (e.g., initiate playback, stop playback, change display size, and/or skip forward/backward in) the respective content (e.g., selection of a control of controls 764B). In response to detecting the request from the first participant to modify the respective content, the computer system (e.g., 700 and/or HMD X700) modifies (e.g., pauses, plays, fast forwards, and/or rewinds) the respective content based on the request from the first participant. The computer system (e.g., 700 and/or HMD X700) detects a request from a second participant (e.g., different from the first participant) to modify (e.g., initiate playback, stop playback, change display size, and/or skip forward/backward in) the respective content. In response to detecting the request from the second participant to modify the respective content, the computer system (e.g., 700 and/or HMD X700) modifies the respective content based on the request from the second participant. In some embodiments, once the respective content is shared with one or more participants of the real-time communication session, the owner/initiated of the respective content and the one or more participants with which the content has been shared can all control the content. Enabling multiple participants in the real-time communication session to control the respective content (e.g., once the respective content is playing) allows the participants to better collaborate in the three-dimensional environment, thereby providing an improved man-machine interface.

In some embodiments, aspects/operations of methods 800, 900, and 1000 may be interchanged, substituted, and/or added between these methods. For example, the techniques are applied in the same three-dimensional environment. For another example, the techniques are applied to the same objects in the three-dimensional environment. For brevity, these details are not repeated here.

FIG. 10 is a flow diagram of an exemplary method 1000 for displaying a sharing indicator that indicates that the respective content is shared with one or more other participants, in some embodiments. In some embodiments, method 1000 is performed at a computer system (e.g., computer system 101 in FIG. 1A) (e.g., a smartphone, a tablet, a watch, and/or a head-mounted device) that is in communication with one or more display generation components (e.g., display generation component 120 in FIGS. 1A, 3, and 4, 702, X702, and/or 706) (e.g., a visual output device, a display, a 3D display, a display having at least a portion that is transparent or translucent on which images can be projected (e.g., a see-through display), a projector, a heads-up display, and/or a display controller) and one or more sensors (e.g., a touch-sensitive surface, a gyroscope, an accelerometer, a motion sensor, a movement sensor, an infrared sensor, a camera sensor, a depth camera, a visible light camera, an eye-tracking sensor, a gaze-tracking sensor, a physiological sensor, and/or an image sensor). In some embodiments, method 1000 is governed by instructions that are stored in a non-transitory (or transitory) computer-readable storage medium and that are executed by one or more processors of a computer system, such as the one or more processors 202 of computer system 101 (e.g., control 110 in FIG. 1A). Some operations in method 1000 are, optionally, combined and/or the order of some operations is, optionally, changed.

During a real-time communication session, the computer system (e.g., 700, X700, 760, and/or X760) detects (1002), via the one or more sensors, a sequence of one or more inputs (e.g., voice commands, gaze, gestures, and/or air gestures) corresponding to a request to share respective content (e.g., media and/or a user interface of an application) (e.g., content of 742 at FIG. 7D) with one or more participants of the real-time communication session.

In response to detecting the sequence of one or more inputs corresponding to the request to share the respective content (e.g., content of 742 at FIG. 7D) with the one or more participants of the real-time communication session, the computer system (e.g., 700, X700, 760, and/or X760) initiates (1004) a process for sharing the respective content with the one or more participants of the real-time communication session. In some embodiments, the real-time communication session has a shared spatial arrangement in which one or more virtual objects that are visible to multiple participants have a consistent spatial relationship (e.g., in a three-dimensional environment) from the viewpoints of different participants in the real-time communication session.

While the respective content (e.g., content of 742 at FIG. 7D) is shared with the one or more participants of the real-time communication session and a representation of the respective content is displayed at a first location in a user interface (e.g., in a three-dimensional environment such as an extended reality environment), the computer system (e.g., 700, X700, 760, and/or X760) displays (1006), via the one or more display generation components, a sharing indicator (e.g., 742A, 762A, and/or 774A) that indicates that the respective content is shared with one or more other participants in the real-time communication session (the sharing indicator optionally includes information indicating a number and/or identity of one or more participants with whom the respective content is shared and/or who are currently accessing the respective content) (e.g., viewing and/or not viewing the shared content, and/or receiving and/or not receiving the shared content), wherein the sharing indicator (e.g., 742A, 762A, and/or 774A) has a respective spatial relationship to the representation (e.g., 742, 762, and/or 774) of the respective content in the user interface (e.g., three-dimensional environment 740).

The computer system (e.g., 700, X700, 760, and/or X760) detects (1008) (e.g., while displaying the sharing indicator) a request (e.g., from the user or from another participant in the real-time communication session) to move (e.g., as in FIGS. 7B1-7D) the representation (e.g., 742, 762, and/or 774) of the respective content to a different location in the user interface (e.g., 740) (e.g., to a location in the user interface that is different from the first location).

In response to detecting the request to move the representation (e.g., 742, 762, and/or 774) of the respective content to the different location in the user interface, the computer system (e.g., 700, X700, 760, and/or X760) displays (1010), via the one or more display generation components, the representation (e.g., 742 in FIGS. 7B1-7D) of the respective content at a second location in the user interface that is different from the first location in the user interface and displays, via the one or more display generation components, the sharing indicator (e.g., 742A) with the respective spatial relationship to the representation of the respective content in the user interface (e.g., concurrently displaying and moving the representation of the respective content with the sharing indicator). Displaying a sharing indicator that indicates that the respective content is shared with one or more other participants in the real-time communication session and moving the sharing indicator along with the respective content provides the user with visual feedback that the content (and, more specifically, which content) is currently being shared with other participants, thereby providing the user with improved visual feedback.

In some embodiments, the computer system (e.g., 700, X700, 760, and/or X760) displays the sharing indicator (e.g., 742, 762, and/or 774) includes displaying an indication (e.g., "User 1 and 3" of 742A at FIG. 7D) of identities of one or more participants in the real-time communication session authorized to manipulate (e.g., move and/or resize) the representation of the respective content. In some embodiments, the sharing indicator includes indications of identities of all participants that are authorized to manipulate the representation of the respective content. In some embodiments, the sharing indicator includes indications of identities of a subset of participants that are authorized (less than all that are authorized) to manipulate the representation of the respective content. Displaying indications of identities of participants authorized to manipulate the window provides the participant with feedback about who can manipulate the window, thereby providing improved visual feedback.

In some embodiments, while the respective content is shared with the one or more participants of the real-time communication session, the computer system (e.g., 700, X700, 760, and/or X760) detects a second request from a respective participant of the one or more participants of the real-time communication session (e.g., different from the user of the computer system) to manipulate (e.g., move and/or resize) the representation of the respective content. In response to detecting the second request from the respective participant to manipulate the representation of the respective content, the computer system (e.g., 700, X700, 760, and/or X760) manipulates (moving and/or resizing) the representation (e.g., 742, 762, and/or 774) of the respective content based on the second request. Enabling other participants to manipulate a shared window enables those participants to manipulate the shared window to better suit their needs, thereby providing an improved man-machine interface.

In some embodiments, while second respective content is not shared with participants of the real-time communication session and a representation (e.g., 742 at FIG. 7B1 and/or 742 at FIG. 7B2) of the second respective content is displayed in the user interface, the computer system (e.g., 700, X700, 760, and/or X760) displays, via the one or more display generation components, a second sharing indicator (e.g., 742A) that indicates that the second respective content is not shared (e.g., "not shared" in 742A) with participants in the real-time communication session. In some embodiments, the computer system displays an indication for private content that indicates that the private content is not being shared with other participants of the real-time communication session. Displaying a sharing indicator for private windows (that have not been shared) provides the participant with visual feedback about the status of the windows (that they are private), thereby providing improved visual feedback.

In some embodiments, the computer system (e.g., 700, X700, 760, and/or X760) detects, via the one or more sensors, a second sequence of one or more inputs (e.g., voice command, touch input, gaze input, and/or air gestures) corresponding to selection of the sharing indicator. In response to detecting the second sequences of one or more inputs corresponding to selection of the sharing indicator, the computer system (e.g., 700, X700, 760, and/or X760) initiates a process (e.g., including display of "stop sharing" or "stop sharing" options in 742 at FIGS. 7H-7I2) to change whether the respective content is shared with the one or more other participants in the real-time communication session. Initiating a process to change whether the window is shared provides the participant with the ability to change the share status of a window, thereby providing the participant with improved privacy and security.

In some embodiments, the process to change whether the respective content is shared with the one or more other participants in the real-time communication session includes displaying, via the one or more display generation components, indications (e.g., "user 1 and 3" in 742 at FIGS. 7H-7I2) (e.g., names and/or images) of identities of the one or more participants of (e.g., all participants of or less than all participants of) the real-time communication session. Displaying indications of identities of participants of the real-time communication session provides the participant with feedback about who will be able to view shared windows, thereby providing improved visual feedback and increasing the security of the system.

In some embodiments, the process to change whether the respective content is shared with the one or more other participants in the real-time communication session includes: in accordance with a determination that the respective content is not shared with the one or more participants of the real-time communication session, displaying, via the one or more display generation components, an option (e.g., "start sharing" option in 742 of FIG. 7I1 and/or FIG. 7I2) to initiate the process for sharing the respective content with the one or more participants of the real-time communication session (e.g., without or without displaying an option to cease sharing the respective content with participants of the real-time communication session). In some embodiments, the computer system (e.g., 700, X700, 760, and/or X760) detects, via one or more sensors (e.g., a touch-sensitive surface, a gyroscope, an accelerometer, a motion sensor, a movement sensor, an infrared sensor, a camera sensor, a depth camera, a visible light camera, an eye-tracking sensor, a gaze-tracking sensor, a physiological sensor, and/or an image sensor) of the computer system, input corresponding to activation of the option (e.g., "start sharing" option in 742 of FIG. 7I1 and/or FIG. 7I2) to initiate the process for sharing the respective content with the one or more participants of the real-time communication session. In response to detecting the input corresponding to activation of the option (e.g., "start sharing" option in 742 of FIG. 7I1 and/or FIG. 7I2) to initiate the process for sharing the respective content with the one or more participants of the real-time communication session, the computer system (e.g., 700, X700, 760, and/or X760) initiates the process for sharing the respective content with the one or more participants of the real-time communication session. Providing an option to start sharing a window when the window is private (not shared) provides the participant with the option to share content with other participants of the real-time communication session and provides feedback to the participant that the window is not shared, thereby providing improved visual feedback.

In some embodiments, the process to change whether the respective content is shared with the one or more other participants in the real-time communication session includes: in accordance with a determination that the respective content is shared with the one or more participants of the real-time communication session, displaying, via the one or more display generation components, an option (e.g., "stop sharing" option in 752D of FIG. 7I1 and/or FIG. 7I2) to cease sharing the respective content with the one or more participants of the real-time communication session (e.g., without or without an option to initiate the process to share the respective content with more participants of the real-time communication session). The computer system (e.g., 700, X700, 760, and/or X760) detects, via one or more sensors (e.g., a touch-sensitive surface, a gyroscope, an accelerometer, a motion sensor, a movement sensor, an infrared sensor, a camera sensor, a depth camera, a visible light camera, an eye-tracking sensor, a gaze-tracking sensor, a physiological sensor, and/or an image sensor) of the computer system, input corresponding to activation of the option (e.g., "stop sharing" option in 752D of FIG. 7I1 and/or FIG. 7I2) to cease sharing the respective content with the one or more participants of the real-time communication session. In response to detecting the input corresponding to activation of the option (e.g., "stop sharing" option in 752D of FIG. 7I1 and/or FIG. 7I2) to initiate the process for sharing the respective content with the one or more participants of the real-time communication session, ceasing sharing the respective content with the one or more participants of the real-time communication session. Providing an option to stop sharing a window when the window is shared provides feedback to the participant that the window is being shared, thereby providing improved visual feedback.

In some embodiments, the user interface is an extended reality environment (e.g., in a three-dimensional environment, such as 940). Enabling the sharing of windows in an extended reality environment enables participants of the extended reality environment to better collaborate, thereby improving the man-machine interface.

In some embodiments, displaying the sharing indicator includes displaying information indicating identities of participants of the real-time communication session with whom the respective content has been shared (e.g., as in 752D in FIG. 7I1 and/or FIG. 7I2 indicating "invited") but have not accepted to access (e.g., view and or listen to) the respective content. In some embodiments, when a participant shares content with other participants, the other participants receive invitations to access the shared content and can, optionally, accept or decline the invitation. In some embodiments, in response to a determination that one or more respective participants of the real-time communication session have accepted to access the respective content, updating the sharing indicator to indicate that the one or more respective participants have accepted to access the respective content (e.g., by displaying information indicating identities of those participants who have accepted to access the respective content). In some embodiments, in response to a determination that one or more respective participants of the real-time communication session have declined to access the respective content, updating the sharing indicator to indicate that the one or more respective participants have declined to access the respective content (e.g., by removing the information indicating the identities of those participants who have declined to access the respective content). Displaying the identities of participants with whom the window has been shared, but have not accepted access to the window provides the participant with visual feedback about who is not accessing the window, thereby providing improved visual feedback.

In some embodiments, during the real-time communication session, the computer system (e.g., 700, X700, 760, and/or X760) displays, via the one or more display generation components, a representation of third respective content in the user interface, including: in accordance with a determination that the third respective content is authorized to be shared with participants of the real-time communication session, displaying the representation of the third respective content with a first background (e.g., white, green, or blue); and in accordance with a determination that the third respective content is not authorized to be shared with participants of the real-time communication session, displaying the representation of the third respective content with a second background (e.g., black or gray) that is different from the first background. Displaying different backgrounds based on whether the content can be shared provides with used with visual feedback about which contents can (and cannot) be shared, thereby providing improved visual feedback.

In some embodiments, the computer system (e.g., 700, X700, 760, and/or X760) ceases to participate in the real-time communication session (e.g., based on received user input and/or based on the real-time communication session ending). In response to ceasing to participate in the real-time communication session, the computer system (e.g., 700, X700, 760, and/or X760) ceases display of the sharing indicator (e.g., 742A, 762A, and/or 774A) that indicates whether the respective content is shared with one or more other participants in the real-time communication session. Ceasing to display the sharing indicator for a participant's windows when that participant leaves the real-time communication session provides the participant with feedback that the windows are not being shared (and cannot be shared), thereby providing improved visual feedback.

In some embodiments, after (e.g., in conjunction with or in response to) ceasing to participate in the real-time communication session, the computer system (e.g., 700, X700, 760, and/or X760) ceases display of a second sharing indicator (e.g., 742A, 762A, and/or 774A) (e.g., that was being displayed immediately before the computer system ceased participating in the real-time communication session) that indicates whether second respective content is shared with one or more other participants in the real-time communication session. Ceasing to display the sharing indicator for a participant's windows when that participant leaves the real-time communication session provides the participant with feedback that the windows are not being shared (and cannot be shared), thereby providing improved visual feedback.

In some embodiments, the computer system (e.g., 700, X700, 760, and/or X760) ceases display of the sharing indicator (e.g., 742A, 762A, and/or 774A) that indicates whether the respective content is shared with one or more other participants in the real-time communication session includes ceasing displaying of the sharing indicator that indicates that the respective content is shared with one or more other participants in the real-time communication session. The computer system (e.g., 700, X700, 760, and/or X760) ceases display of the second sharing indicator (e.g., 742A, 762A, and/or 774A) that indicates whether the second respective content is shared with one or more other participants in the real-time communication session includes ceasing displaying of the second sharing indicator that indicates that the respective content is not shared with one or more other participants in the real-time communication session. In some embodiments, sharing indicators cease to be displayed when participation in the real-time communication session ends independent of whether the sharing indicators indicate the content is or is not being shared. Ceasing to display the sharing indicator for a participant's windows when that participant leaves the real-time communication session provides the participant with feedback that the windows are not being shared (and cannot be shared), thereby providing improved visual feedback.

In some embodiments, the computer system (e.g., 700, X700, 760, and/or X760) displays, via the one or more display generation components and concurrently with the sharing indicator (e.g., 742A, 762A, and/or 774A), a second sharing indicator (e.g., 742A, 762A, and/or 774A) that indicates whether second respective content is shared with participants in the real-time communication session, wherein the second sharing indicator has a respective spatial relationship to the representation of the second respective content (e.g., of 742, 762, and/or 774) in the user interface (e.g., 740). In some embodiments, the second sharing indicator includes the same/similar information as the first sharing indicator and has one or more (e.g., some or all) of the same properties and/or features of the first sharing indicator (e.g., displaying an indication of identities of one or more participants in the real-time communication session authorized to manipulate (e.g., move and/or resize) the representation of the second respective content, enabling other participants to manipulate (moving and/or resizing) the representation of the respective second content once the respective second content is shared, initiating a process (in response to detecting selection of the second sharing indicator) to change whether the second respective content is shared with the one or more other participants in the real-time communication session, and/or displaying information indicating identities of participants of the real-time communication session with whom the second respective content has been shared but have not accepted to access (e.g., view and or listen to) the second respective content). In some embodiments, because different content can be separately shared (e.g., respective content shared and second respective content not shared, or respective content not shared and second respective content shared), the sharing indicator and the second sharing indicator indicate the sharing states of their respective contents (e.g., optionally indicate the different sharing states of their respective contents). Concurrently displaying sharing indicators for multiple windows provides the user with feedback about the sharing status of the windows, which enables the user to quickly figure out which windows are shared with other users and which windows are not shared with other users, thereby providing improved privacy, improved information security, and improved visual feedback. In some embodiments, the computer system detects (e.g., while displaying the sharing indicator) a request (e.g., from the user or from another participant in the real-time communication session) to move the representation of the second respective content to a different location in the user interface and in response to detecting the request to move the representation of the second respective content to the different location in the user interface, the computer system displays the representation of the second respective content at a different location in the user interface and displays the second sharing indicator with the respective spatial relationship to the representation of the second respective content in the user interface (e.g., concurrently displaying and moving the representation of the second respective content with the second sharing indicator).

In some embodiments, aspects/operations of methods 800, 900, and 1000 may be interchanged, substituted, and/or added between these methods. For example, the techniques are applied in the same three-dimensional environment. For another example, the techniques are applied to the same objects in the three-dimensional environment. For brevity, these details are not repeated here.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

As described above, one aspect of the present technology is the gathering and use of data available from various sources to improve XR experiences of users. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to improve an XR experience of a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of XR experiences, the present technology can be configured to allow users to select to "opt in" or "opt out" of participation in the collection of personal information data during registration for services or anytime thereafter. In another example, users can select not to provide data for customization of services. In yet another example, users can select to limit the length of time data is maintained or entirely prohibit the development of a customized service. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, an XR experience can generated by inferring preferences based on non-personal information data or a bare minimum amount of personal information, such as the content being requested by the device associated with a user, other non-personal information available to the service, or publicly available information.

What is claimed is:

1. A computer system configured to communicate with one or more display generation components, the computer system comprising:

one or more processors; and memory storing one or more programs configured to be executed by the one or more processors, the one or more programs including instructions for:

in response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including:

in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content;

while displaying, via the one or more display generation components the first virtual object, detecting, via the one or more sensors of the computer system, an input from the first participant corresponding to a request to reposition the first virtual object in the three-dimensional environment; and in response to detecting the input from the first participant corresponding to a request to reposition the first virtual object in the three-dimensional environment:

in accordance with the determination that the first participant in the real-time communication session has entitlement to access the respective content, repositioning the first virtual object in the three-dimensional environment based on the input corresponding to the request to reposition the first virtual object in the three-dimensional environment; and in accordance with the determination that the first participant does not have entitlement to access the respective content, forgoing repositioning the first virtual object in the three-dimensional environment.

2. The computer system of claim 1, wherein the respective content is selected by a second participant in the real-time communication session, different from the first participant in the real-time communication session, wherein the second participant corresponds to a remote user that is different from a user of the computer system.

3. The computer system of claim 1, wherein displaying, via the one or more display generation components, the first virtual object corresponding to the respective content in the three-dimensional environment further includes:

in accordance with the determination that the first participant does not have entitlement to access the respective content, the first virtual object that corresponds to the respective content and indicates the spatial location of the respective content in the respective spatial arrangement for the first participant includes instructions to obtain entitlement to access the respective content.

4. The computer system of claim 1:

wherein displaying, via the one or more display generation components, the first virtual object corresponding to the respective content in the three-dimensional environment further includes:

in accordance with the determination that the first participant does not have entitlement to access the respective content, the first virtual object that corresponds to the respective content and indicates the spatial location of the respective content in the respective spatial arrangement for the first participant includes a selectable user interface object to initiate a process to obtain entitlement to access the respective content; and the one or more programs further including instructions for:

detecting selection of the selectable user interface object; and in response to detecting selection of the selectable user interface object, initiating the process to obtain entitlement to access the respective content.

5. The computer system of claim 4, wherein the process to obtain entitlement to access the respective content includes a process to purchase access to the respective content.

6. The computer system of claim 4, wherein the process to obtain entitlement to access the respective content includes a process to purchase a subscription to access the respective content.

7. The computer system of claim 4, wherein the process to obtain entitlement to access the respective content includes a process to download an application.

8. The computer system of claim 4, wherein initiating the process to obtain entitlement to access the respective content includes:

displaying, via the one or more display generation components, a second virtual object, different from the first virtual object, for obtaining entitlement to the respective content.

9. The computer system of claim 1, the one or more programs further including instructions for:

while displaying, via the one or more display generation components, a third virtual object corresponding to private content of a participant in the three-dimensional environment, detecting, via one or more sensors of the computer system, input corresponding to a request to reposition the third virtual object in the three-dimensional environment; and in response to detecting input corresponding to the request to reposition the third virtual object in the three-dimensional environment, forgoing repositioning the third virtual object in the three-dimensional environment.

10. The computer system of claim 1, the one or more programs further including instructions for:

while displaying, via the one or more display generation components, the first virtual object corresponding to the respective content in the three-dimensional environment, detecting an event corresponding to a request by a remote participant, different from the first participant, to reposition the first virtual object in the three-dimensional environment; and in response to detecting the event corresponding to the request by the remote participant to reposition the first virtual object in the three-dimensional environment, repositioning the first virtual object in the three-dimensional environment based on the request by the remote participant.

11. The computer system of claim 1, the one or more programs further including instructions for:

while displaying, via the one or more display generation components, a fourth virtual object corresponding to media content in the three-dimensional environment and wherein the fourth virtual object includes a first selectable play button that is configured to initiate playback of the media content, detecting, via one or more sensors of the computer system, input corresponding to activation of the first selectable play button; and in response to detecting the input corresponding to activation of the first selectable play button:

in accordance with a determination that a respective participant is participating in the real-time communication session:

initiating playback of the media content at the computer system; and initiating playback of the media content at a respective computer system of the respective participant; and in accordance with a determination that the respective participant is not participating in the real-time communication session:

initiating playback of the media content at the computer system without initiating playback of the media content at a respective computer system of the respective participant.

12. The computer system of claim 1, the one or more programs further including instructions for:

while displaying, via the one or more display generation components, the first virtual object corresponding to the respective content in the three-dimensional environment without the respective content, detecting that the first participant has obtained entitlement to access the respective content; and in response to detecting that the first participant has obtained entitlement to access the respective content, updating display, via the one or more display generation components, of the first virtual object corresponding to the respective content in the three-dimensional environment to include display of the respective content.

13. The computer system of claim 1, the one or more programs further including instructions for:

while displaying, via the one or more display generation components, the first virtual object corresponding to the respective content in the three-dimensional environment with the respective content:

detecting a request from the first participant to modify the respective content;

in response to detecting the request from the first participant to modify the respective content, modifying the respective content based on the request from the first participant;

detecting a request from a second participant to modify the respective content; and in response to detecting the request from the second participant to modify the respective content, modifying the respective content based on the request from the second participant.

14. The computer system of claim 1, the one or more programs further including instructions for:

in accordance with the determination that the first participant does not have entitlement to access the respective content, the first virtual object that corresponds to the respective content and indicates the spatial location of the respective content in the respective spatial arrangement for the first participant includes an indication of a participant with whom the content is shared.

15. The computer system of claim 8, the one or more programs further including instructions for:

after displaying, via the one or more display generation components, the second virtual object, different from the first virtual object, for obtaining entitlement to the respective content:

detecting, via the one or more sensors of the computer system, an input entering credentials to gain access to the respective content;

in response to detecting the input and in accordance with the credentials grant access to the respective content:

ceasing to display, via the one or more display generation components, the second virtual object; and causing the first virtual object that corresponds to the respective content and indicates the spatial location of the respective content in the respective spatial arrangement for the first participant to include at least the portion of the respective content.

16. A non-transitory computer-readable storage medium storing one or more programs configured to be executed by one or more processors of a computer system that is in communication with one or more display generation components, the one or more programs including instructions for:

in response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including:

in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content;

while displaying, via the one or more display generation components, the first virtual object, detecting, via the one or more sensors of the computer system, an input from the first participant corresponding to a request to reposition the first virtual object in the three-dimensional environment; and in response to detecting the input from the first participant corresponding to a request to reposition the first virtual object in the three-dimensional environment:

in accordance with the determination that the first participant in the real-time communication session has entitlement to access the respective content, repositioning the first virtual object in the three-dimensional environment based on the input corresponding to the request to reposition the first virtual object in the three-dimensional environment; and in accordance with the determination that the first participant does not have entitlement to access the respective content, forgoing repositioning the first virtual object in the three-dimensional environment.

17. The non-transitory computer-readable storage medium of claim 16, wherein the respective content is selected by a second participant in the real-time communication session, different from the first participant in the real-time communication session, wherein the second participant corresponds to a remote user that is different from a user of the computer system.

18. The non-transitory computer-readable storage medium of claim 16, wherein displaying, via the one or more display generation components, the first virtual object corresponding to the respective content in the three-dimensional environment further includes:

in accordance with the determination that the first participant does not have entitlement to access the respective content, the first virtual object that corresponds to the respective content and indicates the spatial location of the respective content in the respective spatial arrangement for the first participant includes instructions to obtain entitlement to access the respective content.

19. The non-transitory computer-readable storage medium of claim 16:

wherein displaying, via the one or more display generation components, the first virtual object corresponding to the respective content in the three-dimensional environment further includes:

in accordance with the determination that the first participant does not have entitlement to access the respective content, the first virtual object that corresponds to the respective content and indicates the spatial location of the respective content in the respective spatial arrangement for the first participant includes a selectable user interface object to initiate a process to obtain entitlement to access the respective content; and the one or more programs further including instructions for:

detecting selection of the selectable user interface object; and in response to detecting selection of the selectable user interface object, initiating the process to obtain entitlement to access the respective content.

20. The non-transitory computer-readable storage medium of claim 19, wherein the process to obtain entitlement to access the respective content includes a process to purchase access to the respective content.

21. The non-transitory computer-readable storage medium of claim 19, wherein the process to obtain entitlement to access the respective content includes a process to purchase a subscription to access the respective content.

22. The non-transitory computer-readable storage medium of claim 19, wherein the process to obtain entitlement to access the respective content includes a process to download an application.

23. The non-transitory computer-readable storage medium of claim 19, wherein initiating the process to obtain entitlement to access the respective content includes:

displaying, via the one or more display generation components, a second virtual object, different from the first virtual object, for obtaining entitlement to the respective content.

24. The non-transitory computer-readable storage medium of claim 16, the one or more programs further including instructions for:

while displaying, via the one or more display generation components, a third virtual object corresponding to private content of a participant in the three-dimensional environment, detecting, via one or more sensors of the computer system, input corresponding to a request to reposition the third virtual object in the three-dimensional environment; and in response to detecting input corresponding to the request to reposition the third virtual object in the three-dimensional environment, forgoing repositioning the third virtual object in the three-dimensional environment.

25. The non-transitory computer-readable storage medium of claim 16, the one or more programs further including instructions for:

while displaying, via the one or more display generation components, the first virtual object corresponding to the respective content in the three-dimensional environment, detecting an event corresponding to a request by a remote participant, different from the first participant, to reposition the first virtual object in the three-dimensional environment; and in response to detecting the event corresponding to the request by the remote participant to reposition the first virtual object in the three-dimensional environment, repositioning the first virtual object in the three-dimensional environment based on the request by the remote participant.

26. The non-transitory computer-readable storage medium of claim 16, the one or more programs further including instructions for:

while displaying, via the one or more display generation components, a fourth virtual object corresponding to media content in the three-dimensional environment and wherein the fourth virtual object includes a first selectable play button that is configured to initiate playback of the media content, detecting, via one or more sensors of the computer system, input corresponding to activation of the first selectable play button; and in response to detecting the input corresponding to activation of the first selectable play button:

in accordance with a determination that a respective participant is participating in the real-time communication session:

initiating playback of the media content at the computer system; and initiating playback of the media content at a respective computer system of the respective participant; and in accordance with a determination that the respective participant is not participating in the real-time communication session:

initiating playback of the media content at the computer system without initiating playback of the media content at a respective computer system of the respective participant.

27. The non-transitory computer-readable storage medium of claim 16, the one or more programs further including instructions for:

while displaying, via the one or more display generation components, the first virtual object corresponding to the respective content in the three-dimensional environment without the respective content, detecting that the first participant has obtained entitlement to access the respective content; and in response to detecting that the first participant has obtained entitlement to access the respective content, updating display, via the one or more display generation components, of the first virtual object corresponding to the respective content in the three-dimensional environment to include display of the respective content.

28. The non-transitory computer-readable storage medium of claim 16, the one or more programs further including instructions for:

while displaying, via the one or more display generation components, the first virtual object corresponding to the respective content in the three-dimensional environment with the respective content:

detecting a request from the first participant to modify the respective content;

in response to detecting the request from the first participant to modify the respective content, modifying the respective content based on the request from the first participant;

detecting a request from a second participant to modify the respective content; and in response to detecting the request from the second participant to modify the respective content, modifying the respective content based on the request from the second participant.

29. The non-transitory computer-readable storage medium of claim 16, the one or more programs further including instructions for:

in accordance with the determination that the first participant does not have entitlement to access the respective content, the first virtual object that corresponds to the respective content and indicates the spatial location of the respective content in the respective spatial arrangement for the first participant includes an indication of a participant with whom the content is shared.

30. The non-transitory computer-readable storage medium of claim 23, the one or more programs further including instructions for:

after displaying, via the one or more display generation components, the second virtual object, different from the first virtual object, for obtaining entitlement to the respective content:

detecting, via the one or more sensors of the computer system, an input entering credentials to gain access to the respective content;

in response to detecting the input and in accordance with the credentials grant access to the respective content:

ceasing to display, via the one or more display generation components, the second virtual object; and causing the first virtual object that corresponds to the respective content and indicates the spatial location of the respective content in the respective spatial arrangement for the first participant to include at least the portion of the respective content.

31. A method, comprising:

at a computer system that is in communication with one or more display generation components:

in response to respective content being selected, during a real-time communication session that occurs in a three-dimensional environment, displaying, via the one or more display generation components, a first virtual object corresponding to the respective content in the three-dimensional environment, wherein the first virtual object has a position in the three-dimensional environment that indicates a spatial location of the respective content in a respective spatial arrangement of virtual objects in the three-dimensional environment, including:

in accordance with a determination that a first participant in the real-time communication session has entitlement to access the respective content, the first virtual object that corresponds to the respective content and indicates the spatial location of the respective content in the respective spatial arrangement for the first participant includes at least a portion of the respective content; and in accordance with a determination that the first participant does not have entitlement to access the respective content, the first virtual object that corresponds to the respective content and indicates the spatial location of the respective content in the respective spatial arrangement for the first participant does not include the respective content;

while displaying, via the one or more display generation components, the first virtual object, detecting, via the one or more sensors of the computer system, an input from the first participant corresponding to a request to reposition the first virtual object in the three-dimensional environment; and in response to detecting the input from the first participant corresponding to a request to reposition the first virtual object in the three-dimensional environment:

in accordance with the determination that the first participant in the real-time communication session has entitlement to access the respective content, repositioning the first virtual object in the three-dimensional environment based on the input corresponding to the request to reposition the first virtual object in the three-dimensional environment; and in accordance with the determination that the first participant does not have entitlement to access the respective content, forgoing repositioning the first virtual object in the three-dimensional environment.

32. The method of claim 31, wherein the respective content is selected by a second participant in the real-time communication session, different from the first participant in the real-time communication session, wherein the second participant corresponds to a remote user that is different from a user of the computer system.

33. The method of claim 31, wherein displaying, via the one or more display generation components, the first virtual object corresponding to the respective content in the three-dimensional environment further includes:

in accordance with the determination that the first participant does not have entitlement to access the respective content, the first virtual object that corresponds to the respective content and indicates the spatial location of the respective content in the respective spatial arrangement for the first participant includes instructions to obtain entitlement to access the respective content.

34. The method of claim 16:

wherein displaying, via the one or more display generation components, the first virtual object corresponding to the respective content in the three-dimensional environment further includes:

in accordance with the determination that the first participant does not have entitlement to access the respective content, the first virtual object that corresponds to the respective content and indicates the spatial location of the respective content in the respective spatial arrangement for the first participant includes a selectable user interface object to initiate a process to obtain entitlement to access the respective content; and the method further comprising:

detecting selection of the selectable user interface object; and in response to detecting selection of the selectable user interface object, initiating the process to obtain entitlement to access the respective content.

35. The method of claim 34, wherein the process to obtain entitlement to access the respective content includes a process to purchase access to the respective content.

36. The method of claim 34, wherein the process to obtain entitlement to access the respective content includes a process to purchase a subscription to access the respective content.

37. The method of claim 34, wherein the process to obtain entitlement to access the respective content includes a process to download an application.

38. The method of claim 34, wherein initiating the process to obtain entitlement to access the respective content includes:

displaying, via the one or more display generation components, a second virtual object, different from the first virtual object, for obtaining entitlement to the respective content.

39. The method of claim 31, further comprising:

while displaying, via the one or more display generation components, a third virtual object corresponding to private content of a participant in the three-dimensional environment, detecting, via one or more sensors of the computer system, input corresponding to a request to reposition the third virtual object in the three-dimensional environment; and in response to detecting input corresponding to the request to reposition the third virtual object in the three-dimensional environment, forgoing repositioning the third virtual object in the three-dimensional environment.

40. The method of claim 31, further comprising:

while displaying, via the one or more display generation components, the first virtual object corresponding to the respective content in the three-dimensional environment, detecting an event corresponding to a request by a remote participant, different from the first participant, to reposition the first virtual object in the three-dimensional environment; and in response to detecting the event corresponding to the request by the remote participant to reposition the first virtual object in the three-dimensional environment, repositioning the first virtual object in the three-dimensional environment based on the request by the remote participant.

41. The method of claim 31, further comprising:

while displaying, via the one or more display generation components, a fourth virtual object corresponding to media content in the three-dimensional environment and wherein the fourth virtual object includes a first selectable play button that is configured to initiate playback of the media content, detecting, via one or more sensors of the computer system, input corresponding to activation of the first selectable play button; and in response to detecting the input corresponding to activation of the first selectable play button:

in accordance with a determination that a respective participant is participating in the real-time communication session:

initiating playback of the media content at the computer system; and initiating playback of the media content at a respective computer system of the respective participant; and in accordance with a determination that the respective participant is not participating in the real-time communication session:

initiating playback of the media content at the computer system without initiating playback of the media content at a respective computer system of the respective participant.

42. The method of claim 31, further comprising:

while displaying, via the one or more display generation components, the first virtual object corresponding to the respective content in the three-dimensional environment without the respective content, detecting that the first participant has obtained entitlement to access the respective content; and in response to detecting that the first participant has obtained entitlement to access the respective content, updating display, via the one or more display generation components, of the first virtual object corresponding to the respective content in the three-dimensional environment to include display of the respective content.

43. The method of claim 31, further comprising:

while displaying, via the one or more display generation components, the first virtual object corresponding to the respective content in the three-dimensional environment with the respective content:

detecting a request from the first participant to modify the respective content;

in response to detecting the request from the first participant to modify the respective content, modifying the respective content based on the request from the first participant;

detecting a request from a second participant to modify the respective content; and in response to detecting the request from the second participant to modify the respective content, modifying the respective content based on the request from the second participant.

44. The method of claim 31, further comprising:

in accordance with the determination that the first participant does not have entitlement to access the respective content, the first virtual object that corresponds to the respective content and indicates the spatial location of the respective content in the respective spatial arrangement for the first participant includes an indication of a participant with whom the content is shared.

45. The method of claim 38, further comprising:

after displaying, via the one or more display generation
    components, the second virtual object, different from
    the first virtual object, for obtaining entitlement to the
    respective content:

detecting, via the one or more sensors of the computer
        system, an input entering credentials to gain access
        to the respective content;

in response to detecting the input and in accordance
        with the credentials grant access to the respective
        content:

ceasing to display, via the one or more display
            generation components, the second virtual object;
            and causing the first virtual object that corresponds to the
            respective content and indicates the spatial loca-
            tion of the respective content in the respective
            spatial arrangement for the first participant to
            include at least the portion of the respective con-
            tent.

\*   \*   \*   \*   \*